(12) United States Patent
Bronicki

(10) Patent No.: US 11,475,742 B2
(45) Date of Patent: Oct. 18, 2022

(54) VISUAL INDICATOR OF FRICTIONLESS STATUS OF SHOPPERS

(71) Applicant: TRAX TECHNOLOGY SOLUTIONS PTE LTD., Singapore (SG)

(72) Inventor: Youval Bronicki, Los Altos, CA (US)

(73) Assignee: Trax Technology Solutions Pte Ltd., Singapore (SG)

( * ) Notice: Subject to any disclaimer, the term of this patent is extended or adjusted under 35 U.S.C. 154(b) by 0 days.

(21) Appl. No.: 17/562,225

(22) Filed: Dec. 27, 2021

(65) Prior Publication Data
US 2022/0122131 A1 Apr. 21, 2022

Related U.S. Application Data

(63) Continuation of application No. PCT/US2021/054489, filed on Oct. 12, 2021.
(Continued)

(51) Int. Cl.
*G07G 1/00* (2006.01)
*G06Q 30/06* (2012.01)
(Continued)

(52) U.S. Cl.
CPC ......... *G07G 1/0063* (2013.01); *G06Q 20/145* (2013.01); *G06Q 20/204* (2013.01);
(Continued)

(58) Field of Classification Search
USPC ....................................................... 705/346
See application file for complete search history.

(56) References Cited

U.S. PATENT DOCUMENTS

| 2015/0012396 A1 | 1/2015 | Puerini et al. |
| 2015/0039458 A1 | 2/2015 | Reid |

(Continued)

FOREIGN PATENT DOCUMENTS

| WO | WO 2018/002709 A2 | 1/2018 |
| WO | WO 2019/048924 A1 | 3/2019 |
| WO | WO 2019/140091 A1 | 7/2019 |

OTHER PUBLICATIONS

Partial Search Report and Accompanying Opinion, dated Jan. 31, 2022, issued by the International Searching Authority in International Patent Application No. PCT/US2021/054489 (13 pages).

*Primary Examiner* — Allyson N Trail
(74) *Attorney, Agent, or Firm* — Finnegan, Henderson, Farabow, Garrett & Dunner LLP

(57) ABSTRACT

A system for determining whether shoppers are eligible for frictionless checkout is disclosed. The system has a processor that obtains image data captured using image sensors positioned in a retail store. The processor analyzes the image data to identify at least one shopper at one or more locations of the retail store. The processor detects, based on the analysis of the image data, at least one product interaction event associated with an action of the at least one shopper at the one or more locations of the retail store. Further, based on the detected at least one product interaction event, the processor determines whether the at least one shopper is eligible for frictionless checkout. In response to a determination that the at least one shopper is ineligible for frictionless checkout, the processor causes delivery of an indicator that the at least one shopper is ineligible for frictionless checkout.

21 Claims, 68 Drawing Sheets

Related U.S. Application Data

(60) Provisional application No. 63/113,490, filed on Nov. 13, 2020, provisional application No. 63/091,009, filed on Oct. 13, 2020.

(51) Int. Cl.

| | | |
|---|---|---|
| *G06V 20/40* | (2022.01) | |
| *G06V 20/52* | (2022.01) | |
| *G06V 40/10* | (2022.01) | |
| *G06Q 20/20* | (2012.01) | |
| *G06V 10/764* | (2022.01) | |
| *G06Q 30/02* | (2012.01) | |
| *G06Q 20/40* | (2012.01) | |
| *G06V 40/16* | (2022.01) | |
| *G06Q 20/14* | (2012.01) | |
| *G06V 40/20* | (2022.01) | |
| *G01G 19/414* | (2006.01) | |
| *G01G 19/52* | (2006.01) | |
| *G08B 5/36* | (2006.01) | |

(52) U.S. Cl.
CPC ....... *G06Q 20/208* (2013.01); *G06Q 20/4016* (2013.01); *G06Q 20/40145* (2013.01); *G06Q 30/0281* (2013.01); *G06Q 30/0609* (2013.01); *G06Q 30/0613* (2013.01); *G06Q 30/0617* (2013.01); *G06Q 30/0623* (2013.01); *G06Q 30/0633* (2013.01); *G06Q 30/0635* (2013.01); *G06Q 30/0639* (2013.01); *G06V 10/764* (2022.01); *G06V 10/765* (2022.01); *G06V 20/44* (2022.01); *G06V 20/52* (2022.01); *G06V 40/103* (2022.01); *G06V 40/172* (2022.01); *G06V 40/20* (2022.01); *G01G 19/4144* (2013.01); *G01G 19/52* (2013.01); *G08B 5/36* (2013.01)

(56) References Cited

U.S. PATENT DOCUMENTS

| | | | |
|---|---|---|---|
| 2018/0232796 | A1 | 8/2018 | Glaser et al. |
| 2021/0027360 | A1* | 1/2021 | Shmueli ................. G06F 1/163 |
| 2021/0056580 | A1* | 2/2021 | Walker ............... G06Q 30/0234 |
| 2021/0177163 | A1* | 6/2021 | Cohn ................... B62B 3/1428 |
| 2021/0287013 | A1* | 9/2021 | Carter ................. G06K 9/6267 |
| 2021/0319420 | A1* | 10/2021 | Yu ........................ G06Q 20/322 |
| 2021/0342812 | A1* | 11/2021 | Hagen ............... G06Q 30/0641 |
| 2022/0005327 | A1* | 1/2022 | Cleper ................. G06K 7/1417 |
| 2022/0067390 | A1* | 3/2022 | Khalili ................ G06V 40/168 |

* cited by examiner

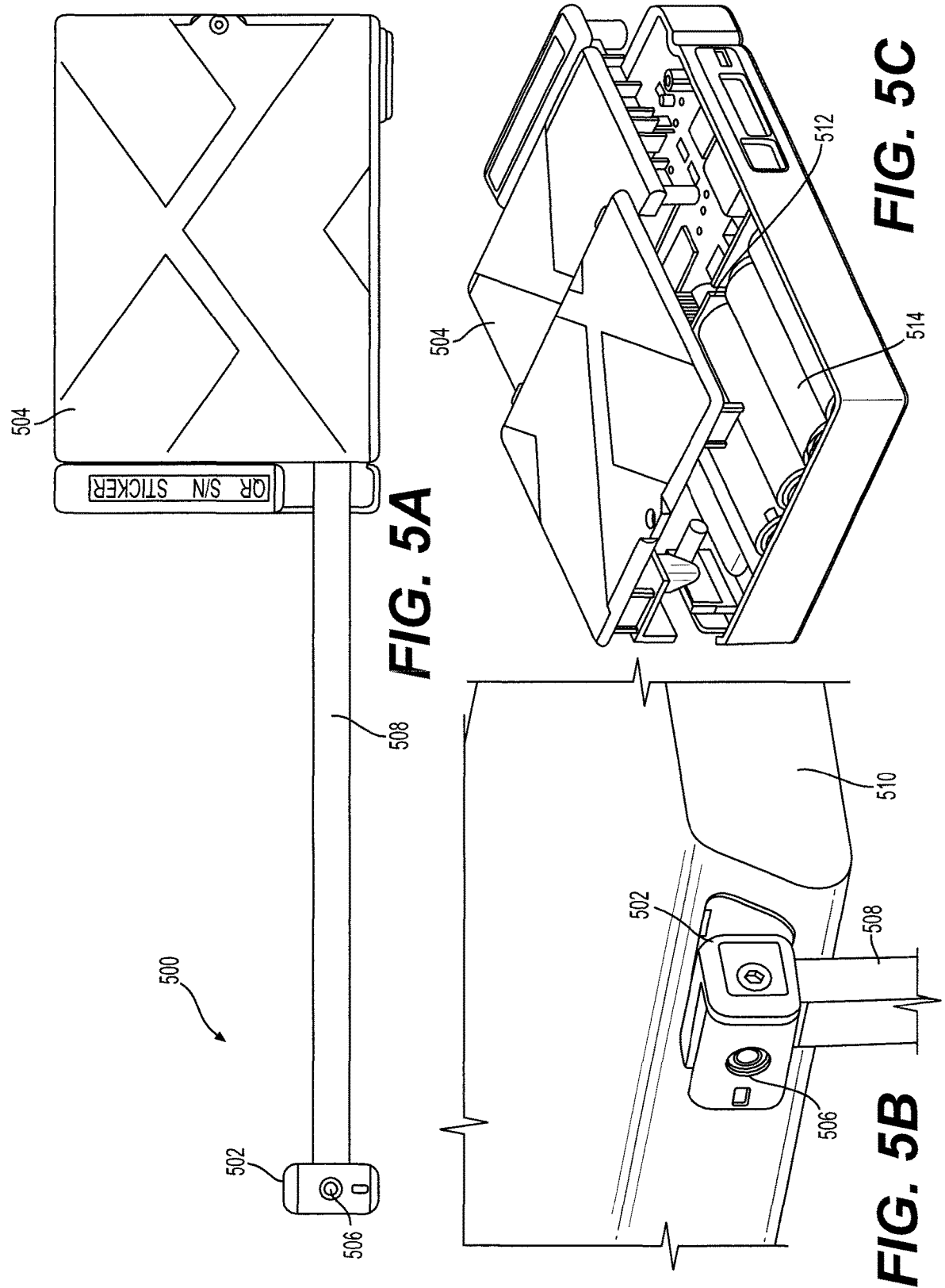

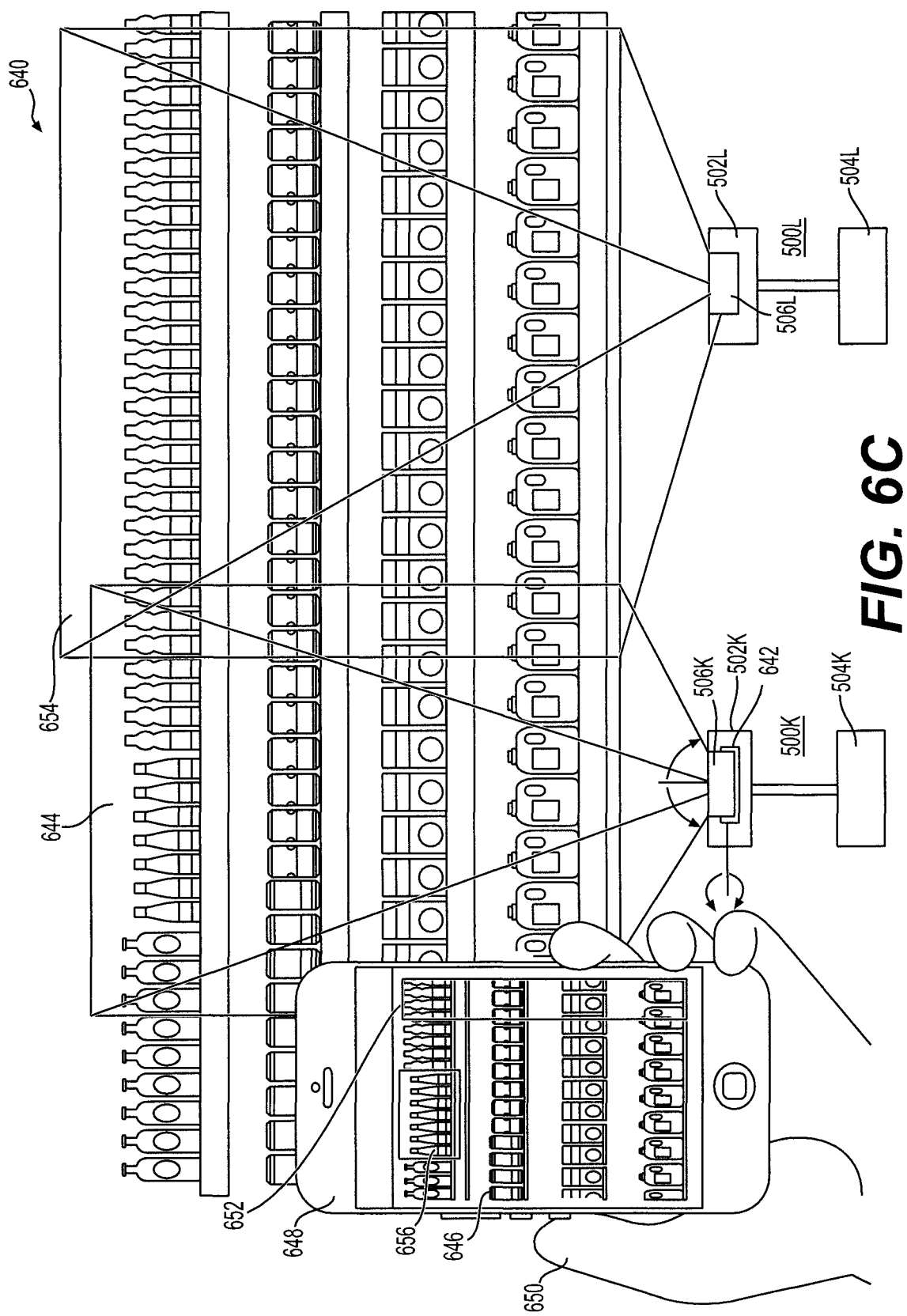

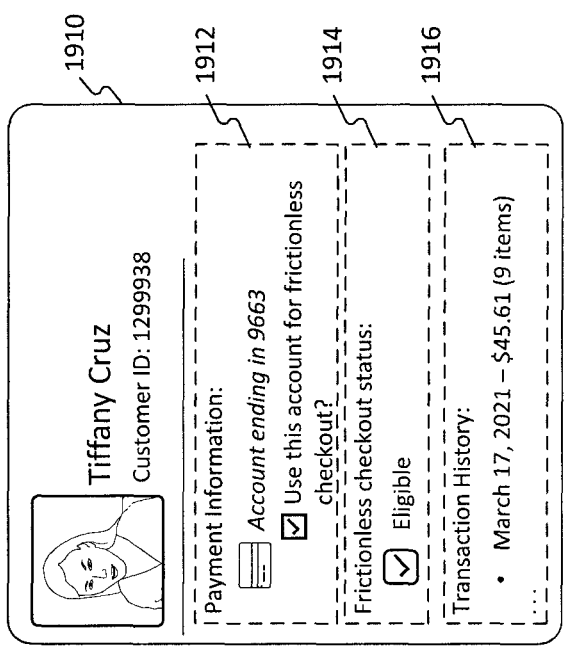

| Use case | First shoplift risk level 2910 | Second shoplift risk level 2912 |
|---|---|---|
| 2902 | Identifying both a quantity and a type of a particular product selected by the shopper | Identifying a type, but not a quantity, of a particular product selected by the shopper |
| 2904 | identifies a type of a particular product selected by the shopper | identifies a general class, but not a specific type, of a particular product selected by the shopper |
| 2906 | identifies product interaction events in which products were removed from a retail shelf and also identifies product interaction events in which products were returned to a retail shelf | identifies product interaction events in which products were removed from a retail shelf but does not identify product interaction events in which products were returned to a retail shelf |
| 2908 | Sending a notification to the shopper in response to each detected product interaction event involving the shopper | Sending notifications to the shopper regarding detected product interaction events that are issued in response to a secondary trigger event |

FIG. 29

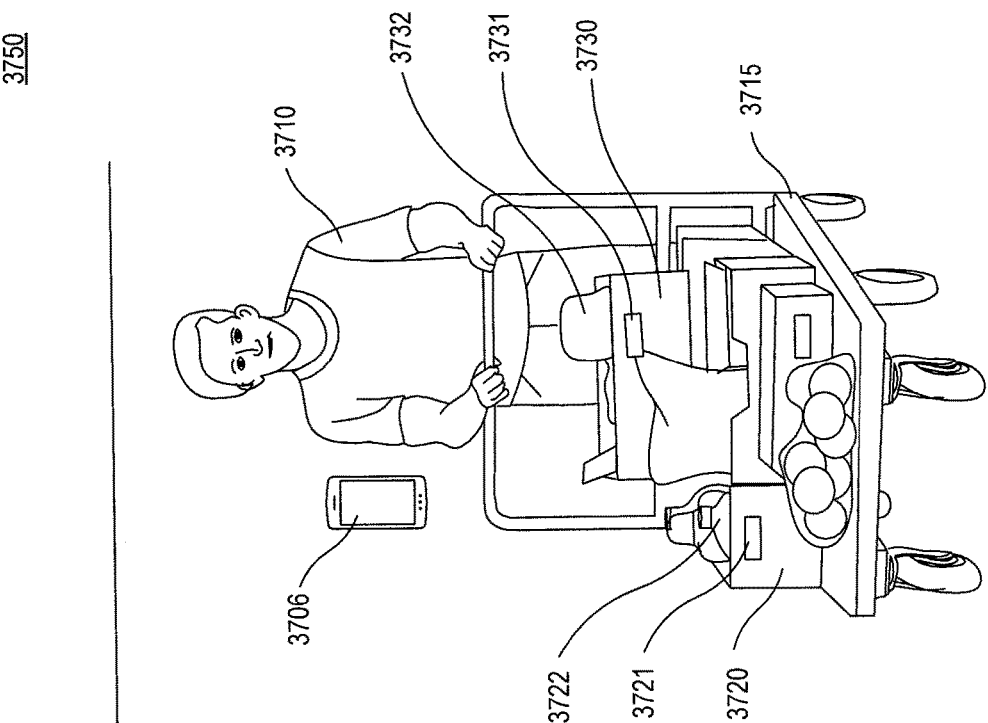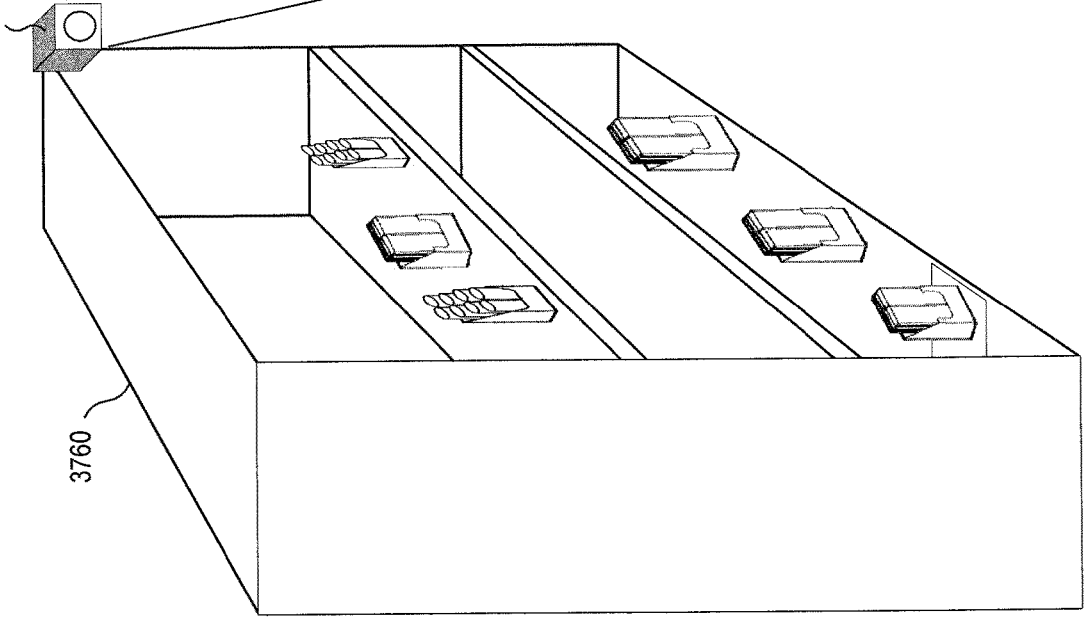
FIG. 37B

VISUAL INDICATOR OF FRICTIONLESS STATUS OF SHOPPERS

CROSS REFERENCES TO RELATED APPLICATIONS

This application is a continuation of International Application No. PCT/US2021/054489, filed on Oct. 12, 2021, which claims the benefit of priority of U.S. Provisional Application No. 63/091,009, filed on Oct. 13, 2020, and U.S. Provisional Application No. 63/113,490, filed on Nov. 13, 2020. The foregoing applications are incorporated herein by reference in their entirety.

BACKGROUND

I. Technical Field

The present disclosure relates generally to systems, methods, and devices for identifying products in retail stores, and more specifically to systems, methods, and devices for capturing, collecting, and automatically analyzing images of products displayed in retail stores for purposes of providing one or more functions associated with the identified products.

II. Background Information

Shopping in stores is a prevalent part of modern daily life. Store owners (also known as "retailers") stock a wide variety of products on store shelves and add associated labels and promotions to the store shelves. Typically, retailers have a set of processes and instructions for organizing products on the store shelves. The source of some of these instructions may include contractual obligations and other preferences related to the retailer methodology for placement of products on the store shelves. Nowadays, many retailers and suppliers send people to stores to personally monitor compliance with the desired product placement. Such a monitoring technique, however, may be inefficient and may result in nonuniform compliance among retailers relative to various product-related guidelines. This technique may also result in significant gaps in compliance, as it does not allow for continuous monitoring of dynamically changing product displays. To increase productivity, among other potential benefits, there is a technological need to provide a dynamic solution that will automatically monitor retail spaces. Such a solution, for example and among other features, may automatically determine whether a disparity exists between a desired product placement and an actual product placement.

The disclosed devices and methods are directed to providing new ways for monitoring retail establishments using image processing and supporting sensors.

SUMMARY

Embodiments consistent with the present disclosure provide systems, methods, and devices for capturing, collecting, and analyzing images of products displayed in retail stores. For example, consistent with the disclosed embodiments, an example system may receive an image depicting a store shelf having products displayed thereon, identify the products on the store shelf, and trigger an alert when disparity exists between the desired product placement and the actual product placement.

In an embodiment, a non-transitory computer-readable medium may include instructions that when executed by a processor may cause the processor to perform a method for determining whether shoppers are eligible for frictionless checkout. The method may comprise obtaining image data captured using a plurality of image sensors positioned in a retail store; analyzing the image data to identify at least one shopper at one or more locations of the retail store; detecting, based on the analysis of the image data, at least one product interaction event associated with an action of the at least one shopper at the one or more locations of the retail store; based on the detected at least one product interaction event, determining whether the at least one shopper is eligible for frictionless checkout; and in response to a determination that the at least one shopper is ineligible for frictionless checkout, causing delivery of an indicator that the at least one shopper is ineligible for frictionless checkout.

In an embodiment, a method for determining whether shoppers are eligible for frictionless checkout may comprise obtaining image data captured using a plurality of image sensors positioned in a retail store; analyzing the image data to identify at least one shopper at one or more locations of the retail store; detecting, based on the analysis of the image data, at least one product interaction event associated with an action of the at least one shopper at the one or more locations of the retail store; based on the detected at least one product interaction event, determining whether the at least one shopper is eligible for frictionless checkout; and in response to a determination that the at least one shopper is ineligible for frictionless checkout, causing delivery of an indicator that the at least one shopper is ineligible for frictionless checkout.

In an embodiment, a system for determining whether shoppers are eligible for frictionless checkout may comprise at least one processor programmed to: obtain image data captured using a plurality of image sensors positioned in a retail store; analyze the image data to identify at least one shopper at one or more locations of the retail store; detect, based on the analysis of the image data, at least one product interaction event associated with an action of the at least one shopper at the one or more locations of the retail store; based on the detected at least one product interaction event, determine whether the at least one shopper is eligible for frictionless checkout; and in response to a determination that the at least one shopper is ineligible for frictionless checkout, cause delivery of an indicator that the at least one shopper is ineligible for frictionless checkout.

In an embodiment, a non-transitory computer-readable medium may include instructions that when executed by a processor cause the processor to perform a method for providing a visual indicator indicative of a frictionless checkout status of at least a portion of a retail shelf. The method may include receiving an output from one or more retail store sensors; based on the output from the one or more retail store sensors, determining a frictionless checkout eligibility status associated with the at least a portion of the retail shelf, wherein the frictionless checkout eligibility status is indicative of whether the at least a portion of the retail shelf includes one or more items eligible for frictionless checkout; and causing a display of an automatically generated visual indicator indicating the frictionless checkout eligibility status associated with the at least a portion of the retail shelf.

In an embodiment, a system may receive an output from one or more retail store sensors. Based on the output from the one or more retail store sensors, the system may determine a frictionless checkout eligibility status associated with the at least a portion of the retail shelf, wherein the frictionless checkout eligibility status is indicative of whether the at least a portion of the retail shelf includes one or more items eligible for frictionless checkout. Thereafter, the system may cause a display of an automatically generated visual indicator indicating the frictionless checkout eligibility status associated with the at least a portion of the retail shelf.

In an embodiment, a method may provide a visual indicator indicative of a frictionless checkout status of at least a portion of a retail shelf. The method may include receiving an output from one or more retail store sensors; based on the output from the one or more retail store sensors, determining a frictionless checkout eligibility status associated with the at least a portion of the retail shelf, wherein the frictionless checkout eligibility status is indicative of whether the at least a portion of the retail shelf includes one or more items eligible for frictionless checkout; and causing a display of an automatically generated visual indicator indicating the frictionless checkout eligibility status associated with the at least a portion of the retail shelf.

In an embodiment, a non-transitory computer-readable medium may include instructions that when executed by a processor cause the processor to perform a method for addressing a shopper's eligibility for frictionless checkout. The method may include identifying at least one shopper in a retail store designated as not eligible for frictionless checkout; in response to the identification of the at least one shopper designated as not eligible for frictionless checkout, automatically identifying an ineligibility condition associated with the at least one shopper's designation as not eligible for frictionless checkout; determining one or more actions for resolving the ineligibility condition; causing implementation of the one or more actions for resolving the ineligibility condition; receiving an indication of successful completion of the one or more actions; and in response to receipt of the indication of successful completion of the one more actions, generating a status indicator indicating that the at least one shopper is eligible for frictionless checkout and storing the generated status indicator in a memory.

In an embodiment, a system for addressing a shopper's eligibility for frictionless checkout may include at least one processing unit configured to: identify at least one shopper in a retail store designated as not eligible for frictionless checkout; in response to the identification of the at least one shopper designated as not eligible for frictionless checkout, automatically identify an ineligibility condition associated with the at least one shopper's designation as not eligible for frictionless checkout; determine one or more actions for resolving the ineligibility condition; cause implementation of the one or more actions for resolving the ineligibility condition; receive an indication of successful completion of the one or more actions; and in response to receipt of the indication of successful completion of the one more actions, generate a status indicator indicating that the at least one shopper is eligible for frictionless checkout and storing the generated status indicator in a memory.

In an embodiment, a non-transitory computer-readable medium may include instructions that when executed by a processor cause the processor to perform a method for addressing a shopper's eligibility for frictionless checkout. The method may include receiving output from at least one sensor positioned in a retail store; analyzing the first data to detect an ambiguous product interaction event involving a first shopper and a second shopper; in response to detection of the ambiguous product interaction event, designating both the first shopper and the second shopper as ineligible for frictionless checkout; detecting an action taken by the first shopper, wherein the action enables resolution of ambiguity associated with the product interaction event; and in response to detection of the action taken by the first shopper, designating the second shopper as eligible for frictionless checkout.

In an embodiment, a non-transitory computer-readable medium includes instructions that when executed by a processor cause the processor to perform a method for updating virtual shopping carts of shoppers with pay-by-weight products. The method may comprise receiving one or more images captured by one or more image sensors, wherein the one or more images depict product interactions between a store associate and a plurality of shoppers, wherein each of the product interactions involves at least one pay-by-weight product; analyzing the one or more images to identify the product interactions and to associate the at least one pay-by-weight product involved with each product interaction with a particular shopper among the plurality of shoppers; providing a notification to the store associate requesting supplemental information to assist in the association of the at least one pay-by-weight product involved with a selected product interaction with the particular shopper among the plurality of shoppers; receiving the requested supplemental information from the store associate; using the analysis of the one or more images and the requested supplemental information to determine the association of the at least one pay-by-weight product involved with the selected product interaction with the particular shopper among the plurality of shoppers; and updating a virtual shopping cart of the particular shopper among the plurality of shoppers with the at least one pay-by-weight product involved with the selected product interaction.

In an embodiment, a method for updating virtual shopping carts of shoppers with pay-by-weight products may comprise receiving one or more images captured by one or more image sensors, wherein the one or more images depict product interactions between a store associate and a plurality of shoppers, wherein each of the product interactions involves at least one pay-by-weight product; analyzing the one or more images to identify the product interactions and to associate the at least one pay-by-weight product involved with each product interaction with a particular shopper among the plurality of shoppers; providing a notification to the store associate requesting supplemental information to assist in the association of the at least one pay-by-weight product involved with a selected product interaction with the particular shopper among the plurality of shoppers; receiving the requested supplemental information from the store associate; using the analysis of the one or more images and the requested supplemental information to determine the association of the at least one pay-by-weight product involved with the selected product interaction with the particular shopper among the plurality of shoppers; and updating a virtual shopping cart of the particular shopper among the plurality of shoppers with the at least one pay-by-weight product involved with the selected product interaction.

In an embodiment, a system for updating virtual shopping carts of shoppers with pay-by-weight products may comprise a memory storing instructions; and at least one processor programmed to execute the stored instructions to: receive one or more images captured by one or more image sensors, wherein the one or more images depict product interactions between a store associate and a plurality of shoppers, wherein each of the product interactions involves at least one pay-by-weight product; analyze the one or more images to identify the product interactions and to associate the at least one pay-by-weight product involved with each product interaction with a particular shopper among the plurality of shoppers; provide a notification to the store associate requesting supplemental information to assist in the association of the at least one pay-by-weight product involved with a selected product interaction with the particular shopper among the plurality of shoppers; receive the requested supplemental information from the store associate; use the analysis of the one or more images and the requested supplemental information to determine the association of the at least one pay-by-weight product involved with the selected product interaction with the particular shopper among the plurality of shoppers; and update a virtual shopping cart of the particular shopper among the plurality of shoppers with the at least one pay-by-weight product involved with the selected product interaction.

In an embodiment, a non-transitory computer-readable medium may include instructions that, when executed by a processor, cause the processor to perform a method that includes receiving one or more images acquired by a camera arranged to capture interactions between a shopper and one or more bulk packages each configured to contain a plurality of products, and analyzing the one or more images to identify the shopper and a particular bulk package among the one or more bulk packages with which the identified shopper interacted. The method also includes receiving an output from at least one sensor configured to monitor changes associated with the particular bulk package, and analyzing the output to determine a quantity of products removed from the particular bulk package by the identified shopper. The method further includes updating a virtual shopping cart associated with the identified shopper to include the determined quantity of products and an indication of a product type associated with the particular bulk package.

In an embodiment, a system for identifying products removed from bulk packaging may include at least one processing unit configured to receive one or more images acquired by a camera arranged to capture interactions between a shopper and one or more bulk packages each configured to contain a plurality of products; analyze the one or more images to identify the shopper and a particular bulk package among the one or more bulk packages with which the identified shopper interacted; receive an output from at least one sensor configured to monitor changes associated with the particular bulk package; analyze the output to determine a quantity of products removed from the particular bulk package by the identified shopper; and update a virtual shopping cart associated with the identified shopper to include the determined quantity of products and an indication of a product type associated with the particular bulk package.

In an embodiment, a non-transitory computer-readable medium including instructions that when executed by a processor cause the processor to perform a method that includes receiving an output from one or more spatial sensors arranged to capture interactions between a shopper and one or more bulk packages each configured to contain a plurality of products, and analyzing the output from the one or more sensors to identify the shopper and a particular bulk package among the one or more bulk packages with which the identified shopper interacted. The method also includes receiving an output from at least one additional sensor configured to monitor changes associated with the particular bulk package, and analyzing the output from the at least one additional sensor to determine a quantity of products removed from the particular bulk package by the identified shopper. The method further includes updating a virtual shopping cart associated with the identified shopper to include the determined quantity of products and an indication of a product type associated with the particular bulk package.

In an embodiment, a method for identifying products removed from bulk packaging may include receiving an output from one or more spatial sensors arranged to capture interactions between a shopper and one or more bulk packages each configured to contain a plurality of products; analyzing the output from the one or more sensors to identify the shopper and a particular bulk package among the one or more bulk packages with which the identified shopper interacted; receiving an output from at least one additional sensor configured to monitor changes associated with the particular bulk package; analyzing the output from the at least one additional sensor to determine a quantity of products removed from the particular bulk package by the identified shopper; and updating a virtual shopping cart associated with the identified shopper to include the determined quantity of products and an indication of a product type associated with the particular bulk package.

In an embodiment, a non-transitory computer-readable medium may include instructions that when executed by at least one processor cause the at least one processor to perform a method for controlling a detail level of shopping data provided to frictionless shoppers. The method may include receiving image data captured using one or more image sensors in a retail store; analyzing the image data to detect a shopper in the retail store; determining a likelihood that the shopper will be involved in shoplifting; and controlling a detail level associated with frictionless shopping data provided to the shopper based on the determined likelihood that the shopper will be involved in shoplifting.

In an embodiment, a system may control a detail level of shopping data provided to frictionless shoppers. The system may include at least one processor configured to receive image data captured using one or more image sensors in a retail store and analyze the image data to detect a shopper in the retail store. The at least one processor may further determine a likelihood that the shopper will be involved in shoplifting. Thereafter, the at least one processor may control a detail level associated with frictionless shopping data provided to the shopper based on the determined likelihood that the shopper will be involved in shoplifting.

In an embodiment, a method may control a detail level of shopping data provided to frictionless shoppers. The method may include receiving image data captured using one or more image sensors in a retail store; analyzing the image data to detect a shopper in the retail store; determining a likelihood that the shopper will be involved in shoplifting; and controlling a detail level associated with frictionless shopping data provided to the shopper based on the determined likelihood that the shopper will be involved in shoplifting.

In an embodiment, a system may deliver shopping data for frictionless shoppers. The system may include at least one processor configured to receive image data captured using one or more image sensors in a retail store and analyze the image data to identify a plurality of product interaction events for at least one shopper in the retail store. The at least one processor is further configured to determine shopping data associated with the plurality of product interaction events, and determine a likelihood that the at least one shopper will be involved in shoplifting. Based on the determined likelihood, the at least one processor may determine an update rate for updating the at least one shopper with the shopping data; and deliver the shopping data to the at least one shopper at the determined update rate.

In an embodiment, a method may deliver shopping data for frictionless shoppers. The method may include receiving image data captured using one or more image sensors in a retail store; analyzing the image data to identify a plurality of product interaction events for at least one shopper in the retail store; determining shopping data associated with the plurality of product interaction events; determining a likelihood that the at least one shopper will be involved in shoplifting; based on the determined likelihood, determining an update rate for updating the at least one shopper with the shopping data; and delivering the shopping data to the at least one shopper at the determined update rate.

In an embodiment, a non-transitory computer-readable medium may include instructions that when executed by at least one processor cause the at least one processor to perform a method for tracking frictionless shopping eligibility relative to individual shopping receptacles. The method may include obtaining image data captured using a plurality of image sensors positioned in a retail store; analyzing the image data to identify a shopper at one or more locations of the retail store; detecting, based on the analysis of the image data, a first product interaction event involving a first shopping receptacle associated with the shopper and a second product interaction event involving a second shopping receptacle associated with the shopper; based on the detected first product interaction event, determining whether the first shopping receptacle is eligible for frictionless checkout; based on the detected second product interaction event, determining whether the second shopping receptacle is eligible for frictionless checkout; and in response to a determination that the first shopping receptacle or the second shopping receptacle is ineligible for frictionless checkout, causing delivery of an indicator identifying which of the first shopping receptacle or the second shopping receptacle is ineligible for frictionless checkout.

In an embodiment, a system may track frictionless shopping eligibility relative to individual shopping receptacles. The system may include at least one processor programmed to obtain image data captured using a plurality of image sensors positioned in a retail store. Thereafter, the at least one processor may analyze the image data to identify a shopper at one or more locations of the retail store, and detect, based on the analysis of the image data, a first product interaction event involving a first shopping receptacle associated with the shopper and a second product interaction event involving a second shopping receptacle associated with the shopper. Based on the detected first product interaction event, the at least one processor may determine whether the first shopping receptacle is eligible for frictionless checkout. Based on the detected second product interaction event, the at least one processor may determine whether the second shopping receptacle is eligible for frictionless checkout. Thereafter, in response to a determination that the first shopping receptacle or the second shopping receptacle is ineligible for frictionless checkout, the at least one processor may cause delivery of an indicator identifying which of the first shopping receptacle or the second shopping receptacle is ineligible for frictionless checkout.

In an embodiment, a method may track frictionless shopping eligibility relative to individual shopping receptacles. The method may include obtaining image data captured using a plurality of image sensors positioned in a retail store; analyzing the image data to identify a shopper at one or more locations of the retail store; detecting, based on the analysis of the image data, a first product interaction event involving a first shopping receptacle associated with the shopper and a second product interaction event involving a second shopping receptacle associated with the shopper; based on the detected first product interaction event, determining whether the first shopping receptacle is eligible for frictionless checkout; based on the detected second product interaction event, determining whether the second shopping receptacle is eligible for frictionless checkout; and in response to a determination that the first shopping receptacle or the second shopping receptacle is ineligible for frictionless checkout, causing delivery of an indicator identifying which of the first shopping receptacle or the second shopping receptacle is ineligible for frictionless checkout.

In an embodiment, a non-transitory computer-readable medium may include instructions that, when executed by at least one processor, cause the at least one processor to perform a method for automatically updating a plurality of virtual shopping carts. The method may include receiving image data captured in a retail store. A first shopping receptacle and a second shopping receptacle may be represented in the received image data. The method may also include determining that the first shopping receptacle is associated with a first virtual shopping cart and that the second shopping receptacle is associated with a second virtual shopping cart different from the first virtual shopping cart, and analyzing the received image data to detect a shopper placing a first product in the first shopping receptacle and to detect the shopper placing a second product in the second shopping receptacle. The method may further include, in response to detecting that the shopper placed the first product in the first shopping receptacle, automatically updating the first virtual shopping cart to include information associated with the first product, and in response to detecting that the shopper placed the second product in the second shopping receptacle, automatically updating the second virtual shopping cart to include information associated with the second product.

In an embodiment, a method for automatically updating a plurality of virtual shopping carts is provided. The method may include receiving image data captured in a retail store. A first shopping receptacle and a second shopping receptacle may be represented in the received image data. The method may also include determining that the first shopping receptacle is associated with a first virtual shopping cart and that the second shopping receptacle is associated with a second virtual shopping cart different from the first virtual shopping cart, and analyzing the received image data to detect a shopper placing a first product in the first shopping receptacle and to detect the shopper placing a second product in the second shopping receptacle. The method may further include, in response to detecting that the shopper placed the first product in the first shopping receptacle, automatically updating the first virtual shopping cart to include information associated with the first product, and in response to detecting that the shopper placed the second product in the second shopping receptacle, automatically updating the second virtual shopping cart to include information associated with the second product.

In an embodiment, a system for automatically updating a plurality of virtual shopping carts may comprise at least one processor. The at least one processor may be configured to receive image data captured in a retail store. A first shopping receptacle and a second shopping receptacle may be represented in the received image data. The at least one processor may also be configured to determine that the first shopping receptacle is associated with a first virtual shopping cart and that the second shopping receptacle is associated with a second virtual shopping cart different from the first virtual shopping cart, and to analyze the received image data to detect a shopper placing a first product in the first shopping receptacle and to detect the shopper placing a second product in the second shopping receptacle. The at least one processor may be further configured to, in response to detecting that the shopper placed the first product in the first shopping receptacle, automatically updating the first virtual shopping cart to include information associated with the first product, and in response to detecting that the shopper placed the second product in the second shopping receptacle, automatically updating the second virtual shopping cart to include information associated with the second product.

In an embodiment, a non-transitory computer-readable medium may include instructions that when executed by at least one processor cause the at least one processor to perform a method for using an electronic shopping list to resolve ambiguity associated with a selected product. The method may include accessing an electronic shopping list associated with a customer of a retail store; receiving image data captured using one or more image sensors in the retail store; analyzing the image data to detect a product selection event involving a shopper; identifying a product associated with the detected product selection event based on analysis of the image data and further based on the electronic shopping list; and in response to identification of the product, updating a virtual shopping cart associated with the shopper.

In an embodiment, a method for using an electronic shopping list to resolve ambiguity associated with a selected product is disclosed. The method may comprise accessing an electronic shopping list associated with a customer of a retail store; receiving image data captured using one or more image sensors in the retail store; analyzing the image data to detect a product selection event involving a shopper; identifying a product associated with the detected product selection event based on analysis of the image data and further based on the electronic shopping list; and in response to identification of the product, updating a virtual shopping cart associated with the shopper.

In an embodiment, a system for using an electronic shopping list to resolve ambiguity associated with a selected product may comprise at least one processor. The at least one processor may be programmed to access an electronic shopping list associated with a customer of a retail store; receive image data captured using one or more image sensors in the retail store; analyze the image data to detect a product selection event involving a shopper; identify a product associated with the detected product selection event based on analysis of the image data and further based on the electronic shopping list; and in response to identification of the product, update a virtual shopping cart associated with the shopper.

In an embodiment, a non-transitory computer-readable medium includes instructions that when executed by at least processor cause the at least processor to perform a method for automatically updating electronic shopping lists of customers of retail stores. The method may include accessing an electronic shopping list of a customer of a retail store, the electronic shopping list including at least one product associated with a shopping order; receiving image data from a plurality of image sensors mounted in the retail store; analyzing the image data to predict an inventory shortage of the at least one product included on the electronic shopping list, wherein the predicted inventory shortage is expected to occur prior to fulfillment of the shopping order; and automatically updating the electronic shopping list based on the predicted inventory shortage of the at least one product.

In an embodiment, a method for automatically updating electronic shopping lists of customers of retail stores is disclosed. The method may comprise accessing an electronic shopping list of a customer of a retail store, the electronic shopping list including at least one product associated with a shopping order; receiving image data from a plurality of image sensors mounted in the retail store; analyzing the image data to predict an inventory shortage of the at least one product included on the electronic shopping list, wherein the predicted inventory shortage is expected to occur prior to fulfillment of the shopping order; and automatically updating the electronic shopping list based on the predicted inventory shortage of the at least one product.

In an embodiment, a system for automatically updating electronic shopping lists of customers of retail stores may comprise at least one processor. The at least one processor may be programmed to access an electronic shopping list of a customer of a retail store, the electronic shopping list including at least one product associated with a shopping order; receive image data from a plurality of image sensors mounted in the retail store; analyze the image data to predict an inventory shortage of the at least one product included on the electronic shopping list, wherein the predicted inventory shortage is expected to occur prior to fulfillment of the shopping order; and automatically update the electronic shopping list based on the predicted inventory shortage of the at least one product.

The foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings:

FIG. 5A is an illustration of an example system for acquiring images of products in a retail store, consistent with the present disclosure.

FIG. 5B is an illustration of a shelf-mounted camera unit included in a first housing of the example system of FIG. 5A, consistent with the present disclosure.

FIG. 5C is an exploded view illustration of a processing unit included in a second housing of the example system of FIG. 5A, consistent with the present disclosure.

FIG. 6C provides a diagrammatic representation of how the exemplary disclosed image acquisition systems may be positioned relative to retail shelving to acquire product images, consistent with the present disclosure.

FIG. 19A illustrates an example shopper profile that may be associated with a shopper, consistent with the disclosed embodiments.

FIG. 19B is a diagrammatic illustration of various actions that may result in frictionless checkout status being granted or restored, consistent with the disclosed embodiments.

FIG. 29 is a table describing different detail levels of shopping data delivered to shoppers in corresponding use cases, consistent with the present disclosure.

FIG. 37B is a schematic illustration of an example configuration of a retail store, consistent with another embodiment of the present disclosure.

DETAILED DESCRIPTION

Figure 1:
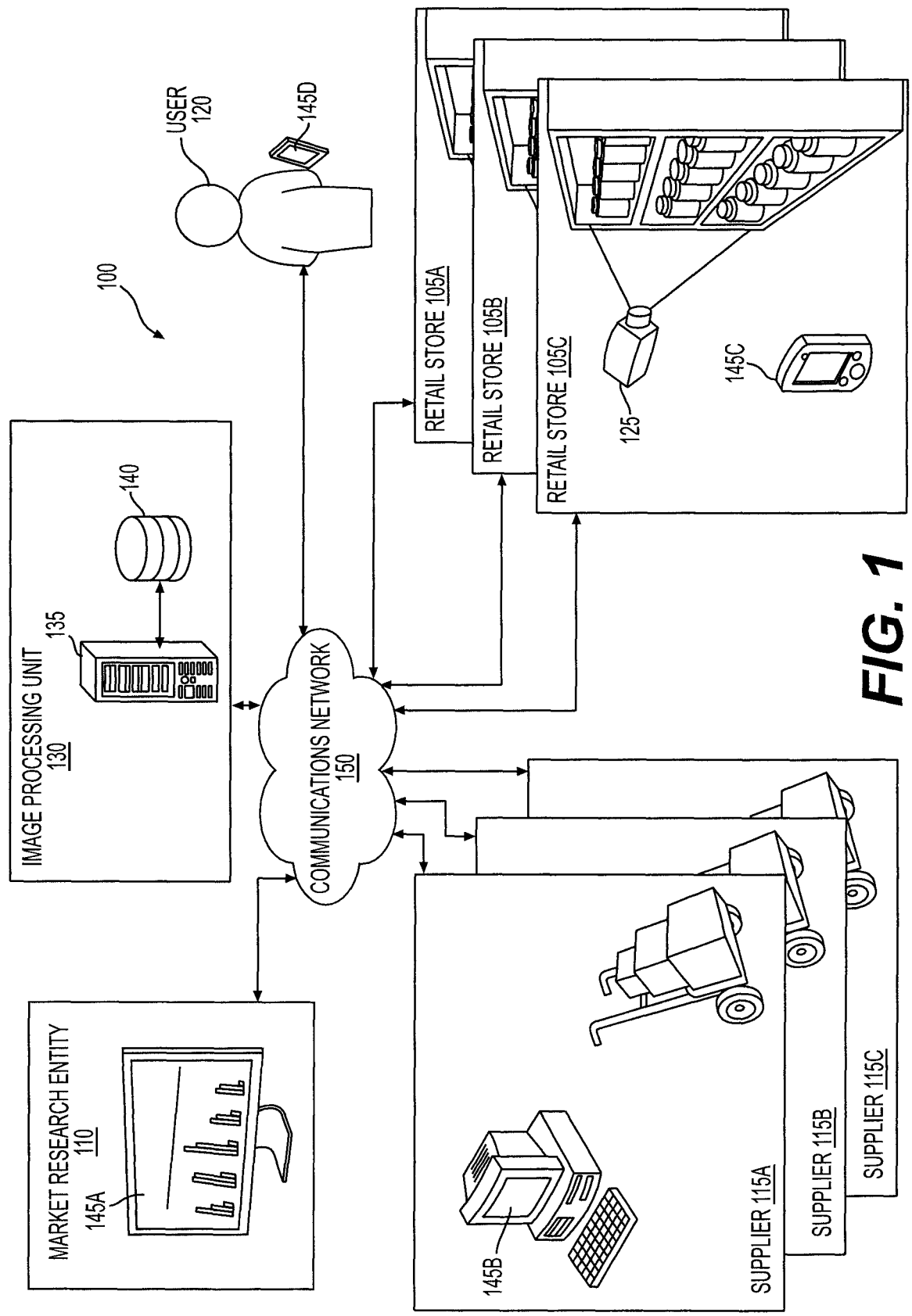
FIG. 1 is an illustration of an exemplary system for analyzing information collected from a retail store.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

The present disclosure is directed to systems and methods for processing images captured in a retail store. As used herein, the term "retail store" or simply "store" refers to an establishment offering products for sale by direct selection by customers physically or virtually shopping within the establishment. The retail store may be an establishment operated by a single retailer (e.g., supermarket) or an establishment that includes stores operated by multiple retailers (e.g., a shopping mall). Embodiments of the present disclosure include receiving an image depicting a store shelf having at least one product displayed thereon. As used herein, the term "store shelf" or simply "shelf" refers to any suitable physical structure which may be used for displaying products in a retail environment. In one embodiment the store shelf may be part of a shelving unit including a number of individual store shelves. In another embodiment, the store shelf may include a display unit having a single-level or multi-level surfaces.

Consistent with the present disclosure, the system may process images and image data acquired by a capturing device to determine information associated with products displayed in the retail store. The term "capturing device" refers to any device configured to acquire image data representative of products displayed in the retail store. Examples of capturing devices may include a digital camera, a time-of-flight camera, a stereo camera, an active stereo camera, a depth camera, a Lidar system, a laser scanner, CCD based devices, or any other sensor based system capable of converting received light into electric signals. The term "image data" refers to any form of data generated based on optical signals in the near-infrared, infrared, visible, and ultraviolet spectrums (or any other suitable radiation frequency range). Consistent with the present disclosure, the image data may include pixel data streams, digital images, digital video streams, data derived from captured images, and data that may be used to construct a 3D image. The image data acquired by a capturing device may be transmitted by wired or wireless transmission to a remote server. In one embodiment, the capturing device may include a stationary camera with communication layers (e.g., a dedicated camera fixed to a store shelf, a security camera, etc.). Such an embodiment is described in greater detail below with reference to FIG. 4A. In another embodiment, the capturing device may include a handheld device (e.g., a smartphone, a tablet, a mobile station, a personal digital assistant, a laptop, and more) or a wearable device (e.g., smart glasses, a smartwatch, a clip-on camera). Such an embodiment is described in greater detail below with reference to FIG. 4B. In another embodiment, the capturing device may include a robotic device with one or more cameras operated remotely or autonomously (e.g., an autonomous robotic device, a drone, a robot on a track, and more). Such an embodiment is described in greater detail below with reference to FIG. 4C.

In some embodiments, the capturing device may include one or more image sensors. The term "image sensor" refers to a device capable of detecting and converting optical signals in the near-infrared, infrared, visible, and ultraviolet spectrums into electrical signals. The electrical signals may be used to form image data (e.g., an image or a video stream) based on the detected signal. Examples of image sensors may include semiconductor charge-coupled devices (CCD), active pixel sensors in complementary metal-oxide-semiconductor (CMOS), or N-type metal-oxide-semiconductors (NMOS, Live MOS). In some cases, the image sensor may be part of a camera included in the capturing device.

Embodiments of the present disclosure further include analyzing images to detect and identify different products. As used herein, the term "detecting a product" may broadly refer to determining an existence of the product. For example, the system may determine the existence of a plurality of distinct products displayed on a store shelf. By detecting the plurality of products, the system may acquire different details relative to the plurality of products (e.g., how many products on a store shelf are associated with a same product type), but it does not necessarily gain knowledge of the type of product. In contrast, the term "identifying a product" may refer to determining a unique identifier associated with a specific type of product that allows inventory managers to uniquely refer to each product type in a product catalogue. Additionally or alternatively, the term "identifying a product" may refer to determining a unique identifier associated with a specific brand of products that allows inventory managers to uniquely refer to products, e.g., based on a specific brand in a product catalogue. Additionally or alternatively, the term "identifying a product" may refer to determining a unique identifier associated with a specific category of products that allows inventory managers to uniquely refer to products, e.g., based on a specific category in a product catalogue. In some embodiments, the identification may be made based at least in part on visual characteristics of the product (e.g., size, shape, logo, text, color, etc.). The unique identifier may include any codes that may be used to search a catalog, such as a series of digits, letters, symbols, or any combinations of digits, letters, and symbols. Consistent with the present disclosure, the terms "determining a type of a product" and "determining a product type" may also be used interchangeably in this disclosure with reference to the term "identifying a product."

Embodiments of the present disclosure further include determining at least one characteristic of the product for determining the type of the product. As used herein, the term "characteristic of the product" refers to one or more visually discernable features attributed to the product. Consistent with the present disclosure, the characteristic of the product may assist in classifying and identifying the product. For example, the characteristic of the product may be associated with the ornamental design of the product, the size of the product, the shape of the product, the colors of the product, the brand of the product, a logo or text associated with the product (e.g., on a product label), and more. In addition, embodiments of the present disclosure further include determining a confidence level associated with the determined type of the product. The term "confidence level" refers to any indication, numeric or otherwise, of a level (e.g., within a predetermined range) indicative of an amount of confidence the system has that the determined type of the product is the actual type of the product. For example, the confidence level may have a value between 1 and 10, alternatively, the confidence level may be expressed as a percentage.

In some cases, the system may compare the confidence level to a threshold. The term "threshold" as used herein denotes a reference value, a level, a point, or a range of values, for which, when the confidence level is above it (or below it depending on a particular use case), the system may follow a first course of action and, when the confidence level is below it (or above it depending on a particular use case), the system may follow a second course of action. The value of the threshold may be predetermined for each type of product or may be dynamically selected based on different considerations. In one embodiment, when the confidence level associated with a certain product is below a threshold, the system may obtain contextual information to increase the confidence level. As used herein, the term "contextual information" (or "context") refers to any information having a direct or indirect relationship with a product displayed on a store shelf. In some embodiments, the system may retrieve different types of contextual information from captured image data and/or from other data sources. In some cases, contextual information may include recognized types of products adjacent to the product under examination. In other cases, contextual information may include text appearing on the product, especially where that text may be recognized (e.g., via OCR) and associated with a particular meaning. Other examples of types of contextual information may include logos appearing on the product, a location of the product in the retail store, a brand name of the product, a price of the product, product information collected from multiple retail stores, product information retrieved from a catalog associated with a retail store, etc.

Reference is now made to FIG. 1, which shows an example of a system 100 for analyzing information collected from retail stores 105 (for example, retail store 105A, retail store 105B, and retail store 105C). In one embodiment, system 100 may represent a computer-based system that may include computer system components, desktop computers, workstations, tablets, handheld computing devices, memory devices, and/or internal network(s) connecting the components. System 100 may include or be connected to various network computing resources (e.g., servers, routers, switches, network connections, storage devices, etc.) necessary to support the services provided by system 100. In one embodiment, system 100 may enable identification of products in retail stores 105 based on analysis of captured images. In another embodiment, system 100 may enable a supply of information based on analysis of captured images to a market research entity 110 and to different suppliers 115 of the identified products in retail stores 105 (for example, supplier 115A, supplier 115B, and supplier 115C). In another embodiment, system 100 may communicate with a user 120 (sometimes referred to herein as a customer, but which may include individuals associated with a retail environment other than customers, such as store associate, data collection agent, etc.) about different products in retail stores 105. In one example, system 100 may receive images of products captured by user 120. In another example, system 100 may provide to user 120 information determined based on automatic machine analysis of images captured by one or more capturing devices 125 associated with retail stores 105.

System 100 may also include an image processing unit 130 to execute the analysis of images captured by the one or more capturing devices 125. Image processing unit 130 may include a server 135 operatively connected to a database 140. Image processing unit 130 may include one or more servers connected by a communication network, a cloud platform, and so forth. Consistent with the present disclosure, image processing unit 130 may receive raw or processed data from capturing device 125 via respective communication links, and provide information to different system components using a network 150. Specifically, image processing unit 130 may use any suitable image analysis technique including, for example, object recognition, object detection, image segmentation, feature extraction, optical character recognition (OCR), object-based image analysis, shape region techniques, edge detection techniques, pixel-based detection, artificial neural networks, convolutional neural networks, etc. In addition, image processing unit 130 may use classification algorithms to distinguish between the different products in the retail store. In some embodiments, image processing unit 130 may utilize suitably trained machine learning algorithms and models to perform the product identification. Network 150 may facilitate communications and data exchange between different system components when these components are coupled to network 150 to enable output of data derived from the images captured by the one or more capturing devices 125. In some examples, the types of outputs that image processing unit 130 may generate may include identification of products, indicators of product quantity, indicators of planogram compliance, indicators of service-improvement events (e.g., a cleaning event, a restocking event, a rearrangement event, etc.), and various reports indicative of the performances of retail stores 105. Additional examples of the different outputs enabled by image processing unit 130 are described below with reference to FIGS. 11A-11E and throughout the disclosure.

Consistent with the present disclosure, network 150 may be any type of network (including infrastructure) that provides communications, exchanges information, and/or facilitates the exchange of information between the components of system 100. For example, network 150 may include or be part of the Internet, a Local Area Network, wireless network (e.g., a Wi-Fi/302.11 network), or other suitable connections. In other embodiments, one or more components of system 100 may communicate directly through dedicated communication links, such as, for example, a telephone network, an extranet, an intranet, the Internet, satellite communications, off-line communications, wireless communications, transponder communications, a local area network (LAN), a wide area network (WAN), a virtual private network (VPN), and so forth.

In one example configuration, server 135 may be a cloud server that processes images received directly (or indirectly) from one or more capturing device 125 and processes the images to detect and/or identify at least some of the plurality of products in the image based on visual characteristics of the plurality of products. The term "cloud server" refers to a computer platform that provides services via a network, such as the Internet. In this example configuration, server 135 may use virtual machines that may not correspond to individual hardware. For example, computational and/or storage capabilities may be implemented by allocating appropriate portions of desirable computation/storage power from a scalable repository, such as a data center or a distributed computing environment. In one example, server 135 may implement the methods described herein using customized hard-wired logic, one or more Application Specific Integrated Circuits (ASICs) or Field Programmable Gate Arrays (FPGAs), firmware, and/or program logic which, in combination with the computer system, cause server 135 to be a special-purpose machine.

In another example configuration, server 135 may be part of a system associated with a retail store that communicates with capturing device 125 using a wireless local area network (WLAN) and may provide similar functionality as a cloud server. In this example configuration, server 135 may communicate with an associated cloud server (not shown) and cloud database (not shown). The communications between the store server and the cloud server may be used in a quality enforcement process, for upgrading the recognition engine and the software from time to time, for extracting information from the store level to other data users, and so forth. Consistent with another embodiment, the communications between the store server and the cloud server may be discontinuous (purposely or unintentional) and the store server may be configured to operate independently from the cloud server. For example, the store server may be configured to generate a record indicative of changes in product placement that occurred when there was a limited connection (or no connection) between the store server and the cloud server, and to forward the record to the cloud server once connection is reestablished.

As depicted in FIG. 1, server 135 may be coupled to one or more physical or virtual storage devices such as database 140. Server 135 may access database 140 to detect and/or identify products. The detection may occur through analysis of features in the image using an algorithm and stored data. The identification may occur through analysis of product features in the image according to stored product models. Consistent with the present embodiment, the term "product model" refers to any type of algorithm or stored product data that a processor may access or execute to enable the identification of a particular product associated with the product model. For example, the product model may include a description of visual and contextual properties of the particular product (e.g., the shape, the size, the colors, the texture, the brand name, the price, the logo, text appearing on the particular product, the shelf associated with the particular product, adjacent products in a planogram, the location within the retail store, etc.). In some embodiments, a single product model may be used by server 135 to identify more than one type of products, such as, when two or more product models are used in combination to enable identification of a product. For example, in some cases, a first product model may be used by server 135 to identify a product category (such models may apply to multiple product types, e.g., shampoo, soft drinks, etc.), and a second product model may be used by server 135 to identify the product type, product identity, or other characteristics associated with a product. In some cases, such product models may be applied together (e.g., in series, in parallel, in a cascade fashion, in a decision tree fashion, etc.) to reach a product identification. In other embodiments, a single product model may be used by server 135 to identify a particular product type (e.g., 6-pack of 16 oz Coca-Cola Zero).

Database 140 may be included on a volatile or nonvolatile, magnetic, semiconductor, tape, optical, removable, non-removable, or other type of storage device or tangible or non-transitory computer-readable medium. Database 140 may also be part of server 135 or separate from server 135. When database 140 is not part of server 135, server 135 may exchange data with database 140 via a communication link. Database 140 may include one or more memory devices that store data and instructions used to perform one or more features of the disclosed embodiments. In one embodiment, database 140 may include any suitable databases, ranging from small databases hosted on a work station to large databases distributed among data centers. Database 140 may also include any combination of one or more databases controlled by memory controller devices (e.g., server(s), etc.) or software. For example, database 140 may include document management systems, Microsoft SQL databases, SharePoint databases, Oracle™ databases, Sybase™ databases, other relational databases, or non-relational databases, such as mongo and others.

Consistent with the present disclosure, image processing unit 130 may communicate with output devices 145 to present information derived based on processing of image data acquired by capturing devices 125. The term "output device" is intended to include all possible types of devices capable of outputting information from server 135 to users or other computer systems (e.g., a display screen, a speaker, a desktop computer, a laptop computer, mobile device, tablet, a PDA, etc.), such as 145A, 145B, 145C and 145D. In one embodiment each of the different system components (i.e., retail stores 105, market research entity 110, suppliers 115, and users 120) may be associated with an output device 145, and each system component may be configured to present different information on the output device 145. In one example, server 135 may analyze acquired images including representations of shelf spaces. Based on this analysis, server 135 may compare shelf spaces associated with different products, and output device 145A may present market research entity 110 with information about the shelf spaces associated with different products. The shelf spaces may also be compared with sales data, expired products data, and more. Consistent with the present disclosure, market research entity 110 may be a part of (or may work with) supplier 115. In another example, server 135 may determine product compliance to a predetermined planogram, and output device 145B may present to supplier 115 information about the level of product compliance at one or more retail stores 105 (for example in a specific retail store 105, in a group of retail stores 105 associated with supplier 115, in all retail stores 105, and so forth). The predetermined planogram may be associated with contractual obligations and/or other preferences related to the retailer methodology for placement of products on the store shelves. In another example, server 135 may determine that a specific store shelf has a type of fault in the product placement, and output device 145C may present to a manager of retail store 105 a user-notification that may include information about a correct display location of a misplaced product, information about a store shelf associated with the misplaced product, information about a type of the misplaced product, and/or a visual depiction of the misplaced product. In another example, server 135 may identify which products are available on the shelf and output device 145D may present to user 120 an updated list of products.

The components and arrangements shown in FIG. 1 are not intended to limit the disclosed embodiments, as the system components used to implement the disclosed processes and features may vary. In one embodiment, system 100 may include multiple servers 135, and each server 135 may host a certain type of service. For example, a first server may process images received from capturing devices 125 to identify at least some of the plurality of products in the image, and a second server may determine from the identified products in retail stores 105 compliance with contractual obligations between retail stores 105 and suppliers 115. In another embodiment, system 100 may include multiple servers 135, a first type of servers 135 that may process information from specific capturing devices 125 (e.g., handheld devices of data collection agents) or from specific retail stores 105 (e.g., a server dedicated to a specific retail store 105 may be placed in or near the store). System 100 may further include a second type of servers 135 that collect and process information from the first type of servers 135.

Figure 2:
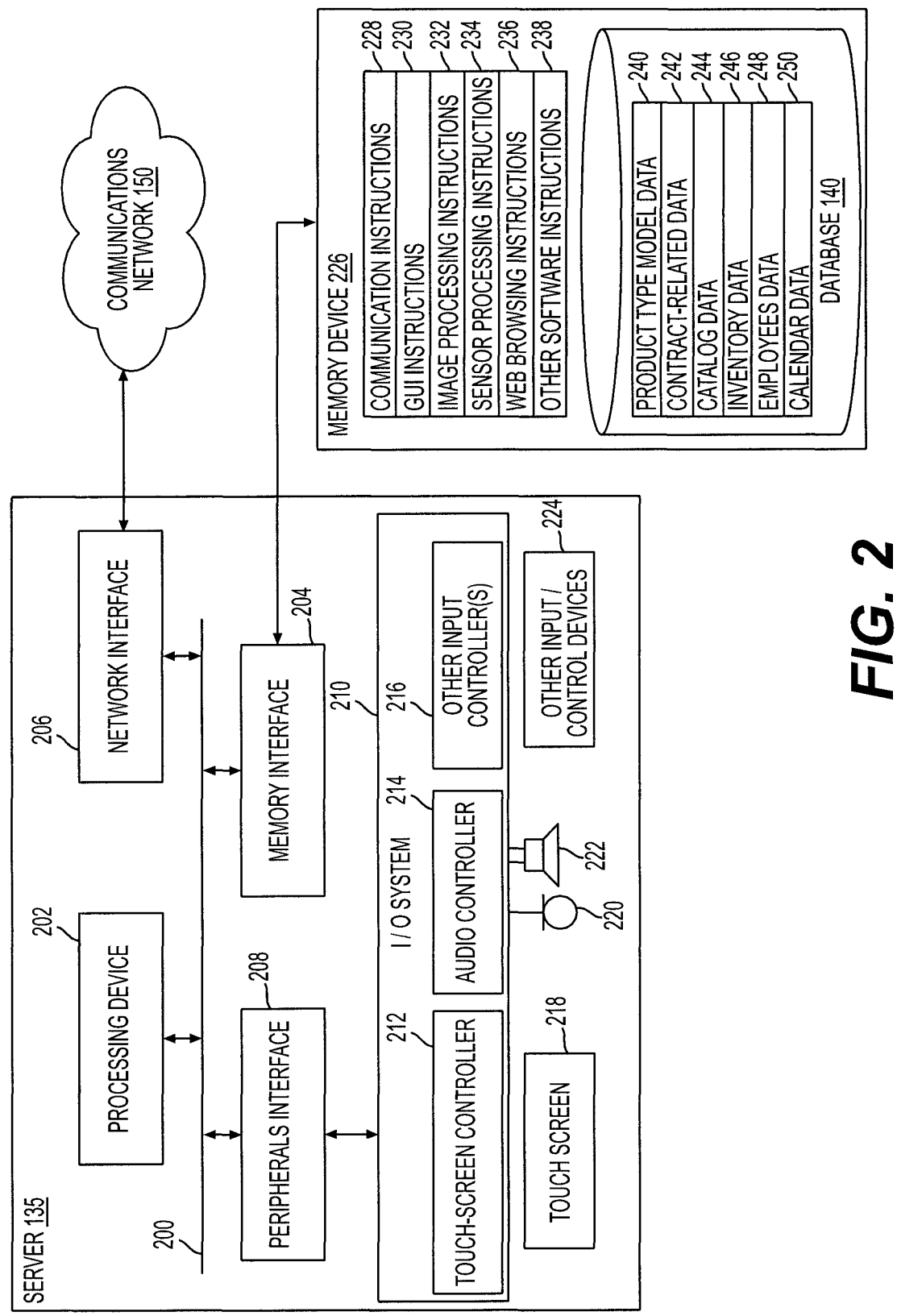
FIG. 2 is a block diagram that illustrates some of the components of an image processing system, consistent with the present disclosure.

FIG. 2 is a block diagram representative of an example configuration of server 135. In one embodiment, server 135 may include a bus 200 (or any other communication mechanism) that interconnects subsystems and components for transferring information within server 135. For example, bus 200 may interconnect a processing device 202, a memory interface 204, a network interface 206, and a peripherals interface 208 connected to an I/O system 210.

Processing device 202, shown in FIG. 2, may include at least one processor configured to execute computer programs, applications, methods, processes, or other software to execute particular instructions associated with embodiments described in the present disclosure. The term "processing device" refers to any physical device having an electric circuit that performs a logic operation. For example, processing device 202 may include one or more processors, integrated circuits, microchips, microcontrollers, microprocessors, all or part of a central processing unit (CPU), graphics processing unit (GPU), digital signal processor (DSP), field programmable gate array (FPGA), or other circuits suitable for executing instructions or performing logic operations. Processing device 202 may include at least one processor configured to perform functions of the disclosed methods such as a microprocessor manufactured by Intel™, Nvidia™, manufactured by AMD™, and so forth. Processing device 202 may include a single core or multiple core processors executing parallel processes simultaneously. In one example, processing device 202 may be a single core processor configured with virtual processing technologies. Processing device 202 may implement virtual machine technologies or other technologies to provide the ability to execute, control, run, manipulate, store, etc., multiple software processes, applications, programs, etc. In another example, processing device 202 may include a multiple-core processor arrangement (e.g., dual, quad core, etc.) configured to provide parallel processing functionalities to allow a device associated with processing device 202 to execute multiple processes simultaneously. It is appreciated that other types of processor arrangements could be implemented to provide the capabilities disclosed herein.

Consistent with the present disclosure, the methods and processes disclosed herein may be performed by server 135 as a result of processing device 202 executing one or more sequences of one or more instructions contained in a non-transitory computer-readable storage medium. As used herein, a non-transitory computer-readable storage medium refers to any type of physical memory on which information or data readable by at least one processor may be stored. Examples include random access memory (RAM), read-only memory (ROM), volatile memory, nonvolatile memory, hard drives, CD ROMs, DVDs, flash drives, disks, any other optical data storage medium, any physical medium with patterns of holes, a RAM, a PROM, an EPROM, a FLASH-EPROM or any other flash memory, NVRAM, a cache, a register, any other memory chip or cartridge, and networked versions of the same. The terms "memory" and "computer-readable storage medium" may refer to multiple structures, such as a plurality of memories or computer-readable storage mediums located within server 135, or at a remote location. Additionally, one or more computer-readable storage mediums may be utilized in implementing a computer-implemented method. The term "computer-readable storage medium" should be understood to include tangible items and exclude carrier waves and transient signals.

According to one embodiment, server 135 may include network interface 206 (which may also be any communications interface) coupled to bus 200. Network interface 206 may provide one-way or two-way data communication to a local network, such as network 150. Network interface 206 may include an integrated services digital network (ISDN) card, cable modem, satellite modem, or a modem to provide a data communication connection to a corresponding type of telephone line. As another example, network interface 206 may include a local area network (LAN) card to provide a data communication connection to a compatible LAN. In another embodiment, network interface 206 may include an Ethernet port connected to radio frequency receivers and transmitters and/or optical (e.g., infrared) receivers and transmitters. The specific design and implementation of network interface 206 depends on the communications network(s) over which server 135 is intended to operate. As described above, server 135 may be a cloud server or a local server associated with retail store 105. In any such implementation, network interface 206 may be configured to send and receive electrical, electromagnetic, or optical signals, through wires or wirelessly, that may carry analog or digital data streams representing various types of information. In another example, the implementation of network interface 206 may be similar or identical to the implementation described below for network interface 306.

Server 135 may also include peripherals interface 208 coupled to bus 200. Peripherals interface 208 may be connected to sensors, devices, and subsystems to facilitate multiple functionalities. In one embodiment, peripherals interface 208 may be connected to I/O system 210 configured to receive signals or input from devices and provide signals or output to one or more devices that allow data to be received and/or transmitted by server 135. In one embodiment I/O system 210 may include or be associated with output device 145. For example, I/O system 210 may include a touch screen controller 212, an audio controller 214, and/or other input controller(s) 216. Touch screen controller 212 may be coupled to a touch screen 218. Touch screen 218 and touch screen controller 212 can, for example, detect contact, movement, or break thereof using any of a plurality of touch sensitivity technologies, including but not limited to capacitive, resistive, infrared, and surface acoustic wave technologies as well as other proximity sensor arrays or other elements for determining one or more points of contact with touch screen 218. Touch screen 218 may also, for example, be used to implement virtual or soft buttons and/or a keyboard. In addition to or instead of touch screen 218, I/O system 210 may include a display screen (e.g., CRT, LCD, etc.), virtual reality device, augmented reality device, and so forth. Specifically, touch screen controller 212 (or display screen controller) and touch screen 218 (or any of the alternatives mentioned above) may facilitate visual output from server 135. Audio controller 214 may be coupled to a microphone 220 and a speaker 222 to facilitate voice-enabled functions, such as voice recognition, voice replication, digital recording, and telephony functions. Specifically, audio controller 214 and speaker 222 may facilitate audio output from server 135. The other input controller(s) 216 may be coupled to other input/control devices 224, such as one or more buttons, keyboards, rocker switches, thumbwheel, infrared port, USB port, image sensors, motion sensors, depth sensors, and/or a pointer device such as a computer mouse or a stylus.

In some embodiments, processing device 202 may use memory interface 204 to access data and a software product stored on a memory device 226. Memory device 226 may include operating system programs for server 135 that perform operating system functions when executed by the processing device. By way of example, the operating system programs may include Microsoft Windows™, Unix™ Linux™, Apple™ operating systems, personal digital assistant (PDA) type operating systems such as Apple iOS, Google Android, Blackberry OS, or other types of operating systems.

Memory device 226 may also store communication instructions 228 to facilitate communicating with one or more additional devices (e.g., capturing device 125), one or more computers (e.g., output devices 145A-145D) and/or one or more servers. Memory device 226 may include graphical user interface instructions 230 to facilitate graphic user interface processing; image processing instructions 232 to facilitate image data processing-related processes and functions; sensor processing instructions 234 to facilitate sensor-related processing and functions; web browsing instructions 236 to facilitate web browsing-related processes and functions; and other software instructions 238 to facilitate other processes and functions. Each of the above identified instructions and applications may correspond to a set of instructions for performing one or more functions described above. These instructions need not be implemented as separate software programs, procedures, or modules. Memory device 226 may include additional instructions or fewer instructions. Furthermore, various functions of server 135 may be implemented in hardware and/or in software, including in one or more signal processing and/or application specific integrated circuits. For example, server 135 may execute an image processing algorithm to identify in received images one or more products and/or obstacles, such as shopping carts, people, and more.

In one embodiment, memory device 226 may store database 140. Database 140 may include product type model data 240 (e.g., an image representation, a list of features, a model obtained by training machine learning algorithm using training examples, an artificial neural network, and more) that may be used to identify products in received images; contract-related data 242 (e.g., planograms, promotions data, etc.) that may be used to determine if the placement of products on the store shelves and/or the promotion execution are consistent with obligations of retail store 105; catalog data 244 (e.g., retail store chain's catalog, retail store's master file, etc.) that may be used to check if all product types that should be offered in retail store 105 are in fact in the store, if the correct price is displayed next to an identified product, etc.; inventory data 246 that may be used to determine if additional products should be ordered from suppliers 115; employee data 248 (e.g., attendance data, records of training provided, evaluation and other performance-related communications, productivity information, etc.) that may be used to assign specific store associates to certain tasks; and calendar data 250 (e.g., holidays, national days, international events, etc.) that may be used to determine if a possible change in a product model is associated with a certain event. In other embodiments of the disclosure, database 140 may store additional types of data or fewer types of data. Furthermore, various types of data may be stored in one or more memory devices other than memory device 226. Throughout this disclosure, the term store associate of a retail store may refer to any person or a robot who is tasked with performing actions in the retail store configured to support the operation of the retail store. Some non-limiting examples of store associates may include store employees, subcontractors contracted to perform such actions in the retail store, employees of entities associated with the retail store (such as suppliers of the retail store, distributers of products sold in the retail store, etc.), people engaged through crowd sourcing to perform such actions in the retail store, robots used to perform such actions in the retail store, and so forth.

The components and arrangements shown in FIG. 2 are not intended to limit the disclosed embodiments. As will be appreciated by a person skilled in the art having the benefit of this disclosure, numerous variations and/or modifications may be made to the depicted configuration of server 135. For example, not all components may be essential for the operation of server 135 in all cases. Any component may be located in any appropriate part of server 135, and the components may be rearranged into a variety of configurations while providing the functionality of the disclosed embodiments. For example, some servers may not include some of the elements shown in I/O system 215.

Figure 3:
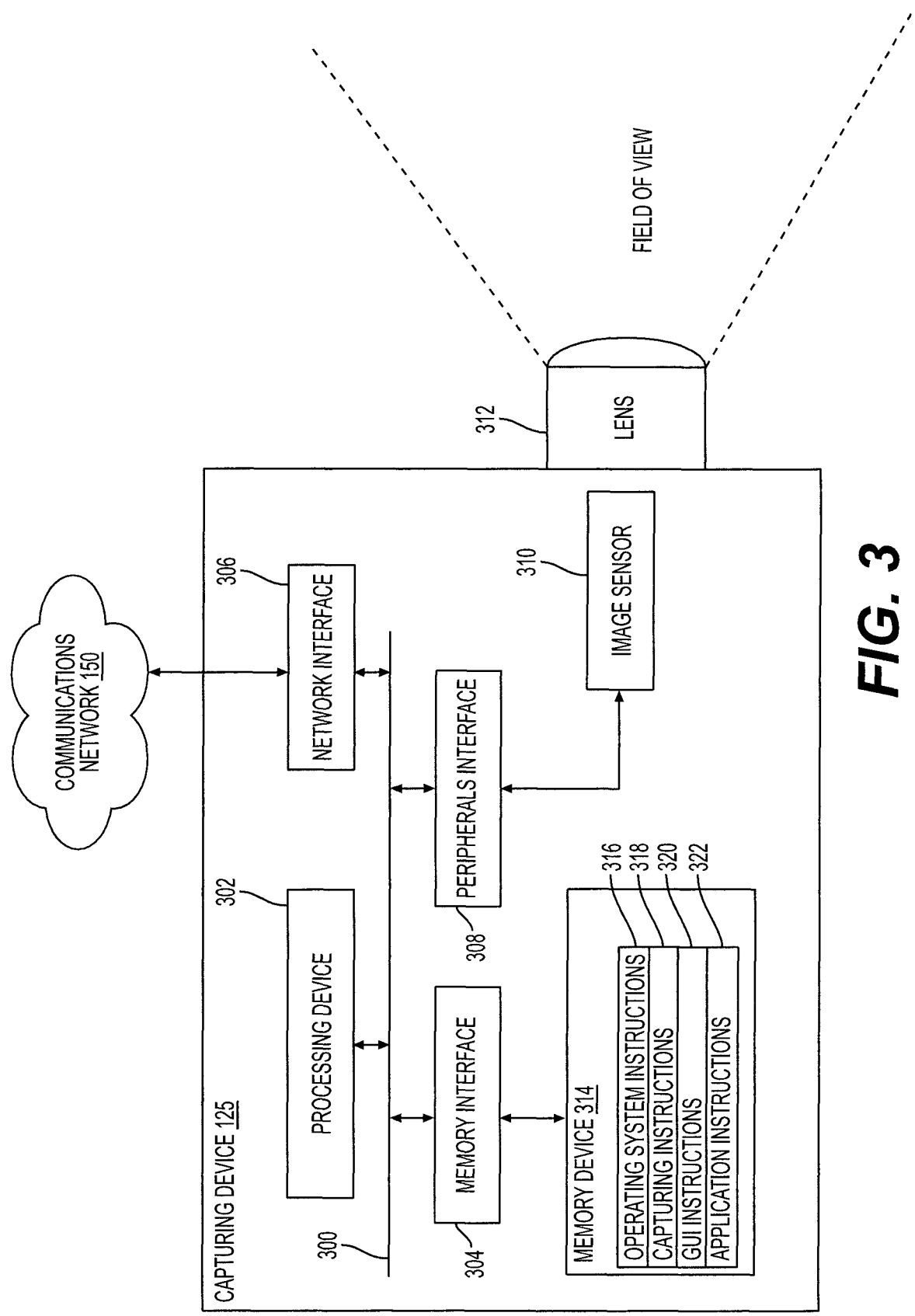
FIG. 3 is a block diagram that illustrates an exemplary embodiment of a capturing device, consistent with the present disclosure.

FIG. 3 is a block diagram representation of an example configuration of capturing device 125. In one embodiment, capturing device 125 may include a processing device 302, a memory interface 304, a network interface 306, and a peripherals interface 308 connected to image sensor 310. These components may be separated or may be integrated in one or more integrated circuits. The various components in capturing device 125 may be coupled by one or more communication buses or signal lines (e.g., bus 300). Different aspects of the functionalities of the various components in capturing device 125 may be understood from the description above regarding components of server 135 having similar functionality.

According to one embodiment, network interface 306 may be used to facilitate communication with server 135. Network interface 306 may be an Ethernet port connected to radio frequency receivers and transmitters and/or optical receivers and transmitters. The specific design and implementation of network interface 306 depends on the communications network(s) over which capturing device 125 is intended to operate. For example, in some embodiments, capturing device 125 may include a network interface 306 designed to operate over a GSM network, a GPRS network, an EDGE network, a Wi-Fi or WiMax network, a Bluetooth® network, etc. In another example, the implementation of network interface 306 may be similar or identical to the implementation described above for network interface 206.

In the example illustrated in FIG. 3, peripherals interface 308 of capturing device 125 may be connected to at least one image sensor 310 associated with at least one lens 312 for capturing image data in an associated field of view. In some configurations, capturing device 125 may include a plurality of image sensors associated with a plurality of lenses 312. In other configurations, image sensor 310 may be part of a camera included in capturing device 125. According to some embodiments, peripherals interface 308 may also be connected to other sensors (not shown), such as a motion sensor, a light sensor, infrared sensor, sound sensor, a proximity sensor, a temperature sensor, a biometric sensor, or other sensing devices to facilitate related functionalities. In addition, a positioning sensor may also be integrated with, or connected to, capturing device 125. For example, such positioning sensor may be implemented using one of the following technologies: Global Positioning System (GPS), GLObal NAvigation Satellite System (GLONASS), Galileo global navigation system, BeiDou navigation system, other Global Navigation Satellite Systems (GNSS), Indian Regional Navigation Satellite System (IRNSS), Local Positioning Systems (LPS), Real-Time Location Systems (RTLS), Indoor Positioning System (IPS), Wi-Fi based positioning systems, cellular triangulation, and so forth. For example, the positioning sensor may be built into mobile capturing device 125, such as smartphone devices. In another example, position software may allow mobile capturing devices to use internal or external positioning sensors (e.g., connecting via a serial port or Bluetooth).

Consistent with the present disclosure, capturing device 125 may include digital components that collect data from image sensor 310, transform it into an image, and store the image on a memory device 314 and/or transmit the image using network interface 306. In one embodiment, capturing device 125 may be fixedly mountable to a store shelf or to other objects in the retail store (such as walls, ceilings, floors, refrigerators, checkout stations, displays, dispensers, rods which may be connected to other objects in the retail store, and so forth). In one embodiment, capturing device 125 may be split into at least two housings such that only image sensor 310 and lens 312 may be visible on the store shelf, and the rest of the digital components may be located in a separate housing. An example of this type of capturing device is described below with reference to FIGS. 5-7.

Consistent with the present disclosure, capturing device 125 may use memory interface 304 to access memory device 314. Memory device 314 may include high-speed, random access memory and/or non-volatile memory such as one or more magnetic disk storage devices, one or more optical storage devices, and/or flash memory (e.g., NAND, NOR) to store captured image data. Memory device 314 may store operating system instructions 316, such as DARWIN, RTXC, LINUX, iOS, UNIX, LINUX, OS X, WINDOWS, or an embedded operating system such as VXWorkS. Operating system 316 may include instructions for handling basic system services and for performing hardware dependent tasks. In some implementations, operating system 316 may include a kernel (e.g., UNIX kernel, LINUX kernel, etc.). In addition, memory device 314 may store capturing instructions 318 to facilitate processes and functions related to image sensor 310; graphical user interface instructions 320 that enables a user associated with capturing device 125 to control the capturing device and/or to acquire images of an area-of-interest in a retail establishment; and application instructions 322 to facilitate a process for monitoring compliance of product placement or other processes.

The components and arrangements shown in FIG. 3 are not intended to limit the disclosed embodiments. As will be appreciated by a person skilled in the art having the benefit of this disclosure, numerous variations and/or modifications may be made to the depicted configuration of capturing device 125. For example, not all components are essential for the operation of capturing device 125 in all cases. Any component may be located in any appropriate part of capturing device 125, and the components may be rearranged into a variety of configurations while providing the functionality of the disclosed embodiments. For example, some capturing devices may not have lenses, and other capturing devices may include an external memory device instead of memory device 314.

Figure 4A:
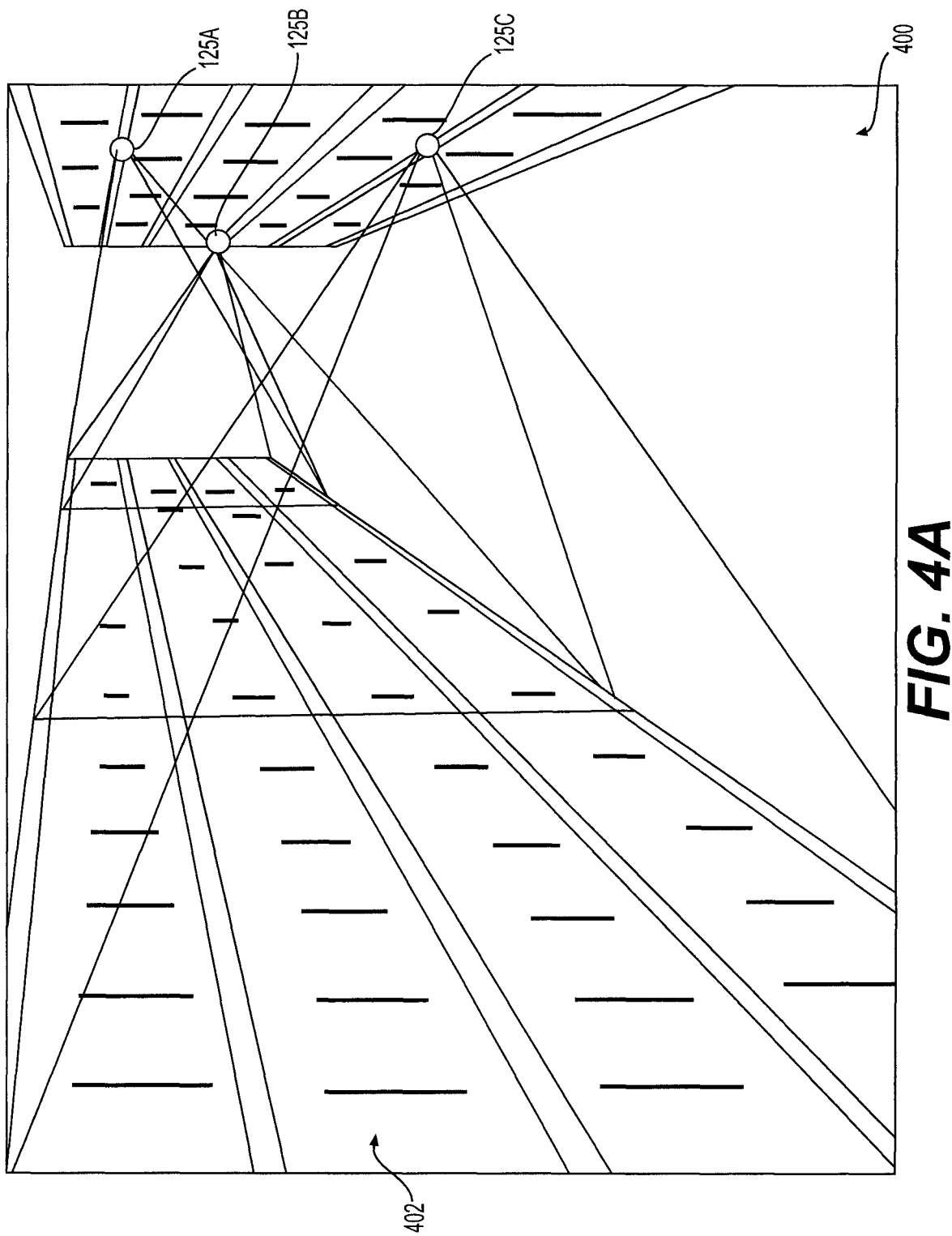
FIG. 4A is a schematic illustration of an example configuration for capturing image data in a retail store, consistent with the present disclosure.
Figure 4B:
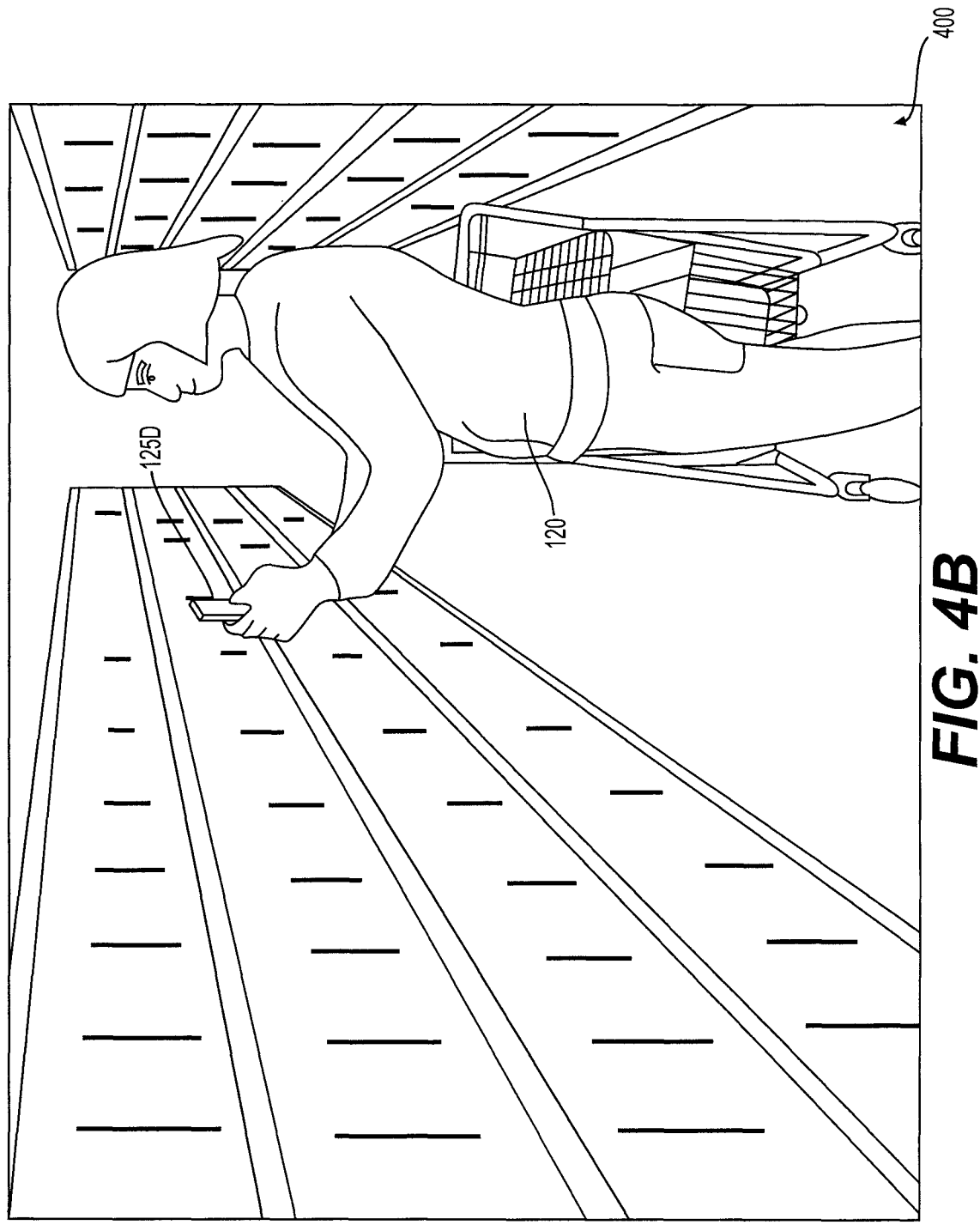
FIG. 4B is a schematic illustration of another example configuration for capturing image data in a retail store, consistent with the present disclosure.
Figure 4C:
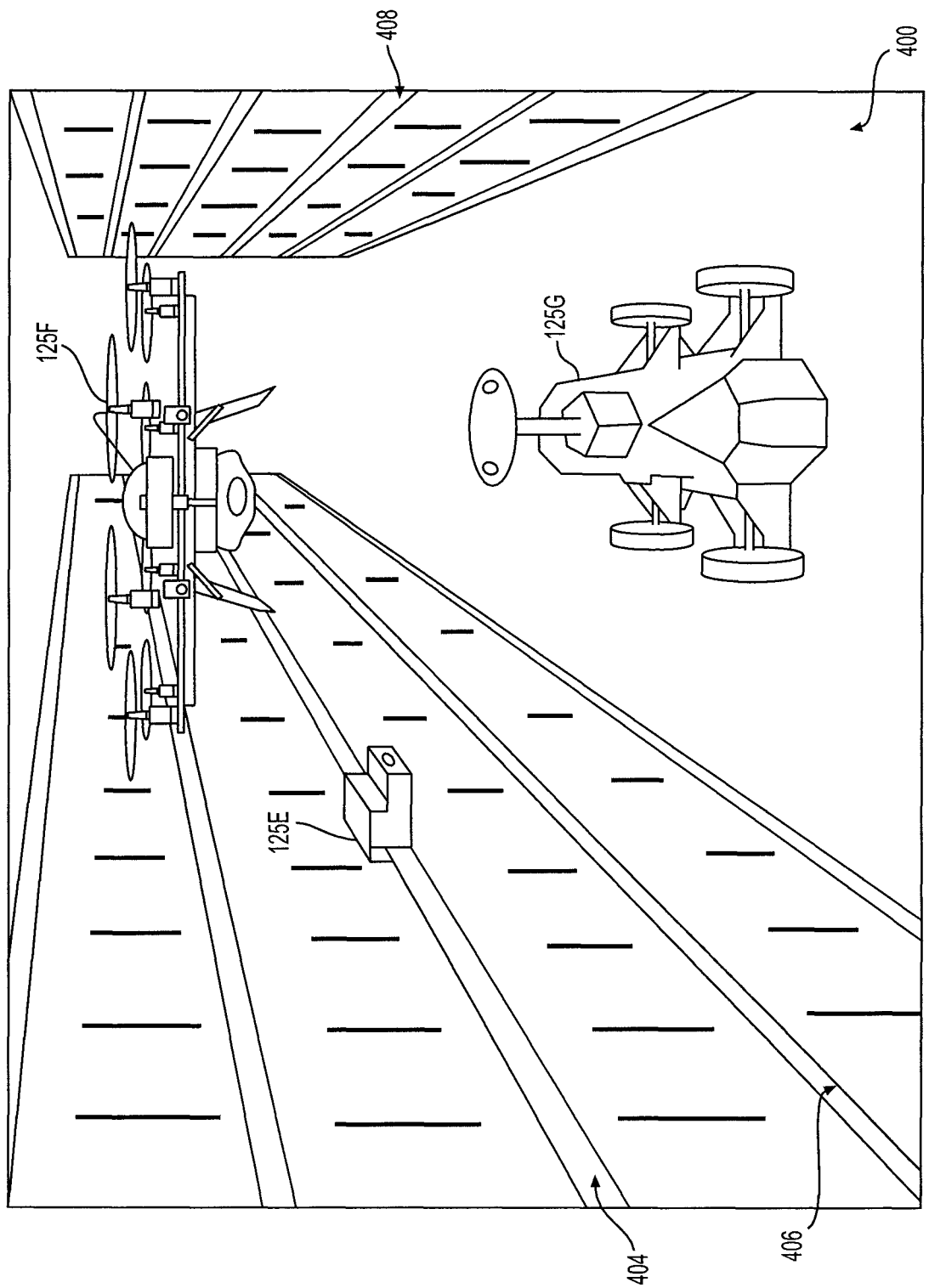
FIG. 4C is a schematic illustration of another example configuration for capturing image data in a retail store, consistent with the present disclosure.

FIGS. 4A-4C illustrate example configurations for capturing image data in retail store 105 according to disclosed embodiments. FIG. 4A illustrates how an aisle 400 of retail store 105 may be imaged using a plurality of capturing devices 125 fixedly connected to store shelves. FIG. 4B illustrates how aisle 400 of retail store 105 may be imaged using a handheld communication device. FIG. 4C illustrates how aisle 400 of retail store 105 may be imaged by robotic devices equipped with cameras.

With reference to FIG. 4A and consistent with the present disclosure, retail store 105 may include a plurality of capturing devices 125 fixedly mounted (for example, to store shelves, walls, ceilings, floors, refrigerators, checkout stations, displays, dispensers, rods which may be connected to other objects in the retail store, and so forth) and configured to collect image data. As depicted, one side of an aisle 400 may include a plurality of capturing devices 125 (e.g., 125A, 125B, and 125C) fixedly mounted thereon and directed such that they may capture images of an opposing side of aisle 400. The plurality of capturing devices 125 may be connected to an associated mobile power source (e.g., one or more batteries), to an external power supply (e.g., a power grid), obtain electrical power from a wireless power transmission system, and so forth. As depicted in FIG. 4A, the plurality of capturing devices 125 may be placed at different heights and at least their vertical fields of view may be adjustable. Generally, both sides of aisle 400 may include capturing devices 125 in order to cover both sides of aisle 400.

Differing numbers of capturing devices 125 may be used to cover shelving unit 402. In addition, there may be an overlap region in the horizontal field of views of some of capturing devices 125. For example, the horizontal fields of view of capturing devices (e.g., adjacent capturing devices) may at least partially overlap with one another. In another example, one capturing device may have a lower field of view than the field of view of a second capturing device, and the two capturing devices may have at least partially overlapping fields of view. According to one embodiment, each capturing device 125 may be equipped with network interface 306 for communicating with server 135. In one embodiment, the plurality of capturing devices 125 in retail store 105 may be connected to server 135 via a single WLAN. Network interface 306 may transmit information associated with a plurality of images captured by the plurality of capturing devices 125 for analysis purposes. In one example, server 135 may determine an existence of an occlusion event (such as, by a person, by store equipment, such as a ladder, cart, etc.) and may provide a notification to resolve the occlusion event. In another example, server 135 may determine if a disparity exists between at least one contractual obligation and product placement as determined based on automatic analysis of the plurality of images. The transmitted information may include raw images, cropped images, processed image data, data about products identified in the images, and so forth. Network interface 306 may also transmit information identifying the location of the plurality capturing devices 125 in retail store 105.

With reference to FIG. 4B and consistent with the present disclosure, server 135 may receive image data captured by users 120. In a first embodiment, server 135 may receive image data acquired by store associates. In one implementation, a handheld device of a store associate (e.g., capturing device 125D) may display a real-time video stream captured by the image sensor of the handheld device. The real-time video stream may be augmented with markings identifying to the store associate an area-of-interest that needs manual capturing of images. One of the situations in which manual image capture may be desirable may occur where the area-of-interest is outside the fields of view of a plurality of cameras fixedly connected to store shelves in aisle 400. In other situations, manual capturing of images of an area-of-interest may be desirable when a current set of acquired images is out of date (e.g., obsolete in at least one respect) or of poor quality (e.g., lacking focus, obstacles, lesser resolution, lack of light, etc.). Additional details of this embodiment are described in Applicant's International Patent Application No. PCT/IB2018/001107, which is incorporated herein by reference.

In a second embodiment, server 135 may receive image data acquired by crowd sourcing. In one exemplary implementation, server 135 may provide a request to a detected mobile device for an updated image of the area-of-interest in aisle 400. The request may include an incentive (e.g., $2 discount) to user 120 for acquiring the image. In response to the request, user 120 may acquire and transmit an up-to-date image of the area-of-interest. After receiving the image from user 120, server 135 may transmit the accepted incentive or agreed upon reward to user 120. The incentive may comprise a text notification and a redeemable coupon. In some embodiments, the incentive may include a redeemable coupon for a product associated with the area-of-interest. Server 135 may generate image-related data based on aggregation of data from images received from crowd sourcing and from images received from a plurality of cameras fixedly connected to store shelves. Additional details of this embodiment are described in Applicant's International Patent Application No. PCT/IB2017/000919, which is incorporated herein by reference.

With reference to FIG. 4C and consistent with the present disclosure, server 135 may receive image data captured by robotic devices with cameras traversing in aisle 400. The present disclosure is not limited to the type of robotic devices used to capture images of retail store 105. In some embodiments, the robotic devices may include a robot on a track (e.g., a Cartesian robot configured to move along an edge of a shelf or in parallel to a shelf, such as capturing device 125E), a drone (e.g., capturing device 125F), and/or a robot that may move on the floor of the retail store (e.g., a wheeled robot such as capturing device 125G, a legged robot, a snake-like robot, etc.). The robotic devices may be controlled by server 135 and may be operated remotely or autonomously. In one example, server 135 may instruct capturing device 125E to perform periodic scans at times when no customers or other obstructions are identified in aisle 400. Specifically, capturing device 125E may be configured to move along store shelf 404 and to capture images of products placed on store shelf 404, products placed on store shelf 406, or products located on shelves opposite store shelf (e.g., store shelf 408). In another example, server 135 may instruct capturing device 125F to perform a scan of all the area of retail store 105 before the opening hour. In another example, server 135 may instruct capturing device 125G to capture a specific area-of-interest, similar as described above with reference to receiving images acquired by the store associates. In some embodiments, robotic capturing devices (such as 125F and 125G) may include an internal processing unit that may allow them to navigate autonomously within retail store 105. For example, the robotic capturing devices may use input from sensors (e.g., image sensors, depth sensors, proximity sensors, etc.), to avoid collision with objects or people, and to complete the scan of the desired area of retail store 105.

As discussed above with reference to FIG. 4A, the image data representative of products displayed on store shelves may be acquired by a plurality of stationary capturing devices 125 fixedly mounted in the retail store. One advantage of having stationary image capturing devices spread throughout retail store 105 is the potential for acquiring product images from set locations and on an ongoing basis such that up-to-date product status may be determined for products throughout a retail store at any desired periodicity (e.g., in contrast to a moving camera system that may acquire product images more infrequently). However, there may be certain challenges in this approach. The distances and angles of the image capturing devices relative to the captured products should be selected such as to enable adequate product identification, especially when considered in view of image sensor resolution and/or optics specifications. For example, a capturing device placed on the ceiling of retail store 105 may have sufficient resolutions and optics to enable identification of large products (e.g., a pack of toilet paper), but may be insufficient for identifying smaller products (e.g., deodorant packages). The image capturing devices should not occupy shelf space that is reserved for products for sale. The image capturing devices should not be positioned in places where there is a likelihood that their fields of view will be regularly blocked by different objects. The image capturing devices should be able to function for long periods of time with minimum maintenance. For example, a requirement for frequent replacement of batteries may render certain image acquisition systems cumbersome to use, especially where many image acquisition devices are in use throughout multiple locations in a retail store and across multiple retail stores. The image capturing devices should also include processing capabilities and transmission capabilities for providing real time or near real time image data about products. The disclosed image acquisition systems address these challenges.

FIG. 5A illustrates an example of a system 500 for acquiring images of products in retail store 105. Throughout the disclosure, capturing device 125 may refer to a system, such as system 500 shown in FIG. 5A. As shown, system 500 may include a first housing 502 configured for location on a retail shelving unit (e.g., as illustrated in FIG. 5B), and a second housing 504 configured for location on the retail shelving unit separate from first housing 502. The first and the second housing may be configured for mounting on the retail shelving unit in any suitable way (e.g., screws, bolts, clamps, adhesives, magnets, mechanical means, chemical means, etc.). In some embodiments, first housing 502 may include an image capture device 506 (e.g., a camera module that may include image sensor 310) and second housing 504 may include at least one processor (e.g., processing device 302) configured to control image capture device 506 and also to control a network interface (e.g., network interface 306) for communicating with a remote server (e.g., server 135).

System 500 may also include a data conduit 508 extending between first housing 502 and second housing 504. Data conduit 508 may be configured to enable transfer of control signals from the at least one processor to image capture device 506 and to enable collection of image data acquired by image capture device 506 for transmission by the network interface. Consistent with the present disclosure, the term "data conduit" may refer to a communications channel that may include either a physical transmission medium such as a wire or a logical connection over a multiplexed medium such as a radio channel In some embodiments, data conduit 508 may be used for conveying image data from image capture device 506 to at least one processor located in second housing 504. Consistent with one implementation of system 500, data conduit 508 may include flexible printed circuits and may have a length of at least about 5 cm, at least about 10 cm, at least about 15 cm, etc. The length of data conduit 508 may be adjustable to enable placement of first housing 502 separately from second housing 504. For example, in some embodiments, data conduit may be retractable within second housing 504 such that the length of data conduit exposed between first housing 502 and second housing 504 may be selectively adjusted.

In one embodiment, the length of data conduit 508 may enable first housing 502 to be mounted on a first side of a horizontal store shelf facing the aisle (e.g., store shelf 510 illustrated in FIG. 5B) and second housing 504 to be mounted on a second side of store shelf 510 that faces the direction of the ground (e.g., an underside of a store shelf). In this embodiment, data conduit 508 may be configured to bend around an edge of store shelf 510 or otherwise adhere/follow contours of the shelving unit. For example, a first portion of data conduit 508 may be configured for location on the first side of store shelf 510 (e.g., a side facing an opposing retail shelving unit across an aisle) and a second portion of data conduit 508 may be configured for location on a second side of store shelf 510 (e.g., an underside of the shelf, which in some cases may be orthogonal to the first side). The second portion of data conduit 508 may be longer than the first portion of data conduit 508. Consistent with another embodiment, data conduit 508 may be configured for location within an envelope of a store shelf. For example, the envelope may include the outer boundaries of a channel located within a store shelf, a region on an underside of an L-shaped store shelf, a region between two store shelves, etc. Consistent with another implementation of system 500 discussed below, data conduit 508 may include a virtual conduit associated with a wireless communications link between first housing 502 and second housing 504.

FIG. 5B illustrates an exemplary configuration for mounting first housing 502 on store shelf 510. Consistent with the present disclosure, first housing 502 may be placed on store shelf 510, next to or embedded in a plastic cover that may be used for displaying prices. Alternatively, first housing 502 may be placed or mounted on any other location in retail store 105. For example, first housing 502 may be placed or mounted on the walls, on the ceiling, on refrigerator units, on display units, and more. The location and/or orientation of first housing 502 may be selected such that a field of view of image capture device 506 may cover at least a portion of an opposing retail shelving unit. Consistent with the present disclosure, image capture device 506 may have a view angle of between 50 and 80 degrees, about 62 degrees, about 67 degrees, or about 75 degrees. Consistent with the present disclosure, image capture device 506 may include an image sensor having sufficient image resolution to enable detection of text associated with labels on an opposing retail shelving unit. In one embodiment, the image sensor may include m*n pixels. For example, image capture device 506 may have an 8 MP image sensor that includes an array of 3280*2464 pixels. Each pixel may include at least one photo-voltaic cell that converts the photons of the incident light to an electric signal. The electrical signal may be converted to digital data by an A/D converter and processed by the image processor (ISP). In one embodiment, the image sensor of image capture device 506 may be associated with a pixel size of between 1.1×1.1 um² and 1.7×1.7 um², for example, 1.4×1.4 um².

Figure 6A:
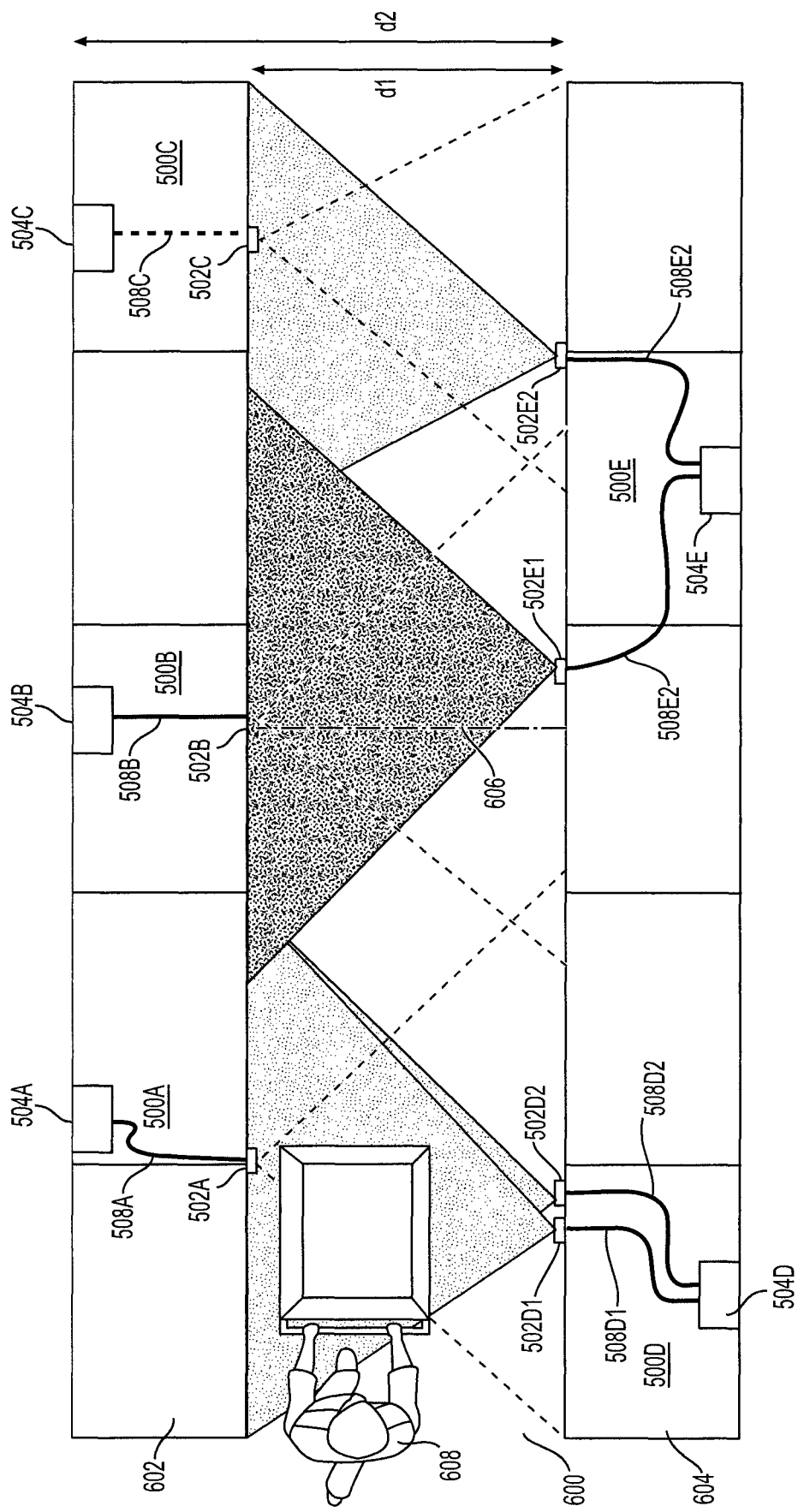
FIG. 6A is a top view representation of an aisle in a retail store with multiple image acquisition systems deployed thereon for acquiring images of products, consistent with the present disclosure.

Consistent with the present disclosure, image capture device 506 may be associated with a lens (e.g., lens 312) having a fixed focal length selected according to a distance expected to be encountered between retail shelving units on opposite sides of an aisle (e.g., distance d1 shown in FIG. 6A) and/or according to a distance expected to be encountered between a side of a shelving unit facing the aisle on one side of an aisle and a side of a shelving unit facing away of the aisle on the other side of the aisle (e.g., distance d2 shown in FIG. 6A). The focal length may also be based on any other expected distance between the image acquisition device and products to be imaged. As used herein, the term "focal length" refers to the distance from the optical center of the lens to a point where objects located at the point are substantially brought into focus. In contrast to zoom lenses, in fixed lenses the focus is not adjustable. The focus is typically set at the time of lens design and remains fixed. In one embodiment, the focal length of lens 312 may be selected based on the distance between two sides of aisles in the retail store (e.g., distance d1, distance d2, and so forth). In some embodiments, image capture device 506 may include a lens with a fixed focal length having a fixed value between 2.5 mm and 4.5 mm, such as about 3.1 mm, about 3.4 mm, about 3.7 mm. For example, when distance d1 between two opposing retail shelving units is about 2 meters, the focal length of the lens may be about 3.6 mm. Unless indicated otherwise, the term "about" with regards to a numeric value is defined as a variance of up to 5% with respect to the stated value. Of course, image capture devices having non-fixed focal lengths may also be used depending on the requirements of certain imaging environments, the power and space resources available, etc.

FIG. 5C illustrates an exploded view of second housing 504. In some embodiments, the network interface located in second housing 504 (e.g., network interface 306) may be configured to transmit to server 135 information associated with a plurality of images captured by image capture device 506. For example, the transmitted information may be used to determine if a disparity exists between at least one contractual obligation (e.g. planogram) and product placement. In one example, the network interface may support transmission speeds of 0.5 Mb/s, 1 Mb/s, 5 Mb/s, or more. Consistent with the present disclosure, the network interface may allow different modes of operations to be selected, such as: high-speed, slope-control, or standby. In high-speed mode, associated output drivers may have fast output rise and fall times to support high-speed bus rates; in slope-control, the electromagnetic interference may be reduced and the slope (i.e., the change of voltage per unit of time) may be proportional to the current output; and in standby mode, the transmitter may be switched off and the receiver may operate at a lower current.

Figure 6B:
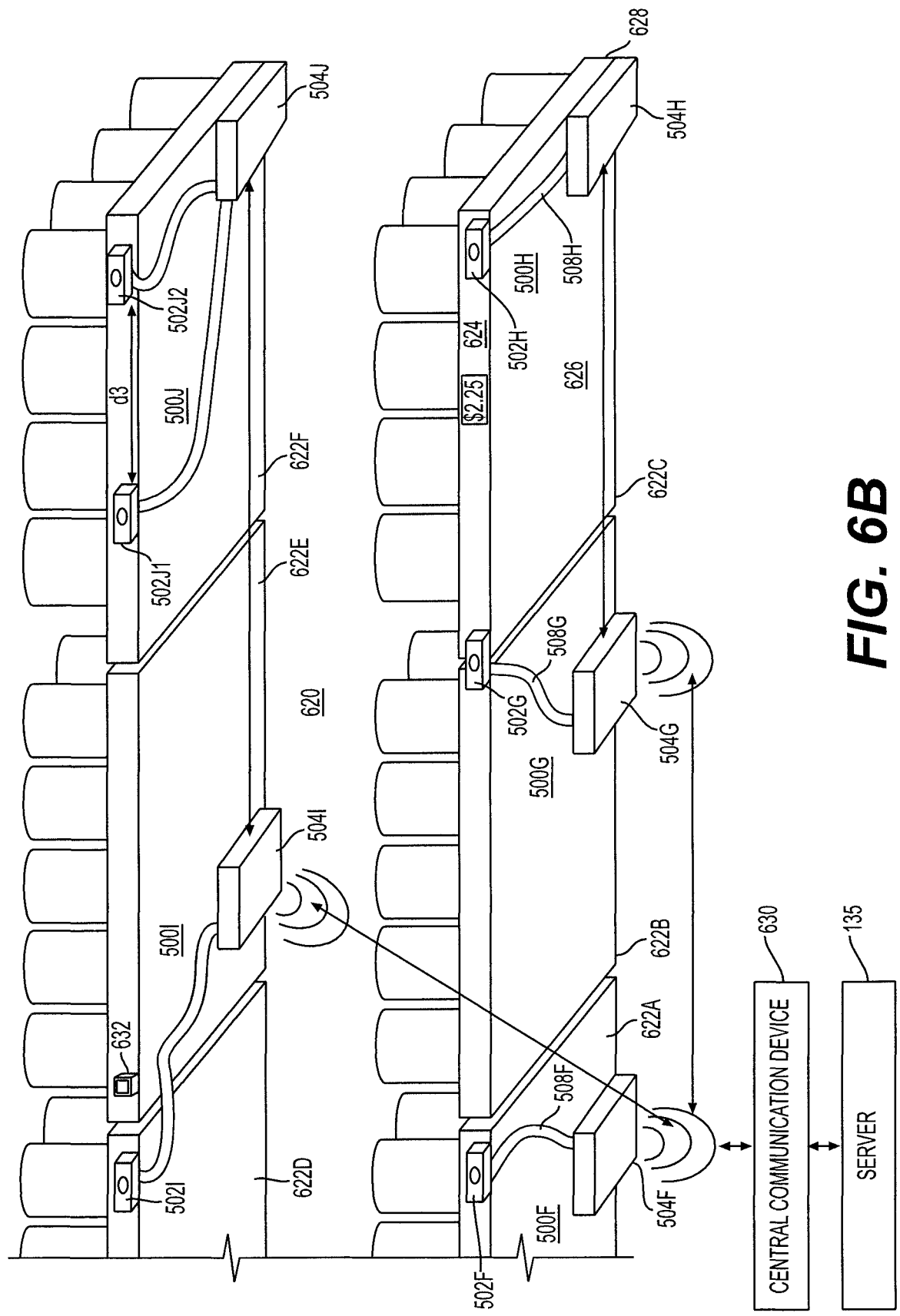
FIG. 6B is a perspective view representation of part of a retail shelving unit with multiple image acquisition systems deployed thereon for acquiring images of products, consistent with the present disclosure.

Consistent with the present disclosure, second housing 504 may include a power port 512 for conveying energy from a power source to first housing 502. In one embodiment, second housing 504 may include a section for at least one mobile power source 514 (e.g., in the depicted configuration the section is configured to house four batteries). The at least one mobile power source may provide sufficient power to enable image capture device 506 to acquire more than 1,000 pictures, more than 5,000 pictures, more than 10,000 pictures, or more than 15,000 pictures, and to transmit them to server 135. In one embodiment, mobile power source 514 located in a single second housing 504 may power two or more image capture devices 506 mounted on the store shelf. For example, as depicted in FIGS. 6A and 6B, a single second housing 504 may be connected to a plurality of first housings 502 with a plurality of image capture devices 506 covering different (overlapping or non-overlapping) fields of view. Accordingly, the two or more image capture devices 506 may be powered by a single mobile power source 514 and/or the data captured by two or more image capture devices 506 may be processed to generate a panoramic image by a single processing device located in second housing 504. In addition to mobile power source 514 or as an alternative to mobile power source 514, second housing 504 may also be connected to an external power source. For example, second housing 504 may be mounted to a store shelf and connected to an electric power grid. In this example, power port 512 may be connected to the store shelf through a wire for providing electrical power to image capture device 506. In another example, a retail shelving unit or retail store 105 may include a wireless power transmission system, and power port 512 may be connected to a device configured to obtain electrical power from the wireless power transmission system. In addition, as discussed below, system 500 may use power management policies to reduce the power consumption. For example, system 500 may use selective image capturing and/or selective transmission of images to reduce the power consumption or conserve power.

FIG. 6A illustrates a schematic diagram of a top view of aisle 600 in retail store 105 with multiple image acquisition systems 500 (e.g., 500A, 500B, 500C, 500D, and 500E) deployed thereon for acquiring images of products. Aisle 600 may include a first retail shelving unit 602 and a second retail shelving unit 604 that opposes first retail shelving unit 602. In some embodiments, different numbers of systems 500 may be mounted on opposing retail shelving units. For example, system 500A (including first housing 502A, second housing 504A, and data conduit 508A), system 500B (including first housing 502B second housing 504B, and data conduit 508B), and system 500C (including first housing 502C, second housing 504C, and data conduit 508C) may be mounted on first retail shelving unit 602; and system 500D (including first housing 502D1, first housing 502D2, second housing 504D, and data conduits 508D1 and 508D2) and system 500E (including first housing 502E1, first housing 502E2, second housing 504E, and data conduits 508E1 and 508E2) may be mounted on second retail shelving unit 604. Consistent with the present disclosure, image capture device 506 may be configured relative to first housing 502 such that an optical axis of image capture device 506 is directed toward an opposing retail shelving unit when first housing 502 is fixedly mounted on a retail shelving unit. For example, optical axis 606 of the image capture device associated with first housing 502B may be directed towards second retail shelving unit 604 when first housing 502B is fixedly mounted on first retail shelving unit 602. A single retail shelving unit may hold a number of systems 500 that include a plurality of image capturing devices. Each of the image capturing devices may be associated with a different field of view directed toward the opposing retail shelving unit. Different vantage points of differently located image capture devices may enable image acquisition relative to different sections of a retail shelf. For example, at least some of the plurality of image capturing devices may be fixedly mounted on shelves at different heights. Examples of such a deployment are illustrated in FIGS. 4A and 6B.

As shown in FIG. 6A each first housing 502 may be associated with a data conduit 508 that enables exchanging of information (e.g., image data, control signals, etc.) between the at least one processor located in second housing 504 and image capture device 506 located in first housing 502. In some embodiments, data conduit 508 may include a wired connection that supports data-transfer and may be used to power image capture device 506 (e.g., data conduit 508A, data conduit 508B, data conduit 508D1, data conduit 508D2, data conduit 508E1, and data conduit 508E2). Consistent with these embodiments, data conduit 508 may comply with a wired standard such as USB, Micro-USB, HDMI, Micro-HDMI, Firewire, Apple, etc. In other embodiments, data conduit 508 may be a wireless connection, such as a dedicated communications channel between the at least one processor located in second housing 504 and image capture device 506 located in first housing 502 (e.g., data conduit 508C). In one example, the communications channel may be established by two Near Field Communication (NFC) transceivers. In other examples, first housing 502 and second housing 504 may include interface circuits that comply with other short-range wireless standards such as Bluetooth, WiFi, ZigBee, etc.

In some embodiments of the disclosure, the at least one processor of system 500 may cause at least one image capture device 506 to periodically capture images of products located on an opposing retail shelving unit (e.g., images of products located on a shelf across an aisle from the shelf on which first housing 502 is mounted). The term "periodically capturing images" includes capturing an image or images at predetermined time intervals (e.g., every minute, every 30 minutes, every 150 minutes, every 300 minutes, etc.), capturing video, capturing an image every time a status request is received, and/or capturing an image subsequent to receiving input from an additional sensor, for example, an associated proximity sensor. Images may also be captured based on various other triggers or in response to various other detected events. In some embodiments, system 500 may receive an output signal from at least one sensor located on an opposing retail shelving unit. For example, system 500B may receive output signals from a sensing system located on second retail shelving unit 604. The output signals may be indicative of a sensed lifting of a product from second retail shelving unit 604 or a sensed positioning of a product on second retail shelving unit 604. In response to receiving the output signal from the at least one sensor located on second retail shelving unit 604, system 500B may cause image capture device 506 to capture one or more images of second retail shelving unit 604. Additional details on a sensing system, including the at least one sensor that generates output signals indicative of a sensed lifting of a product from an opposing retail shelving unit, is discussed below with reference to FIGS. 8-10.

Consistent with embodiments of the disclosure, system 500 may detect an object 608 in a selected area between first retail shelving unit 602 and second retail shelving unit 604. Such detection may be based on the output of one or more dedicated sensors (e.g., motion detectors, etc.) and/or may be based on image analysis of one or more images acquired by an image acquisition device. Such images, for example, may include a representation of a person or other object recognizable through various image analysis techniques (e.g., trained neural networks, Fourier transform analysis, edge detection, filters, face recognition, etc.). The selected area may be associated with distance d1 between first retail shelving unit 602 and second retail shelving unit 604. The selected area may be within the field of view of image capture device 506 or an area where the object causes an occlusion of a region of interest (such as a shelf, a portion of a shelf being monitored, and more). Upon detecting object 608, system 500 may cause image capture device 506 to forgo image acquisition while object 608 is within the selected area. In one example, object 608 may be an individual, such as a customer or a store associate. In another example, detected object 608 may be an inanimate object, such as a cart, box, carton, one or more products, cleaning robots, etc. In the example illustrated in FIG. 6A, system 500A may detect that object 608 has entered into its associated field of view (e.g., using a proximity sensor) and may instruct image capturing device 506 to forgo image acquisition. In alternative embodiments, system 500 may analyze a plurality of images acquired by image capture device 506 and identify at least one image of the plurality of images that includes a representation of object 608. Thereafter, system 500 may avoid transmission of at least part of the at least one identified image and/or information based on the at least one identified image to server 135.

As shown in FIG. 6A, the at least one processor contained in a second housing 504 may control a plurality of image capture devices 506 contained in a plurality of first housings 502 (e.g., systems 500D and 500E). Controlling image capturing device 506 may include instructing image capturing device 506 to capture an image and/or transmit captured images to a remote server (e.g., server 135). In some cases, each of the plurality of image capture devices 506 may have a field of view that at least partially overlaps with a field of view of at least one other image capture device 506 from among plurality of image capture devices 506. In one embodiment, the plurality of image capture devices 506 may be configured for location on one or more horizontal shelves and may be directed to substantially different areas of the opposing first retail shelving unit. In this embodiment, the at least one processor may control the plurality of image capture devices such that each of the plurality of image capture devices may capture an image at a different time. For example, system 500E may have a second housing 504E with at least one processor that may instruct a first image capturing device contained in first housing 502E1 to capture an image at a first time and may instruct a second image capturing device contained in first housing 502E2 to capture an image at a second time which differs from the first time. Capturing images in different times (or forwarding them to the at least one processor at different times) may assist in processing the images and writing the images in the memory associated with the at least one processor.

FIG. 6B illustrates a perspective view assembly diagram depicting a portion of a retail shelving unit 620 with multiple systems 500 (e.g., 500F, 500G, 500H, 500I, and 500J) deployed thereon for acquiring images of products. Retail shelving unit 620 may include horizontal shelves at different heights. For example, horizontal shelves 622A, 622B, and 622C are located below horizontal shelves 622D, 622E, and 622F. In some embodiments, a different number of systems 500 may be mounted on shelves at different heights. For example, system 500F (including first housing 502F and second housing 504F), system 500G (including first housing 502G and second housing 504G), and system 500H (including first housing 502H and second housing 504H) may be mounted on horizontal shelves associated with a first height; and system 500I (including first housing 502I, second housing 504I, and a projector 632) and system 500J (including first housing 502J1, first housing 502J2, and second housing 504J) may be mounted on horizontal shelves associated with a second height. In some embodiments, retail shelving unit 620 may include a horizontal shelf with at least one designated place (not shown) for mounting a housing of image capturing device 506. The at least one designated place may be associated with connectors such that first housing 502 may be fixedly mounted on a side of horizontal shelf 622 facing an opposing retail shelving unit using the connectors.

Consistent with the present disclosure, system 500 may be mounted on a retail shelving unit that includes at least two adjacent horizontal shelves (e.g., shelves 622A and 622B) forming a substantially continuous surface for product placement. The store shelves may include standard store shelves or customized store shelves. A length of each store shelf 622 may be at least 50 cm, less than 200 cm, or between 75 cm to 175 cm. In one embodiment, first housing 502 may be fixedly mounted on the retail shelving unit in a slit between two adjacent horizontal shelves. For example, first housing 502G may be fixedly mounted on retail shelving unit 620 in a slit between horizontal shelf 622B and horizontal shelf 622C. In another embodiment, first housing 502 may be fixedly mounted on a first shelf and second housing 504 may be fixedly mounted on a second shelf. For example, first housing 502I may be mounted on horizontal shelf 622D and second housing 504I may be mounted on horizontal shelf 622E. In another embodiment, first housing 502 may be fixedly mounted on a retail shelving unit on a first side of a horizontal shelf facing the opposing retail shelving unit and second housing 504 may be fixedly mounted on retail shelving unit 620 on a second side of the horizontal shelf orthogonal to the first side. For example, first housing 502H may mounted on a first side 624 of horizontal shelf 622C next to a label and second housing 504H may be mounted on a second side 626 of horizontal shelf 622C that faces down (e.g., towards the ground or towards a lower shelf). In another embodiment, second housing 504 may be mounted closer to the back of the horizontal shelf than to the front of the horizontal shelf. For example, second housing 504H may be fixedly mounted on horizontal shelf 622C on second side 626 closer to third side 628 of the horizontal shelf 622C than to first side 624. Third side 628 may be parallel to first side 624. As mentioned above, data conduit 508 (e.g., data conduit 508H) may have an adjustable or selectable length for extending between first housing 502 and second housing 504. In one embodiment, when first housing 502H is fixedly mounted on first side 624, the length of data conduit 508H may enable second housing 604H to be fixedly mounted on second side 626 closer to third side 628 than to first side 624.

As mentioned above, at least one processor contained in a single second housing 504 may control a plurality of image capture devices 506 contained in a plurality of first housings 502 (e.g., system 500J). In some embodiments, the plurality of image capture devices 506 may be configured for location on a single horizontal shelf and may be directed to substantially the same area of the opposing first retail shelving unit (e.g., system 500D in FIG. 6A). In these embodiments, the image data acquired by the first image capture device and the second image capture device may enable a calculation of depth information (e.g., based on image parallax information) associated with at least one product positioned on an opposing retail shelving unit. For example, system 500J may have single second housing 504J with at least one processor that may control a first image capturing device contained in first housing 502J1 and a second image capturing device contained in first housing 502J2. The distance d3 between the first image capture device contained in first housing 502J1 and the second image capture device contained in first housing 502J2 may be selected based on the distance between retail shelving unit 620 and the opposing retail shelving unit (e.g., similar to d1 and/or d2). For example, distance d3 may be at least 5 cm, at least 10 cm, at least 15 cm, less than 40 cm, less than 30 cm, between about 5 cm to about 20 cm, or between about 10 cm to about 15 cm. In another example, d3 may be a function of d1 and/or d2, a linear function of d1 and/or d2, a function of d1*log(d1) and/or d2*log(d2) such as a1*d1*log(d1) for some constant a1, and so forth. The data from the first image capturing device contained in first housing 502J1 and the second image capturing device contained in first housing 502J2 may be used to estimate the number of products on a store shelf of retail shelving unit 602. In related embodiments, system 500 may control a projector (e.g., projector 632) and image capture device 506 that are configured for location on a single store shelf or on two separate store shelves. For example, projector 632 may be mounted on horizontal shelf 622E and image capture device 506I may be mounted on horizontal shelf 622D. The image data acquired by image capture device 506 (e.g., included in first housing 502I) may include reflections of light patterns projected from projector 632 on the at least one product and/or the opposing retail shelving unit and may enable a calculation of depth information associated with at least one product positioned on the opposing retail shelving unit. The distance between projector 632 and the image capture device contained in first housing 502I may be selected based on the distance between retail shelving unit 620 and the opposing retail shelving unit (e.g., similar to d1 and/or d2). For example, the distance between the projector and the image capture device may be at least 5 cm, at least 10 cm, at least 15 cm, less than 40 cm, less than 30 cm, between about 5 cm to about 20 cm, or between about 10 cm to about 15 cm. In another example, the distance between the projector and the image capture device may be a function of d1 and/or d2, a linear function of d1 and/or d2, a function of d1*log(d1) and/or d2*log(d2) such as a1*d1*log(d1) for some constant a1, and so forth.

Consistent with the present disclosure, a central communication device 630 may be located in retail store 105 and may be configured to communicate with server 135 (e.g., via an Internet connection). The central communication device may also communicate with a plurality of systems 500 (for example, less than ten, ten, eleven, twelve, more than twelve, and so forth). In some cases, at least one system of the plurality of systems 500 may be located in proximity to central communication device 630. In the illustrated example, system 500F may be located in proximity to central communication device 630. In some embodiments, at least some of systems 500 may communicate directly with at least one other system 500. The communications between some of the plurality of systems 500 may happen via a wired connection, such as the communications between system 500J and system 500I and the communications between system 500H and system 500G. Additionally or alternatively, the communications between some of the plurality of systems 500 may occur via a wireless connection, such as the communications between system 500G and system 500F and the communications between system 500I and system 500F. In some examples, at least one system 500 may be configured to transmit captured image data (or information derived from the captured image data) to central communication device 630 via at least two mediating systems 500, at least three mediating systems 500, at least four mediating systems 500, or more. For example, system 500J may convey captured image data to central communication device 630 via system 500I and system 500F.

Consistent with the present disclosure, two (or more) systems 500 may share information to improve image acquisition. For example, system 500J may be configured to receive from a neighboring system 500I information associated with an event that system 500I had identified, and control image capture device 506 based on the received information. For example, system 500J may forgo image acquisition based on an indication from system 500I that an object has entered or is about to enter its field of view. Systems 500I and 500J may have overlapping fields of view or non-overlapping fields of view. In addition, system 500J may also receive (from system 500I) information that originates from central communication device 630 and control image capture device 506 based on the received information. For example, system 500I may receive instructions from central communication device 630 to capture an image when supplier 115 inquiries about a specific product that is placed in a retail unit opposing system 500I. In some embodiments, a plurality of systems 500 may communicate with central communication device 630. In order to reduce or avoid network congestion, each system 500 may identify an available transmission time slot. Thereafter, each system 500 may determine a default time slot for future transmissions based on the identified transmission time slot.

FIG. 6C provides a diagrammatic representation of a retail shelving unit 640 being captured by multiple systems 500 (e.g., system 500K and system 500L) deployed on an opposing retail shelving unit (not shown). FIG. 6C illustrates embodiments associated with the process of installing systems 500 in retail store 105. To facilitate the installation of system 500, each first housing 502 (e.g., first housing 502K) may include an adjustment mechanism 642 for setting a field of view 644 of image capture device 506K such that the field of view 644 will at least partially encompass products placed both on a bottom shelf of retail shelving unit 640 and on a top shelf of retail shelving unit 640. For example, adjustment mechanism 642 may enable setting the position of image capture device 506 relative to first housing 502K. Adjustment mechanism 642 may have at least two degrees of freedom to separately adjust manually (or automatically) the vertical field of view and the horizontal field of view of image capture device 506K. In one embodiment, the angle of image capture device 506K may be measured using position sensors associated with adjustment mechanism 642, and the measured orientation may be used to determine if image capture device 506K is positioned in the right direction. In one example, the output of the position sensors may be displayed on a handheld device of a person (such as a store associate) installing image capturing device 506K. Such an arrangement may provide the store associate/installer with real time visual feedback representative of the field of view of an image acquisition device being installed.

In addition to adjustment mechanism 642, first housing 502 may include a first physical adapter (not shown) configured to operate with multiple types of image capture device 506 and a second physical adapter (not shown) configured to operate with multiple types of lenses. During installation, the first physical adapter may be used to connect a suitable image capture device 506 to system 500 according to the level of recognition requested (e.g., detecting a barcode from products, detecting text and price from labels, detecting different categories of products, etc.). Similarly, during installation, the second physical adapter may be used to associate a suitable lens to image capture device 506 according to the physical conditions at the store (e.g., the distance between the aisles, the horizontal field of view required from image capture device 506, and/or the vertical field of view required from image capture device 506). The second physical adapter provides the store associate/installer the ability to select the focal length of lens 312 during installation according to the distance between retail shelving units on opposite sides of an aisle (e.g., distance d1 and/or distance d2 shown in FIG. 6A). In some embodiments, adjustment mechanism 642 may include a locking mechanism to reduce the likelihood of unintentional changes in the field of view of image capture device 506. Additionally or alternatively, the at least one processor contained in second housing 504 may detect changes in the field of view of image capture device 506 and issue a warning when a change is detected, when a change larger than a selected threshold is detected, when a change is detected for a duration longer than a selected threshold, and so forth.

In addition to adjustment mechanism 642 and the different physical adapters, system 500 may modify the image data acquired by image capture device 506 based on at least one attribute associated with opposing retail shelving unit 640. Consistent with the present disclosure, the at least one attribute associated with retail shelving unit 640 may include a lighting condition, the dimensions of opposing retail shelving unit 640, the size of products displayed on opposing retail shelving unit 640, the type of labels used on opposing retail shelving unit 640, and more. In some embodiments, the attribute may be determined, based on analysis of one or more acquired images, by at least one processor contained in second housing 504. Alternatively, the attribute may be automatically sensed and conveyed to the at least one processor contained in second housing 504. In one example, the at least one processor may change the brightness of captured images based on the detected light conditions. In another example, the at least one processor may modify the image data by cropping the image such that it will include only the products on retail shelving unit (e.g., not to include the floor or the ceiling), only area of the shelving unit relevant to a selected task (such as planogram compliance check), and so forth.

Consistent with the present disclosure, during installation, system 500 may enable real-time display 646 of field of view 644 on a handheld device 648 of a user 650 installing image capturing device 506K. In one embodiment, real-time display 646 of field of view 644 may include augmented markings 652 indicating a location of a field of view 654 of an adjacent image capture device 506L. In another embodiment, real-time display 646 of field of view 644 may include augmented markings 656 indicating a region of interest in opposing retail shelving unit 640. The region of interest may be determined based on a planogram, identified product type, and/or part of retail shelving unit 640. For example, the region of interest may include products with a greater likelihood of planogram incompliance. In addition, system 500K may analyze acquired images to determine if field of view 644 includes the area that image capturing device 506K is supposed to monitor (for example, from labels on opposing retail shelving unit 640, products on opposing retail shelving unit 640, images captured from other image capturing devices that may capture other parts of opposing retail shelving unit 640 or capture the same part of opposing retail shelving unit 640 but in a lower resolution or at a lower frequency, and so forth). In additional embodiments, system 500 may further comprise an indoor location sensor which may help determine if the system 500 is positioned at the right location in retail store 105.

In some embodiments, an anti-theft device may be located in at least one of first housing 502 and second housing 504. For example, the anti-theft device may include a specific RF label or a pin-tag radio-frequency identification device, which may be the same or similar to a type of anti-theft device that is used by retail store 105 in which system 500 is located. The RF label or the pin-tag may be incorporated within the body of first housing 502 and second housing 504 and may not be visible. In another example, the anti-theft device may include a motion sensor whose output may be used to trigger an alarm in the case of motion or disturbance, in case of motion that is above a selected threshold, and so forth.

Figure 7A:
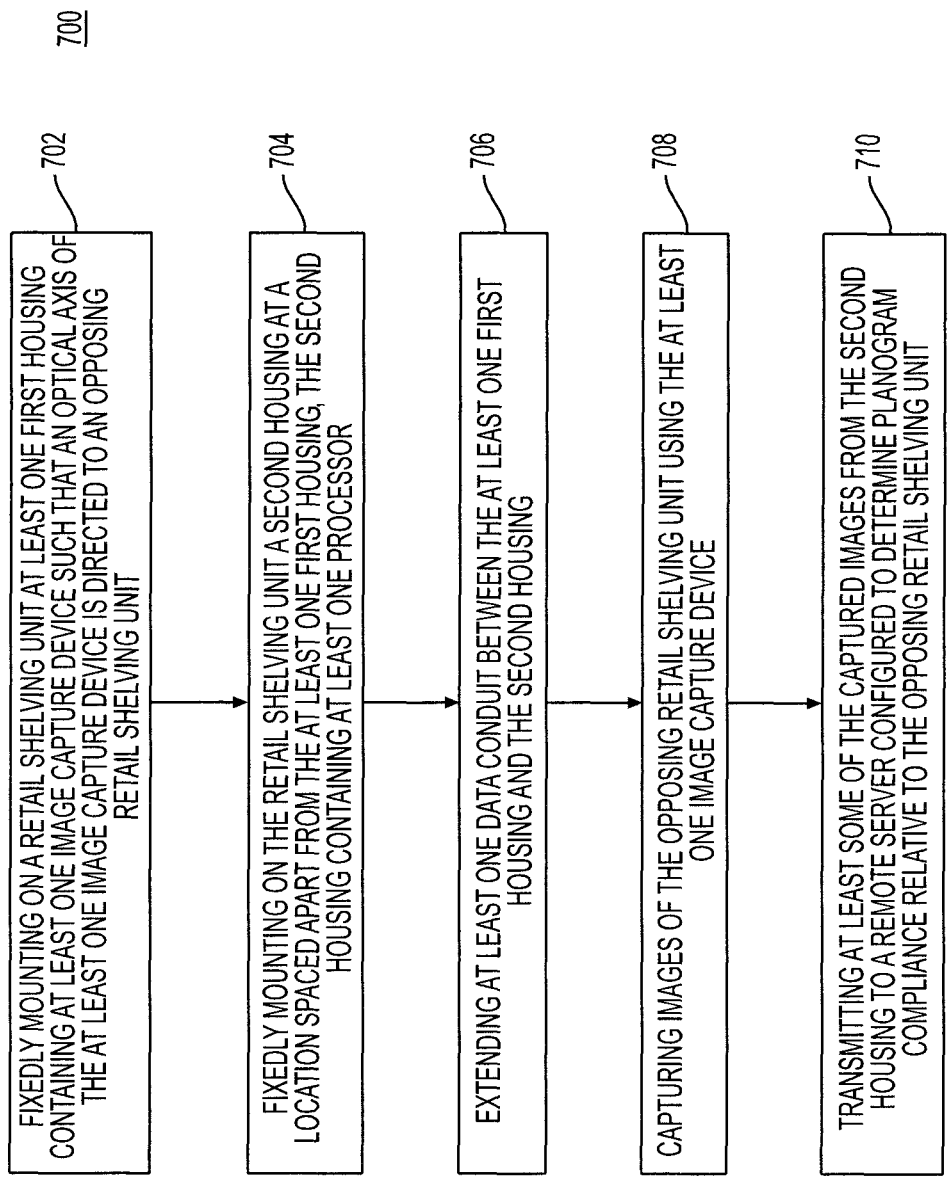
FIG. 7A provides a flowchart of an exemplary method for acquiring images of products in retail store, consistent with the present disclosure.

FIG. 7A includes a flowchart representing an exemplary method 700 for acquiring images of products in retail store 105 in accordance with example embodiments of the present disclosure. For purposes of illustration, in the following description, reference is made to certain components of system 500 as deployed in the configuration depicted in FIG. 6A. It will be appreciated, however, that other implementations are possible and that other configurations may be utilized to implement the exemplary method. It will also be readily appreciated that the illustrated method may be altered to modify the order of steps, delete steps, or further include additional steps.

At step 702, the method includes fixedly mounting on first retail shelving unit 602 at least one first housing 502 containing at least one image capture device 506 such that an optical axis (e.g., optical axis 606) of at least one image capture device 506 is directed to second retail shelving unit 604. In one embodiment, fixedly mounting first housing 502 on first retail shelving unit 602 may include placing first housing 502 on a side of store shelf 622 facing second retail shelving unit 604. In another embodiment, fixedly mounting first housing 502 on retail shelving unit 602 may include placing first housing 502 in a slit between two adjacent horizontal shelves. In some embodiments, the method may further include fixedly mounting on first retail shelving unit 602 at least one projector (such as projector 632) such that light patterns projected by the at least one projector are directed to second retail shelving unit 604. In one embodiment, the method may include mounting the at least one projector to first retail shelving unit 602 at a selected distance to first housing 502 with image capture device 506. In one embodiment, the selected distance may be at least 5 cm, at least 10 cm, at least 15 cm, less than 40 cm, less than 30 cm, between about 5 cm to about 20 cm, or between about 10 cm to about 15 cm. In one embodiment, the selected distance may be calculated according to a distance between to first retail shelving unit 602 and second retail shelving unit 604, such as d1 and/or d2, for example selecting the distance to be a function of d1 and/or d2, a linear function of d1 and/or d2, a function of d1*log(d1) and/or d2*log(d2) such as a1*d1*log(d1) for some constant a1, and so forth.

At step 704, the method includes fixedly mounting on first retail shelving unit 602 second housing 504 at a location spaced apart from the at least one first housing 502, second housing 504 may include at least one processor (e.g., processing device 302). In one embodiment, fixedly mounting second housing 504 on the retail shelving unit may include placing second housing 504 on a different side of store shelf 622 than the side first housing 502 is mounted on.

At step 706, the method includes extending at least one data conduit 508 between at least one first housing 502 and second housing 504. In one embodiment, extending at least one data conduit 508 between at least one first housing 502 and second housing 504 may include adjusting the length of data conduit 508 to enable first housing 502 to be mounted separately from second housing 504. At step 708, the method includes capturing images of second retail shelving unit 604 using at least one image capture device 506 contained in at least one first housing 502 (e.g., first housing 502A, first housing 502B, or first housing 502C). In one embodiment, the method further includes periodically capturing images of products located on second retail shelving unit 604. In another embodiment the method includes capturing images of second retail shelving unit 604 after receiving a trigger from at least one additional sensor in communication with system 500 (wireless or wired).

At step 710, the method includes transmitting at least some of the captured images from second housing 504 to a remote server (e.g., server 135) configured to determine planogram compliance relative to second retail shelving unit 604. In some embodiments, determining planogram compliance relative to second retail shelving unit 604 may include determining at least one characteristic of planogram compliance based on detected differences between the at least one planogram and the actual placement of the plurality of product types on second retail shelving unit 604. Consistent with the present disclosure, the characteristic of planogram compliance may include at least one of: product facing, product placement, planogram compatibility, price correlation, promotion execution, product homogeneity, restocking rate, and planogram compliance of adjacent products.

Figure 7B:
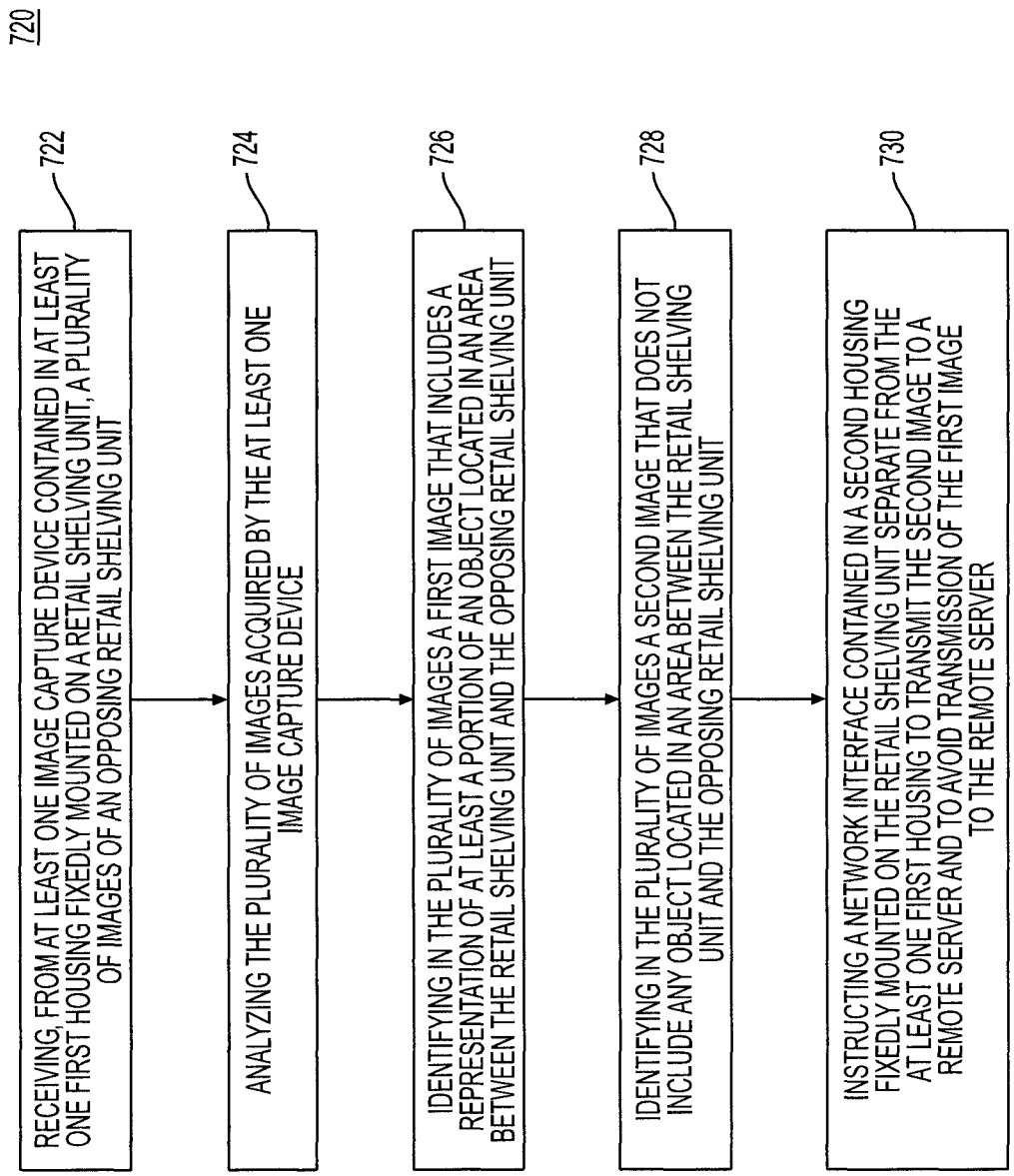
FIG. 7B provides a flowchart of a method for acquiring images of products in retail store, consistent with the present disclosure.

FIG. 7B provides a flowchart representing an exemplary method 720 for acquiring images of products in retail store 105, in accordance with example embodiments of the present disclosure. For purposes of illustration, in the following description, reference is made to certain components of system 500 as deployed in the configuration depicted in FIG. 6A. It will be appreciated, however, that other implementations are possible and that other configurations may be utilized to implement the exemplary method. It will also be readily appreciated that the illustrated method may be altered to modify the order of steps, delete steps, or further include additional steps.

At step 722, at least one processor contained in a second housing may receive from at least one image capture device contained in at least one first housing fixedly mounted on a retail shelving unit a plurality of images of an opposing retail shelving unit. For example, at least one processor contained in second housing 504A may receive from at least one image capture device 506 contained in first housing 502A (fixedly mounted on first retail shelving unit 602) a plurality of images of second retail shelving unit 604. The plurality of images may be captured and collected during a period of time (e.g., a minute, an hour, six hours, a day, a week, or more).

At step 724, the at least one processor contained in the second housing may analyze the plurality of images acquired by the at least one image capture device. In one embodiment, at least one processor contained in second housing 504A may use any suitable image analysis technique (for example, object recognition, object detection, image segmentation, feature extraction, optical character recognition (OCR), object-based image analysis, shape region techniques, edge detection techniques, pixel-based detection, artificial neural networks, convolutional neural networks, etc.) to identify objects in the plurality of images. In one example, the at least one processor contained in second housing 504A may determine the number of products located in second retail shelving unit 604. In another example, the at least one processor contained in second housing 504A may detect one or more objects in an area between first retail shelving unit 602 and second retail shelving unit 604.

At step 726, the at least one processor contained in the second housing may identify in the plurality of images a first image that includes a representation of at least a portion of an object located in an area between the retail shelving unit and the opposing retail shelving unit. In step 728, the at least one processor contained in the second housing may identify in the plurality of images a second image that does not include any object located in an area between the retail shelving unit and the opposing retail shelving unit. In one example, the object in the first image may be an individual, such as a customer or a store associate. In another example, the object in the first image may be an inanimate object, such as carts, boxes, products, etc.

At step 730, the at least one processor contained in the second housing may instruct a network interface contained in the second housing, fixedly mounted on the retail shelving unit separate from the at least one first housing, to transmit the second image to a remote server and to avoid transmission of the first image to the remote server. In addition, the at least one processor may issue a notification when an object blocks the field of view of the image capturing device for more than a predefined period of time (e.g., at least 30 minutes, at least 75 minutes, at least 150 minutes).

Embodiments of the present disclosure may automatically assess compliance of one or more store shelves with a planogram. For example, embodiments of the present disclosure may use signals from one or more sensors to determine placement of one or more products on store shelves. The disclosed embodiments may also use one or more sensors to determine empty spaces on the store shelves. The placements and empty spaces may be automatically assessed against a digitally encoded planogram. A planogram refers to any data structure or specification that defines at least one product characteristic relative to a display structure associated with a retail environment (such as store shelf or area of one or more shelves). Such product characteristics may include, among other things, quantities of products with respect to areas of the shelves, product configurations or product shapes with respect to areas of the shelves, product arrangements with respect to areas of the shelves, product density with respect to areas of the shelves, product combinations with respect to areas of the shelves, etc. Although described with reference to store shelves, embodiments of the present disclosure may also be applied to end caps or other displays; bins, shelves, or other organizers associated with a refrigerator or freezer units; or any other display structure associated with a retail environment.

The embodiments disclosed herein may use any sensors configured to detect one or more parameters associated with products (or a lack thereof). For example, embodiments may use one or more of pressure sensors, weight sensors, light sensors, resistive sensors, capacitive sensors, inductive sensors, vacuum pressure sensors, high pressure sensors, conductive pressure sensors, infrared sensors, photo-resistor sensors, photo-transistor sensors, photo-diodes sensors, ultrasonic sensors, or the like. Some embodiments may use a plurality of different kinds of sensors, for example, associated with the same or overlapping areas of the shelves and/or associated with different areas of the shelves. Some embodiments may use a plurality of sensors configured to be placed adjacent a store shelf, configured for location on the store shelf, configured to be attached to, or configured to be integrated with the store shelf. In some cases, at least part of the plurality of sensors may be configured to be placed next to a surface of a store shelf configured to hold products. For example, the at least part of the plurality of sensors may be configured to be placed relative to a part of a store shelf such that the at least part of the plurality of sensors may be positioned between the part of a store shelf and products placed on the part of the shelf. In another embodiment, the at least part of the plurality of sensors may be configured to be placed above and/or within and/or under the part of the shelf.

In one example, the plurality of sensors may include light detectors configured to be located such that a product placed on the part of the shelf may block at least some of the ambient light from reaching the light detectors. The data received from the light detectors may be analyzed to detect a product or to identify a product based on the shape of a product placed on the part of the shelf. In one example, the system may identify the product placed above the light detectors based on data received from the light detectors that may be indicative of at least part of the ambient light being blocked from reaching the light detectors. Further, the data received from the light detectors may be analyzed to detect vacant spaces on the store shelf. For example, the system may detect vacant spaces on the store shelf based on the received data that may be indicative of no product being placed on a part of the shelf. In another example, the plurality of sensors may include pressure sensors configured to be located such that a product placed on the part of the shelf may apply detectable pressure on the pressure sensors. Further, the data received from the pressure sensors may be analyzed to detect a product or to identify a product based on the shape of a product placed on the part of the shelf. In one example, the system may identify the product placed above the pressure sensors based on data received from the pressure sensors being indicative of pressure being applied on the pressure sensors. In addition, the data from the pressure sensors may be analyzed to detect vacant spaces on the store shelf, for example based on the readings being indicative of no product being placed on a part of the shelf, for example, when the pressure readings are below a selected threshold. Consistent with the present disclosure, inputs from different types of sensors (such as pressure sensors, light detectors, etc.) may be combined and analyzed together, for example to detect products placed on a store shelf, to identify shapes of products placed on a store shelf, to identify types of products placed on a store shelf, to identify vacant spaces on a store shelf, and so forth.

Figure 8A:
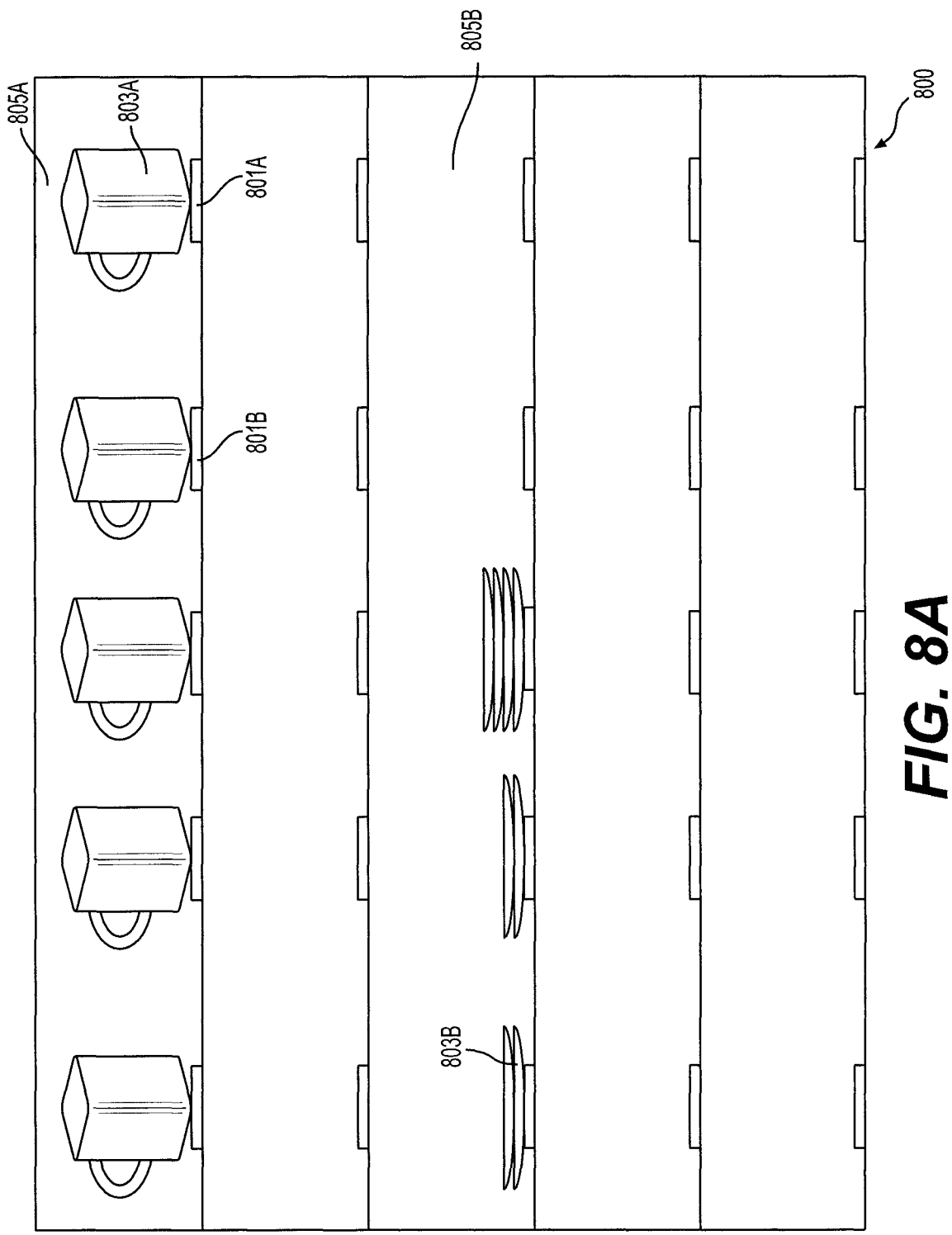
FIG. 8A is a schematic illustration of an example configuration for detecting products and empty spaces on a store shelf, consistent with the present disclosure.

With reference to FIG. 8A and consistent with the present disclosure, a store shelf 800 may include a plurality of detection elements, e.g., detection elements 801A and 801B. In the example of FIG. 8A, detection elements 801A and 801B may comprise pressure sensors and/or other type of sensors for measuring one or more parameters (such as resistance, capacitance, or the like) based on physical contact (or lack thereof) with products, e.g., product 803A and product 803B. Additionally or alternatively, detection elements configured to measure one or more parameters (such as current induction, magnetic induction, visual or other electromagnetic reflectance, visual or other electromagnetic emittance, or the like) may be included to detect products based on physical proximity (or lack thereof) to products. Consistent with the present disclosure, the plurality of detection elements may be configured for location on shelf 800. The plurality of detection elements may be configured to detect placement of products when the products are placed above at least part of the plurality of detection elements. Some embodiments of the disclosure, however, may be performed when at least some of the detection elements may be located next to shelf 800 (e.g., for magnetometers or the like), across from shelf 800 (e.g., for image sensors or other light sensors, light detection and ranging (LIDAR) sensors, radio detection and ranging (RADAR) sensors, or the like), above shelf 800 (e.g., for acoustic sensors or the like), below shelf 800 (e.g., for pressure sensors or the like), or any other appropriate spatial arrangement. Although depicted as standalone units in the example of FIG. 8A, the plurality of detection elements may form part of a fabric (e.g., a smart fabric or the like), and the fabric may be positioned on a shelf to take measurements. For example, two or more detection elements may be integrated together into a single structure (e.g., disposed within a common housing, integrated together within a fabric or mat, etc.). In some examples, detection elements (such as detection elements 801A and 801B) may be placed adjacent to (or placed on) store shelves as described above. Some examples of detection elements may include pressure sensors and/or light detectors configured to be placed above and/or within and/or under a store shelf as described above.

Detection elements associated with shelf 800 may be associated with different areas of shelf 800. For example, detection elements 801A and 801B are associated with area 805A while other detection elements are associated with area 805B. Although depicted as rows, areas 805A and 805B may comprise any areas of shelf 800, whether contiguous (e.g., a square, a rectangular, or other regular or irregular shape) or not (e.g., a plurality of rectangles or other regular and/or irregular shapes). Such areas may also include horizontal regions between shelves (as shown in FIG. 8A) or may include vertical regions that include area of multiple different shelves (e.g., columnar regions spanning over several different horizontally arranged shelves). In some examples, the areas may be part of a single plane. In some examples, each area may be part of a different plane. In some examples, a single area may be part of a single plane or be divided across multiple planes.

One or more processors (e.g., processing device 202) configured to communicate with the detection elements (e.g., detection elements 801A and 801B) may detect first signals associated with a first area (e.g., areas 805A and/or 805B) and second signals associated with a second area. In some embodiments, the first area may, in part, overlap with the second area. For example, one or more detection elements may be associated with the first area as well as the second area and/or one or more detection elements of a first type may be associated with the first area while one or more detection elements of a second type may be associated with the second area overlapping, at least in part, the first area. In other embodiments, the first area and the second area may be spatially separate from each other.

The one or more processors may, using the first and second signals, determine that one or more products have been placed in the first area while the second area includes at least one empty area. For example, if the detection elements include pressure sensors, the first signals may include weight signals that match profiles of particular products (such as the mugs or plates depicted in the example of FIG. 8A), and the second signals may include weight signals indicative of the absence of products (e.g., by being equal to or within a threshold of a default value such as atmospheric pressure or the like). The disclosed weight signals may be representative of actual weight values associated with a particular product type or, alternatively, may be associated with a relative weight value sufficient to identify the product and/or to identify the presence of a product. In some cases, the weight signal may be suitable for verifying the presence of a product regardless of whether the signal is also sufficient for product identification. In another example, if the detection elements include light detectors (as described above), the first signals may include light signals that match profiles of particular products (such as the mugs or plates depicted in the example of FIG. 8A), and the second signals may include light signals indicative of the absence of products (e.g., by being equal to or within a threshold of a default value such as values corresponding to ambient light or the like). For example, the first light signals may be indicative of ambient light being blocked by particular products, while the second light signals may be indicative of no product blocking the ambient light. The disclosed light signals may be representative of actual light patterns associated with a particular product type or, alternatively, may be associated with light patterns sufficient to identify the product and/or to identify the presence of a product.

The one or more processors may similarly process signals from other types of sensors. For example, if the detection elements include resistive or inductive sensors, the first signals may include resistances, voltages, and/or currents that match profiles of particular products (such as the mugs or plates depicted in the example of FIG. 8A or elements associated with the products, such as tags, etc.), and the second signals may include resistances, voltages, and/or currents indicative of the absence of products (e.g., by being equal to or within a threshold of a default value such as atmospheric resistance, a default voltage, a default current, corresponding to ambient light, or the like). In another example, if the detection elements include acoustics, LIDAR, RADAR, or other reflective sensors, the first signals may include patterns of returning waves (whether sound, visible light, infrared light, radio, or the like) that match profiles of particular products (such as the mugs or plates depicted in the example of FIG. 8A), and the second signals may include patterns of returning waves (whether sound, visible light, infrared light, radio, or the like) indicative of the absence of products (e.g., by being equal to or within a threshold of a pattern associated with an empty shelf or the like).

Any of the profile matching described above may include direct matching of a subject to a threshold. For example, direct matching may include testing one or more measured values against the profile value(s) within a margin of error; mapping a received pattern onto a profile pattern with a residual having a maximum, minimum, integral, or the like within the margin of error; performing an autocorrelation, Fourier transform, convolution, or other operation on received measurements or a received pattern and comparing the resultant values or function against the profile within a margin of error; or the like. Additionally or alternatively, profile matching may include fuzzy matching between measured values and/or patterns and a database of profiles such that a profile with a highest level of confidence according to the fuzzy search. Moreover, as depicted in the example of FIG. 8A, products, such as product 803B, may be stacked and thus associated with a different profile when stacked than when standalone.

Any of the profile matching described above may include use of one or more machine learning techniques. For example, one or more artificial neural networks, random forest models, or other models trained on measurements annotated with product identifiers may process the measurements from the detection elements and identify products therefrom. In such embodiments, the one or more models may use additional or alternative input, such as images of the shelf (e.g., from capturing devices 125 of FIGS. 4A-4C explained above) or the like.

Based on detected products and/or empty spaces, determined using the first signals and second signals, the one or more processors may determine one or more aspects of planogram compliance. For example, the one or more processors may identify products and their locations on the shelves, determine quantities of products within particular areas (e.g., identifying stacked or clustered products), identify facing directions associated with the products (e.g., whether a product is outward facing, inward facing, askew, or the like), or the like. Identification of the products may include identifying a product type (e.g., a bottle of soda, a loaf of broad, a notepad, or the like) and/or a product brand (e.g., a Coca-Cola® bottle instead of a Sprite® bottle, a Starbucks® coffee tumbler instead of a Tervis® coffee tumbler, or the like). Product facing direction and/or orientation, for example, may be determined based on a detected orientation of an asymmetric shape of a product base using pressure sensitive pads, detected density of products, etc. For example, the product facing may be determined based on locations of detected product bases relative to certain areas of a shelf (e.g., along a front edge of a shelf), etc. Product facing may also be determined using image sensors, light sensors, or any other sensor suitable for detecting product orientation.

The one or more processors may generate one or more indicators of the one or more aspects of planogram compliance. For example, an indicator may comprise a data packet, a data file, or any other data structure indicating any variations from a planogram, e.g., with respect to product placement such as encoding intended coordinates of a product and actual coordinates on the shelf, with respect to product facing direction and/or orientation such as encoding indicators of locations that have products not facing a correct direction and/or in an undesired orientation, or the like.

In addition to or as an alternative to determining planogram compliance, the one or more processors may detect a change in measurements from one or more detection elements. Such measurement changes may trigger a response. For example, a change of a first type may trigger capture of at least one image of the shelf (e.g., using capturing devices 125 of FIGS. 4A-4C explained above) while a detected change of a second type may cause the at least one processor to forgo such capture. A first type of change may, for example, indicate the moving of a product from one location on the shelf to another location such that planogram compliance may be implicated. In such cases, it may be desired to capture an image of the product rearrangement in order to assess or reassess product planogram compliance. In another example, a first type of change may indicate the removal of a product from the shelf, e.g., by employee store associate due to damage, by a customer to purchase, or the like. On the other hand, a second type of change may, for example, indicate the removal and replacement of a product to the same (within a margin of error) location on the shelf, e.g., by a customer to inspect the item. In cases where products are removed from a shelf, but then replaced on the shelf (e.g., within a particular time window), the system may forgo a new image capture, especially if the replaced product is detected in a location similar to or the same as its recent, original position.

Figure 8B:
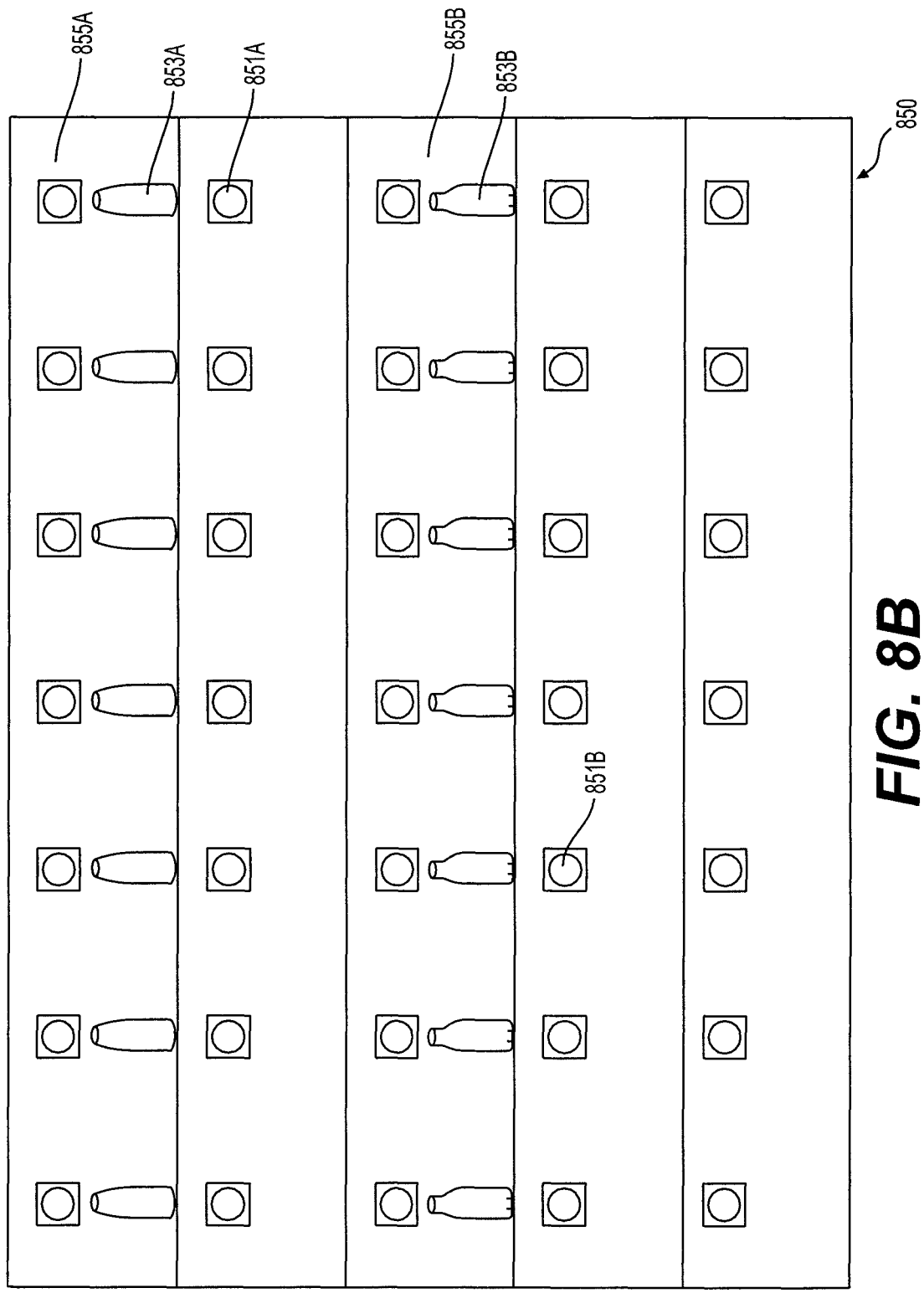
FIG. 8B is a schematic illustration of another example configuration for detecting products and empty spaces on a store shelf, consistent with the present disclosure.

With reference to FIG. 8B and consistent with the present disclosure, a store shelf 850 may include a plurality of detection elements, e.g., detection elements 851A and 851B. In the example of FIG. 8B, detection elements 851A and 851B may comprise light sensors and/or other sensors measuring one or more parameters (such as visual or other electromagnetic reflectance, visual or other electromagnetic emittance, or the like) based on electromagnetic waves from products, e.g., product 853A and product 853B. Additionally or alternatively, as explained above with respect to FIG. 8B, detection elements 851A and 851B may comprise pressure sensors, other sensors measuring one or more parameters (such as resistance, capacitance, or the like) based on physical contact (or lack thereof) with the products, and/or other sensors that measure one or more parameters (such as current induction, magnetic induction, visual or other electromagnetic reflectance, visual or other electromagnetic emittance, or the like) based on physical proximity (or lack thereof) to products.

Moreover, although depicted as located on shelf 850, some detection elements may be located next to shelf 850 (e.g., for magnetometers or the like), across from shelf 850 (e.g., for image sensors or other light sensors, light detection and ranging (LIDAR) sensors, radio detection and ranging (RADAR) sensors, or the like), above shelf 850 (e.g., for acoustic sensors or the like), below shelf 850 (e.g., for pressure sensors, light detectors, or the like), or any other appropriate spatial arrangement. Further, although depicted as standalone in the example of FIG. 8B, the plurality of detection elements may form part of a fabric (e.g., a smart fabric or the like), and the fabric may be positioned on a shelf to take measurements.

Detection elements associated with shelf 850 may be associated with different areas of shelf 850, e.g., area 855A, area 855B, or the like. Although depicted as rows, areas 855A and 855B may comprise any areas of shelf 850, whether contiguous (e.g., a square, a rectangular, or other regular or irregular shape) or not (e.g., a plurality of rectangles or other regular and/or irregular shapes).

One or more processors (e.g., processing device 202) in communication with the detection elements (e.g., detection elements 851A and 851B) may detect first signals associated with a first area and second signals associated with a second area. Any of the processing of the first and second signals described above with respect to FIG. 8A may similarly be performed for the configuration of FIG. 8B.

In both FIGS. 8A and 8B, the detection elements may be integral to the shelf, part of a fabric or other surface configured for positioning on the shelf, or the like. Power and/or data cables may form part of the shelf, the fabric, the surface, or be otherwise connected to the detection elements. Additionally or alternatively, as depicted in FIGS. 8A and 8B, individual sensors may be positioned on the shelf. For example, the power and/or data cables may be positioned under the shelf and connected through the shelf to the detection elements. In another example, power and/or data may be transmitted wirelessly to the detection elements (e.g., to wireless network interface controllers forming part of the detection elements). In yet another example, the detection elements may include internal power sources (such as batteries or fuel cells).

Figure 9:
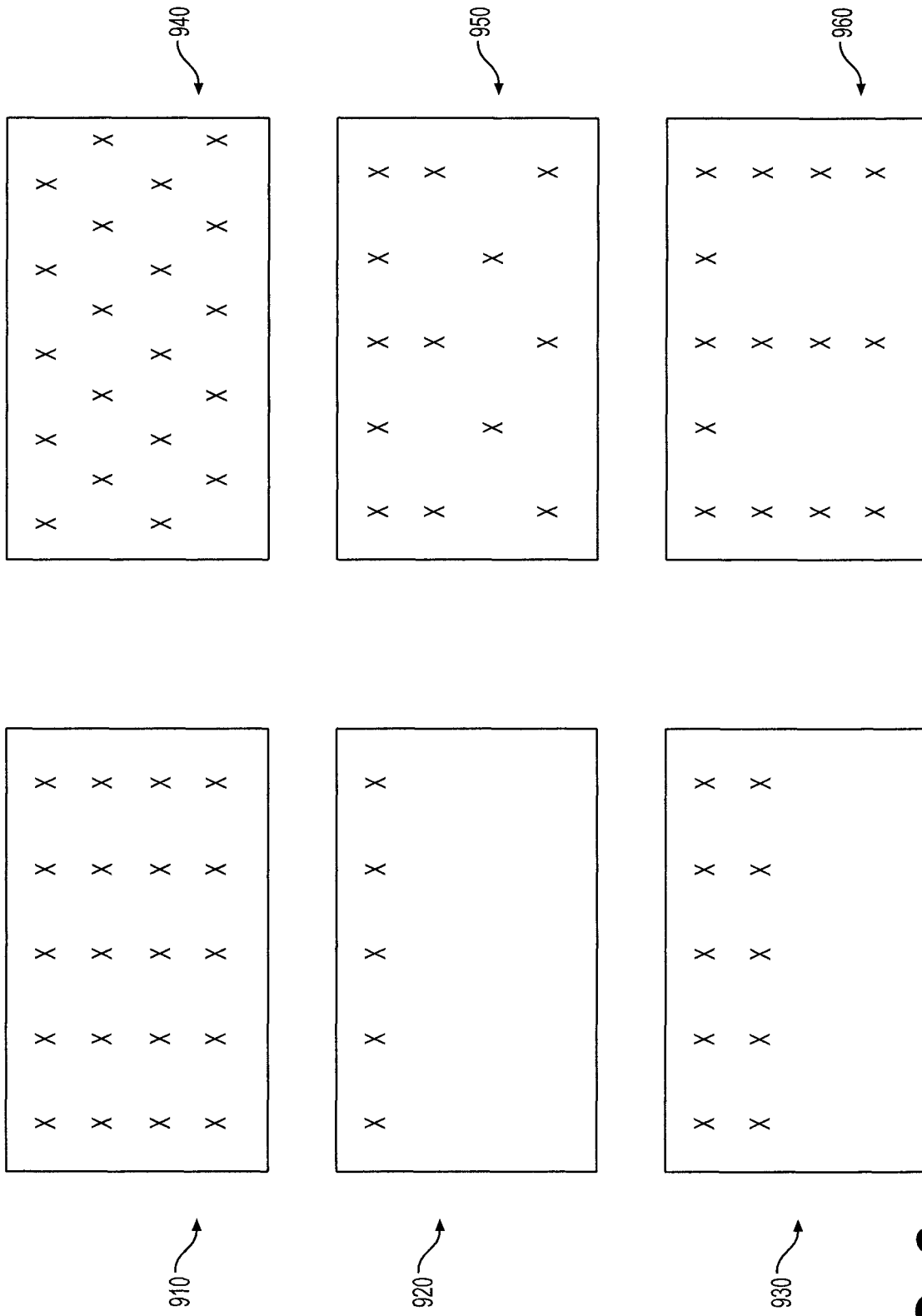
FIG. 9 is a schematic illustration of example configurations for detection elements on store shelves, consistent with the present disclosure.

With reference to FIG. 9 and consistent with the present disclosure, the detection elements described above with reference to FIGS. 8A and 8B may be arranged on rows of the shelf in any appropriate configuration. All of the arrangements of FIG. 9 are shown as a top-down view of a row (e.g., area 805A, area 805B, area 855A, area 855B, or the like) on the shelf. For example, arrangements 910 and 940 are both uniform distributions of detection elements within a row. However, arrangement 910 is also uniform throughout the depth of the row while arrangement 940 is staggered. Both arrangements may provide signals that represent products on the shelf in accordance with spatially uniform measurement locations. As further shown in FIG. 9, arrangements 920, 930, 950, and 960 cluster detection elements near the front (e.g., a facing portion) of the row. Arrangement 920 includes detection elements at a front portion while arrangement 930 includes defection elements in a larger portion of the front of the shelf. Such arrangements may save power and processing cycles by having fewer detection elements on a back portion of the shelf. Arrangements 950 and 960 include some detection elements in a back portion of the shelf but these elements are arranged less dense than detection elements in the front. Such arrangements may allow for detections in the back of the shelf (e.g., a need to restock products, a disruption to products in the back by a customer or a store associate, or the like) while still using less power and fewer processing cycles than arrangements 910 and 940. And, such arrangements may include a higher density of detection elements in regions of the shelf (e.g., a front edge of the shelf) where product turnover rates may be higher than in other regions (e.g., at areas deeper into a shelf), and/or in regions of the shelf where planogram compliance is especially important.

Figure 10A:
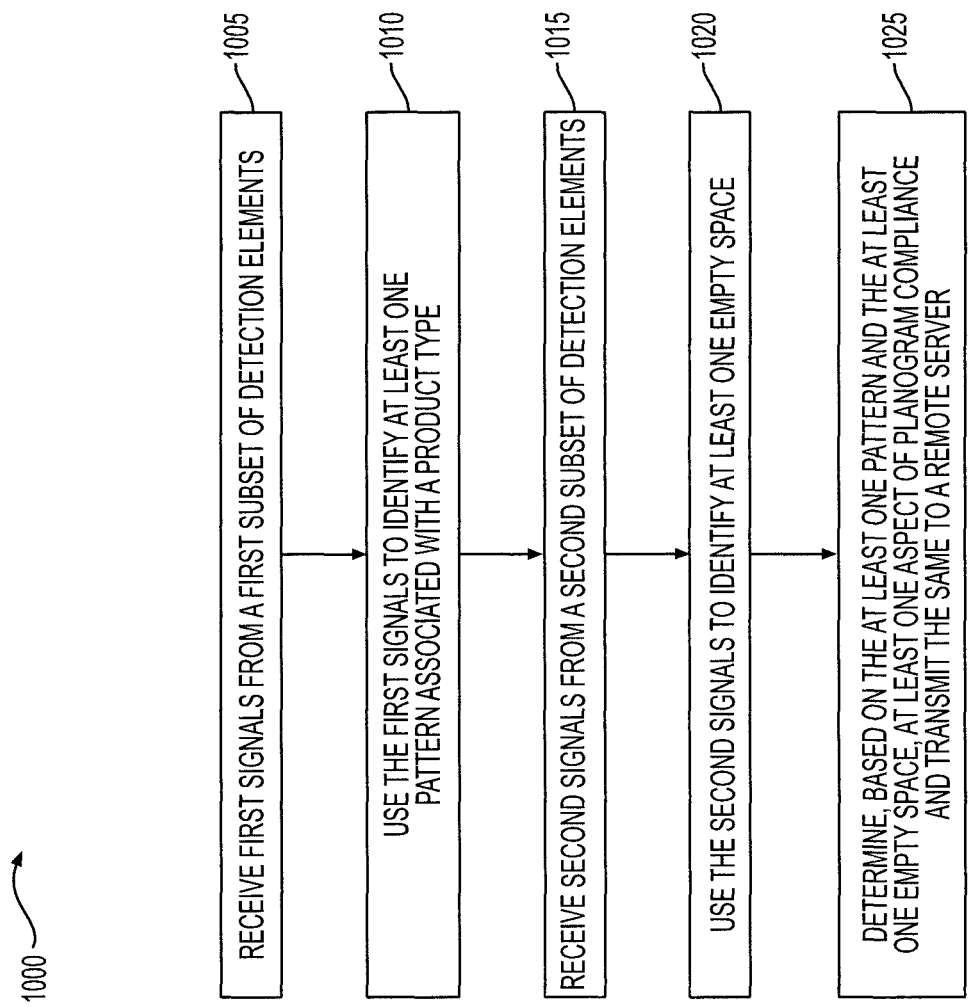
FIG. 10A illustrates an exemplary method for monitoring planogram compliance on a store shelf, consistent with the present disclosure.

FIG. 10A is a flow chart, illustrating an exemplary method 1000 for monitoring planogram compliance on a store shelf, in accordance with the presently disclosed subject matter. It is contemplated that method 1000 may be used with any of the detection element arrays discussed above with reference to, for example, FIGS. 8A, 8B and 9. The order and arrangement of steps in method 1000 is provided for purposes of illustration. As will be appreciated from this disclosure, modifications may be made to process 1000, for example, adding, combining, removing, and/or rearranging one or more steps of process 1000.

Method 1000 may include a step 1005 of receiving first signals from a first subset of detection elements (e.g., detection elements 801A and 801B of FIG. 8A) from among the plurality of detection elements after one or more of a plurality of products (e.g., products 803A and 803B) are placed on at least one area of the store shelf associated with the first subset of detection elements. As explained above with respect to FIGS. 8A and 8B, the plurality of detection elements may be embedded into a fabric configured to be positioned on the store shelf. Additionally or alternatively, the plurality of detection elements may be configured to be integrated with the store shelf. For example, an array of pressure sensitive elements (or any other type of detector) may be fabricated as part of the store shelf. In some examples, the plurality of detection elements may be configured to placed adjacent to (or located on) store shelves, as described above.

As described above with respect to arrangements 910 and 940 of FIG. 9, the plurality of detection elements may be substantially uniformly distributed across the store shelf. Alternatively, as described above with respect to arrangements 920, 930, 950, and 960 of FIG. 9, the plurality of detection elements may be distributed relative to the store shelf such that a first area of the store shelf has a higher density of detection elements than a second area of the store shelf. For example, the first area may comprise a front portion of the shelf, and the second area may comprise a back portion of the shelf.

In some embodiments, such as those including pressure sensors or other contact sensors as depicted in the example of FIG. 8A, step 1005 may include receiving the first signals from the first subset of detection elements as the plurality of products are placed above the first subset of detection elements. In some embodiments where the plurality of detection elements includes pressure detectors, the first signals may be indicative of pressure levels detected by pressure detectors corresponding to the first subset of detection elements after one or more of the plurality of products are placed on the at least one area of the store shelf associated with the first subset of detection elements. For example, the first signals may be indicative of pressure levels detected by pressure detectors corresponding to the first subset of detection elements after stocking at least one additional product above a product previously positioned on the shelf, removal of a product from the shelf, or the like. In other embodiments where the plurality of detection elements includes light detectors, the first signals may be indicative of light measurements made with respect to one or more of the plurality of products placed on the at least one area of the store shelf associated with the first subset of detection elements. Specifically, the first signals may be indicative of at least part of the ambient light being blocked from reaching the light detectors by the one or more of the plurality of products.

In embodiments including proximity sensors as depicted in the example of FIG. 8B, step 1005 may include receiving the first signals from the first subset of detection elements as the plurality of products are placed below the first subset of detection elements. In embodiments where the plurality of detection elements include proximity detectors, the first signals may be indicative of proximity measurements made with respect to one or more of the plurality of products placed on the at least one area of the store shelf associated with the first subset of detection elements.

Method 1000 may include step 1010 of using the first signals to identify at least one pattern associated with a product type of the plurality of products. For example, any of the pattern matching techniques described above with respect to FIGS. 8A and 8B may be used for identification. A pattern associated with a product type may include a pattern (e.g., a continuous ring, a discontinuous ring of a certain number of points, a certain shape, etc.) associated with a base of a single product. The pattern associated with a product type may also be formed by a group of products. For example, a six pack of soda cans may be associated with a pattern including a 2×3 array of continuous rings associated with the six cans of that product type. Additionally, a grouping of two liter bottles may form a detectable pattern including an array (whether uniform, irregular, or random) of discontinuous rings of pressure points, where the rings have a diameter associated with a particular 2-liter product. Various other types of patterns may also be detected (e.g., patterns associated with different product types arranged adjacent to one another, patterns associated with solid shapes (such as a rectangle of a boxed product), etc.). In another example, an artificial neural network configured to recognize product types may be used to analyze the signals received by step 1005 (such as signals from pressure sensors, from light detectors, from contact sensors, and so forth) to determine product types associated with products placed on an area of a shelf (such as an area of a shelf associated with the first subset of detection elements). In yet another example, a machine learning algorithm trained using training examples to recognize product types may be used to analyze the signals received by step 1005 (such as signals from pressure sensors, from light detectors, from contact sensors, and so forth) to determine product types associated with products placed on an area of a shelf (such as an area of a shelf associated with the first subset of detection elements).

In some embodiments, step 1010 may further include accessing a memory storing data (e.g., memory device 226 of FIG. 2 and/or memory device 314 of FIG. 3A) associated with patterns of different types of products. In such embodiments, step 1010 may include using the first signals to identify at least one product of a first type using a first pattern (or a first product model) and at least one product of a second type using a second pattern (or a second product model). For example, the first type may include one brand (such as Coca-Cola® or Folgers®) while the second type may include another brand (such as Pepsi® or Maxwell House®). In this example, a size, shape, point spacing, weight, resistance or other property of the first brand may be different from that of the second brand such that the detection elements may differentiate the brands. Such characteristics may also be used to differentiate like-branded, but different products from one another (e.g., a 12-ounce can of Coca Cola, versus a 16 oz bottle of Coca Cola, versus a 2-liter bottle of Coca Cola). For example, a soda may have a base detectable by a pressure sensitive pad as a continuous ring. Further, the can of soda may be associated with a first weight signal having a value recognizable as associated with such a product. A 16 ounce bottle of soda may be associated with a base having four or five pressure points, which a pressure sensitive pad may detect as arranged in a pattern associated with a diameter typical of such a product. The 16 ounce bottle of soda may also be associated with a second weight signal having a value higher than the weight signal associated with the 12 ounce can of soda. Further still, a 2 liter bottle of soda may be associated with a base having a ring, four or five pressure points, etc. that a pressure sensitive pad may detect as arranged in a pattern associated with a diameter typical of such a product. The 2 liter bottle of soda may be associated with a weight signal having a value higher than the weight signal associated with the 12 ounce can of soda and 16 ounce bottle of soda.

In the example of FIG. 8B, the different bottoms of product 853A and product 853B may be used to differentiate the products from each other. For example, detection elements such as pressure sensitive pads may be used to detect a product base shape and size (e.g., ring, pattern of points, asymmetric shape, base dimensions, etc.). Such a base shape and size may be used (optionally, together with one or more weight signals) to identify a particular product. The signals may also be used to identify and/or distinguish product types from one another. For example, a first type may include one category of product (such as soda cans) while a second type may include a different category of product (such as notepads). In another example, detection elements such as light detectors may be used to detect a product based on a pattern of light readings indicative of a product blocking at least part of the ambient light from reaching the light detectors. Such pattern of light readings may be used to identify product type and/or product category and/or product shape. For example, products of a first type may block a first subset of light frequencies of the ambient light from reaching the light detectors, while products of a second type may block a second subset of light frequencies of the ambient light from reaching the light detectors (the first subset and second subset may differ). In this case the type of the products may be determined based on the light frequencies reaching the light detectors. In another example, products of a first type may have a first shape of shades and therefore may block ambient light from reaching light detectors arranged in one shape, while products of a second type may have a second shape of shades and therefore may block ambient light from reaching light detectors arranged in another shape. In this case the type of the products may be determined based on the shape of blocked ambient light. Any of the pattern matching techniques described above may be used for the identification.

Additionally or alternatively, step 1010 may include using the at least one pattern to determine a number of products placed on the at least one area of the store shelf associated with the first subset of detection elements. For example, any of the pattern matching techniques described above may be used to identify the presence of one or more product types and then to determine the number of products of each product type (e.g., by detecting a number of similarly sized and shaped product bases and optionally by detecting weight signals associated with each detected base). In another example, an artificial neural network configured to determine the number of products of selected product types may be used to analyze the signals received by step 1005 (such as signals from pressure sensors, from light detectors, from contact sensors, and so forth) to determine the number of products of selected product types placed on an area of a shelf (such as an area of a shelf associated with the first subset of detection elements). In yet another example, a machine learning algorithm trained using training examples to determine the number of products of selected product types may be used to analyze the signals received by step 1005 (such as signals from pressure sensors, from light detectors, from contact sensors, and so forth) to determine the number of products of selected product types placed on an area of a shelf (such as an area of a shelf associated with the first subset of detection elements). Additionally or alternatively, step 1010 may include extrapolating from a stored pattern associated with a single product (or type of product) to determine the number of products matching the first signals. In such embodiments, step 1010 may further include determining, for example based on product dimension data stored in a memory, a number of additional products that may be placed on the at least one area of the store shelf associated with the second subset of detection elements. For example, step 1010 may include extrapolating based on stored dimensions of each product and stored dimensions of the shelf area to determine an area and/or volume available for additional products. Step 1010 may further include extrapolation of the number of additional products based on the stored dimensions of each product and determined available area and/or volume.

Method 1000 may include step 1015 of receiving second signals from a second subset of detection elements (e.g., detection elements 851A and 851B of FIG. 8B) from among the plurality of detection elements, the second signals being indicative of no products being placed on at least one area of the store shelf associated with the second subset of detection elements. Using this information, method 1000 may include step 1020 of using the second signals to determine at least one empty space on the store shelf. For example, any of the pattern matching techniques described above may be used to determine that the second signals include default values or other values indicative of a lack of product in certain areas associated with a retail store shelf. A default value may be include, for example, a pressure signal associated with an un-loaded pressure sensor or pressure sensitive mat, indicating that no product is located in a certain region of a shelf. In another example, a default value may include signals from light detectors corresponding to ambient light, indicating that no product is located in a certain region of a shelf.

Method 1000 may include step 1025 of determining, based on the at least one pattern associated with a detected product and the at least one empty space, at least one aspect of planogram compliance. As explained above with respect to FIGS. 8A and 8B, the aspect of planogram compliance may include the presence or absence of particular products (or brands), locations of products on the shelves, quantities of products within particular areas (e.g., identifying stacked or clustered products), facing directions associated with the products (e.g., whether a product is outward facing, inward facing, askew, or the like), or the like. A planogram compliance determination may be made, for example, by determining a number of empty spaces on a shelf and determining a location of the empty spaces on a shelf. The planogram determination may also include determining weight signal magnitudes associated with detected products at the various detected non-empty locations. This information may be used by the one or more processors in determining whether a product facing specification has been satisfied (e.g., whether a front edge of a shelf has a suitable number of products or suitable density of products), whether a specified stacking density has been achieved (e.g., by determining a pattern of detected products and weight signals of the detected products to determine how many products are stacked at each location), whether a product density specification has been achieved (e.g., by determining a ratio of empty locations to product-present locations), whether products of a selected product type are located in a selected area of the shelf, whether all products located in a selected area of the shelf are of a selected product type, whether a selected number of products (or a selected number of products of a selected product type) are located in a selected area of the shelf, whether products located in a selected area of a shelf are positioned in a selected orientation, or whether any other aspect of one or more planograms has been achieved.

For example, the at least one aspect may include product homogeneity, and step 1025 may further include counting occurrences where a product of the second type is placed on an area of the store shelf associated with the first type of product. For example, by accessing a memory including base patterns (or any other type of pattern associated with product types, such as product models), the at least one processor may detect different products and product types. A product of a first type may be recognized based on a first pattern, and product of a second type may be recognized based on a second, different pattern (optionally also based on weight signal information to aid in differentiating between products). Such information may be used, for example, to monitor whether a certain region of a shelf includes an appropriate or intended product or product type. Such information may also be useful in determining whether products or product types have been mixed (e.g., product homogeneity). Regarding planogram compliance, detection of different products and their relative locations on a shelf may aid in determining whether a product homogeneity value, ratio, etc. has been achieved. For example, the at least one processor may count occurrences where a product of a second type is placed on an area of the store shelf associated with a product of a first type.

Additionally or alternatively, the at least one aspect of planogram compliance may include a restocking rate, and step 1025 may further include determining the restocking rate based on a sensed rate at which products are added to the at least one area of the store shelf associated with the second subset of detection elements. Restocking rate may be determined, for example, by monitoring a rate at which detection element signals change as products are added to a shelf (e.g., when areas of a pressure sensitive pad change from a default value to a product-present value).

Additionally or alternatively, the at least one aspect of planogram compliance may include product facing, and step 1025 may further include determining the product facing based on a number of products determined to be placed on a selected area of the store shelf at a front of the store shelf. Such product facing may be determined by determining a number of products along a certain length of a front edge of a store shelf and determining whether the number of products complies with, for example, a specified density of products, a specified number of products, and so forth.

Step 1025 may further include transmitting an indicator of the at least one aspect of planogram compliance to a remote server. For example, as explained above with respect to FIGS. 8A and 8B, the indicator may comprise a data packet, a data file, or any other data structure indicating any variations from a planogram, e.g., with respect to product (or brand) placement, product facing direction, or the like. The remote server may include one or more computers associated with a retail store (e.g., so planogram compliance may be determined on a local basis within a particular store), one or more computers associated with a retail store evaluation body (e.g., so planogram compliance may be determined across a plurality of retail stores), one or more computers associated with a product manufacturer, one or more computers associated with a supplier (such as supplier 115), one or more computers associated with a market research entity (such as market research entity 110), etc.

Method 1000 may further include additional steps. For example, method 1000 may include identifying a change in at least one characteristic associated with one or more of the first signals (e.g., signals from a first group or type of detection elements), and in response to the identified change, triggering an acquisition of at least one image of the store shelf. The acquisition may be implemented by activating one or more of capturing devices 125 of FIGS. 4A-4C, as explained above. For example, the change in at least one characteristic associated with one or more of the first signals may be indicative of removal of at least one product from a location associated with the at least one area of the store shelf associated with the first subset of detection elements. Accordingly, method 1000 may include triggering the acquisition to determine whether restocking, reorganizing, or other intervention is required, e.g., to improve planogram compliance. Thus, method 1000 may include identifying a change in at least one characteristic associated with one or more of the first signals; and in response to the identified change, trigger a product-related task for a store associate of the retail store.

Additionally or alternatively, method 1000 may be combined with method 1050 of FIG. 10B, described below, such that step 1055 is performed any time after step 1005.

Figure 10B:
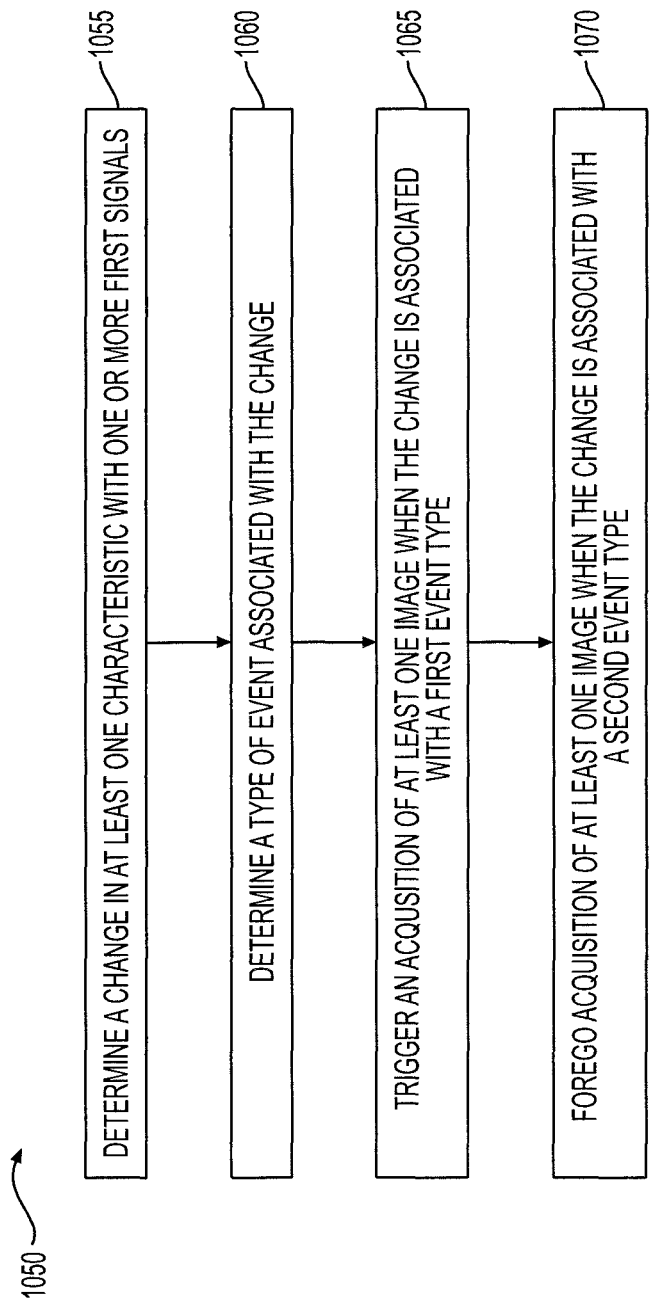
FIG. 10B is illustrates an exemplary method for triggering image acquisition based on product events on a store shelf, consistent with the present disclosure.

FIG. 10B is a flow chart, illustrating an exemplary method 1050 for triggering image capture of a store shelf, in accordance with the presently disclosed subject matter. It is contemplated that method 1050 may be used in conjunction with any of the detection element arrays discussed above with reference to, for example, FIGS. 8A, 8B and 9. The order and arrangement of steps in method 1050 is provided for purposes of illustration. As will be appreciated from this disclosure, modifications may be made to process 1050, for example, adding, combining, removing, and/or rearranging one or more steps of process 1050.

Method 1050 may include a step 1055 of determining a change in at least one characteristic associated with one or more first signals. For example, the first signals may have been captured as part of method 1000 of FIG. 10A, described above. For example, the first signals may include pressure readings when the plurality of detection elements includes pressure sensors, contact information when the plurality of detection elements includes contact sensors, light readings when the plurality of detection elements includes light detectors (for example, from light detectors configured to be placed adjacent to (or located on) a surface of a store shelf configured to hold products, as described above), and so forth.

Method 1050 may include step 1060 of using the first signals to identify at least one pattern associated with a product type of the plurality of products. For example, any of the pattern matching techniques described above with respect to FIGS. 8A, 8B, and step 1010 may be used for identification.

Method 1050 may include step 1065 of determining a type of event associated with the change. For example, a type of event may include a product removal, a product placement, movement of a product, or the like.

Method 1050 may include step 1070 of triggering an acquisition of at least one image of the store shelf when the change is associated with a first event type. For example, a first event type may include removal of a product, moving of a product, or the like, such that the first event type may trigger a product-related task for a store associate of the retail store depending on analysis of the at least one image. The acquisition may be implemented by activating one or more of capturing devices 125 of FIGS. 4A-4C, as explained above. In some examples, the triggered acquisition may include an activation of at least one projector (such as projector 632). In some examples, the triggered acquisition may include acquisition of color images, depth images, stereo images, active stereo images, time of flight images, LIDAR images, RADAR images, and so forth.

Method 1050 may include a step (not shown) of forgoing the acquisition of at least one image of the store shelf when the change is associated with a second event type. For example, a second event type may include replacement of a removed product by a customer, stocking of a shelf by a store associate, or the like. As another example, a second event type may include removal, placement, or movement of a product that is detected within a margin of error of the detection elements and/or detected within a threshold (e.g., removal of only one or two products; movement of a product by less than 5 cm, 20 cm, or the like; moving of a facing direction by less than 10 degrees; or the like), such that no image acquisition is required.

Figure 11A:
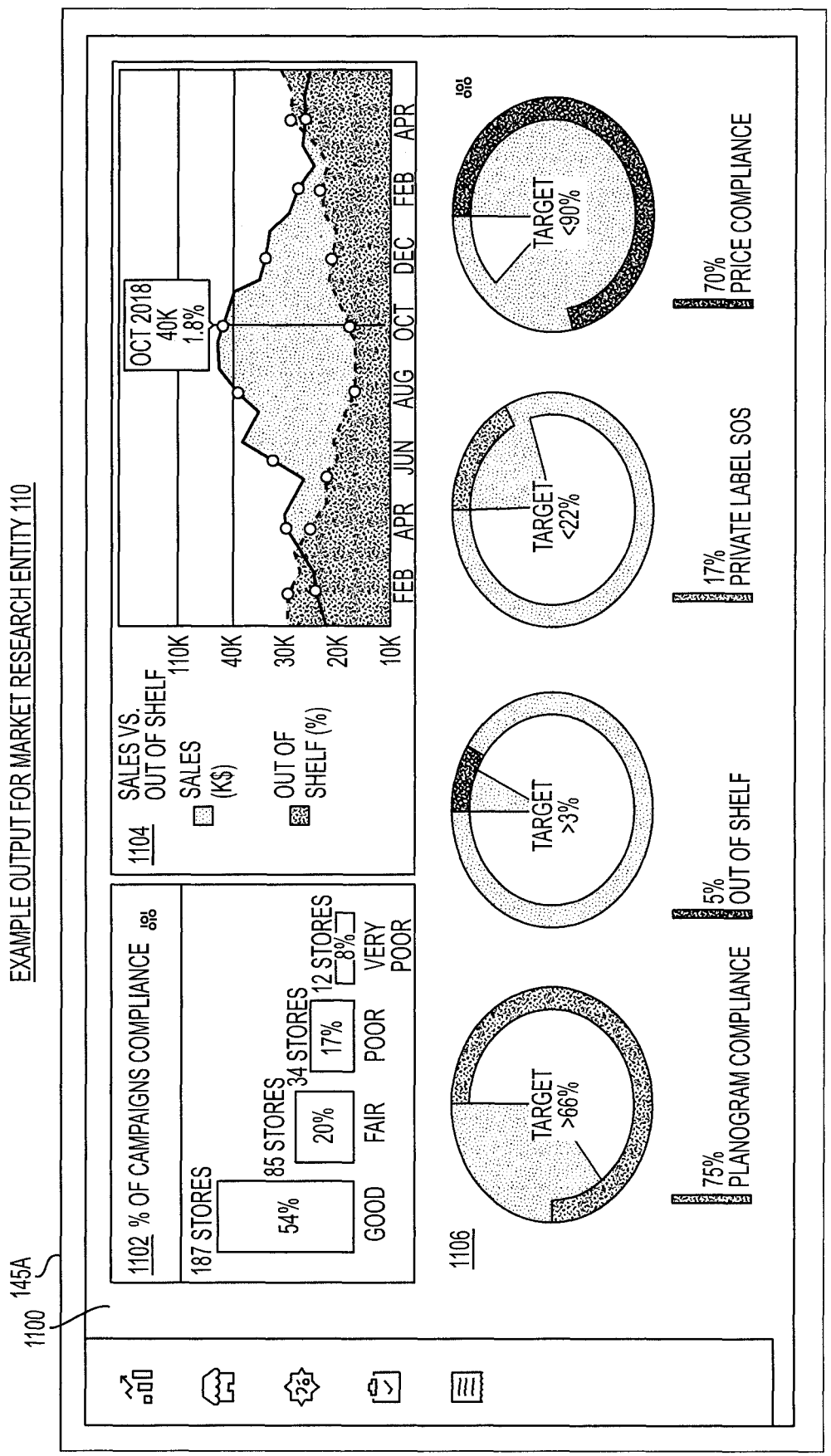
FIG. 11A is a schematic illustration of an example output for a market research entity associated with the retail store, consistent with the present disclosure.
Figure 11B:
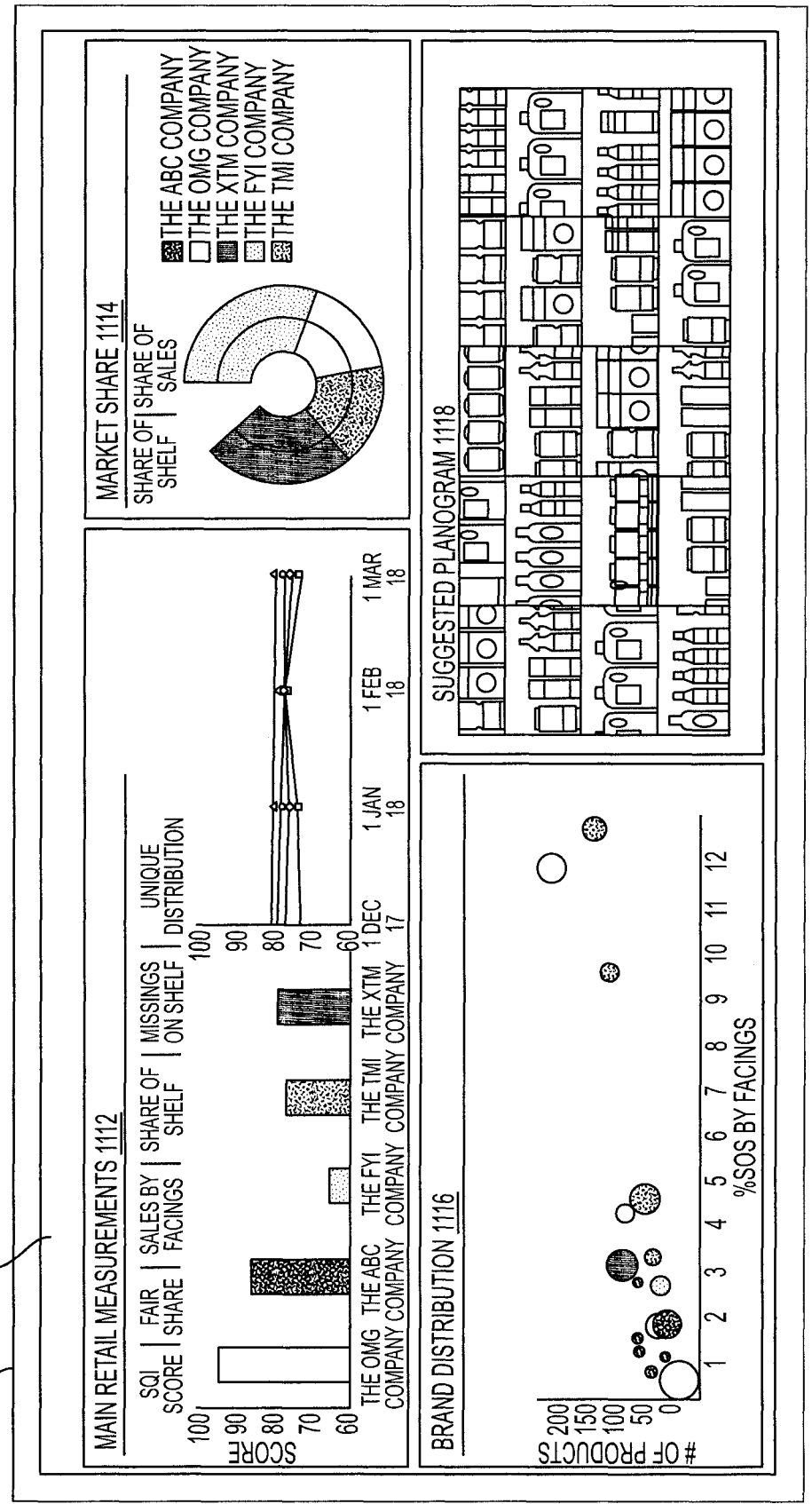
FIG. 11B is a schematic illustration of an example output for a supplier of the retail store, consistent with the present disclosure.
Figure 11C:
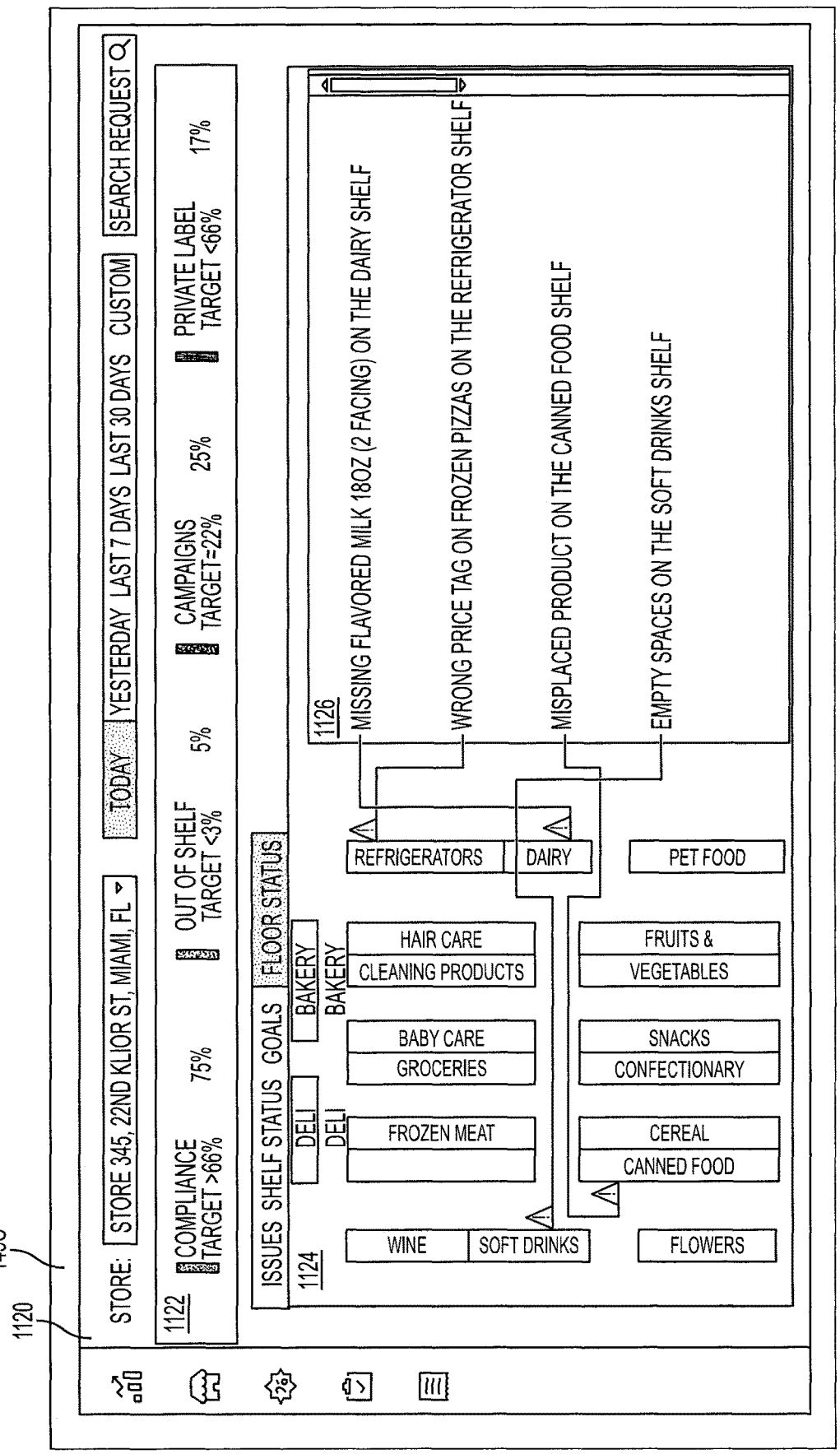
FIG. 11C is a schematic illustration of an example output for a manager of the retail store, consistent with the present disclosure.
Figure 11D:
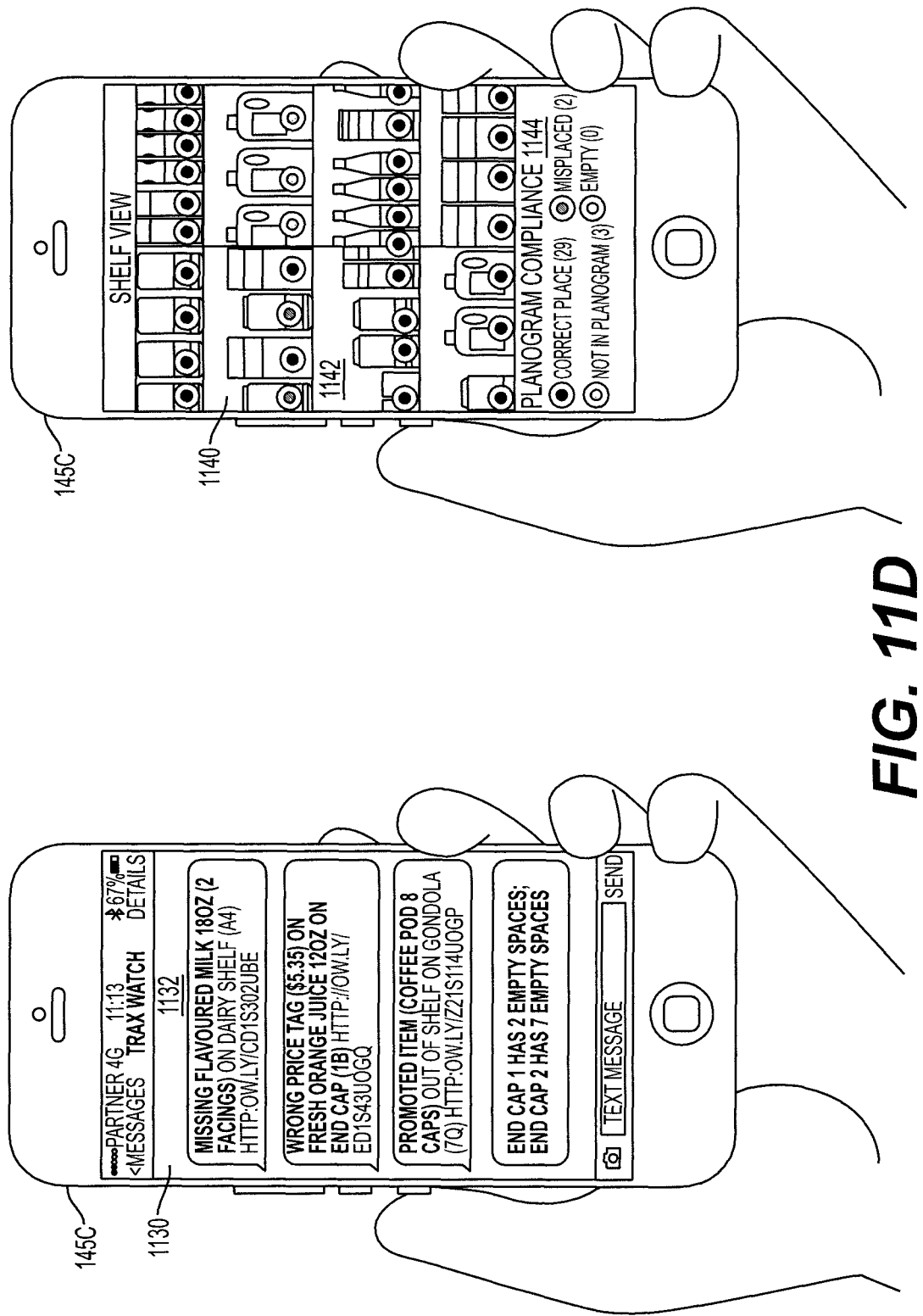
FIG. 11D is a schematic illustration of two examples outputs for a store associate of the retail store, consistent with the present disclosure.
Figure 11E:
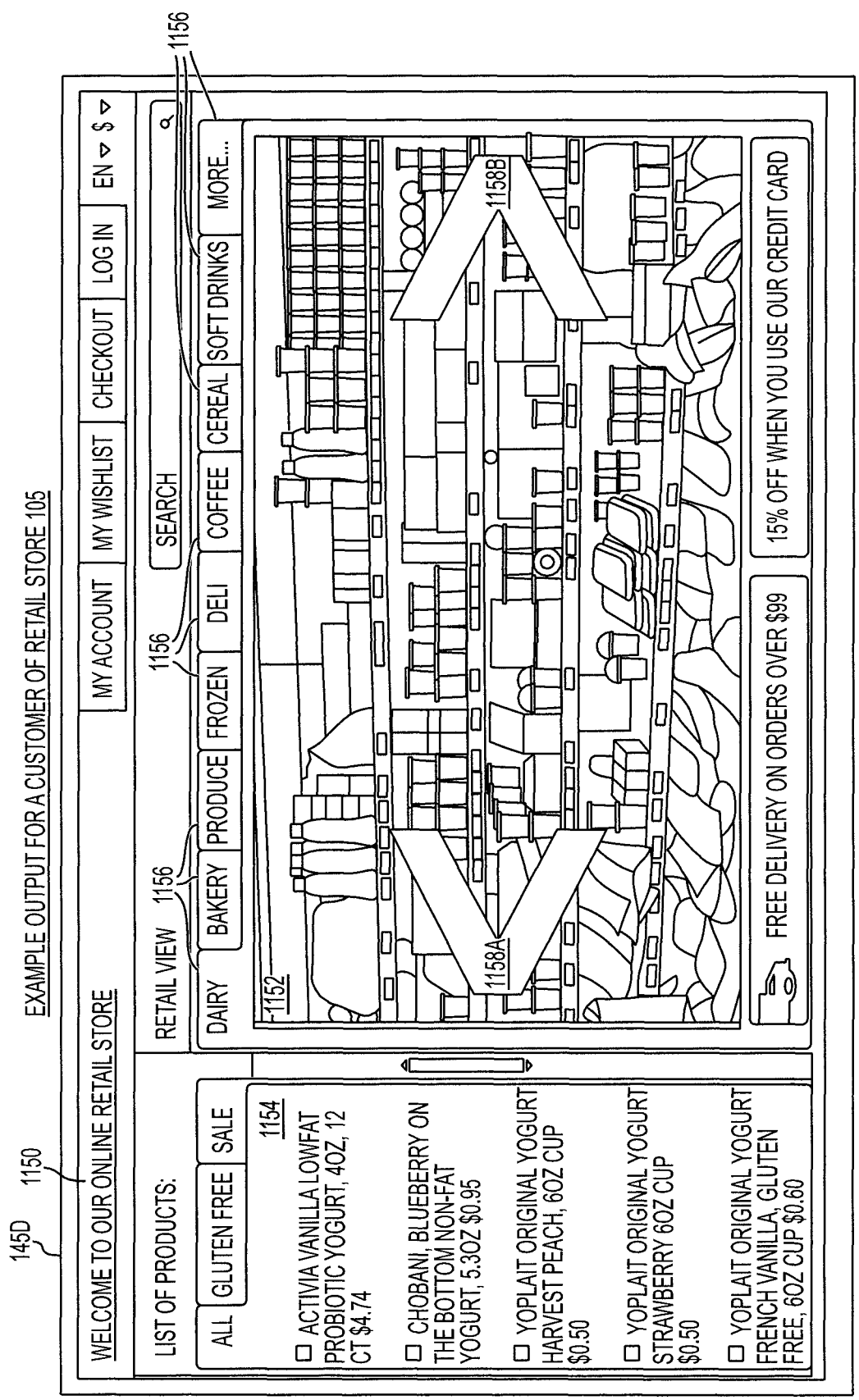
FIG. 11E is a schematic illustration of an example output for an online customer of the retail store, consistent with the present disclosure.

FIGS. 11A-11E illustrate example outputs based on data automatically derived from machine processing and analysis of images captured in retail store 105 according to disclosed embodiments. FIG. 11A illustrates an optional output for market research entity 110. FIG. 11B illustrates an optional output for supplier 115. FIGS. 11C and 11D illustrate optional outputs for store associates of retail store 105. And FIG. 11E illustrates optional outputs for user 120.

FIG. 11A illustrates an example graphical user interface (GUI) 500 for output device 145A, representative of a GUI that may be used by market research entity 110. Consistent with the present disclosure, market research entity 110 may assist supplier 115 and other stakeholders in identifying emerging trends, launching new products, and/or developing merchandising and distribution plans across a large number of retail stores 105. By doing so, market research entity 110 may assist supplier 115 in growing product presence and maximizing or increasing new product sales. As mentioned above, market research entity 110 may be separated from or part of supplier 115. To successfully launch a new product, supplier 115 may use information about what really happens in retail store 105. For example, supplier 115 may want to monitor how marketing plans are being executed and to learn what other competitors are doing relative to certain products or product types. Embodiments of the present disclosure may allow market research entity 110 and suppliers 115 to continuously monitor product-related activities at retail stores 105 (e.g., using system 100 to generate various metrics or information based on automated analysis of actual, timely images acquired from the retail stores). For example, in some embodiments, market research entity 110 may track how quickly or at what rate new products are introduced to retail store shelves, identify new products introduced by various entities, assess a supplier's brand presence across different retail stores 105, among many other potential metrics.

In some embodiments, server 135 may provide market research entity 110 with information including shelf organization, analysis of skew productivity trends, and various reports aggregating information on products appearing across large numbers of retail stores 105. For example, as shown in FIG. 11A, GUI 1100 may include a first display area 1102 for showing a percentage of promotion campaign compliance in different retail stores 105. GUI 1100 may also include a second display area 1104 showing a graph illustrating sales of a certain product relative to the percentage of out of shelf. GUI 1100 may also include a third display area 1106 showing actual measurements of different factors relative to target goals (e.g., planogram compliance, restocking rate, price compliance, and other metrics). The provided information may enable market research entity 110 to give supplier 115 informed shelving recommendations and fine-tune promotional strategies according to in-store marketing trends, to provide store managers with a comparison of store performances in comparison to a group of retail stores 105 or industry wide performances, and so forth.

FIG. 11B illustrates an example GUI 1110 for output device 145B used by supplier 115. Consistent with the present disclosure, server 135 may use data derived from images captured in a plurality of retail stores 105 to recommend a planogram, which often determines sales success of different products. Using various analytics and planogram productivity measures, server 135 may help supplier 115 to determine an effective planogram with assurances that most if not all retail stores 105 may execute the plan. For example, the determined planogram may increase the probability that inventory is available for each retail store 105 and may be designed to decrease costs or to keep costs within a budget (such as inventory costs, restocking costs, shelf space costs, etc.). Server 135 may also provide pricing recommendations based on the goals of supplier 115 and other factors. In other words, server 135 may help supplier 115 understand how much room to reserve for different products and how to make them available for favorable sales and profit impact (for example, by choosing the size of the shelf dedicated to a selected product, the location of the shelf, the height of the shelf, the neighboring products, and so forth). In addition, server 135 may monitor near real-time data from retail stores 105 to determine or confirm that retail stores 105 are compliant with the determined planogram of supplier 115. As used herein, the term "near real-time data," in the context of this disclosure, refers to data acquired or generated, etc., based on sensor readings and other inputs (such as data from image sensors, audio sensors, pressure sensors, checkout stations, etc.) from retail store 105 received by system 100 within a predefined period of time (such as time periods having durations of less than a second, less than a minute, less than an hour, less than a day, less than a week, etc.).

In some embodiments, server 135 may generate reports that summarize performance of the current assortment and the planogram compliance. These reports may advise supplier 115 of the category and the item performance based on individual SKU, sub segments of the category, vendor, and region. In addition, server 135 may provide suggestions or information upon which decisions may be made regarding how or when to remove markdowns and when to replace underperforming products. For example, as shown in FIG. 11B, GUI 1110 may include a first display area 1112 for showing different scores of supplier 115 relative to scores associated with its competitors. GUI 1110 may also include a second display area 1114 showing the market share of each competitor. GUI 1110 may also include a third display area 1116 showing retail measurements and distribution of brands. GUI 1110 may also include a fourth display area 1118 showing a suggested planogram. The provided information may help supplier 115 to select preferred planograms based on projected or observed profitability, etc., and to ensure that retail stores 105 are following the determined planogram.

FIGS. 11C and 11D illustrate example GUIs for output devices 145C, which may be used by store associates of retail store 105. FIG. 11C depicts a GUI 1120 for a manager of retail store 105 designed for a desktop computer, and FIG. 11D depicts GUI 1130 and 1140 for store staff designed for a handheld device. In-store execution is one of the challenges retail stores 105 have in creating a positive customer experience. Typical in-store execution may involve dealing with ongoing service events, such as a cleaning event, a restocking event, a rearrangement event, and more. In some embodiments, system 100 may improve in-store execution by providing adequate visibility to ensure that the right products are located at preferred locations on the shelf. For example, using near real-time data (e.g., captured images of store shelves) server 135 may generate customized online reports. Store managers and regional managers, as well as other stakeholders, may access custom dashboards and online reports to see how in-store conditions (such as, planogram compliance, promotion compliance, price compliance, etc.) are affecting sales. This way, system 100 may enable managers of retail stores 105 to stay on top of burning issues across the floor and assign store associates to address issues that may negatively impact the customer experience.

In some embodiments, server 135 may cause real-time automated alerts when products are out of shelf (or near out of shelf), when pricing is inaccurate, when intended promotions are absent, and/or when there are issues with planogram compliance, among others. In the example shown in FIG. 11C, GUI 1120 may include a first display area 1122 for showing the average scores (for certain metrics) of a specific retail store 105 over a selected period of time. GUI 1120 may also include a second display area 1124 for showing a map of the specific retail store 105 with real-time indications of selected in-store execution events that require attention, and a third display area 1126 for showing a list of the selected in-store execution events that require attention. In another example, shown in FIG. 11D, GUI 1130 may include a first display area 1132 for showing a list of notifications or text messages indicating selected in-store execution events that require attention. The notifications or text messages may include a link to an image (or the image itself) of the specific aisle with the in-store execution event. In another example, shown in FIG. 11D, GUI 1140 may include a first display area 1142 for showing a display of a video stream captured by output device 145C (e.g., a real-time display or a near real-time display) with augmented markings indicting a status of planogram compliance for each product (e.g., correct place, misplaced, not in planogram, empty, and so forth). GUI 1140 may also include a second display area 1144 for showing a summary of the planogram compliance for all the products identified in the video stream captured by output device 145C. Consistent with the present disclosure, server 135 may generate within minutes actionable tasks to improve store execution. These tasks may help store associates of retail store 105 to quickly address situations that may negatively impact revenue and customer experience in the retail store 105.

FIG. 11E illustrates an example GUI 1150 for output device 145D used by an online customer of retail store 105. Traditional online shopping systems present online customers with a list of products. Products selected for purchase may be placed into a virtual shopping cart until the customers complete their virtual shopping trip. Virtual shopping carts may be examined at any time, and their contents may be edited or deleted. However, common problems of traditional online shopping systems arise when the list of products on the website does not correspond with the actual products on the shelf. For example, an online customer may order a favorite cookie brand without knowing that the cookie brand is out-of-stock. Consistent with some embodiments, system 100 may use image data acquired by capturing devices 125 to provide the online customer with a near real-time display of the retail store and a list of the actual products on the shelf based on near real-time data. In one embodiment, server 135 may select images without occlusions in the field of view (e.g., without other customers, carts, etc.) for the near real-time display. In one embodiment, server 135 may blur or erase depictions of customers and other people from the near real-time display. As used herein, the term "near real-time display," in the context of this disclosure, refers to image data captured in retail store 105 that was obtained by system 100 within a predefined period of time (such as less than a second, less than a minute, less than about 30 minutes, less than an hour, less than 3 hours, or less than 12 hours) from the time the image data was captured.

Consistent with the present disclosure, the near real-time display of retail store 105 may be presented to the online customer in a manner enabling easy virtual navigation in retail store 105. For example, as shown in FIG. 11E, GUI 1150 may include a first display area 1152 for showing the near real-time display and a second display area 1154 for showing a product list including products identified in the near real-time display. In some embodiments, first display area 1152 may include different GUI features (e.g., tabs 1156) associated with different locations or departments of retail store 105. By selecting each of the GUI features, the online customer may virtually jump to different locations or departments in retail store 105. For example, upon selecting the "bakery" tab, GUI 1150 may present a near real-time display of the bakery of retail store 105. In addition, first display area 1152 may include one or more navigational features (e.g., arrows 1158A and 1158B) for enabling the online customer to virtually move within a selected department and/or virtually walk through retail store 105. Server 135 may be configured to update the near real-time display and the product list upon determining that the online customer wants to virtually move within retail store 105. For example, after identifying a selection of arrow 1158B, server 135 may present a different section of the dairy department and may update the product list accordingly. In another example, server 135 may update the near-real time display and the product list in response to new captured images and new information received from retail store 105. Using GUI 1150, the online customer may have the closest shopping experience without actually being in retail store 105. For example, an online customer can visit the vegetable department and decide not to buy tomatoes after seeing that they are not ripe enough.

As discussed above, shopping in retail stores is a prevalent part of modern-day life. To improve customer experience, during a shopper's visit to a retail store, store owners may provide a variety of convenient ways for the shoppers to select and purchase products. For example, one common way of improving customer experience has been to provide self-checkout counters in a retail store, allowing shoppers to quickly purchase their desired items and leave the store without needing to wait for a store associate to help with the purchasing process. The disclosed embodiments provide another method of improving customer experience in the form of frictionless checkout.

As used herein, frictionless checkout refers to any checkout process for a retail environment with at least one aspect intended to expedite, simplify, or otherwise improve an experience for customers. In some embodiments, frictionless checkout may reduce or eliminate the need to take inventory of products being purchased by the customer at checkout. For example, this may include tracking the selection of products made by the shopper so that they are already identified at the time of checkout. The tracking of products may occur through the implementation of sensors used to track movement of the shopper and/or products within the retail environment, as described throughout the present disclosure. Additionally or alternatively, frictionless checkout may include an expedited or simplified payment procedure. For example, if a retail store has access to payment information associated with a shopper, the payment information may be used to receive payment for products purchased by the shopper automatically or upon selection and/or confirmation of the payment information by the shopper. In some embodiments, frictionless checkout may involve some interaction between the shopper and a store associate or checkout device or terminal. In other embodiments, frictionless checkout may not involve any interaction between the shopper and a store associate or checkout device or terminal. For example, the shopper may walk out of the store with the selected products and a payment transaction may occur automatically. While the term "frictionless" is used for purposes of simplicity, it is to be understood that this encompasses semi frictionless checkouts as well. Accordingly, various types of checkout experiences may be considered "frictionless," and the present disclosure is not limited to any particular form or degree of frictionless checkout.

It may be important to determine whether a customer qualifies for frictionless checkout. For example, a customer who has a good credit history or history of timely payments for prior purchases may qualify for frictionless checkout at a retail store. In contrast, a customer having a bad credit history or repeated incidents of delayed or missed payments for the purchase of goods may not qualify for frictionless checkout. In other cases, a store owner may require immediate or in store payment for a high-value product. For example, in an electronics store, the store owner may require immediate or in-store payment for products such as high-definition televisions, high-end home theater systems, high-end stereos, etc. A shopper entering the electronics store and selecting one or more of these high-end items for purchase may not qualify for frictionless checkout. On the other hand, a shopper who purchases a relatively lower-priced its item, for example, a set of USB flash drives, a wireless mouse, etc., may be eligible for frictionless checkout. The disclosed methods and systems may provide a visual indicator that may indicate whether a shopper is eligible for frictionless checkout.

In some embodiments, a non-transitory computer-readable medium may include instructions that when executed by a processor may cause the processor to perform a method for determining whether shoppers are eligible for frictionless checkout. For example, as discussed above, the disclosed system may include one or more servers 135, which may include one or more processing devices 202. Processing device 202 may be configured to execute one or more instructions stored in a non-transitory computer-readable storage medium. As also discussed above, the non-transitory computer-readable medium may include one or more of random access memory (RAM), read-only memory (ROM), volatile memory, nonvolatile memory, hard drives, CD ROMs, DVDs, flash drives, disks, any other optical data storage medium, any physical medium with patterns of holes, a RAM, a PROM, an EPROM, a FLASH-EPROM or any other flash memory, NVRAM, a cache, a register, any other memory chip or cartridge, and networked versions of the same, etc.

In some embodiments, the method may include obtaining image data captured using a plurality of image sensors positioned in a retail store. For example, as discussed above, a retail store (e.g., 105A, 105B, 105C, etc., see FIG. 1) may include one or more capturing devices 125 configured to capture one or more images. Capturing devices 125 may include one or more of a digital camera, a time-of-flight camera, a stereo camera, an active stereo camera, a depth camera, a Lidar system, a laser scanner, CCD based devices, etc. Capturing devices 125 may be stationary or movable devices mounted to walls or shelves in the retail stores (e.g., 105A, 105B, 105C, etc.). It is also contemplated that capturing devices 125 may be handheld devices (e.g., a smartphone, a tablet, a mobile station, a personal digital assistant, a laptop, etc.), a wearable device (e.g., smart glasses, a smartwatch, a clip-on camera, etc.) or may be attached to a robotic device (e.g., drone, robot, etc.). It is further contemplated that capturing devices 125 may be held or worn by a shopper, a store associate, or by one or more other persons present in retail stores 105.

One or more of capturing devices 125 may include one or more image sensors 310, which may include one or more semiconductor charge-coupled devices (CCD), active pixel sensors in complementary metal-oxide-semiconductor (CMOS), or N-type metal-oxide-semiconductors (NMOS, Live MOS), etc. The one or more image sensors 310 in retail stores 105 may be configured to capture images of one or more persons (e.g., shoppers, store associates, etc.), one or more shelves 350, one or more items 803A, 803B, 853A, etc. on shelves 350, and/or other objects (e.g., shopping carts, checkout counters, walls, columns, poles, aisles, pathways between aisles), etc. The images may be in the form of image data, which may include, for example, pixel data streams, digital images, digital video streams, data derived from captured images, etc.

In some embodiments, the method may include analyzing the image data to identify at least one shopper at one or more locations of the retail store. For example, processing device 202 may analyze the image data obtained by the one or more image sensors 310 to identify one or more persons or objects in the image data. As used herein, the term identify may broadly refer to determining an existence of a person or a product in the image data. It is also contemplated, however, that in some embodiments identifying a person in the image data may include recognizing a likeness of the person and associating an identifier (e.g., name, customer ID, account number, telephone number, etc.) with the recognized person. It is contemplated that processing device 202 may use any suitable image analysis technique, for example, including one or more of object recognition, object detection, image segmentation, feature extraction, optical character recognition (OCR), object-based image analysis, shape region techniques, edge detection techniques, pixel-based detection, artificial neural networks, convolutional neural networks, etc., to identify one or more persons or objects in the image data. It is further contemplated that processing device 202 may access one or more databases 140 to retrieve one or more reference images of likenesses of one or more persons. Further, processing device 202 may use one or more of the image analysis techniques discussed above to compare the images retrieved from database 140 with the image data received from the one or more image sensors 310 to recognize the likeness of one or more shoppers in the image data. It is also contemplated that processing device 202 may retrieve other identifying information (e.g., name, customers ID, account number, telephone number, etc.) associated with the images retrieved from database 140 based on, for example, profiles of the one or more shoppers stored in database 140. In some embodiments, processing device 202 may also be configured to employ machine learning algorithms or artificial neural networks to recognize and identify one or more shoppers in the image data obtained by image sensors 310.

Figure 12A:
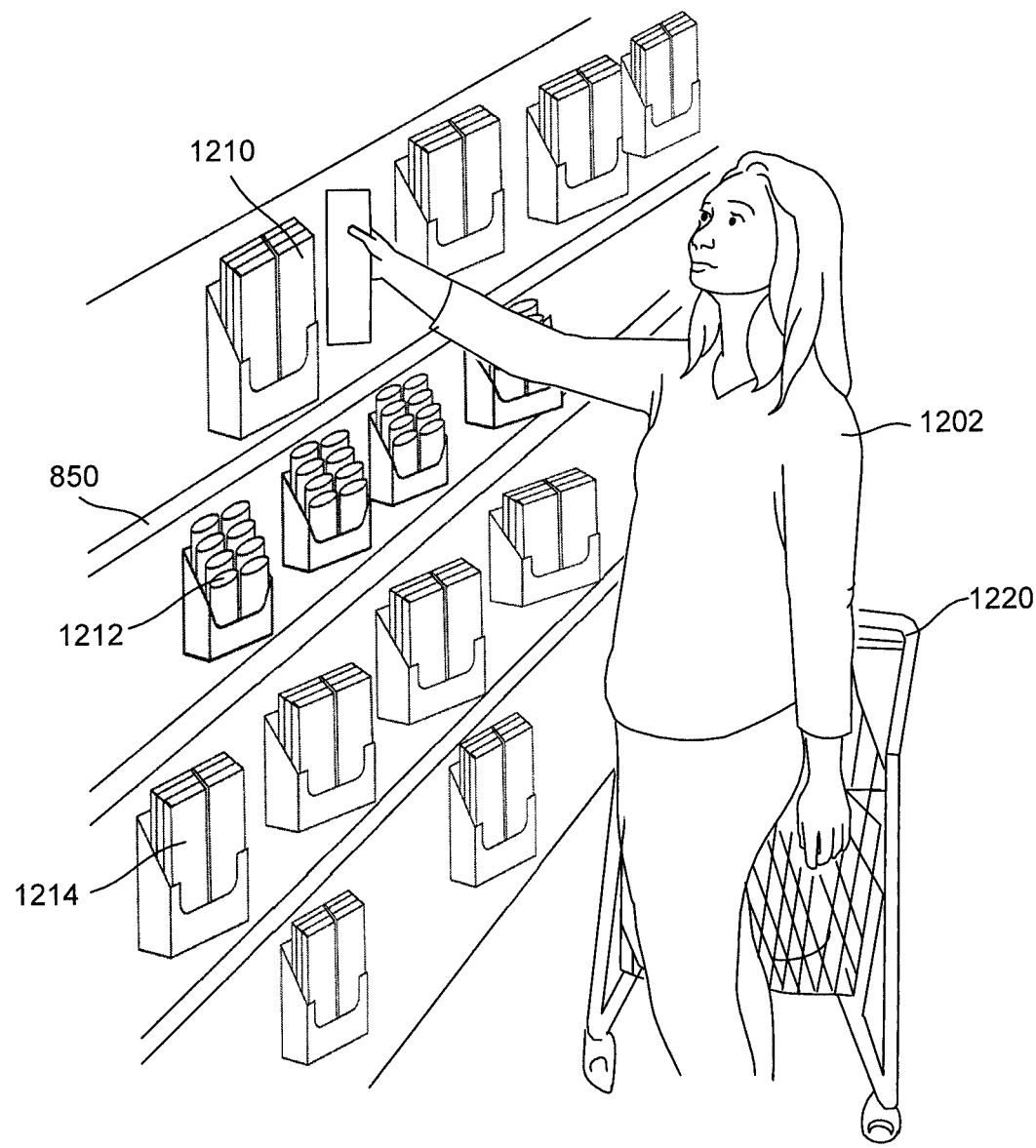
FIG. 12A illustrates an example of a shopper interacting with a product in a retail store, consistent with the present disclosure.

In some embodiments, the method may include detecting, based on the analysis of the image data, at least one product interaction event associated with an action of the at least one shopper at the one or more locations of the retail store. For example, as a shopper passes through the retail store, a shopper may interact with one or more products located in the store by performing one or more actions. For example, as illustrated in FIG. 12A, shopper 1202 may be standing near shelf 850 that may be carrying products 1210, 1212, 1214, etc. Shopper 1202 may have shopping cart 1220. In some embodiments, the action of the at least one shopper may include removing a product from a shelf associated with the retail store. For example, as illustrated in FIG. 12A, shopper 1202 may interact with the one or more products 1210, 1212, 1214, etc., by picking up product 1210 and removing product 1210 from shelf 850. In some embodiments, the action of the at least one shopper may include returning a product to a shelf associated with the retail store. For example, shopper may pick up a product (e.g., 1210, 1212, 1214, etc.) by removing product 1210 from shelf 850 associated with retail store (e.g., 105A, 105B, 105C, etc.), inspect product 1210, position product 1210 in various orientations, return product 1210 back to shelf 850, place product 1210 in shopping cart 1220, remove product 1210 from shopping cart 1220, and/or move product 1210 from one location to another (e.g., move product 1210 from shelf 850 to a different position on the same shelf, or to another shelf, etc.). Each of these actions by shopper 1202 may constitute a product interaction event. Other examples of product interaction events may include, for example, shopper 1202 picking up a product (e.g., 1210, 1212, 1214, etc.) and checking its price using a price scanner, shopper 1202 picking up a plurality of products (e.g., one or more of 1210, 1212, 1214, etc.), shopper 1202 returning some of the plurality of products (e.g., one or more of 1210, 1212, 1214, etc.) previously removed by shopper 1202 from shelf 850, etc. It is also contemplated that a product interaction event may include a combination of one or more of the actions or events described above.

Processing device 202 may analyze image data received from one or more image sensors 310 to detect occurrence of one or more of the product interaction events discussed above. Processing device 202 may employ one or more of the image analysis techniques including, for example, object recognition, object detection, image segmentation, feature extraction, optical character recognition (OCR), object-based image analysis, shape region techniques, edge detection techniques, pixel-based detection, artificial neural networks, convolutional neural networks, etc., to detect the one or more of product interaction events discussed above. It is also contemplated that processing device 202 may analyze the image data obtained by the one or more sensors 310 at a single location or at a plurality of locations in retail stores 125.

In some embodiments, the method may include obtaining sensor data from a one or more sensors disposed on a retail shelf between the retail shelf and one or more products placed on the retail shelf. As discussed above, a shelf (e.g., 850) associated with retail store (e.g., 105A, 105B, 105C, etc.) may include one or more sensors (e.g., 851A, 851B, etc.) disposed between one or more products (e.g., 803A, 803B, 853A, 1210, 1212, 1214, etc.). The one or more sensors (e.g., 851A, 851B, etc.) may be configured to detect one or more parameters such as a position or change of position of one or more products (e.g., 803A, 803B, 853A, 1210, 1212, 1214, etc.) on the shelf 850. It is also contemplated that in some embodiments the one or more sensors (e.g., 851A, 851B, etc.) may be configured to measure a pressure being exerted on shelf 850 and/or a weight of shelf 850 to detect whether one or more products (e.g., 803A, 803B, 853A, 1210, 1212, 1214, etc.) have been removed from shelf 850 by shopper 1202 or replaced on shelf 850 by shopper 1202. For example, processing device 202 may receive signals from a weight sensor positioned on shelf 850 in retail store (e.g., 105A, 105B, 105C, etc.). Processing device 202 may determine that a product (e.g., 803A, 803B, 853A, 1210, 1212, 1214, etc.) has been removed from shelf 850 or returned to shelf 850 based on a change in weight detected by the weight sensor. By way of another example, processing device 202 may receive signals from a pressure sensor positioned on shelf 850 in retail store (e.g., 105A, 105B, 105C, etc.). Processing device may determine that one or more products have been removed from shelf 850 or returned to shelf 850 based on a change in pressure detected by the pressure sensor. As another example, processing device 220 may receive signals from a touch sensor positioned on shelf 850 in retail store (e.g., 105A, 105B, 105C, etc.). Processing device 202 may determine that one or more products have been removed from shelf 850 or returned to shelf 850 based on signals received from the touch sensor. In another example, shelf 850 or a location in a vicinity of shelf 850 in retail store (e.g., 105A, 105B, 105C, etc.) may be equipped with a light sensor. Processing device 202 may determine that one or more products have been removed from shelf 850 or returned to shelf 850 based on signals received from the light sensor. As also discussed above, it is contemplated that in some embodiments the one or more sensors may measure other parameters such as resistance, capacitance, inductance, reflectance, emittance, etc., based on a proximity of the one or more sensors with the one or more products to determine whether a product (e.g., 803A, 803B, 853A, 1210, 1212, 1214, etc.) has been removed from shelf 850 by shopper 1202 or returned to shelf 850 by shopper 1202.

In some embodiments, the at least one product interaction event may be detected based on analysis of the image data and the sensor data. As discussed above, processing device 202 may detect whether a shopper has taken an action associated with the product (e.g., interacted with the product) based on analysis of image data received from one or more image sensors 310. As also discussed above, processing device 202 may detect whether the shopper has taken an action associated with a product based on signals received from one or more sensors (e.g., 851A, 851B, etc.) associated with a shelf (e.g., 850) in retail store (e.g., 105A, 105B, 105C, etc.) It is also contemplated that in some embodiments, processing device 202 may determine whether a shopper (e.g., 1202) has interacted with a product (e.g., 803A, 803B, 853A, 1210, 1212, 1214, etc.) located on shelf 850 based on an analysis of both the image data received from one or more image sensors 310 and the sensor data received from one or more sensors (e.g., 851A, 851B, etc.) associated with shelf 850. For examples, processing device 202 may determine that a product (e.g., 803A, 803B, 853A, 1210, 1212, 1214, etc.) has been removed from shelf 850 based on an analysis of the image data obtained from image sensors 310. Processing device 202 may confirm that the product (e.g., 803A, 803B, 853A, 1210, 1212, 1214, etc.) has been removed from shelf 850 by determining whether there has been a change in a weight of shelf 850 based on sensor data received from sensors (e.g., 851A, 851B, etc.). By way of another example, in some situations, processing device 202 may be unable to determine whether a product (e.g., 803A, 803B, 853A, 1210, 1212, 1214, etc.) has been removed from or returned to shelf 850 based solely on analysis of the image data. This may occur, for example, because another shopper (e.g., 1204, see FIG. 12B) or object may be partially or fully occluding shopper 1202 in the image data while shopper 1202 is interacting with a product (e.g., 803A, 803B, 853A, 1210, 1212, 1214, etc.). In such cases, processing device 202 may additionally or alternatively rely on sensor data obtained from sensors (e.g., 851A, 851B, etc.) to determine whether shopper 1202 has removed a product from a shelf or returned a product to the shelf (e.g., interacted with a product). Thus, various combinations of image data and sensor data may be used to determine whether a product interaction event (e.g., action by a shopper relative to a product in the store) has occurred.

Figure 12B:
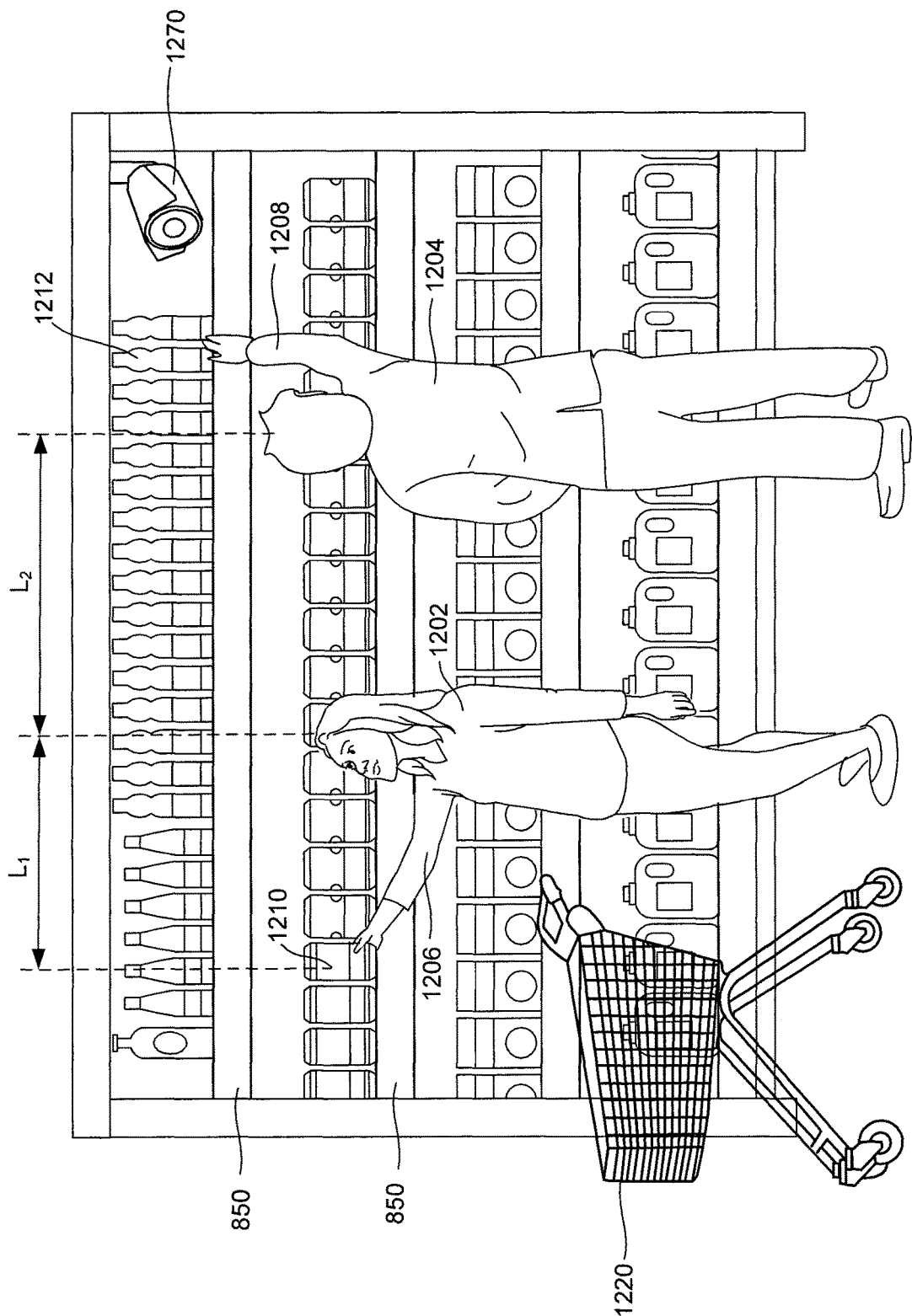
FIG. 12B illustrates an example of a plurality of shoppers interacting with products in a retail store, consistent with the present disclosure.
Figure 12C:
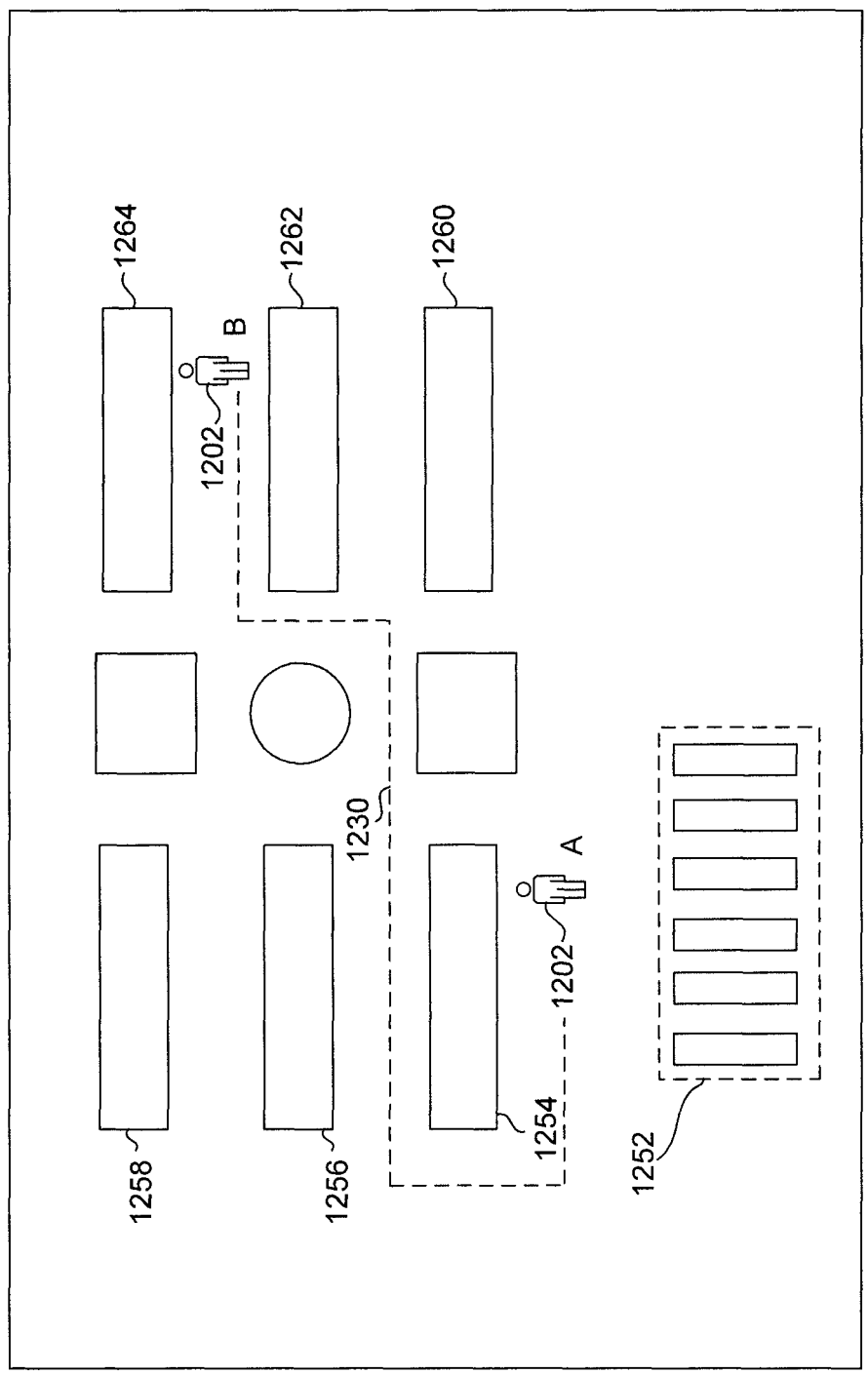
FIG. 12C illustrates a top view of an exemplary retail store showing a path followed by a shopper, consistent with the present disclosure.

In some embodiments, the at least one shopper may include a plurality of shoppers, and wherein identifying the at least one shopper at the one or more locations of the retail store may include determining an individual path for each of the plurality of shoppers in the retail store. It is contemplated that there may be more than one shopper present in a retail store (e.g., 105A, 105B, 105C, etc.) at any given time. For example, as illustrated in FIG. 12B, shoppers 1202, 1204 may be present in the retail store. To identify a shopper (e.g., shopper 1202), it may be necessary to analyze images of shopper 1202 taken in different locations within the retail store (e.g., 105A, 105B, 105C, etc.). This may occur, for example, because image data obtained by image sensors 310 in one location of the store may not have sufficient information to identify shopper 1202. For example, FIG. 12C illustrates a top view of an exemplary retail store 105. As illustrated in FIG. 12C, retail store 105 may include checkout area 1252, aisles 1254, 1256, 1258, 1260, 1262, 1264, etc. Shopper 1202 may interact with a product (e.g., 803A, 803B, 853A, 1210, 1212, 1214, etc.) located on shelf 850 at location A (see FIG. 12C) of a retail store (e.g., 105A, 105B, 105C, etc.). However, a face of shopper 1202 at location A may be partially or fully occluded in the image data associated with location A, for example, due to the presence of another shopper 1204, a shelf, or another object next to shopper 1202. Thus, it may not be possible to identify shopper 1202 associated with the product interaction event (e.g., interaction of shopper 1202 with a product) that may have occurred at location A. However, image data obtained from a different location (e.g., location B) in the store may include a clearer or better image of shopper 1202. To identify shopper 1202 using the image data from a different location (e.g., locations A and B), it may be necessary to ensure the image data at the two locations A and B corresponds to the same shopper 1202. One way of doing this may be to determine a path 1230 of shopper 1202 as shopper 1202 travels around store 150 and relating the two locations A and B with path 1230 taken by shopper 1202. That is, it may be possible to use image data at location B to identify shopper 1202 associated with a product interaction event at location A when locations A and B both lie on path 1230 of shopper 1202 through the retail store 105.

In some embodiments, the individual path determined for each of the plurality of shoppers may be used in detecting the at least one product interaction event. For example, as discussed above a shopper (e.g., 1202) may interact with a product (e.g., 803A, 803B, 853A, 1210, 1212, 1214, etc.) located on shelf 850 at location A of a retail store (e.g., 105A, 105B, 105C, etc.). Processing device 202 may determine, for example, based on analysis of image data obtained from image sensors 310 and associated with location A that shopper 1202 has removed a product (e.g., 1212) from shelf 850 at location A. However, the removed product 1212 may be occluded by shopper 1202, by another shopper 1204, or another object located in the store 105. As a result, the image data associated with location A may be insufficient to identify product 1212 that shopper 1202 may have removed from shelf 850 at location A. However, as shopper 1202 travels through retail store 105 along path 1230, image data of shopping cart 1220 associated with shopper 1202 may be obtained at location B, and the image data associated with location B may allow processing device 202 to identify the previously unidentified product 1212 that shopper 1202 may have removed from shelf 850 at location A and placed in shopping cart 1220. Processing device 202 may be configured to determine path 1230 of shopper 1202 from location A to location be in the store to be able to associate the product identifier using the image data at location B. Processing device 202 may also be configured to use the determined path 1230 to identify shopper 1202 at locations A and B. Further, processing device 202 may be configured to identify a product interaction event (e.g., removal of product 1212 from shelf 850) at location A based on analysis of image data at location B on path 1230.

In some embodiments, the at least one product interaction event may be detected based on a plurality of products that the at least one shopper is expected to buy. It is contemplated that in some embodiments, information associated with one or more products previously purchased by a shopper (e.g., 1202) may be stored in database 140. For example, when shopper 1202 visits a retail store (e.g., 105B) and purchases one or more products (e.g., 803A, 803B, 853A, 1210, 1212, 1214, etc.), a list of the one or more products purchased by shopper 1202 may be stored in database 140. It is contemplated that when shopper 1202 subsequently enters a retail store (e.g., 105B), processing device 202 may be able to access the list of previously purchases products associated with shopper 1202 from database 140. Processing device 202 may also be configured to identify the one or more products (e.g., 803A, 803B, 853A, 1210, 1212, 1214, etc.) that shopper 1202 may have previously purchased at retail store 105B. During the subsequent visit of shopper 1202 to retail store 105B, the shopper may be expected to purchase one or more products from the list of previously purchased products. During the subsequent visit of shopper 1202 to retail store 105B, processing device 202 may detect a product interaction event based on an analysis of image data obtained by one or more image sensors 310, and/or based on a sensor data obtained from one or more sensors 851A, 851B. Processing device 202 may identify the product (e.g., 1204) associated with the product interaction event based on the list of previous purchases retrieved from database 140 and information regarding the retail store location (e.g., particular shelf 850). For example, analysis of the image data may indicate that shopper 1202 is associated with a product interaction event at a particular shelf 1254 (e.g., shelf that carries bread). Furthermore, processing device 202 may determine from the list of previous purchases retrieved from database 140 that shopper 1202 has previously purchased bread at retail store 105B. Processing device 202 may then associate the product interaction event shelf 1254 with removal of a product (e.g., bread) based on the list of previous purchases associated with shopper 1202.

In some embodiments, the method may include determining whether the at least one shopper is eligible for frictionless checkout based on the detected at least one product interaction event. Many different criteria may be used by processing device 202 to determine whether a shopper (e.g., 1202, 1204, etc.) is eligible for frictionless checkout based on a detected product interaction event. Some examples of these criteria are provided below. It should be understood however that these examples are nonlimiting and that many other criteria may be used determine whether a shopper (e.g., 1202, 1204, etc.) is eligible for frictionless checkout. In some embodiments, processing device 202 may determine that a shopper (e.g., 1204) is ineligible for frictionless checkout when a product interaction event associated with shopper 1204 is associated with an unidentified product. For example, processing device 202 may detect a product interaction event in which shopper 1204 removes a product (e.g., 1214) from shelf 850 or returns product 1214 to shelf 850 in retail store 105. However, image data and/or sensor data associated with the product interaction event may be insufficient to identify product 1214. As a result, processing device 202 may associate the product interaction event with an unidentified product. Because product 1214 is unidentified based on analysis of the image and/or sensor data, processing device 202 may designate shopper 1204 as being ineligible for frictionless checkout.

In some embodiments, determining whether the at least one shopper is eligible for frictionless checkout may be based on whether the at least one shopper is detected removing or selecting a product from a shelf that may be designated as ineligible for frictionless checkout. For example, a retailer may designate certain products as being ineligible for frictionless checkout. Such products may include, for example, high-priced items (e.g., aged bottle of wine, premium olive oil, caviar, etc.), items that may be available only in a limited quantity (e.g., particular brand or vintage of wine, particular brand of a product, etc.), items that may be age restricted (e.g., alcohol, tobacco, etc.), items requiring additional information or input (e.g., gift cards of variable monetary value), or the like. It is contemplated that retailer may designate shelf 850 carrying such products as constituting a shelf that is ineligible for frictionless checkout. As discussed above, processing device 202 may detect a product interaction event when, for example, a shopper (e.g., 1202) removes a product (e.g., 803A, 803B, 853A, 1210, 1212, 1214, etc.) from a shelf in a retail location. When processing device 202 determines that shopper 1202 removed a product from shelf 850 that has been designated as ineligible for frictionless checkout, processing device 202 may determine that shopper 1202 is ineligible for frictionless checkout.

By way of another example, a particular shelf (e.g., 1256) in a retail store (e.g., 105A, 105B, 105C, etc.) may include one or more displays associated with one or more services (e.g., free delivery, opening a new credit card account, vacation deals, home cleaning services, gardening services, etc.). It is contemplated that retailer may designate shelf 1256 associated with one or more services as being ineligible for frictionless checkout. As discussed above, processing device 202 may detect a product interaction event when, for example, shopper 1202 selects materials associated with the one or more services from shelf 1256. When processing device 202 determines that shopper 1202 has selected a service from a shelf 1256 that has been designated as ineligible for frictionless checkout, processing device 202 may determine that shopper 1202 is also ineligible for frictionless checkout.

By way of another example, a particular shelf 1256 retail store may include one or more interactive displays (e.g., touch screen device, tablet, etc.) that may allow shopper 1202 to select one or more products and/or one or more services. It is contemplated that a retailer may designate this particular shelf 1256 associated with the one or more interactive displays as being ineligible for frictionless checkout. As discussed above, processing device 202 may detect a product interaction event when, for example, shopper 1202 selects one or more items from the one or more interactive displays on shelf 1256. When processing device 202 determines that shopper 1202 has selected one or more items from the interactive displays on a shelf 1256 that has been designated as being ineligible for frictionless checkout, processing device 202 may determine that shopper 1202 is also ineligible for frictionless checkout.

In some embodiments, determining whether the at least one shopper is eligible for frictionless checkout may be based on at least one indicator of a degree of ambiguity associated with the detected at least one product interaction event. In some embodiments, the at least one indicator of the degree of ambiguity may be determined based on the image data. As discussed above, processing device 202 may detect one or more product interaction events based on an analysis of image data obtained by the one or more image sensors 310. It is contemplated that in some instances, processing device 202 may not be able to identify either the shopper or the product being removed from shelf 850 or being returned to shelf 850, or both because of the quality of the image data. For example, in some instances images obtained by the one or more sensors 310 may be too dark because of insufficient light. As another example, portions of an image of shopper 1202 and/or a product (e.g., 803A, 803B, 853A, 1210, 1212, 1214, etc.) may be occluded by another shopper 1204, and/or another object. By way of another example, an image of a product (e.g., 803A, 803B, 853A, 1210, 1212, 1214, etc.) may be blurry or out of focus making it difficult to, for example, read a label on the product using optical character recognition techniques. In each of the above-described examples, processing device 202 may be unable to identify shopper 1202 and/or a product (e.g., 803A, 803B, 853A, 1210, 1212, 1214, etc.) associated with a product interaction event. Processing device 202 may be configured to determine an indicator of the degree of ambiguity associated with the product interaction event when processing device 202 is unable to identify shopper 1202 and/or a product (e.g., 803A, 803B, 853A, 1210, 1212, 1214, etc.) associated with the product interaction event. By way of example, the indicator may be a numerical value ranging between a minimum and maximum value, with the value indicating a degree of ambiguity. As another example, the indicator may be in the form of text (e.g., Low, Medium, High, etc.) indicating a degree of ambiguity. By way of example, processing device 202 may be configured to identify shopper 1202 and/or a product (e.g., 803A, 803B, 853A, 1210, 1212, 1214, etc.) by comparing the image data obtained from the one or more image sensors 310 with one or more reference images of shopper 1202 and/or a product (e.g., 803A, 803B, 853A, 1210, 1212, 1214, etc.). Processing device 202 may be configured to determine the indicator of ambiguity based on, for example, a degree of similarity between the image data and the reference image of the shopper 1202 and/or a product (e.g., 803A, 803B, 853A, 1210, 1212, 1214, etc.). It is also contemplated that processing device 202 may execute one or more mathematical or statistical algorithms or other models to determine the indicator of ambiguity.

In some embodiments, the at least one indicator of the degree of ambiguity may be determined based on the image data and on data captured using at least one sensor disposed on a surface of a retail shelf. As discussed above, in some instances, processing device 202 may use a combination of analyses of image data obtained from the one or more image sensors 310 and sensor data obtained from one or more sensors (e.g., 851A, 851B) to identify one or more products (e.g., 803A, 803B, 853A, 1210, 1212, 1214, etc.) involved in a product interaction event. Processing device 202 may be configured to determine an indicator of ambiguity when, for example, processing device 202 is unable to identify a product (e.g., 803A, 803B, 853A, 1210, 1212, 1214, etc.) removed from or returned to shelf 850 by shopper 1202 based on analysis of both the image data and the sensor data. For example, processor 202 may be configured to identify a product (e.g., 803A, 803B, 853A, 1210, 1212, 1214, etc.) removed from or returned to shelf 850 by comparing a change in weight or pressure detected by, for example, sensors 851A, 851B with a reference weight or pressure associated with the product. Processing device 202 may be configured to determine an indicator of ambiguity based on a difference between the change in weight and the reference weight, or the change in pressure and the reference pressure. It is contemplated that processing device 202 may execute various mathematical or statistical algorithms or other models to determine the indicator of ambiguity based on analysis of both the image data and the sensor data associated with a product interaction event. It is also contemplated that in some embodiments, processing device 202 may use mathematical and/or statistical algorithms or other models to combine the indicators of ambiguity obtained based on analysis of the image data and analysis of the sensor data.

It is contemplated that processing device 202 may determine whether shopper 1202 is eligible for frictionless checkout based on the determined indicator of ambiguity. For example, processing device 202 may compare the determined indicator of ambiguity with a threshold indicator of ambiguity. Processing device 202 may be configured to determine that the shopper is ineligible for frictionless checkout when the determined indicator of ambiguity is greater than or equal to the threshold indicator of ambiguity. On the other hand, processing device 202 may be configured to determine that the shopper is eligible for frictionless checkout, when the determine indicator of ambiguity is less than the threshold indicator of ambiguity.

In some embodiments, the determination that the at least one shopper is ineligible for frictionless checkout may be based on a determination of a number of ambiguous events among the detected at least one product interaction event. In addition to determining an indicator of ambiguity, processing device 202 may be configured to determine a number of products interaction events that may ambiguous (e.g., that may have an indicator of ambiguity greater than or equal to a predetermined threshold indicator of ambiguity). For example, processing device 202 may compare the determined indicator of ambiguity with the threshold indicator of ambiguity and identify that product interaction events are ambiguous when indicators of ambiguity associated with those product interaction events exceed the predetermined indicator of ambiguity. Processing device 202 may also be configured to compare a total number of ambiguous product interaction events with the total number of detected product interaction events. In some embodiments, the at least one shopper may be determined to be ineligible for frictionless checkout if the number of ambiguous events exceeds a predetermined threshold. For example, processing device 202 may be configured identify shopper 1202 as being ineligible for frictionless checkout when the number of ambiguous events exceeds the predetermined threshold number of ambiguous events. In some embodiments, the predetermined threshold maybe based on a total number of the detected product interaction events. For example, processing device 202 may be configured to identify shopper 1202 as being eligible or ineligible for frictionless checkout based on a ratio of a number of ambiguous events and the total number of product interaction events. By way of example, when the percentage of ambiguous product interaction events is greater than 50% (e.g., when a ratio of the total number of ambiguous product interaction events to the total number of detected product interaction events is greater than 0.5), processing device 202 may be configured to determine that the shopper 1202 is ineligible for frictionless checkout. On the other hand, when the percentage of ambiguous product interaction events is relatively low (e.g., 0-0.3 or less than 30%), processing device 202 may be configured to determine that shopper 1202 is eligible for fictionalize checkout.

In some embodiments, the determination that the at least one shopper is ineligible for frictionless checkout may be based on a determination of a product value associated with one or more ambiguous events among the detected at least one product interaction event. It is contemplated that in some embodiments, shopper 1202 may be deemed ineligible for frictionless checkout when, for example, a product interaction event associated with a high-value product may have been determined to be ambiguous. By way of example, processing device 202 may determine that a product interaction event in which shopper 1202 removes a high-value product from shelf 1256 is ambiguous. In response, processing device 202 may be configured to determine that shopper 1202 is ineligible for frictionless checkout.

In some embodiments, the method may include causing an ambiguity resolution action in response to a detection of at least one ambiguous event among the detected at least one product interaction event. In some embodiments, when processing device 202 identifies a product interaction event is ambiguous, processing device 202 may initiate an ambiguity resolution action. For example, processing device 202 may send an instruction to a device associated with a store associate, asking the store associate to determine whether shopper 1202 removed a product (e.g., 803A, 803B, 853A, 1210, 1212, 1214, etc.) from a shelf (e.g., 1258) during the ambiguous product interaction event. The store associate may make the determination by visually inspecting products in shopping cart 1220 of shopper 1202, or by directly interacting with shopper 1202 and asking shopper 1202 whether he or she removed a product associated with the ambiguous product interaction event. In some embodiments, the store associate may direct shopper 1202 to a checkout aisle to perform the inspection. Based on the inspection or interaction with shopper 1202, store associate may alter the status of the ambiguous product interaction event. For example, after confirming the shopper 1202 removed a product (e.g., 1214) from shelf 1258, the store associate and/or processing device 202 may change the status of the ambiguous product interaction event to an unambiguous product interaction event.

In some embodiments, the method may include causing an eligibility status for frictionless checkout for the at least one shopper to be restored based on data associated with a completion of the ambiguity resolution action. For example, when a previously marked ambiguous product interaction event is updated and deemed an unambiguous product interaction event, the eligibility status of and associated shopper 1202 may be changed. By way of example, when processing device 202 determines the product interaction event to be ambiguous, processing device 202 may deem an associated shopper 1202 as being ineligible for frictionless checkout. However, when, for example, a store associate revises the status of the ambiguous product interaction event and marks it as not being ambiguous, processing device 202 may revise the status of the associated shopper 1202 from being ineligible for frictionless checkout to being eligible for frictionless checkout.

In some embodiments, determining whether the at least one shopper is eligible for frictionless checkout may include determining an indicator of a confidence level associated with each detected product interaction event. For example, as discussed above, processing device 202 may analyze image data obtained from the one or more image sensors 310 to determine the occurrence of a product interaction event (e.g., removal of a product from a shelf, return of a product to a shelf, etc.). As also discussed above, processing device 202 may additionally or alternatively analyze sensor data obtained from the one or more sensors 851A, 851B to determine the occurrence of a product interaction event. Processing device 202 may be configured to determine a confidence level associated with a detected product interaction event. For example, processing device 202 may assign a high confidence level (e.g. 80% to 100%) when there is a high likelihood that a product interaction event has occurred, that is, when there is a high likelihood that shopper 1202, for example, has removed a product (e.g., 803A, 803B, 853A, 1210, 1212, 1214, etc.) from a shelf (e.g., 850, 1254, 1256, etc.) or returned a product (e.g., 803A, 803B, 853A, 1210, 1212, 1214, etc.) to a shelf (e.g., 850, 1254, 1256, etc.). However, in some instances, processing device 202 may not be able to determine whether shopper 1202 has removed a product from or returned a product to a shelf (e.g., 850, 1254, 1256, etc.). This may occur for instance when an image of shopper 1202 and/or product (e.g., 803A, 803B, 853A, 1210, 1212, 1214, etc.) is occluded by another shopper 1204 or another object in the retail store. Additionally or alternatively, this may occur when for example more than one shopper 1202, 1204 interacts with products on a shelf. FIG. 12B illustrates a situation where, for example, both shoppers 1202 and 1204 remove products 1210 and 1212, respectively from shelves 850. As illustrated in FIG. 12B, camera 1270, including image sensor 310 may be located at one end of shelves 850. As a result, in the image data obtained by camera 1270, an image of shopper 1202 may be occluded by an image of shopper 1204. Additionally or alternatively, an image of shopper 1202's hand 1206 removing product 1210 may be occluded by image of shopper 1204's hand 1208, which may be removing product 1212 from shelves 850. In this situation, processing device 202 may not be able to determine which of shoppers 1202 and/or 1204 removed product 1210 from shelf 850. When processing device 202 determines that there is a lower likelihood that a product interaction event has occurred (because is it not clear which shopper removed product 1210), processing device 202 may be configured to assign a low confidence level (e.g., 0%-20%) to the detected product interaction event.

In some embodiments, a determination that the at least one shopper is ineligible for frictionless checkout may be based on whether the confidence level associated with the at least one product interaction event is below a predetermined threshold. It is contemplated that processing device 202 may determine whether shopper 1202 is eligible or ineligible for frictionless checkout based on a confidence level associated with a product interaction event associated with shopper 1202. For example, shopper 1202 may be deemed eligible for frictionless checkout, when processing device 202 has assigned a high confidence level (e.g., 80%-100%) to a product interaction event. On the other hand, shopper 1202 may be deemed ineligible for frictionless checkout when a confidence level associated with the product interaction event is low (e.g., 0% to 20%). By way of another example, when a product interaction event is associated with a high-value product, the reverse may be true. That is, when a confidence level associated with a product interaction event associated with a high-value product is high (e.g., 80%-100%), processing device 202 may determine that shopper 1202 is ineligible for frictionless checkout. On the other hand, when a confidence level associated with a product interaction event related to a high-value product is low (e.g., 0% to 20%), processing device 202 may determine that shopper 1202 is eligible for frictionless checkout.

In some embodiments, determining the indicator of the confidence level for each detected product interaction event may depend on a distance between a detected additional shopper and the at least one shopper when the at least one shopper removes a product from a shelf or returns a product to the shelf. As discussed above, then may be plurality of shoppers (e.g., 1202, 1204) present in a retail store. In particular, in some instances, there may be more than one shopper 1202, 1204 present near a particular shelf 850. FIG. 12D illustrates shoppers 1202, 1204 present near shelf 850. Processing device 202 may detect the occurrence of a product interaction event based on image data associated with shelf 850. However because the presence or more than one shopper (e.g., shopper 1202, shopper 1204, etc.) near shelf 850, processing device 202 may not be able to identify whether shopper 1202 or shopper 1204 was responsible for removing a product from or returning a product to shelf 850. It is contemplated that processing device 202 may be able to determine which of shoppers 1202 or 1204 interacted with the product based on the distance between shoppers 1202 or 1204 and shelf 850, as compared to a distance between shopper 1202 and shopper 1204. For example, as illustrated in FIG. 12D in one instance, shopper 1202 may be positioned at a distance $L_1$ relative to product 1210 whereas, shopper 1204 may be positioned at a distance $L_2$ from shopper 1202. Thus, shopper 1204 may be positioned at a distance $L_1+L_2$ from product 1210, which may be larger than distance $L_1$ between shopper 1202 and product 1210. In this instance, processing device 202 may identify shopper 1202 as being associated with the product interaction event. Processing device 202 may assign a confidence level to the product interaction event based on the distance $L_2$ between shopper 1202 and shopper 1204. For example, when a distance $L_2$ between shopper 1202 and shopper 1204 is relatively small, processing device 202 may assign a low confidence level (e.g., 0%-20%) to the product interaction event. This is because when the distance $L_2$ between shopper 1202 and shopper 1204 is low, it may be difficult to determine which of shoppers 1202 or 1204 removed product 1210 from shelf 850 or returned product 1210 to shelf 850. In contrast, when distance $L_2$ between shopper 1202 and shopper 1204 is relatively large, processing device 202 may assign a high confidence level (e.g., 80%-100%) to the product interaction event. This is because when the distance $L_2$ between hopper 1202 and shopper 1204 is relatively large, it may be possible to identify with more certainty whether shopper 1202 or shopper 1204 was associated with the product interaction event.

In some embodiments, the method may include updating the confidence level of a particular product interaction event after receiving additional input indicative of products purchased by at least one additional shopper. As discussed above, in some instances processing device 202 may assign a low confidence level (e.g., 0%-20%) to a product interaction event because of the uncertainty associated with determining which of, for example, shoppers 1202 or 1204 may be associated with the product interaction event. It is contemplated, however, that as shoppers 1202 and 1204 move around the retail store 105 one or more image sensors 310 may be able to obtain additional image data associated with each of shoppers 1202, 1204. In some instances, processing device 202 may be able to determine, for example, that shopping cart 1220 associated with shopper 1202 includes a product 1210 associated with a product interaction event that has been previously assigned a low confidence level. Based on the additional image data, however, processing device 202 may update or modify the confidence level associated with that interaction event. For example, when processing device 202 determines based on the subsequent image data that product 1210 is associated with for example, shopping cart 1220 of shopper 1202, processing device 202 may update the confidence level associated with the product interaction event by increasing the confidence level to a high confidence level.

In some embodiments, the method may include obtaining cart data indicative of an actual plurality of products within a cart of a particular shopper. For example, as shopper 1202 moves around a retail store (e.g., 105A, 105B, 105C, etc.), one or more sensors 310 may be configured to obtain image data including images of for example shopping cart 1220, including the one or more products (e.g., 803A, 803B, 853A, 1210, 1212, 1214, etc.) that may have been purchased by shopper 1202. Processing device 202 may perform image analysis on the received image data to identify the products (e.g., 803A, 803B, 853A, 1210, 1212, 1214, etc.) that may be present in shopping cart 1220. Processing device 202 may also be configured to determine a number of each identified product present in shopping cart 1220 and/or a total number of products present in shopping cart 1220 based on analysis of the image data.

In some embodiments the method may include determining, based on analysis of the detected at least one product interaction event, an expected plurality of products within the cart of the particular shopper. As discussed above, processing device 202 may analyze image data and/or sensor data associated with each of one or more product interaction events. Processing device 202 may be configured to determine whether one or more products (e.g., 803A, 803B, 853A, 1210, 1212, 1214, etc.) were removed from one or more shelves 850 and/or returned to the one or more shelves 850 based on the analysis of the image data and/or sensor data. Processing device 202 may also be configured to identify the one or more products (e.g., 803A, 803B, 853A, 1210, 1212, 1214, etc.) that may have been removed from shelf 850 during the one or more detected product interaction events. Based on the identification of the one or more products, processing device 202 may be configured to determine a number of each identified product (e.g., 803A, 803B, 853A, 1210, 1212, 1214, etc.) and/or a total number of products that may have been removed by a particular shopper (e.g., 1202) during the one or more detected product interaction events. Thus processing device 202 may be configured to determine an expected number of products that should be present in shopping cart 1220 associated with shopper 1202 based on analysis of the image data and/or the sensor data associated with the one or more product interaction events.

In some embodiments, the method may include determining whether a discrepancy exists between the actual plurality of products and the expected plurality of products. For example, processing device 202 may compare the actual number of products determined to be present in shopping cart 1220 associated with shopper 1202 with the expected number of products for shopper 1202. In some embodiments, processing device may also be configured to compare a number of each identified product determined to be present in shopping cart 1220 associated with shopper 1202 with the expected number of that identified product for that shopper 1202. Processing device 202 may also be configured to determine a discrepancy (e.g., difference between the numbers of products present in shopping cart 1220 associated with shopper 1202 and the expected numbers of products for that shopper 1202). In some embodiments, the method may include determining that the particular shopper is ineligible for frictionless checkout based on the determined discrepancy. It is contemplated that processing device 202 may determine that shopper 1202 is ineligible for frictionless checkout when processing device 202 determines that the number of products present in shopping cart 1220 associated with shopper 1202 is greater than a number of products expected to be in shopping cart 1220 based on analysis of the image data and sensor data associated with one or more product interaction events. For example, in one instance processing device 202 may determine that a number of products actually present in shopping cart 1220 associated with shopper 1202 is greater than an expected number of products for that particular shopper 1202. Such a discrepancy may indicate that one or more product interaction events may not have been captured in the image data and/or sensor data, and/or may not have been detected by processing device 202. Processing device 202 may therefore determine that shopper 1202 is ineligible for frictionless checkout.

In some embodiments, the at least one shopper may be determined to be ineligible for frictionless checkout if the product value exceeds a predetermined threshold. For example, processing device 202 may compare a price (e.g., value) of a product (e.g., 803A, 803B, 853A, 1210, 1212, 1214, etc.), which shopper 1202 may have removed from shelf 850, with a predetermined threshold price or value. Processing device 202 may determine that shopper 1202 is ineligible for frictionless checkout when the price of the product removed by shopper 1202 is greater than or equal to the predetermined threshold price or value. For example, as discussed above, the product removed by shopper 1202 may be a high-priced item and the retailer may want to ensure shopper 1202 makes payment for that high-priced item before leaving retail store 105. In some embodiments, the predetermined threshold may be up to a selected value for a single product. For example, the predetermined threshold price or value may be determined based on one product selected from the plurality of products that the shopper may have removed from one or more shelves 850 during the shopper's visit to a retail store (e.g., 105A, 105B, 105C, etc.). By way of example, the threshold price may be determined as a maximum price of a product already present in shopping cart 1220 of shopper 1202. In some embodiments, the predetermined threshold may be up to a selected ratio of a total product value associated with the detected product interaction events. For example, in some embodiments, the threshold price or value may be based on a total price or value of all the products that the shopper may have removed from the one or more shelves 850 during the shopper's visit to a retail store (e.g., 105A, 105B, 105C, etc.). Processing device 202 may continuously or periodically determine a total price or value of all the items that the shopper may have removed from the one or more shelves 850. Processing device 202 may determine the threshold price as being a predetermined percentage (e.g., 25%, 50%, etc.) or ratio (0.25, 0.5, etc.) of the total price. Processing device 202 may determine that the shopper is ineligible for frictionless checkout when a price of a product (e.g., 803A, 803B, 853A, 1210, 1212, 1214, etc.) removed from shelf 850 by shopper 1202 is greater than the predetermined percentage of ratio of the total price of all the products in shopping cart 1220. For example, if the total price of the products in shopping cart 1220 is T and the predetermined ration is 0.25, then processing device 202 may determine that shopper 1202 is ineligible for frictionless checkout when shopper 1202 removes a product having a price greater than 0.25T from shelf 850.

In some embodiments, the method may include accessing a customer profile associated with a particular shopper. In some embodiments, the method may include foregoing the delivery of the indicator that the particular shopper is ineligible for frictionless checkout based on information associated with the customer profile. As discussed above, it is contemplated that server 135 and/or database 140 may store information associated with one or more shoppers 1202, 1204 in the form of customer profiles. For example, a customer profile for shopper 1202 may include identification information of shopper 1202 (e.g., a name, an identification number, an address, and telephone number, an email address, a mailing address), and/or other information associated with shopper 1202. The other information may include, for example, shopping history, including a list of products previously purchased by shopper 1202, frequency of purchase of each of the products in the list, total value of products purchased by shopper 1202 during each visit to a retail store or during a predetermined period of time, payment history of shopper 1202, including information regarding on-time payments, late payments, delinquent payments, etc. The other information may also include information regarding any charges that shopper 1202 may have contested in the past, and/or other information associated with purchase of products at the retail store by shopper 1202. It is contemplated that in some embodiments, processing device 202 may determine that shopper 1202 is eligible for frictionless checkout based on the information included in the customer profile associated with shopper 1202.

In some embodiments, the information may indicate that the particular shopper is a trusted shopper. A trusted shopper as used in this disclosure may be determined based on information in the customer profile that indicates, for example, that shopper 1202 has previously informed the retail store 105 regarding errors in the price of products previously purchased by the shopper (e.g., under-charging shopper 1202), that shopper 1202 has paid for products purchased on time, and/or that shopper 1202 has a good credit history, etc. It is to be understood that these criteria for defining a trusted shopper are exemplary and nonlimiting and that many these or other criteria may be used individually or in any combination to define a trusted shopper. It is contemplated that processing device 202 may designate shopper 1202 as being eligible for frictionless checkout when the customer profile associated with shopper 102 includes one or more items of information indicating that the shopper is a trusted shopper.

In some embodiments, the information may indicate that the particular shopper is a returning customer. By way of another example, the information in a customer profile associated with shopper 1202 may indicate that shopper 1202 has previously shopped at a particular retail store (e.g., 105C). It also contemplated that in some embodiments the customer profile associated with shopper 1202 may include an indicator or a flag indicating that shopper 1202 is a returning customer and has previously shopped at, for example, retail store 105C. Processing device 202 may designate that shopper 1202 is eligible for frictionless checkout based on information in the customer profile, indicating that shopper 1202 is a returning customer.

In some embodiments, the information indicates that the particular shopper does not have a history of ambiguous product interaction events. By way of another example, a customer profile associated with a shopper (e.g., 1202) may include information regarding prior ambiguous product interaction events. Processing device 202 may determine whether a total number of prior ambiguous product interaction events in a customer profile for shopper 1202 is greater than or equal to a predetermined threshold number of ambiguous product interaction events. Processing device 202 may determine that shopper 1202 is eligible for frictionless checkout when the number of ambiguous product interaction events in the customer profile associated with shopper 1202 is less than the predetermined threshold number of ambiguous product interaction events.

In some embodiments, the information may indicate that the particular shopper is not associated with prior fraudulent transactions. By way of another example, a customer profile may include information regarding prior purchases of one or more products from a retail store (e.g., 105A, 105B, 105C, etc.) or returns of one or more products to the retail store. The customer profile may also include information or an indication whether one or more of the prior purchases or returns included fraudulent transactions (e.g., payments using a fake or stolen credit card account, returning a product different from that sold by the retail store, purchasing one or more products without paying for the products, etc.) Processing device 202 may determine that shopper (e.g., 1202) is ineligible for frictionless checkout when the customer profile associated with shopper 1202 indicates that shopper 1202 previously engaged in one or more fraudulent transactions.

In some embodiments, the information may indicate that the particular shopper is a valuable customer. By way of another example, a customer profile may include information indicating that a shopper (e.g., 1202) is a valuable customer. As used in this disclosure, a shopper may be determined to be a valuable customer based on the shopper's prior purchase history. For example, shopper 1202 may be determined to be a valuable shopper when an amount of money spent by shopper 1202 at a particular retail location (e.g., 105B) is greater than or equal to a threshold amount of money, or when the number of products purchased by shopper 1202 at retail location 105B is greater than or equal to a threshold number of products. In some embodiments, shopper 1202 may be determined to be a valuable shopper based on a frequency with shopper 1202 makes purchases at retail store 105B. In other embodiments, shopper 1202 may be determined to be a valuable shopper, for example, when shopper 1202 frequently purchases high-value items. It is also contemplated that shopper 1202 may be determined to be a valuable shopper based on a combination of one or more of the above-identified factors. It is to be understood that the disclosed criteria for defining a valuable shopper are exemplary and non-limiting and that many other criteria may be used to define a valuable shopper.

Figure 13A:
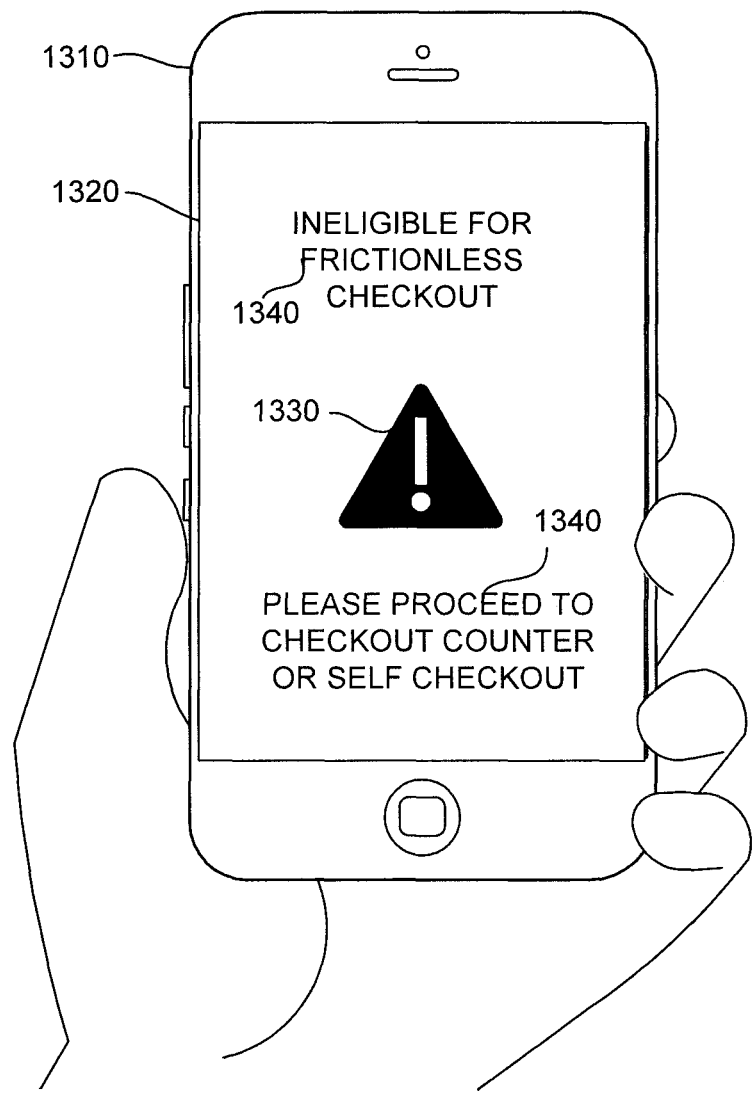
FIG. 13A illustrates an example of a device displaying an indicator, consistent with the present disclosure.

In some embodiments, the method may include causing delivery of an indicator that the at least one shopper is ineligible for frictionless checkout in response to a determination that the at least one shopper is ineligible for frictionless checkout. For example, processing device 202 may generate an indicator, indicating whether a shopper is eligible or ineligible for frictionless checkout. The indicator may be in the form of a numerical value, a textual message, and/or a symbol or image. Processing device 202 may also be configured to adjust a color, or font, and/or other display characteristics of the indicator. Processing device 202 may be configured to transmit the indicator to a device associated with the retailer and/or with the shopper. In some embodiments, causing the delivery of the indicator that the at least one shopper is ineligible for frictionless checkout includes sending a notification to a wearable device associated with the at least one shopper. For example, processing device 202 may be configured to transmit the indicator to a wearable device (e.g., a smartwatch, a smart glass, etc.) associated with the shopper. The indicator received from processing device 202 may be displayed on a display associated with the wearable device. In some embodiments, causing the delivery of the indicator that the at least one shopper is ineligible for frictionless checkout includes sending a notification to a mobile device associated with the at least one shopper. It is contemplated that additionally or alternatively, processing device 202 may transmit the indicator to one or more mobile devices (e.g., a smart form, a tablet computer, a laptop computer, etc.) associated with the shopper. FIG. 13A illustrates an exemplary smartphone 1310 having a display 1320. As illustrated in FIG. 13A, an exemplary indicator including symbol 1330 and text 1340 (e.g., INELIGIBLE FOR FRICTIONLESS CHECKOUT and/or PLEASE PROCEED TO CHECKOUT COUNTER OR SELF CHECKOUT) may be displayed on display 1320. It is also contemplated that when a shopper (e.g., 1202, 1204, etc.) is determined to be eligible for frictionless checkout, processing device 202 may cause the one or more indicator devices or display devices discussed above to display an indicator, indicating that the shopper (e.g., 1202, 1204, etc.) is eligible for frictionless checkout. For example, in this case, symbol 1330 may be replaced by a check mark and text 1340 may instead display "ELIGIBLE FOR FRICTIONLESS CHECKOUT" and/or "YOU MAY EXIT THE STORE WHENEVER YOU ARE READY." It is to be understood that the symbols and text discussed above are exemplary and non-limiting and the indicator may additionally or alternatively include other symbols, text, and/or graphical elements.

Figure 13B:
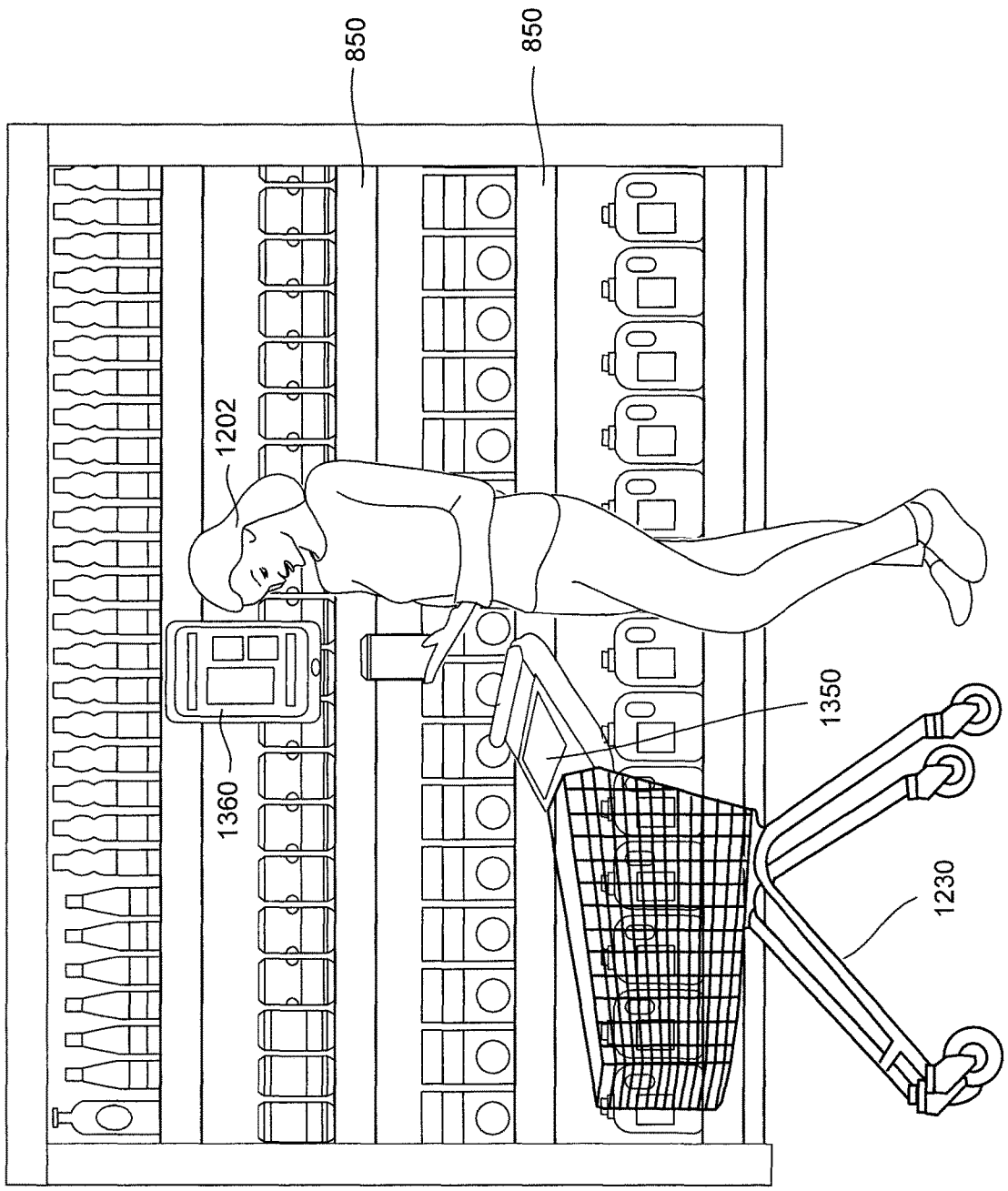
FIG. 13B illustrates additional examples of devices capable of displaying an indicator, consistent with the present disclosure.

In some embodiments, causing the delivery of the indicator that the at least one shopper is ineligible for frictionless checkout includes causing a notification to be generated by a shopping cart associated with the at least one shopper. It is also contemplated that in some embodiments a shopping cart (e.g., 1230) being used by a shopper (e.g., 1202) may be equipped with an indicator or display device, and display device on the shopping cart may be configured to display an indicator, indicating whether the shopper is eligible or ineligible for frictionless checkout. For example, FIG. 13B illustrates shopper 1202 adjacent shelves 850. As illustrated in FIG. 13B, shopping cart 1220 of shopper 1202 may include indicator or display device 1350. Processing device 202 may be configured to transmit an indicator (e.g., 1330, 1340, etc.) to display device 1350 on the shopping cart 1220. Processing device 202 may also be configured to transmit instructions to display device 1350 on the shopping cart 1220 to display the indicator (e.g., 1330, 1340, etc.). In some embodiments, processing device 202 may additionally or alternatively be configured to transmit an indicator (e.g., 1330, 1340, etc.) to display device 1360 that may be affixed to one or more shelves 850. Processing device 202 may also be configured to transmit instructions to display device 1360 on affixed to one or more shelves 850 to display the indicator (e.g., 1330, 1340, etc.).

In some embodiments, causing a delivery of the indicator that the at least one shopper is ineligible for frictionless checkout includes sending a notification to a computing device associated with a store associate of the retail store. It is further contemplated that additionally or alternatively, processing device 202 may be configured to transmit the indicator (e.g., 1330, 1340, etc.), indicating whether a shopper (e.g., 1202, 1204, etc.) is eligible for frictionless checkout, to a device associated with the retailer. For example, processing device 202 may transmit the indicator (e.g., 1330, 1340, etc.) to one or more of a mobile phone, a tablet computer, a laptop computer, a desktop computer, a smartwatch, etc., associated with a store associate or other employee of the retailer.

In some embodiments, the delivery of the indicator that the at least one shopper is ineligible for frictionless checkout occurs after the at least one shopper enters a checkout area of the retail store. Processing device 202 may transmit the indicator (e.g., 1330, 1340, etc.), indicating whether a shopper (e.g., 1202, 1204) is ineligible for frictionless checkout at any time after determining that the shopper is ineligible for frictionless checkout. For example, processing device 202 may transmit the indicator during the time the shopper (e.g., 1202, 1204) travels around a retail store (e.g., 105A, 105B, 105C), and/or when the shopper (e.g., 1202, 1204) approaches a checkout counter (e.g., 1252) associated with the retail store (e.g., 105A, 105B, 105C).

Figure 14:
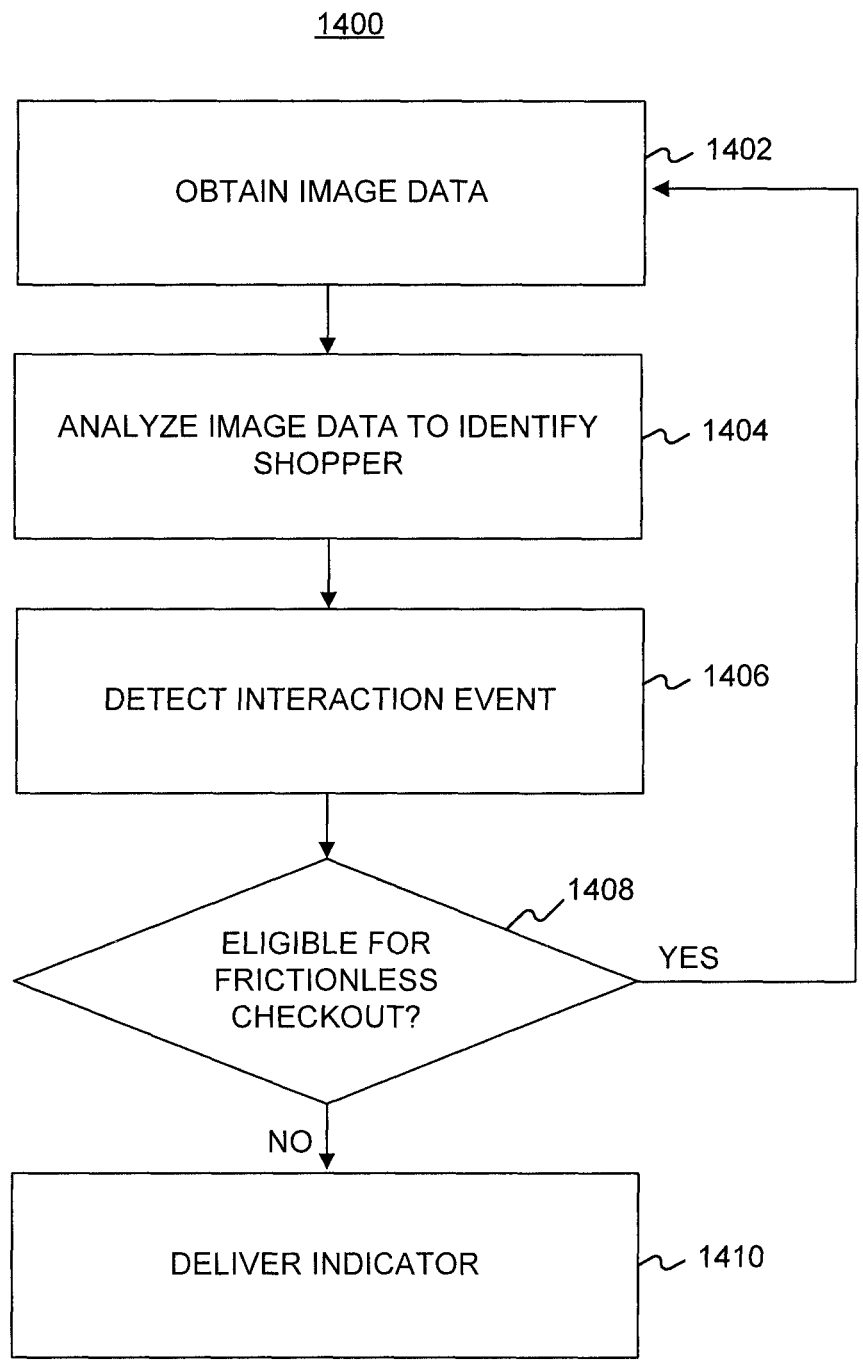
FIG. 14 illustrates an exemplary method for determining whether shoppers are eligible for frictionless checkout, consistent with the present disclosure.

FIG. 14 is a flowchart showing an exemplary process 1400 for determining whether shoppers are eligible for frictionless checkout. Process 1400 may be performed by one or more processing devices associated with apparatus server 135, such as processing device 202.

In step 1402, process 1400 may include obtaining image data captured using one or more image sensors positioned in a retail store. For example, as discussed above, a retail store (e.g., 105A, 105B, 105C, etc., see FIG. 1) may include one or more capturing devices 125 configured to capture one or more images. One or more of capturing devices 125 may include one or more image sensors 310 that may be configured to capture images of one or more persons (e.g., shoppers, store associates, etc.), one or more shelves 350, one or more items 803A, 803B, 853A, etc. on shelves 350, and/or other objects (e.g., shopping carts, checkout counters, walls, columns, poles, aisles, pathways between aisles), etc. The images may be in the form of image data, which may include, for example, pixel data streams, digital images, digital video streams, data derived from captured images, etc.

In step 1404, process 1400 may include analyzing the image data to identify at least one shopper at one or more locations of the retail store. For example, processing device 202 may analyze the image data obtained by the one or more image sensors 310 to identify one or more persons or objects in the image data. It is contemplated that processing device 202 may use any suitable image analysis technique, for example, including one or more of object recognition, object detection, image segmentation, feature extraction, optical character recognition (OCR), object-based image analysis, shape region techniques, edge detection techniques, pixel-based detection, artificial neural networks, convolutional neural networks, etc., to identify one or more persons or objects in the image data. It is further contemplated that processing device 202 may access one or more databases 140 to retrieve one or more reference images of likenesses of one or more persons. Further, processing device 202 may use one or more of the image analysis techniques discussed above to compare the images retrieved from database 140 with the image data received from the one or more image sensors 310 to recognize the likeness of one or more shoppers in the image data. It is also contemplated that processing device 202 may retrieve other identifying information (e.g., name, customers ID, account number, telephone number, etc.) associated with the images retrieved from database 140 based on, for example, profiles of the one or more shoppers stored in database 140. In some embodiments, processing device 202 may also be configured to employ machine learning algorithms or artificial neural networks to recognize and identify one or more shoppers in the image data obtained by image sensors 310.

In step 1406, process 1400 may include detecting, based on the analysis of the image data, at least one product interaction event associated with an action of the at least one shopper at the one or more locations of the retail store. For example, as a shopper passes through the retail store, a shopper may interact with one or more products located in the store by performing one or more actions. For example, as illustrated in FIG. 12A, shopper 1202 may be standing near shelf 850 that may be carrying products 1210, 1212, 1214, etc. Shopper 1202 may have shopping cart 1220. As illustrated in FIG. 12A, shopper 1202 may interact with the one or more products 1210, 1212, 1214, etc., by picking up product 1210 and removing product 1210 from shelf 850. Additionally or alternatively, shopper 1202 may interact with the one or more products (e.g., 1210, 1212, 1214, etc.) by inspect the product, positioning the product in various orientations, returning the product to shelf 850, placing the product in shopping cart 1220, removing the product from shopping cart 1220, and/or moving the product from one location to another. Some other examples are described below, for example in relation to FIGS. 24-26.

In step 1408, process 1400 may include determining whether the at least one shopper is eligible for frictionless checkout based on the detected at least one product interaction event. As discussed above, processing device 202 may determine whether shopper (e.g., 1202, 1204, etc.) is eligible for frictionless checkout based on a detected product interaction event. As also discussed in detail above, processing device may employ one or more of many different criteria to determine whether a shopper (e.g., 1202, 1204, etc.) is ineligible for frictionless checkout. When processing device 202 determines that a shopper (e.g., 1202, 1204, etc.) is eligible for frictionless checkout (Step 1408: Yes), process 1400 may return to step 1402. When processing device 202 determines, however, that a shopper (e.g., 1202, 1204, etc.) is not eligible for frictionless checkout (Step 1408: No), process 1400 may proceed to step 1410. Some other examples are described below, for example in relation to FIGS. 24-26.

In step 1410, process 1400 may include causing delivery of an indicator that the at least one shopper is ineligible for frictionless checkout. For example, processing device 202 may generate an indicator, indicating whether a shopper is eligible or ineligible for frictionless checkout. The indicator may be in the form of a numerical value, a textual message, and/or a symbol or image. Processing device 202 may also be configured to adjust a color, or font, and/or other display characteristics of the indicator. Processing device 202 may be configured to transmit the indicator to a device associated with the retailer and/or with the shopper. For example, processing device 202 may be configured to transmit the indicator to a wearable device (e.g., a smartwatch, a smart glass, etc.) associated with the shopper. The indicator received from processing device 202 may be displayed on a display associated with the wearable device. It is contemplated that additionally or alternatively, processing device 202 may transmit the indicator to one or more mobile devices (e.g., a smart form, a tablet computer, a laptop computer, etc.) associated with the shopper. FIG. 13A illustrates an exemplary smartphone 1310 having a display 1320. It is also contemplated that in some embodiments a shopping cart (e.g., 1230) being used by a shopper (e.g., 1202) may be equipped with an indicator or display device, and display device on the shopping cart may be configured to display an indicator, indicating whether the shopper is eligible or ineligible for frictionless checkout.

Traditionally, customers of brick-and-mortar retail stores collect the products they wish to purchase, and then wait in a shopping line to pay at a checkout counter. The checkout counter may be a self-checkout point-of-sale system or serviced by a store associate of the store who scans all of the items before the items are paid for by the customers. Nowadays, retail stores seek ways to provide a frictionless checkout experience to improve customer service. Frictionless shopping eases and speeds up the buying process, because the products that customers collect are automatically identified and assigned to a virtual shopping cart associated with the appropriate customer. This way, customers may skip spending time in a shopping line and simply leave the retail store with the products they collected.

Enabling frictionless checkout may look easy, but actually it may require an exceptionally complex process that takes into consideration different scenarios. For example, depending on detected conditions or other circumstances, a particular retail shelf may be eligible for frictionless checkout or ineligible for frictionless checkout. The present system provides a visual indicator that may be automatically updated to indicate a current status of a retail shelf or portion of a retail shelf. The visual indicator may inform shoppers whether items on a shelf or a portion of a shelf are eligible for frictionless checkout. With this information, customers may choose to avoid products not eligible for frictionless checkout or may choose such products with advance knowledge that traditional checkout will be required. Additionally, this information may enable store associates to attend to shelves not eligible for frictionless checkout and to rectify conditions preventing frictionless checkout eligibility.

As noted generally above, a retail environment may provide a frictionless checkout experience. As used herein, a frictionless checkout refers to any checkout process for a retail environment with at least one aspect intended to expedite, simplify, or otherwise improve an experience for customers. In some embodiments, a frictionless checkout may reduce or eliminate the need to take inventory of products being purchased by the customer at checkout. For example, this may include tracking the selection of products made by the shopper so that they are already identified at the time of checkout. The tracking of products may occur through the implementation of sensors used to track movement of the shopper and/or products within the retail environment, as described throughout the present disclosure. Additionally or alternatively, a frictionless checkout may include an expedited or simplified payment procedure. For example, if a retail store has access to payment information associated with a shopper, the payment information may be used automatically or upon selection and/or confirmation of the payment information by the user. In some embodiments, a frictionless checkout may involve some interaction between the user and a store associate or checkout device or terminal. In other embodiments, the frictionless checkout may not involve any interaction. For example, the shopper may walk out of the store with the selected products and a payment transaction may occur automatically. While the term "frictionless" is used for purposes of simplicity, it is to be understood that this encompasses semi frictionless checkouts as well. Accordingly, various types of checkout experiences may be considered "frictionless," and the present disclosure is not limited to any particular form or degree of frictionless checkout.

Figure 15A:
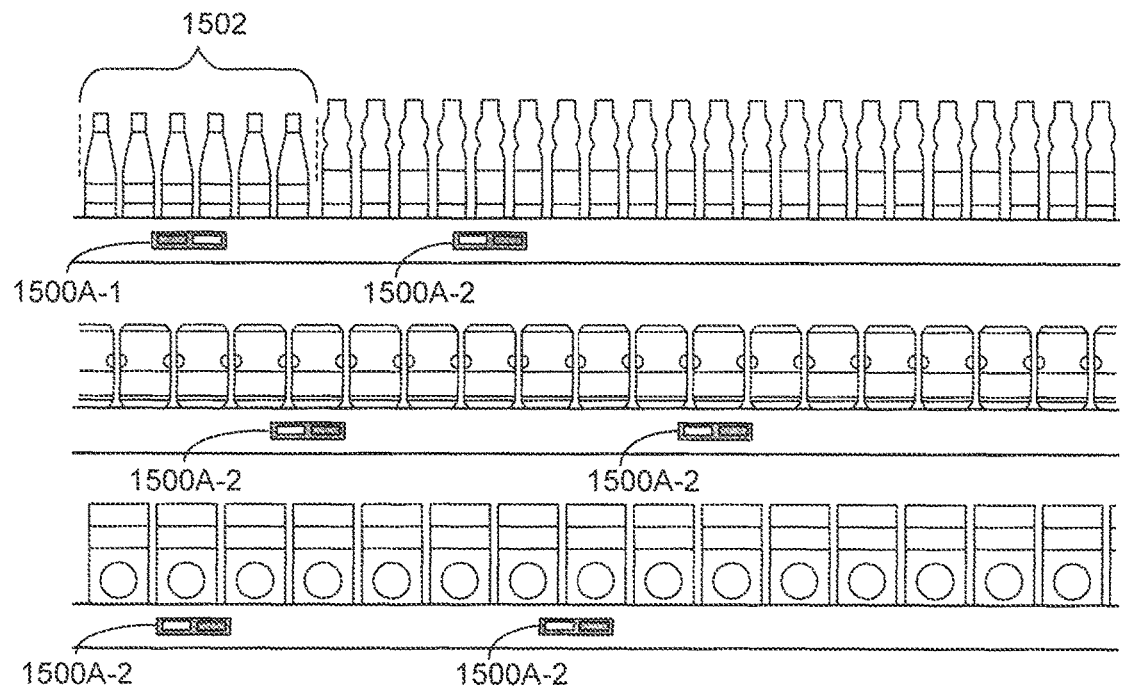
FIG. 15A is a schematic illustration of an example configuration for providing visual indicators indicating the frictionless checkout eligibility statuses of different portions of retail shelves, consistent with the present disclosure.
Figure 15B:
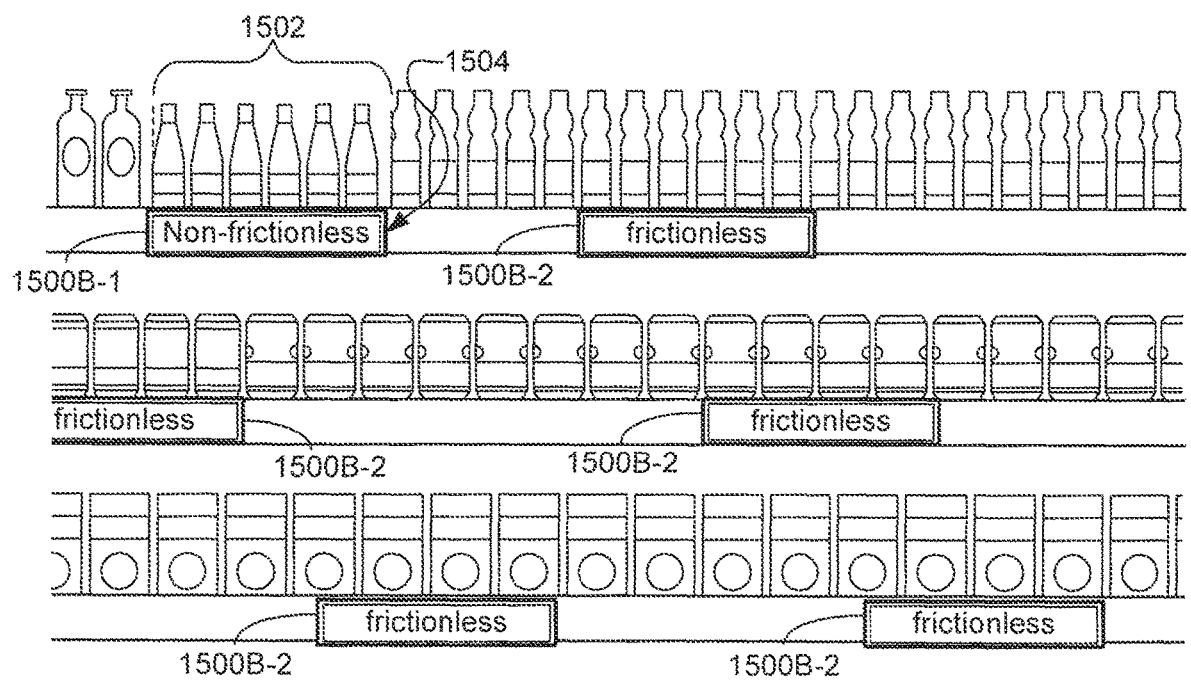
FIG. 15B is a schematic illustration of another example configuration for providing visual indicators indicating the frictionless checkout eligibility statuses of different portions of retail shelves, consistent with the present disclosure.
Figure 15C:
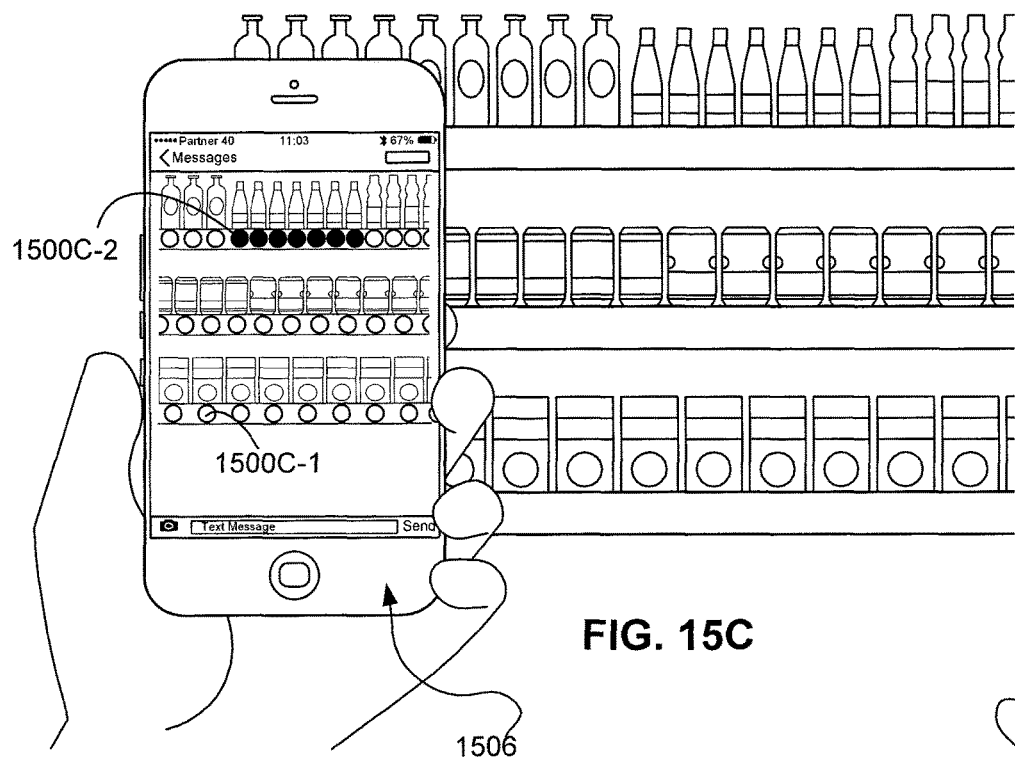
FIG. 15C is a schematic illustration of another example configuration for providing visual indicators indicating the frictionless checkout eligibility statuses of different portions of retail shelves, consistent with the present disclosure.
Figure 15D:
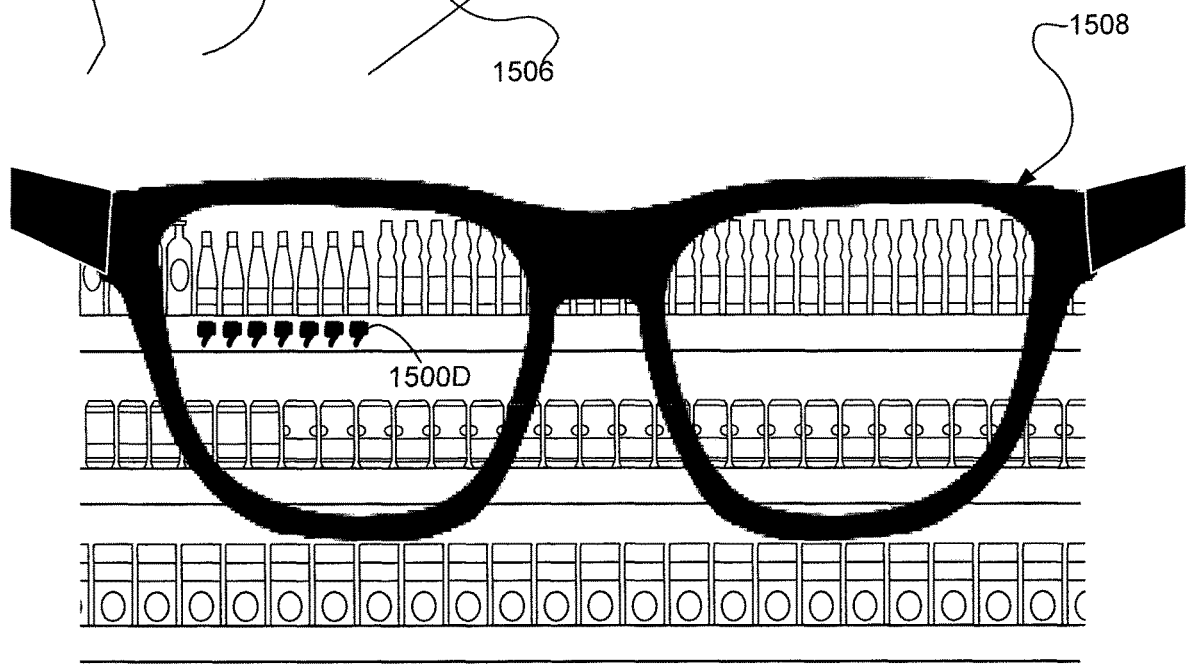
FIG. 15D is a schematic illustration of another example configuration for providing visual indicators indicating the frictionless checkout eligibility statuses of different portions of retail shelves, consistent with the present disclosure.

FIGS. 15A-15D illustrate example visual indicators 1500A-1500D (collectively referred to as visual indicators 1500) indicative of the frictionless checkout statuses of portions of retail shelves according to disclosed embodiments. FIGS. 15A and 15B illustrate examples of hardware solutions physically installed in retail store 105. Specifically, FIG. 15A illustrates how visual indicators may be displayed via light sources associated with different portions of a retail shelf, and FIG. 15B illustrates how visual indicators may be displayed via display units associated with different portions of a retail shelf. FIGS. 15C and 15D illustrate examples of software solutions that use a mobile communication device of an individual in retail store 105. Specifically, FIG. 15C illustrates how visual indicators may be displayed via a mobile device associated with an individual in retail store 105, and FIG. 15D illustrates how visual indicators may be displayed via an Augmented Reality (AR) system associated with an individual in the retail store.

With reference to FIG. 15A and consistent with the present disclosure, visual indicator 1500A is displayed via one or more light sources associated with at least a portion of a retail shelf (e.g., store shelf 510). The one or more light sources may be part of the shelf or part of a device attachable to the shelf. In the illustrated example, visual indicator 1500A-1 indicates that the products 1502 are ineligible for frictionless checkout, and visual indicators 1500A-2 indicate that the rest of the products are eligible for frictionless checkout. In one embodiment, visual indicator 1500 may include a color associated with the one or more light sources. For example, a green light may indicate that products associated with the at least a portion of a retail shelf may be eligible for frictionless checkout; and a red light may indicate that products associated with the at least a portion of a retail shelf may be ineligible for frictionless checkout.

With reference to FIG. 15B and consistent with the present disclosure, visual indicators 1500B are displayed via display units 1504 associated with different portions of a retail shelf. The display units 1504 may be part of the shelf or may be attachable to the shelf. In the illustrated example, visual indicator 1500B-1 indicates that the products 1502 are ineligible for frictionless checkout, and visual indicators 1500B-2 indicate that the rest of the products are eligible for frictionless checkout. In one embodiment, visual indicator 1500 may include text shown on the display. For example, the text "frictionless" may indicate that products associated with the at least a portion of a retail shelf may be eligible for frictionless checkout; and the text "non-frictionless" may indicate that products associated with the at least a portion of a retail shelf may be ineligible for frictionless checkout.

With reference to FIG. 15C and consistent with the present disclosure, visual indicators 1500C are displayed via a mobile device 1506 associated with an individual in the retail store. Mobile device 1506 may be associated with a shopper in the retail store or a store associate of the retail store. Consistent with the present disclosure, mobile device 1506 may include a handheld device (e.g., a smartphone, a tablet, a mobile station, a personal digital assistant, a laptop, and more) or a wearable device (e.g., smart glasses, a smartwatch, a clip-on camera). In the illustrated example, each of the visual indicators displayed by mobile device 1506 is tied to a specific product, and there are two types of indicators: 1500C-1, indicating that an associated product is eligible for frictionless checkout; and 1500C-2, indicating that an associated product is ineligible for frictionless checkout.

With reference to FIG. 15D and consistent with the present disclosure, visual indicators 1500D are displayed via an extended reality (XR) system 1508 associated an individual in the retail store. XR system 1508 may be associated with a shopper in the retail store or a store associate of the retail store. Consistent with the present disclosure, XR system 1508 may include a Virtual Reality (VR) device, an Augmented Reality (AR) device, a Mixed Reality (MR) device, smart glasses, mobile devices, mobile phones, smartphones, and so forth. Some non-limiting examples of XR system 1508 may include Nreal Light, Magic Leap One, Varjo, Quest 1, Quest 2, Vive, and so forth. In the illustrated example, each of the visual indicators displayed by XR system 1508 is tied to a specific product, and there is only one type of indicators 1500D that indicates that an associated product is ineligible for frictionless checkout. In this case, the absence of the automatically generated visual indicator 1500 indicates that the other products are eligible for frictionless checkout.

Figure 16:
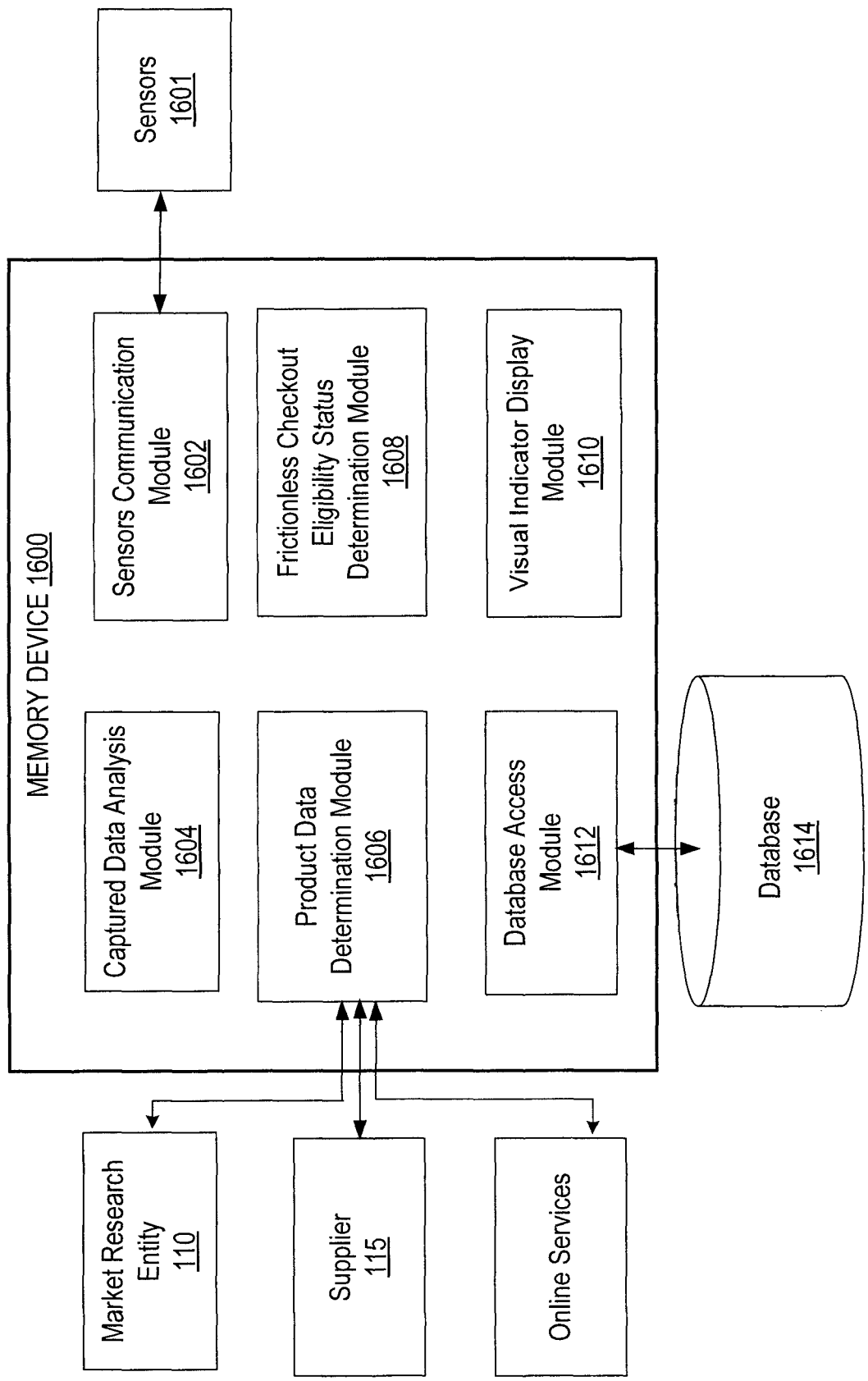
FIG. 16 is a block diagram illustrating an exemplary embodiment of a memory device containing software modules for executing methods consistent with the present disclosure.

FIG. 16 illustrates an exemplary embodiment of a memory device 1600 containing software modules consistent with the present disclosure. In particular, as shown, memory device 1600 may include a sensors communication module 1602, a captured data analysis module 1604, a product data determination module 1606, a frictionless checkout eligibility status determination module 1608, a visual indicator display module 1610, a database access module 1612, and a database 1614. Modules 1602, 1604, 1606, 1608, 1610, and 1612 may contain software instructions for execution by at least one processor (e.g., processing device 202) associated with system 100. Sensors communication module 1602, captured data analysis module 1604, product data determination module 1606, frictionless checkout eligibility status determination module 1608, visual indicator display module 1610, database access module 1612, and database 1614 may cooperate to perform various operations. For example, sensors communication module 1602 may receive an data from one or more sensors in retail store 105, captured data analysis module 1604 may use the received data to determine information about a displayed inventory of products on shelves of retail store 105, product data determination module 1606 may obtain product data about the type of products on the retail shelves, frictionless checkout eligibility status determination module 1608 may use information about the displayed inventory of a plurality of products and/or the product data to determine a frictionless checkout eligibility status associated with at least a portion of a retail shelf, and visual indicator display module 1610 may cause a display of a visual indicator indicative of the frictionless checkout eligibility status.

According to disclosed embodiments, memory device 1600 may be part of system 100, for example, memory device 226. Alternatively, memory device 1600 may be stored in an external database or an external storage communicatively coupled with server 135, such as one or more databases or memories accessible over communication network 150. Further, in other embodiments, the components of memory device 1600 may be distributed in more than one server and more than one memory device.

In some embodiments, sensors communication module 1602 may receive information from sensors 1601, located in retail store 105. In one example, sensors communication module 1602 may receive image data (e.g., images or video) captured by a plurality of image sensors fixedly mounted in retail store 105 or derived from images captured by a plurality of image sensors fixedly mounted in retail store 105. In another example, sensors communication module 1602 may receive image data (e.g., images or data derived from images) from robotic capturing devices configured to navigate autonomously within retail store 105 and to capture images of multiple types of products. In yet another example, sensors communication module 1602 may receive data from one or more shelf sensors disposed on a surface of the at least a portion of the retail shelf configured to hold one or more products placed on the at least a portion of the retail shelf. The one or more shelf sensors may include pressure sensitive pads, touch-sensitive sensors, light detectors, weight sensors, light sensors, resistive sensors, ultrasonic sensors, and more.

In some embodiments, captured data analysis module 1604 may process the information collected by sensors communication module 1602 to determine information about the displayed inventory of products on the shelves of retail store 105. In one embodiment, captured data analysis module 1604 may determine the information about the displayed inventory of products on shelves of retail store 105 solely based on image data, for example, image data received from a plurality of image sensors fixedly mounted in retail store 105 (e.g., as illustrated in FIG. 4A). In another embodiment, captured data analysis module 1604 may determine the information about the displayed inventory of products on the shelves of retail store 105 using a combination of image data and data from one or more retail store sensors configured to measure properties of products placed on a store shelf (e.g., as illustrated in FIG. 8A). For example, captured data analysis module 1604 may analyze the data received from detection elements attached to store shelves, alone or in combination with images captured in retail store 105 (e.g., using robotic capturing devices).

In some embodiments, product data determination module 1606 may determine product data about the products placed on the shelves of retail store 105. The product data may be determined using information collected from one or more of entities in the supply chain and other data sources, for example, Enterprise Resource Planning (ERP), Warehouse Management Software (WMS), and Supply Chain Management (SCM) applications. In addition, product data determination module 1606 may determine the product data using analytics of data associated with past delivery and sales of the products. Consistent with the present disclosure, the product data may be used to determine time periods of eligibility and time periods of ineligibility for different types of products.

In one embodiment, the product data may be determined based on demand data for products placed on shelves of retail store 105. The demand data may be obtained using forecasting algorithms, including statistical algorithms such as Fourier and multiple linear regression algorithms. The forecasting algorithms may use a variety of factors relating to different perishable products, and various types of demand history data (e.g., shipments data, point-of-sale data, customer order data, return data, marketing data, and more). Generally, demand history data may be broken into two types: base and non-base. Base history data includes predictable demand data that may be repeatable. Conversely, non-base history data is that part of demand that is due to special events, such as promotions or extreme market circumstances. In another embodiment, the product data may be determined based on scheduling data received from one or more of entities in the supply chain. For example, the scheduling data may be obtained from online services (e.g., from a server that store data on shipments orders), from supplier 115 associated with the products (e.g., from a farmer that produced the products), from a market research entity 110 (e.g., statistics about demand for certain products), from a shipment company that delivers the products (e.g., from an TOT sensor in a cargo ship), or from a distribution company that delivers the products (e.g., from an agent who supplies the products to retail stores).

Frictionless checkout eligibility status determination module 1608 may determine the frictionless checkout eligibility status associated with at least a portion of a retail shelf and/or the frictionless checkout eligibility status associated with specific products placed on the retail shelf. In a first embodiment, frictionless checkout eligibility status determination module 1608 may determine the frictionless checkout eligibility status using solely information from sensors communication module 1602. In a second embodiment, frictionless checkout eligibility status determination module 1608 may determine the frictionless checkout eligibility status using information from sensors communication module 1602 and information from product data determination module 1606. Consistent with the present disclosure, frictionless checkout eligibility status determination module 1608 may use artificial neural networks, convolutional neural networks, machine learning models, image regression models, and other processing techniques to determine the frictionless checkout eligibility status. For example, captured data analysis module 1604 may calculate a convolution of at least part of the image data. In response to a first value of the calculated convolution, frictionless checkout eligibility status determination module 1608 may determine a first frictionless checkout eligibility status associated with the at least a portion of the retail shelf; and in response to a second value of the calculated convolution, frictionless checkout eligibility status determination module 1608 may determine a second frictionless checkout eligibility status associated with the at least a portion of the retail shelf, the second frictionless checkout eligibility status may be differ from the first frictionless checkout eligibility status.

Consistent with an embodiment, frictionless checkout eligibility status determination module 1608 may determine the frictionless checkout eligibility status based on an arrangement of products placed on the at least a portion of the retail shelf as reflected in the output received from sensors 1601. The arrangement of products placed on the at least a portion of the retail shelf may include the number of products, their placement pattern, etc. In one example, the at least a portion of the retail shelf may correspond to a first product type, and in response to a product of a second product type being placed on the at least a portion of the retail shelf, frictionless checkout eligibility status determination module 1608 may determine that the frictionless checkout eligibility status for products associated with the at least a portion of the retail shelf is ineligible.

Frictionless checkout eligibility status determination module 1608 may determine the frictionless checkout eligibility status further based on product data associated with the type of products placed on the at least a portion of the retail shelf. For example, some products may be on sale, and to increase sales, frictionless checkout eligibility status determination module 1608 may determine that they are eligible for frictionless checkout even when certain conditions do not exist. In one embodiment, a threshold determined based on the product data may be used to determine the frictionless checkout eligibility status associated with the at least a portion of the retail shelf. For example, the threshold may be determined based on the type of products, based on a physical dimension of products of the product type, based on a price associated with the product type, based on a risk for thefts associated with the product type, and so forth.

In some embodiments, visual indicator display module 1610 may cause a display of an automatically generated visual indicator based on the output of frictionless checkout eligibility status determination module 1608. The visual indicator is indicative of the frictionless checkout eligibility status associated with the at least a portion of the retail shelf. Examples of visual indicators generated by visual indicator display module 1610 are illustrated in FIGS. 15A-D and described in detail above. In one embodiment, the display of the automatically generated visual indicator indicates that the at least a portion of the retail shelf is not eligible for frictionless checkout, and an absence of the automatically generated visual indicator indicates that the at least a portion of the retail shelf is eligible for frictionless checkout.

In some embodiments, database access module 1612 may cooperate with database 1614 to retrieve stored product data. The retrieved product data may include, for example, sales data, theft data (e.g., a likelihood that a certain product may be subject to shoplifting), a schedule of arrivals of additional products, inventory records, checkout data, calendar data, historical product turnover data, and more. As described above, frictionless checkout eligibility status determination module 1608 may use the product data stored in database 1614 to determine the frictionless checkout eligibility status. Database 1614 may include separate databases, including, for example, a vector database, raster database, tile database, viewport database, and/or a user input database, configured to store data. The data stored in database 1614 may be received from modules 1602-1612, server 135, from any communication device associated with retail stores 105, market research entity 110, suppliers 115, users 120, and more. Moreover, the data stored in database 1614 may be provided as input using data entry, data transfer, or data uploading.

Modules 1602-1612 may be implemented in software, hardware, firmware, a mix of any of those, or the like. For example, if the modules are implemented in software, the modules may be stored in a server (e.g., server 135) or distributed over a plurality of servers. In some embodiments, any one or more of modules 1602-1612 and data associated with database 1614 may be stored in database 140 and/or located on server 135, which may include one or more processing devices. Processing devices of server 135 may be configured to execute the instructions of modules 1602-1612. In some embodiments, aspects of modules 1602-1612 may include software, hardware, or firmware instructions (or a combination thereof) executable by one or more processors, alone, or in various combinations with each other. For example, modules 1602-1612 may be configured to interact with each other and/or other modules of server 135 to perform functions consistent with disclosed embodiments.

Figure 17A:
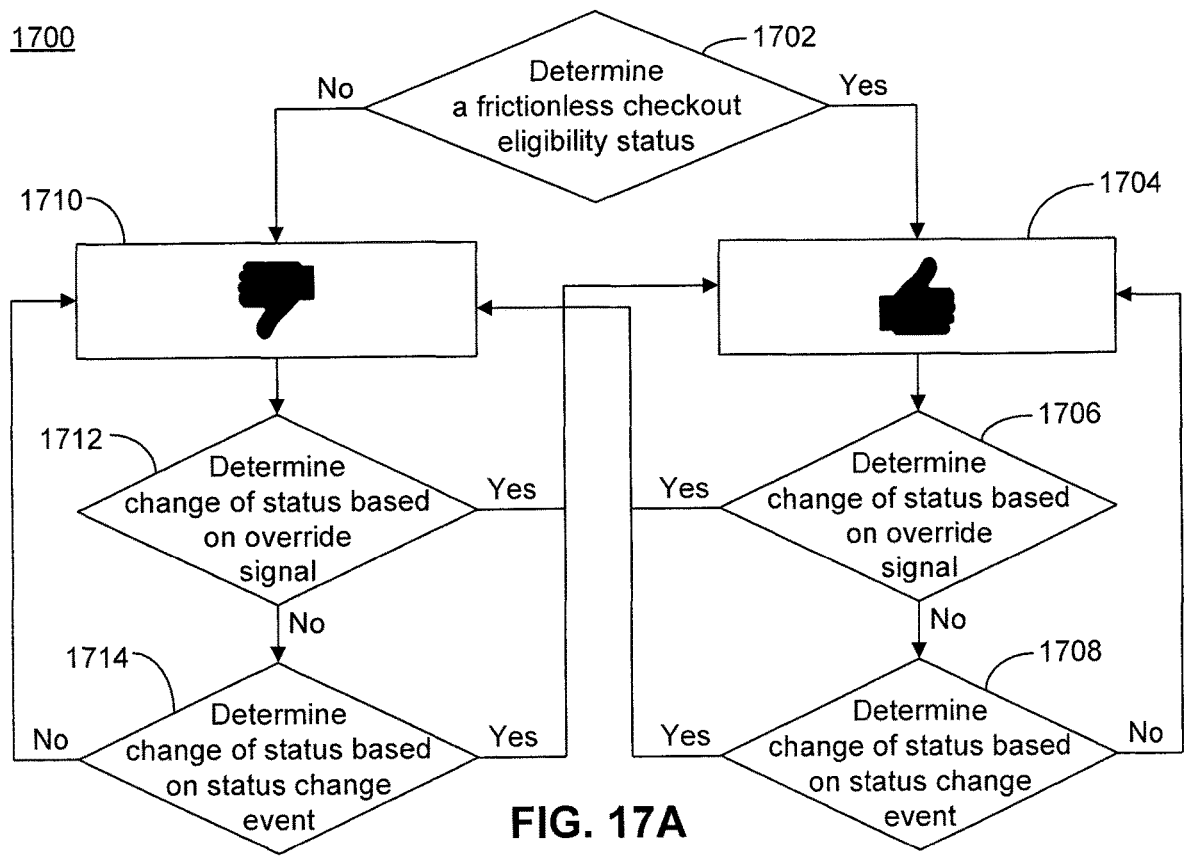
FIG. 17A is a flowchart of an exemplary process for updating a visual indicator indicating the frictionless checkout eligibility status of a retail shelf, consistent with the present disclosure.

FIG. 17A depicts a flowchart of an example process 1700 executed by a processing device of system 100 (e.g., processing device 202) for updating visual indicator indicating the frictionless checkout eligibility status. For purposes of illustration, in the following description, reference is made to certain components of system 100. It will be appreciated, however, that other implementations are possible and that other components may be used to implement example process 1700. It will also be readily appreciated that the example process 1700 may be altered to modify the order of steps, delete steps, or further include additional steps.

Process 1700 begins when the processing device determines a frictionless checkout eligibility status (decision block 1702). The frictionless checkout eligibility status may be determined for certain products, for certain product types, for a portion of a shelf, for a whole shelf, or for an area in retail store 105. As mentioned above, the frictionless checkout eligibility status may be determined based on sensor data, product data, or a combination thereof. When the frictionless checkout eligibility status is determined to be appropriate, the processing device may cause a display of visual indicator 1500 (block 1704). Thereafter, the processing device may determine if a change of the frictionless checkout eligibility status is needed based on an obtained override signal (decision block 1706). The override signal may be determined based on the product data or received from a store associate of retail store 105. For example, the manager of the retail store may wish to maintain a non-frictionless status for some products regardless of sensor outputs. In case no override signal was received, the processing device may determine if a change of the frictionless checkout eligibility status is needed based on detection of a status change event (decision block 1708). If a status change event was not detected, visual indicator 1500 of block 1704 may be maintained.

When either an override signal is obtained or a status change event is detected, the processing device may cause a display of visual indicator 1500 indicative of a non-frictionless status (block 1710). Thereafter, the processing device may determine if a change of the frictionless checkout eligibility status is needed, based on an obtained override signal (decision block 1712) or detection of a status change event (decision block 1714). Consistent with the present disclosure, a status change event may be detected based on output from the one or more retail store sensors (e.g., sensors 1601). For example, the status change event may include an identification of at least two shoppers standing in a vicinity of at least a portion of the retail shelf, or an identification of a shopper that placed a product on the at least a portion of the retail shelf, or a determination of an orientation of a shopper opposing the portion of the retail shelf, or a determination that the output from the one or more retail store sensors is not sufficient for determining that the at least a portion of the retail shelf is eligible for frictionless shopping.

The following scenario is an example of how process 1700 may be implemented in the retail store. Initially, a first shopper is standing next to a retail shelf holding canned fish. The retail shelf includes a device with at least one light source that displays visual indicator 1500A-2 indicating that the retail shelf is eligible for frictionless shopping. While the first shopper is considering which fish to buy, a second shopper comes and stands next to the first shopper. The coming of the second shopper may be considered as a status change event, because the system may not be able to determine which shopper picked a can of sardines and which shopper picked a can of mackerel, e.g., at a certainty level greater than a threshold. In accordance with decision block 1708, the processing device may cause the device to display visual indicator 1500A-1 to inform the first and second shoppers that picking canned fish at this time would require them to complete a traditional checkout. When one of the shoppers steps away from the retail shelf, the processing device causes the device to display again visual indicator 1500A-2, because the leaving of the shopper may also be considered as a status change event, as shown in step 1714.

Figure 17B:
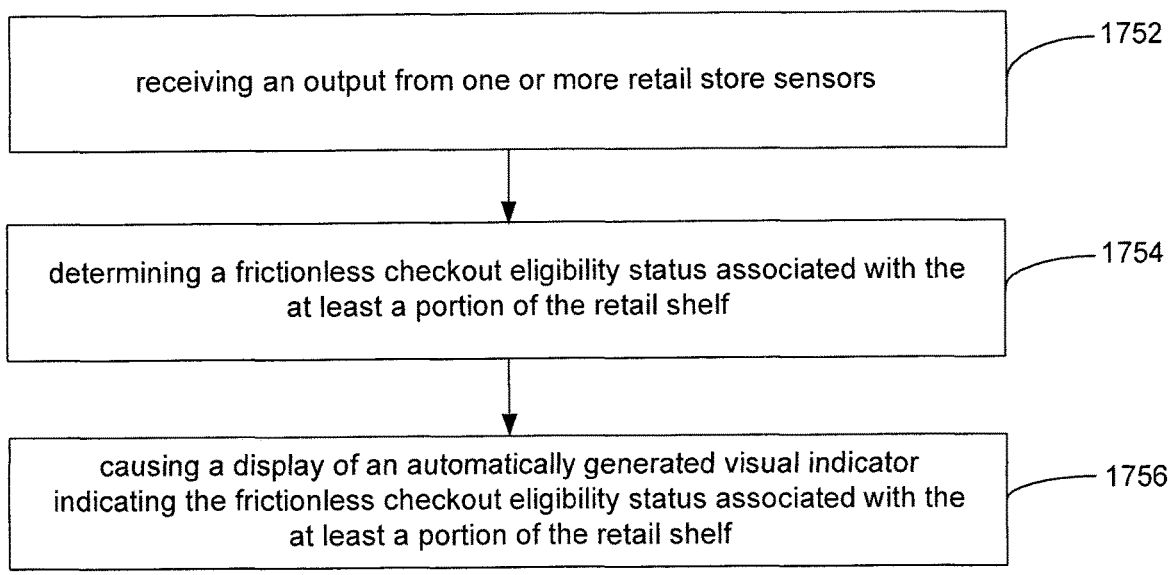
FIG. 17B is a flowchart of an exemplary method for providing a visual indicator indicative of a frictionless checkout status of at least a portion of a retail shelf consistent with the present disclosure.

FIG. 17B is a flowchart of an example process 1750 for providing a visual indicator indicative of a frictionless checkout status of at least a portion of a retail shelf executed by a processing device of system 100, according to embodiments of the present disclosure. The processing device of system 100 may include at least one processor within image processing unit (e.g., server 135) or any processor associated with retail store 105. For purposes of illustration, in the following description, reference is made to certain components of system 100. It will be appreciated, however, that other implementations are possible and that any combination of components or devices may be utilized to implement the exemplary method. It will also be readily appreciated that the illustrated method may be altered to modify the order of steps, delete steps, or further include additional steps, such as steps directed to optional embodiments.

In some embodiments, the processing device of system 100 may "receive an output from one or more retail store sensors. As discussed earlier, various types of sensors may be used to monitor inventory of products in retail store 105. By way of example only, at step 1752 in FIG. 17B, a processing device (e.g., processing device 202) may receive an output from one or more retail store sensors. In an embodiment, the one or more retail store sensors are disposed on a surface of the at least a portion of the retail shelf configured to hold one or more products placed on the at least a portion of the retail shelf. For example, the one or more retail store sensors may include at least one shelf sensor, such as a weight-sensitive sensor, a touch-sensitive sensor, a pressure-sensitive sensor, a light-sensitive sensor, or any combination thereof. In another embodiment, the one or more retail store sensors may include at least one image sensor configured to capture one or more images of the at least a portion of the retail shelf, and the output includes image data captured using the at least one image sensor. In yet another embodiment, the one or more retail store sensors includes at least one image sensor and at least one shelf sensor.

In some embodiments, the processing device of system 100 may determine a frictionless checkout eligibility status associated with the at least a portion of the retail shelf. The term "frictionless checkout eligibility status associated with the at least a portion of the retail shelf" is used to denote a reference value, a level, a point, or a range of values, for determining if a shopper that picked a product from the at least a portion of the retail shelf is entitled to frictionless checkout. In one example, the frictionless checkout eligibility status may be either of the terms "frictionless" or "non-frictionless," which are used to describe whether the at least a portion of the retail shelf includes one or more items eligible for frictionless checkout. Alternatively, the frictionless checkout eligibility status may include a value representing a frictionless checkout eligibility score, and the system may determine whether a shopper is entitled to frictionless checkout based on the overall scores of the product he or she picked. As discussed above, the determination of the frictionless checkout eligibility status may be based on the output from the one or more retail store sensors. Consistent with the present disclosure, a determination that a portion of the retail shelf is entitled to a frictionless checkout eligibility status occurs when all the items (e.g., products) placed on that portion of the retail shelf are entitled to a frictionless checkout eligibility status. Whereas a determination that a portion of the retail shelf is not entitled to a frictionless checkout eligibility status occurs when at least one the items placed on that portion of the retail shelf is not entitled to a frictionless checkout eligibility status. By way of example only, at step 1754 in FIG. 17B, the processing device may determine a frictionless checkout eligibility status associated with the at least a portion of the retail shelf.

In related embodiments, the processing device may calculate a convolution of at least part of the image data captured by the one or more retail store sensors. Thereafter, in response to a first value of the calculated convolution, the processing device may determine a first frictionless checkout eligibility status associated with the at least a portion of the retail shelf. In response to a second value of the calculated convolution, the processing device may determine a second frictionless checkout eligibility status associated with the at least a portion of the retail shelf. The second frictionless checkout eligibility status differs from the first frictionless checkout eligibility status. For example, the first frictionless checkout eligibility status may be "frictionless," and the second frictionless checkout eligibility status may be "non-frictionless." In additional embodiments, the processing device may determine the frictionless checkout eligibility status based on an arrangement of products placed on the at least a portion of the retail shelf. The arrangement of products detected may be based on the output received from the one or more sensors. In one example, the at least a portion of the retail shelf may correspond to a first product type, and in response to a product of a second product type being placed on the at least a portion of the retail shelf, the processing device may determine that the at least a portion of the retail shelf is ineligible to frictionless checkout.

In some embodiments, the processing device of system 100 may cause a display of an automatically generated visual indicator indicating the frictionless checkout eligibility status associated with the at least a portion of the retail shelf. In this disclosure, the term "associated with the at least a portion of the retail shelf" means that the visual indicator is displayed in proximity to the portion of the retail shelf. Consistent with the present disclosure, the processing device may cause a display of a first visual indicator indicative of a first frictionless checkout eligibility status associated with a first portion of a certain retail shelf and may cause a display of a second visual indicator indicative of a second frictionless checkout eligibility status associated with a second portion of the certain retail shelf. Alternatively, the processing device may cause a display of a visual indicator indicative of the first frictionless checkout eligibility status and an absence of the automatically generated visual indicator may indicates the second frictionless checkout eligibility status. By way of example only, at step 1756 in FIG. 17B, the processing device may cause a display of an automatically generated visual indicator indicating the frictionless checkout eligibility status associated with the at least a portion of the retail shelf. As illustrated in FIG. 15A, the visual indicator may be displayed via at least one light source associated with the at least a portion of the retail shelf. For example, the at least one light source may be part of the shelf or part of a device attachable to the shelf. Moreover, the visual indicator may include a color associated with the light source, e.g., green for frictionless and red for non-frictionless. As illustrated in FIG. 15B, the visual indicator may be displayed via a display unit associated with the at least a portion of the retail shelf, wherein the visual indicator includes text shown on the display. As illustrated in FIG. 15C, the visual indicator may be displayed via one or more mobile devices associated with a shopper in the retail store or associated with a store associate of the retail store. As illustrated in FIG. 15D, the visual indicator may be displayed via an augmented reality (AR) system associated with a shopper in the retail store or with a store associate of the retail store.

In some embodiments, the processing device of system 100 may determine a change in the frictionless checkout eligibility status associated with the at least a portion of the retail shelf based on a detected status change event indicated by the output from the one or more retail store sensors. In this disclosure, the term "status change event" refers to any combination of conditions that may potentially decrease a certainty level the system has in identifying a shopper-product interaction. As shown in FIG. 17A, upon detecting a status change event, the processing device may update the visual indicator to reflect the change in the frictionless checkout eligibility status. In one embodiment, the status change event may include an identification of at least two shoppers standing in a vicinity of the at least a portion of the retail shelf. In another embodiment, the status change event may include an identification of a shopper that placed a product on the at least a portion of the retail shelf. For example, the shopper may place a product on the shelf different from the other products on the shelf. In another embodiment, the status change event may include a determination of an orientation of a shopper opposing the at least a portion of the retail shelf. In another embodiment, the status change event may include a determination that the output from the one or more retail store sensors is not sufficient for determining whether the at least a portion of the retail shelf is eligible for frictionless shopping. For example, an image sensor may be blocked by some kind of an object, or one of the shelf sensors may be broken.

In some embodiments, the processing device of system 100 may obtain input related to a type of products placed on the at least a portion of the retail shelf; and determining the frictionless checkout eligibility status of the at least a portion of the retail shelf based on the obtained input. The input may be related to a type of products and may define time periods of eligibility and time periods of ineligibility. In some cases, the input may include the product data, as described above with reference to FIG. 16. In one example, the input related to a type of products may include an indication that the products associated with the portion of the shelf are on sale, so to increase sales, the processing device may determine it should be eligible for frictionless even when certain conditions do not exist. Specifically, a threshold may be used to determine the frictionless checkout eligibility status associated with the at least a portion of the retail shelf. In one example, the threshold may be selected based on the type of products, e.g., based on a physical dimension of products of the product type, based on a price associated with the product type, based on a risk for thefts associated with the product type, and so forth. In a related embodiment, the processing device may obtain a status override signal, and determine the frictionless checkout eligibility status of the at least a portion of the retail shelf based on the status override signal. For example, for some products, it may be desirable to maintain a frictionless eligibility status regardless of sensor outputs.

As described throughout the present disclosure, a retail environment may allow a frictionless (or semi-frictionless) shopping experience for users or customers. For example, this may include expediting or even eliminating a checkout process a customer must complete to make a purchase. In some embodiments, this may include automatically tracking products a customer has selected (e.g., by placing items in a cart or basket, etc.) and completing a transaction associated with the products without requiring the customer to present the items to a cashier, scan each item individually, present a payment method, or the like. Additional details regarding frictionless shopping experiences are provided throughout the present disclosure.

In order to provide a frictionless shopping experience for shoppers, it may be beneficial for a retailer to track or determine a shopper's eligibility for semi-frictionless shopping. Various conditions or events may cause a shopper to lose eligibility for frictionless checkout. For example, a shopper may be near one or more other shoppers when a certain product is selected, which may lead to ambiguity regarding which of the shoppers removed the product from the shelf. Such ambiguity may cause the shopper to lose eligibility for frictionless checkout, as the exact inventory of the shopper's cart, for example, may be unknown. In some embodiments, characteristics or information about a shopper may lead to ineligibility, such as a lack of frictionless payment information associated with the user being available.

In situations where a shopper's eligibility for frictionless checkout has been lost or has not yet been established, it may be beneficial for a retailer to restore eligibility for shoppers. In some embodiments, this restoration may occur automatically and without action by the shopper. The disclosed embodiments allow for various actions to be taken to automatically restore a shopper's eligibility for frictionless checkout. For example, the shopper may be requested to scan an item previously placed in a cart (e.g., using a barcode scanner) or position the contents of a cart or basket before a camera. A store associate may be dispatched to rectify a detected ambiguity, or an action taken by one shopper may rectify an ambiguity associated with another shopper (e.g., if two shoppers are involved in an ambiguous product selection event, the ambiguity may be resolved during checkout of one of the shoppers where the items selected by that shopper can be confirmed). Any of these actions or events may result in an eligibility for frictionless checkout to be returned to a shopper.

As noted generally above, a retail environment may provide a frictionless checkout experience. As used herein, a frictionless checkout refers to any checkout process for a retail environment with at least one aspect intended to expedite, simplify, or otherwise improve an experience for customers. In some embodiments, a frictionless checkout may reduce or eliminate the need to take inventory of products being purchased by the customer at checkout. For example, this may include tracking the selection of products made by the shopper so that they are already identified at the time of checkout. The tracking of products may occur through the implementation of sensors used to track movement of the shopper and/or products within the retail environment, as described throughout the present disclosure. Additionally or alternatively, a frictionless checkout may include an expedited or simplified payment procedure. For example, if a retail store has access to payment information associated with a shopper, the payment information may be used automatically or upon selection and/or confirmation of the payment information by the user. In some embodiments, a frictionless checkout may involve some interaction between the user and a store associate or checkout device or terminal. In other embodiments, the frictionless checkout may not involve any interaction. For example, the shopper may walk out of the store with the selected products and a payment transaction may occur automatically. While the term "frictionless" is used for purposes of simplicity, it is to be understood that this encompasses semi-frictionless checkouts as well. Accordingly, various types of checkout experiences may be considered "frictionless," and the present disclosure is not limited to any particular form or degree of frictionless checkout.

To participate in a frictionless checkout process, a shopper may be required to be designated as having frictionless checkout eligibility. Various ineligibility conditions may arise that cause a shopper to be designated as not eligible for frictionless checkout. An ineligibility condition may include any condition in which the disclosed system has insufficient information for completing a frictionless checkout. In some embodiments, an ineligibility condition may include some degree of uncertainty relative to a product selection by a shopper. For example, an ambiguous product interaction event may be detected, which may include any event resulting in uncertainty about whether one or more products have been selected by a particular shopper. An ambiguous product interaction event may include an event in which one or more sensors, such as capturing device 125 described above, is unable to fully or accurately capture enough information to determine whether a product has been selected by a shopper. For example, a shopper's interaction with a product may be fully or partially obscured from view of the sensor, leading to uncertainty as to whether the product was selected.

Figure 18:
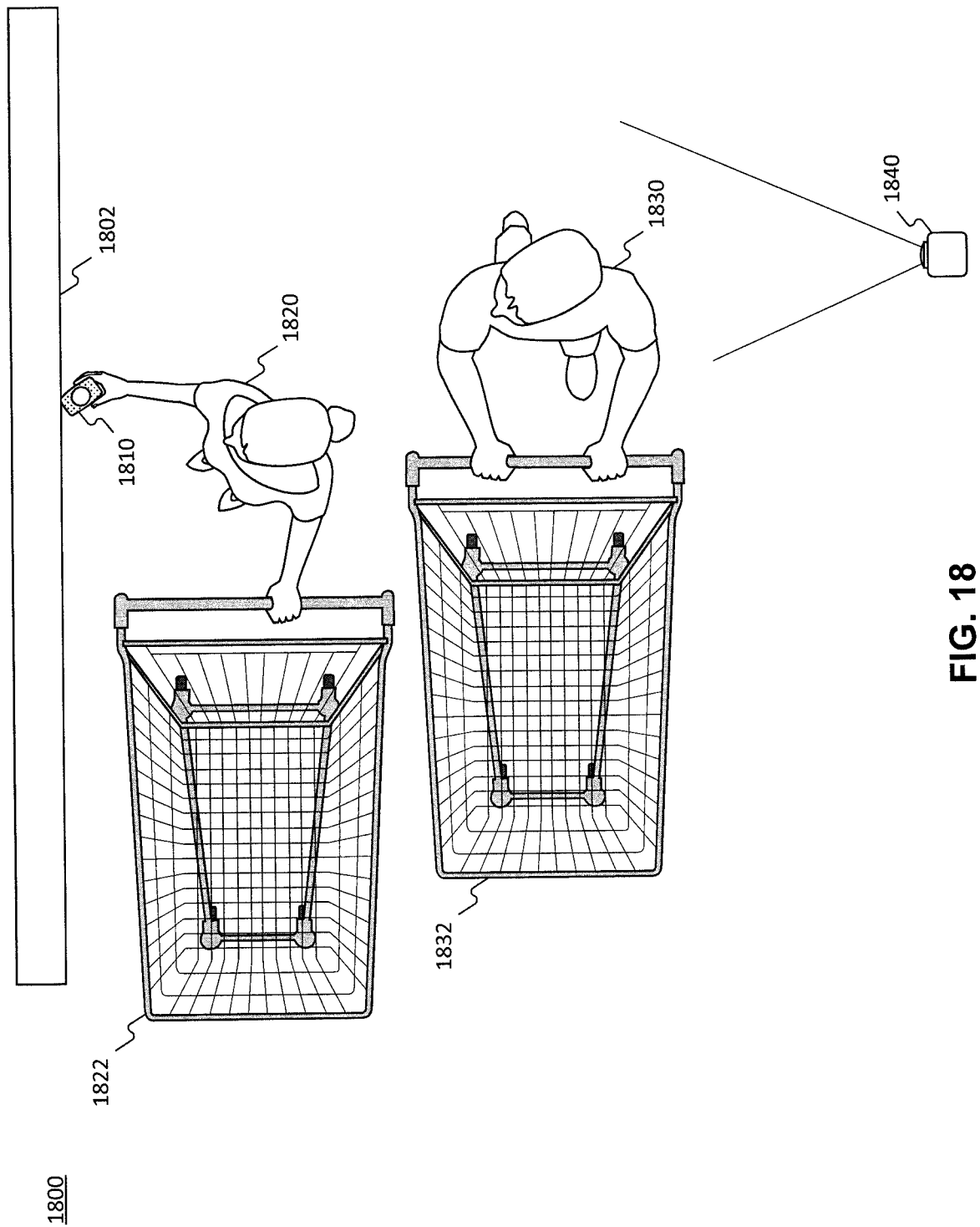
FIG. 18 illustrates an example ambiguous product interaction event that may be detected, consistent with the disclosed embodiments.

FIG. 18 illustrates an example ambiguous product interaction event 1800 that may be detected, consistent with the disclosed embodiments. As shown in FIG. 18, a shopper 1820 may interact with a product 1810 in a retail environment. For example, this may include, looking at product 1810, stopping in front of product 1810, picking up product 1810 from a shelf 1802, returning product 1810 to shelf 1802, placing product 1810 in a shopping cart 1822 associated with shopper 1820, or various other forms of interaction. In some embodiments, the interaction between shopper 1820 and product 1810 may at least partially be detected by a sensor. In some embodiments, the sensor may include a camera 1840, as shown in FIG. 18. Camera 1840 may include any device capable of capturing one or more images from within a retail environment. In some embodiments, camera 1840 may correspond to image capture device 125 (including devices 125A, 125B, 125C, 125D, 125E, 125F, or 125G) as described above. Accordingly, any embodiments or features described in reference to image capture device 125 may equally apply to camera 1840. Camera 1840 (and in some cases, additional image capture devices) may be used to identify shoppers 1820 and 1830 in the retail environment, as well as product 1810, as described in further detail above.

In some embodiments, ambiguous product interaction event 1800 may occur due to a view of camera 1840 being at least partially blocked. For example, shopper 1820 may be positioned such that the interaction with product 1810 by shopper 1820 is blocked by the body of shopper 1830. Accordingly, it may be unclear whether the product was selected or returned to the shelf. Or, if a product was selected, it may not be clear which product was removed from the shelf. In some embodiments, an individual or object may block the view of camera 1840. For example, another shopper 1830 may be positioned such that the interaction with product 1810 is blocked, as shown in FIG. 18. Various other types of events related to camera 1840 may cause uncertainty as to the interaction with product 1810. For example, this may include a temporary loss of connection to camera 1840, a loss of power to camera 1840, a malfunction, improper positioning of camera 1840, dirt or debris on a lens of camera 1840, a failure to recognize product 1810 using images captured by camera 1840 (e.g., due to movement of product 1810, blurry or low-resolution images, etc.), or any other even that may lead to uncertainty in recognizing whether or not product 1810 was selected by a particular shopper. Further, while camera 1840 is used by way of example, ambiguous product interaction events may arise due to uncertainty associated with other types of sensors, including pressure sensors, weight sensors, light sensors, resistive sensors, capacitive sensors, inductive sensors, vacuum pressure sensors, high pressure sensors, conductive pressure sensors, infrared sensors, photo-resistor sensors, photo-transistor sensors, photo-diodes sensors, ultrasonic sensors, or the like.

Based on the failure to fully capture the interaction with product 1810, various forms of uncertainty may arise. For example, it may be unclear whether product 1810 was selected by shopper 1820 (e.g., placed into shopping cart 1822) or was returned to shelf 1802. It may also be unclear whether product 1810 was selected or whether a different product from shelf 1802 was selected. In other words, an ambiguous product interaction event may involve a shopper adding or removing an unrecognized object from cart or basket. In some embodiments, a retail store system may correctly identify which product or product type was selected, but it may be unclear which shopper has selected the product. In the example shown in FIG. 18, it may not be clear whether product 1810 is placed in shopping cart 1822 (and thus associated with shopper 1820) or placed in shopping cart 1832 (and thus associated with shopper 1830). In another example, two shoppers may pick products from a shelf at approximately the same time, for example each picking one product, and it may be unclear which product was picked by which shopper. In yet another example, one or more shoppers may interact with a portion of a retail shelf that do not support frictionless checkout at the time of the interaction (for example, as described above), and the ambiguity may be due to the interaction with the portion of the retail shelf when it does not support frictionless checkout. It is to be understood that the ambiguous product interaction event illustrated in FIG. 18 is provided by way of example, and various other scenarios may lead to uncertainty leading to an ineligibility status of a shopper for frictionless checkout.

Consistent with the disclosed embodiments, ineligibility conditions may arise in various other types of scenarios. In some embodiments, an ineligibility status may include a lack of an available form of automatic payment for a shopper. For example, the shopper may not have provided payment information, may not have selected or approved previously stored payment information for frictionless checkout, may be associated with expired payment information, or various other issues that may make automatic payment information available for frictionless checkout. In some embodiments, the automatic payment information for a shopper may be stored in a shopper profile, such as shopper profile 1910 described in further detail below with respect to FIG. 19A. Ineligibility conditions may be identified based on other factors, including a shopper being unrecognized by the disclosed system, a shopper leaving view of one or more cameras or other sensors, a product or item being disqualified for frictionless checkout (e.g., an item requiring weighing, a sale item, a seasonal or promotional item, an oversized or heavy item, etc.), or various other conditions that may inhibit or interfere with frictionless checkout.

Based on a detected ineligibility condition, such as an ambiguous product interaction event, one or more shoppers may be designated as ineligible for frictionless checkout. In some embodiments, this may include updating a frictionless checkout status for a shopper in a shopper profile. FIG. 19A illustrates an example shopper profile 1910 that may be associated with a shopper, such a shopper 1820. Shopper profile 1910 may be associated with a specific store or retailer location, a specific chain or brand of retailer, or a specific family of retailers, or may be a global profile associated not associated with any particular retailer. As shown in FIG. 19A, shopper profile 1910 may include identifying information for a shopper, such as a name of the shopper, a customer ID or other identifier, a phone number, an address, demographic information, a retailer or merchant associated with the shopper, or any other information that may be associated with a shopper. As noted above, shopper profile 1910 may include payment information 1912. For example, this may include credit card information or other financial account information used complete a transaction. In some embodiments, payment information 1912 may further include a rewards or frequent shopper membership information, coupons or discounts associated with a shopper, enrollment in frictionless checkout, or any other information associated with payment. In some embodiments, multiple payment methods may be stored in shopper profile 1910. Accordingly, a shopper may select one or more payment methods to be automatically used for frictionless checkout.

In some embodiments, shopper profile 1910 may include a frictionless checkout status 1914. Frictionless checkout status 1914 may be any form of indicator or data designating whether a shopper is eligible for frictionless checkout. Frictionless checkout status 1914 may be a global status indicating a shopper is always ineligible (e.g., if no payment information has been provided), or may be a temporary status indicating the shopper is usually eligible, but that eligibility is temporarily suspended based on an ineligibility condition. In some embodiments, information regarding an ineligibility condition may be stored as part of frictionless checkout status 1914 (or shopper profile 1910). For example, the status may include a description, code, classification, or other information identifying a reason for the status. In some embodiments, the frictionless checkout status 1914 may include other data or information, such as whether the shopper is enrolled in frictionless checkout, a frequency or history of use of frictionless checkout, or similar information.

Shopper profile 1910 may include any other forms of information that may be relevant to a shopper, including transaction history 1916. Transaction history 1916 may include a list of historical transactions associated with the shopper. In some embodiment, transaction history 1916 may be specific to frictionless checkouts, however, it may equally include non-frictionless checkouts. While shopper profile 1910 is presented graphically in FIG. 19A, it is to be understood that the information may be represented in various forms, such as a database, a table, an array, a list, or any other suitable data structure or format.

Once a shopper has been designated as not eligible for frictionless checkout, the occurrence of various actions may result in frictionless checkout status being granted or restored. In some embodiments, system 100 (e.g., via server 135, etc.) may cause implementation of one or more actions to resolve the ineligibility condition. For example, system 100 may determine actions for resolving an ineligibility condition and may cause the actions to be implemented. FIG. 19B is a diagrammatic illustration of various actions that may result in frictionless checkout status being granted or restored, consistent with the disclosed embodiments. In some embodiments, system 100 may cause a query or communication to be issued to the shopper to resolve the ineligibility condition. For example, a request may be transmitted to a device associated with a shopper, such as devices 145C or 145D.

As described above, the ineligibility condition may be based on a detected ambiguous product interaction event. Accordingly, the communication may include a request or instructions for the shopper to resolve the ineligibility condition. In some embodiments, the communication may be a request for the shopper to bring one or more items within a range of a sensor, as shown as action 1920. For example, in response to the communication, shopper 1820 may bring product 1810 within the range of sensor 1922 as shown. In some embodiments, sensor 1922 may be a camera, such as camera 1840. Accordingly, sensor 1922 may capture one or more images for identifying product 1810. As another example, sensor 1922 may be a barcode scanner, which may similarly allow identification of product 1810 based on a scannable code printed on a label or otherwise associated with product 1810. As another example, sensor 1922 may be a scale, which may read a weight of product 1810 to resolve the ineligibility condition. For example, an ineligibility condition may exist due to a product weight being required to determine pricing and weighing product 1810 may resolve the ineligibility condition. Various other forms of sensors may be used as described herein.

The request may identify the product to be scanned in various ways. For example, a request may include instructions relative to the timing of an object being selected (e.g., "please scan the last item placed in the cart"). As another example, the request may include instructions related to particular item type or category (e.g., "please scan the ketchup bottle," etc.). In some embodiments, the request may include other information, such as a location of a suggested scanner to use, directions to the nearest scanner within the retail environment, an indication that the shopper is currently ineligible for frictionless checkout, a description or other indication of the ineligibility condition (e.g., that the item was unrecognized, that it was unclear whether an item was placed in the cart, etc.), or various other information as described herein.

As another example, a communication to a shopper may include a query to identify products in a shopping cart associated with the shopper. For example, the query may request that a shopper confirm that a particular item or item type was selected, as shown in action 1930. Shopper 1920 may receive a request via a user device 1932 to identify or confirm an identity of product 1810 placed in cart 1922. In some embodiments, this may include a specific product involved in a detected ambiguous product interaction event involving the shopper, as described above. For example, the query may provide product details most likely associated with product 1810 based on information gathered by one or more sensors, and confirmation from the shopper may resolve the uncertainty. Product details may include a type of product (e.g., condiment, ketchup, etc.), a brand name, a size, a product subtype (e., flavor, color, model, etc.), a quantity, a price, or other information associated with a product. The query may request that the shopper confirm and/or provide one or more of these details. In some embodiments, multiple best matches for product information may be presented and the user may select from the presented options. In instances where the correct product information is not presented (or where no best matches are provided at all), a user may input the correct information (either manually, by scanning the product, capturing an image of the product, etc.) through user device 1932. In some embodiments, the query may relate to other types of actions performed by a shopper, such as a query relating to a type of product detected as being returned to or removed from a retail shelf. User device 1932 may be any form of device capable of receiving and presenting communications to a user. In some embodiments, user device 1932 may correspond to any form of user device described herein, including devices 145C and 145D.

In instances where an ineligibility condition includes a lack of an available form of automatic payment, the communication to the shopper may be to input, select, or confirm one or more automatic payment options. For example, shopper profile 1910 may not include any payment information 1912 and a request may be sent to user device 1932 to input payment information. When payment information 1912 is already input, the request may be for the shopper to select or confirm an automatic payment method to be used for frictionless checkout, update or add payment information (e.g., an expiration date, a security code, etc.), verify the shopper would like to use frictionless checkout, or the like. In some embodiments, communications regarding payment information may be transmitted to third parties, such as a bank or financial institution associated with the shopper. For example, the communication may request that the bank or financial institution provide or confirm automatic payment information for the shopper. As another example, an action for resolving issues with automatic payment information may include interrogating an electronically readable payment instrument associated with a shopper. As used herein, an electronically readable payment instrument may include any form of device or apparatus that may electronically store payment information that may be accessed electronically. This may include a radio-frequency identification (RFID) chip, a credit card, a mobile phone or device, a wearable device, or any other device that may provide payment information in response to an interrogation communication.

In addition to or as an alternative to the communications described above for shoppers, similar communications may be generated for store associates for resolving an ineligibility condition, as shown by action 1940. For example, a communication may be received by store associate 1942 via a user device 1944. In some embodiments, user device 1944 may correspond to devices 145C and/or 145D. Accordingly, any embodiments or details described above with respect to with devices 145C and/or 145D may equally apply to user device 1944. The communication may include instructions to confirm an identity of one or more products in a shopping cart associated with a shopper. For example, the instructions may query the store associate to input or confirm product details as described above. In some embodiments, the communication may provide instructions to capture an image of the product, scan the product, weigh the product, or capture other information about the product using a sensor. In instances where an ambiguous product interaction event includes an uncertainty as to which shopper of multiple shoppers selected an item, the request may be to identify or confirm which shopper selected a particular item. In some embodiments, the communication may include other information, such as a shelf the product was retrieved from (e.g., a shelf number, a camera identifier, etc.), a location in the retail environment the product was selected from (e.g., presented as a store map with a visual location identifier, aisle number, etc.), known or predicted product details, shopper identity information (e.g., extracted from shopper profile 1910), or any other information relevant to resolving an ambiguous product interaction event. Communications may similarly be provided to store associates for resolving other ineligibility conditions. For example, the store associate may receive instructions to request identity information from a shopper, confirm a shopper's identity, request or confirm payment information from a shopper, request or confirm enrollment in frictionless checkout, or requests to acquire or confirm any other information that may resolve an ineligibility condition.

In some embodiments, actions taken with respect to one shopper may resolve ineligibility conditions for other shoppers. For example, in some embodiments, it may be unclear whether an item was taken by a first shopper or a second shopper, as discussed above. Accordingly, resolution of the ineligibility condition with respect to a first shopper may also resolve the ineligibility condition for the second shopper. For example, if system 100 can confirm product 1810 was placed in shopping cart 1822, this may also confirm it was not placed in shopping cart 1832, thereby resolving the ineligibility condition for shopper 1830 in addition to shopper 1820. In some embodiments, where it is confirmed product 1810 was not placed in shopping cart 1822, system 100 may automatically conclude it was placed in shopping cart 1832 and resolve the ineligibility condition for both shoppers. In other embodiments, system 100 may maintain the ineligibility condition for shopper 1830 until it can be confirmed product 1810 was placed in shopping cart 1832. Any of the various actions described above for one shopper (e.g., shopper 1820) may be used to resolve ineligibility conditions for a second shopper (e.g., shopper 1830). Various other actions may also resolve the ineligibility condition for the second shopper. For example, if an ambiguous product interaction event involving shoppers 1820 and 1830 is detected, completion of a non-frictionless checkout for shopper 1820 (thereby verifying the products selected by shopper 1820) may resolve an ineligibility condition for shopper 1830. While various examples are provided above, any other form of action associated with shopper 1820 that confirms whether shopper 1820 selected product 1810 may also resolve an ineligibility condition for shopper 1830.

Figure 20A:
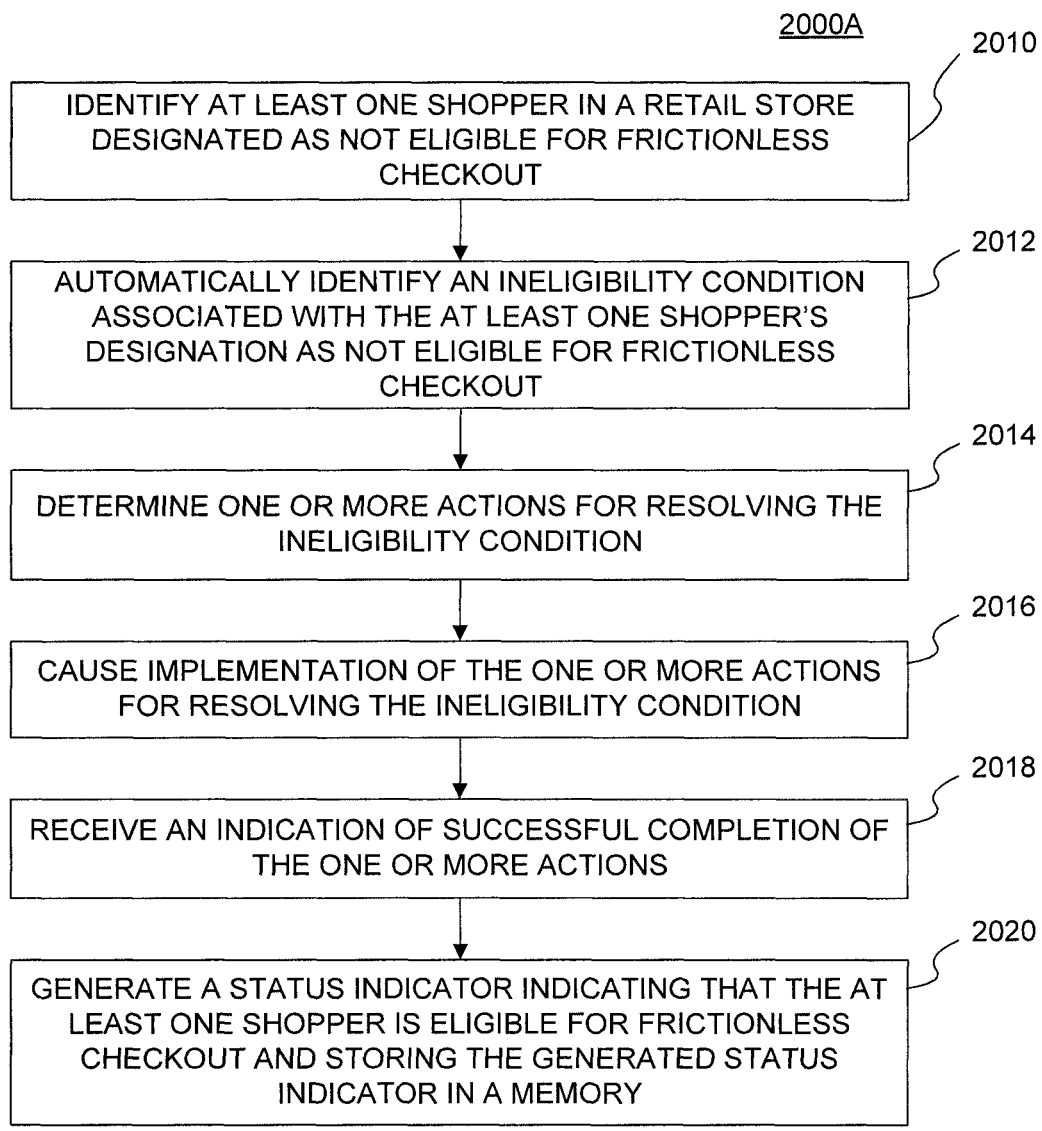
FIG. 20A is a flowchart showing an exemplary method for addressing a shopper's eligibility for frictionless checkout, consistent with the present disclosure.

FIG. 20A is a flowchart shopping an exemplary method for addressing a shopper's eligibility for frictionless checkout, consistent with the present disclosure. Process 2000A may be performed by at least one processing device of a server, such as processing device 302, as described above. In some embodiments, some or all of process 2000A may be performed by a different device associated with system 100. In some embodiments, a non-transitory computer readable medium may contain instructions that when executed by a processor cause the processor to perform process 2000A. Further, process 2000A is not necessarily limited to the steps shown in FIG. 20A, and any steps or processes of the various embodiments described throughout the present disclosure may also be included in process 2000A, including those described above with respect to FIGS. 18, 19A, and 19B.

In step 2010, process 2000A includes identifying at least one shopper in a retail store designated as not eligible for frictionless checkout. Referring to FIG. 18, this may include identifying shopper 1820, which may be designated as not eligible for frictionless checkout, as described above. In some embodiments, the identification of the at least one shopper in the retail store may be based on analysis of at least one image captured by a camera in the retail store. For example, this may include analysis of an image captured by camera 1840. In some embodiments, the identification of the at least one shopper may further be based on shopper profile information stored in at least one database. For example, this may include information stored in a shopper profile associated with the at least one shopper, such as shopper profile 1910 described above. In some embodiments, the information stored in the shopper profile may indicate whether the at least one shopper has an available automatic payment method. For example, this may include automatic payment information 1912 described above. According to some embodiments, the identification of the at least one shopper may be based on a detected ambiguous product interaction event involving the at least one shopper. For example, step 2010 may include detecting the ambiguous product interaction event and identifying the at least one shopper as being designated as not eligible for frictionless checkout based on the detected ambiguous product interaction event.

In step 2012, process 2000A includes automatically identifying an ineligibility condition associated with the at least one shopper's designation as not eligible for frictionless checkout. Step 2012 may be performed in response to the identification of the at least one shopper designated as not eligible for frictionless checkout of step 2010. As described above, the ineligibility condition may include various types of conditions. In some embodiments, the ineligibility condition may include uncertainty relative to a product selection by the at least one shopper due to a detected ambiguous product interaction event involving the at least one shopper, as described above with respect to FIG. 18. In some examples, image data captured using one or more images sensors (such as camera 1840) may be analyzed to identify the ineligibility condition associated with the at least one shopper's designation as not eligible for frictionless checkout. For example, positions of the at least one shopper may be detected in the image data, and the ineligibility condition may be identified based on the detected positions (for example, based on the positions being too close to one another, based on the positions of at least two shoppers being in a selected region (the selected region may be selected based on shelf 1802 and/or product 1810), based on the positions being at an angular distance with respect to the image sensor that is lower than a selected threshold, etc.). In another example, one or more actions of the at least one shopper may be detected in the image data (for example using an action recognition algorithm), and the ineligibility condition may be identified based on the one or more actions. In yet another example, a convolution of at least part of the image data may be calculated, in response to a first value of the convolution of the at least part of the image data, a first ineligibility condition may be identified, and in response to a second value of the convolution of the at least part of the image data, a second ineligibility condition may be identified, the second ineligibility condition may differ from the first ineligibility condition. Alternatively or additionally, the ineligibility condition may include a lack of an available form of automatic payment for the at least one shopper.

In step 2014, process 2000A includes determining one or more actions for resolving the ineligibility condition. In some embodiments, the one or more actions include issuing a query to the at least one shopper to confirm an identity of products in a shopping cart associated with the at least one shopper. For example, this may include a query for the shopper to use a dedicated device for scanning a barcode or placing the products in front of a camera. Alternatively or additionally, this may include a request to identify or confirm selection of an item. In some embodiments, the query may identify a specific product involved in a detected ambiguous product interaction event involving the at least one shopper. For example, the query may identify a specific product or product type believed to have been interacted with by the shopper. In some embodiments, the query may relate to a type of product detected as being removed from or returned to a retail shelf.

According to some embodiments, the one or more actions may include automatically generating a communication to the at least one shopper requesting that the at least one shopper bring one or more selected items in range of at least one sensor. For example, the sensor may include a camera, a barcode scanner, a scale or various other forms of sensors described herein. In some embodiments, the one or more actions may include automatically generating a communication to the at least one shopper indicating that the at least one shopper is currently ineligible for frictionless checkout. For example, the communication may include an indication of the ineligibility, an indication of a reason for the eligibility, at least one remedial action for the at least one shopper to take to resolve the ineligibility condition, or any other relevant information. In some embodiments, the one or more actions may involve generating communications for other entities, such as store associates. For example, the one or more actions include automatically generating a communication to a store associate with instructions to confirm an identity of one or more products in a shopping cart associated with the at least one shopper.

In embodiments where the ineligibility condition includes a lack of an available form of automatic payment for the at least one shopper, the one or more actions may include steps to obtain information regarding automatic payment. For example, the one or more actions include sending of an electronic communication to the at least one shopper regarding automatic payment options. This may include sending a communication to device 1932 as described above. Similarly, the one or more actions may include interrogating an electronically readable payment instrument associated with the at least one shopper. As another example, the one or more actions may include sending of an electronic communication to a bank associated with the at least one shopper.

In step 2016, process 2000A includes causing implementation of the one or more actions for resolving the ineligibility condition. This may include generating and transmitting the various queries or other communications described above. In some embodiments, this may include generating instructions to be performed by a device, such as a personal device, a camera, a scanner, a sensor, or other device to perform a particular operation, such as scanning a product, or the like.

In some embodiments, process 2000A may further include steps to resolve the identified ineligibility condition. For example, in step 2018, process 2000A includes receiving an indication of successful completion of the one or more actions. This may include any form of information collected in response to the various actions described above. For example, this may include receiving an indication that a shopper or store associate has confirmed the identity of a product or that a particular interaction with a product has occurred. As another example, this may include receiving information from a camera or other sensor associated with the one or more actions described above.

In step 2020, in response to receipt of the indication of successful completion of the one more actions, process 2000A includes generating a status indicator indicating that the at least one shopper is eligible for frictionless checkout and storing the generated status indicator in a memory. For example, this may include generating or modifying frictionless checkout status 1914 stored in shopper profile 1910. This may include updating other information, such as a database, a table, an array, or other data structure. In some embodiments, step 2020 may include generating and transmitting a communication indicating the eligibility status. For example, information indicating the status may be transmitted to device 1932 associated with a shopper, device 1944 associated with a store associate, or various other devices described herein.

Figure 20B:
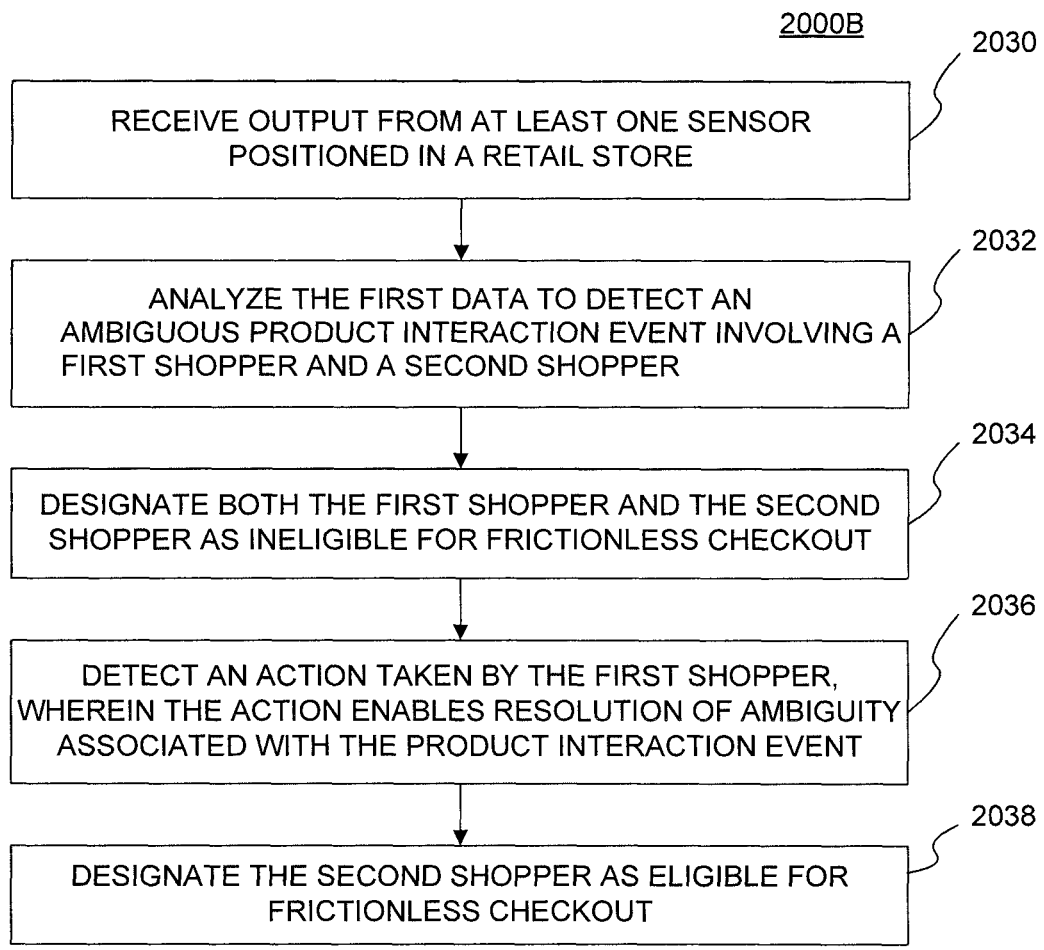
FIG. 20B is a flowchart showing another exemplary method for addressing a shopper's eligibility for frictionless checkout, consistent with the present disclosure.

As described above, in some embodiments, an ineligibility condition may arise due to an ambiguous product interaction event involving multiple shoppers. FIG. 20B is a flowchart showing another exemplary method for addressing a shopper's eligibility for frictionless checkout, consistent with the present disclosure. Process 2000B may be performed by at least one processing device of a server, such as processing device 302, as described above. In some embodiments, some or all of process 2000B may be performed by a different device associated with system 100. In some embodiments, a non-transitory computer readable medium may contain instructions that when executed by a processor cause the processor to perform process 2000B. Further, process 2000B is not necessarily limited to the steps shown in FIG. 20B, and any steps or processes of the various embodiments described throughout the present disclosure may also be included in process 2000B, including those described above with respect to FIGS. 18, 19A, 19B, and 20A.

In step 2030, process 2000B includes receiving output from at least one sensor positioned in a retail store. For example, the sensor may include an image capture device, such as camera 1840. The sensor may include other types of sensors, such as a barcode scanner, a scale, a pressure sensor, or other sensors that could potentially be associated with detecting an ambiguous product interaction event.

In step 2032, process 2000B includes analyzing the first data to detect an ambiguous product interaction event involving a first shopper and a second shopper. For example, this may include detecting an ambiguous product interaction event in which it is unclear whether a product was selected by the first shopper or the second shopper, as described in greater detail above with respect to FIG. 18. In some examples, image data captured using one or more images sensors (such as camera 1840) may be analyzed to detect the ambiguous product interaction event involving the first shopper and the second shopper. For example, positions of the first shopper and the second shopper may be detected in the image data, and the ambiguous product interaction event may be detected based on the detected positions (for example, based on the positions being too close to one another, based on the positions of the first shopper and the second shopper being in a selected region (the selected region may be selected based on shelf 1802 and/or product 1810), based on the positions being at an angular distance with respect to the image sensor that is lower than a selected threshold, etc.). In another example, one or more actions of the first shopper and the second shopper may be detected in the image data (for example using an action recognition algorithm), and the ambiguous product interaction event may be detected based on the one or more actions. In yet another example, a convolution of at least part of the image data may be calculated, in response to a first value of the convolution of the at least part of the image data, ambiguous product interaction event may be detected, and in response to a second value of the convolution of the at least part of the image data, the detection of the ambiguous product interaction event may be withheld and/or forgone.

In step 2034, process 2000B includes designating both the first shopper and the second shopper as ineligible for frictionless checkout in response to detection of the ambiguous product interaction event. For example, this may include updating a frictionless checkout status 1914 in shopper profiles of the first shopper and the second shopper. This may further include generating a communication to transmit to a device associated with the first shopper and/or the second shopper indicating the ineligibility status, as described above. In some embodiments, this may further include determining one or more actions for resolving the ineligibility condition and causing implementation of the one or more actions for resolving the ineligibility condition, as described above with respect to process 2000A.

In step 2036, process 2000B includes detecting an action taken by the first shopper, wherein the action enables resolution of ambiguity associated with the product interaction event. For example, the action taken by the first shopper may include a non-frictionless checkout. Accordingly, during the non-frictionless checkout an accurate inventory of items selected and purchased by the first shopper may be obtained, thus resolving the ambiguity associated with the product interaction event for the second shopper. As another example, the action taken by the first shopper may include scanning one or more selected items or bringing one or more selected items within range of at least one sensor, such as a camera, a scale, or the like. Accordingly, based on information obtained from the scanner or sensor, the selection of a product by the first shopper may be confirmed.

In step 2038, process 2000B includes designating the second shopper as eligible for frictionless checkout in response to detection of the action taken by the first shopper. For example, this may include updating a frictionless checkout status 1914 in a shopper profile for the second shopper, as described above. Step 2038 may also include designating the first shopper as eligible for frictionless checkout in response to detection of the action taken by the first shopper. Step 2038 may further include generating a communication indicating the ineligibility condition has been resolved, which may be transmitted to one or more of the first shopper, the second shopper, a store associate, or other entities associated with system 100.

As discussed above, one common way of improving customer experience while shopping in retail store has been to provide self-checkout counters in a retail store, allowing shoppers to quickly purchase their desired items and leave the store without needing to wait for a store associate to help with the purchasing process. The disclosed embodiments provide another method of improving customer experience in the form of frictionless checkout, particularly for pay-by-weight products.

As noted generally above, frictionless checkout refers to any checkout process for a retail environment with at least one aspect intended to expedite, simplify, or otherwise improve an experience for customers. In some embodiments, frictionless checkout may reduce or eliminate the need to take inventory of products being purchased by the customer at checkout. For example, this may include tracking the selection of products made by the shopper so that they are already identified at the time of checkout. The tracking of products may occur through the implementation of sensors used to track movement of the shopper and/or products within the retail environment, as described throughout the present disclosure. Additionally or alternatively, frictionless checkout may include an expedited or simplified payment procedure. For example, if a retail store has access to payment information associated with a shopper, the payment information may be used to receive payment for products purchased by the shopper automatically or upon selection and/or confirmation of the payment information by the shopper. In some embodiments, frictionless checkout may involve some interaction between the shopper and a store associate or checkout device or terminal. In other embodiments, frictionless checkout may not involve any interaction between the shopper and a store associate or checkout device or terminal. For example, the shopper may walk out of the store with the selected products and a payment transaction may occur automatically. While the term "frictionless" is used for purposes of simplicity, it is to be understood that this encompasses semi frictionless checkouts as well. Accordingly, various types of checkout experiences may be considered "frictionless," and the present disclosure is not limited to any particular form or degree of frictionless checkout.

Frictionless shopping of pay-by-weight products, for example, products from a deli department, products such as specialty coffee, tea, or cheese sold by weight, or other pay-by-weight, clerk assisted transactions may differ significantly from frictionless shopping of regular products. This is because each pay-by-weight product may differ (for example, in weight, in content, in price, and so forth). Even when dedicated cameras are used to capture product-customer transactions, an ambiguity may arise when a number of shoppers order and receive pay-by-weight products at the same time. In such situations, feedback from a store associate may assist in resolving the ambiguity. The disclosed methods and systems may provide a way for updating the virtual shopping carts of shoppers with pay-by-weight products.

In some embodiments, a non-transitory computer-readable medium may include instructions that when executed by a processor may cause the processor to perform a method for updating virtual shopping carts of shoppers with pay-by-weight products. For example, as discussed above, the disclosed system may include one or more servers 135, which may include one or more processing devices 202. Processing device 202 may be configured to execute one or more instructions stored in a non-transitory computer-readable storage medium. As also discussed above, the non-transitory computer-readable medium may include one or more of random access memory (RAM), read-only memory (ROM), volatile memory, nonvolatile memory, hard drives, CD ROMs, DVDs, flash drives, disks, any other optical data storage medium, any physical medium with patterns of holes, a RAM, a PROM, an EPROM, a FLASH-EPROM or any other flash memory, NVRAM, a cache, a register, any other memory chip or cartridge, and networked versions of the same, etc.

Figure 21:
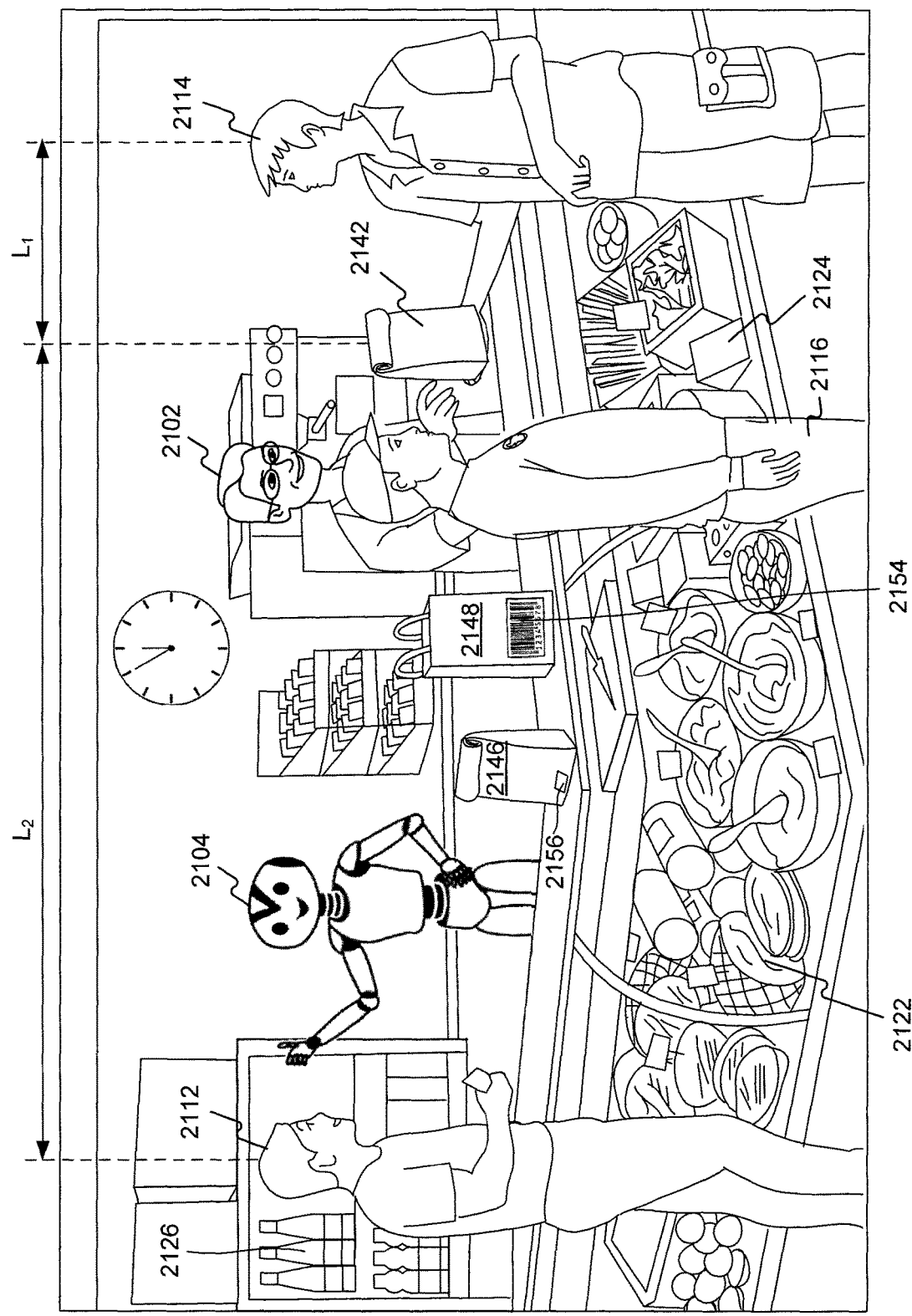
FIG. 21 illustrates an example of one or more shoppers interacting with a store associate to purchase a pay-by-weight product in a retail store, consistent with the present disclosure.

FIG. 21 illustrates an example of one or more shoppers interacting with a store associate to purchase a pay-by-weight product in a retail store (e.g., 105A, 105B, 105C, etc.). As illustrated in FIG. 21, one or more of shoppers 2112, 2114, 2116 may interact with store associate 2102 to purchase one or more of products 2122, 2124, 2126, etc. It is contemplated that the instructions stored on the non-transitory computer-readable medium may allow processing device 202 to update a virtual shopping cart associated with a shopper (e.g., shopper 2112, 2114, 2116, etc.) by including one or more pay-by-weight products (e.g., products 2122, 2124, 2126, etc.) in the virtual shopping cart.

In some embodiments, the method may include receiving one or more images captured by one or more image sensors, wherein the one or more images may depict product interactions between a store associate and a plurality of shoppers, wherein each of the product interactions may involve at least one pay-by-weight product. For example, as discussed above, a retail store (e.g., 105A, 105B, 105C, etc., see FIG. 1) may include one or more capturing devices 125 configured to capture one or more images. Capturing devices 125 may include one or more of a digital camera, a time-of-flight camera, a stereo camera, an active stereo camera, a depth camera, a Lidar system, a laser scanner, CCD based devices, etc. Capturing devices 125 may be stationary or movable devices mounted to walls or shelves in the retail stores (e.g., 105A, 105B, 105C, etc.). It is also contemplated that capturing devices 125 may be handheld devices (e.g., a smartphone, a tablet, a mobile station, a personal digital assistant, a laptop, etc.), a wearable device (e.g., smart glasses, a smartwatch, a clip-on camera, etc.) or may be attached to a robotic device (e.g., drone, robot, etc.). It is further contemplated that capturing devices 125 may be held or worn by a shopper, a store employee, or by one or more other persons present in retail stores 105.

One or more of capturing devices 125 may include one or more image sensors 310, which may include one or more semiconductor charge-coupled devices (CCD), active pixel sensors in complementary metal-oxide-semiconductor (CMOS), or N-type metal-oxide-semiconductors (NMOS, Live MOS), etc. The one or more image sensors 310 in retail stores 105 may be configured to capture images of one or more persons (e.g., shoppers, store associates, etc.), one or more pay-by-weight products (e.g., 2122, 2124, 2126, 2142, 2144, 2146, etc.), and/or other objects (e.g., shopping carts, checkout counters, walls, columns, poles, aisles, pathways between aisles), etc. The images may be in the form of image data, which may include, for example, pixel data streams, digital images, digital video streams, data derived from captured images, etc.

The one or more images obtained by the one or more image sensors 310 may depict one or more product interactions. Product interactions may include one or more actions of shopper (e.g., 2112, 2114, 2116, etc.) and/or store associate (e.g., 2102) to receive one or more pay-by-weight products (e.g., 2122, 2124, 2126, 2142, 2144, 2146, etc.) or to return one or more pay-by-weight products to the store associate. It is contemplated that one or more of these product interactions may be associated with pay-by-weight products. Pay-by-weight products may include products that may be sold by the retail store by weight or by quantity and may require interaction between a shopper and a store associate for purchasing the pay-by-weight products. Examples of a pay-by-weight product may include deli-meats (e.g., 2122), deli-cheeses (e.g., 2124), breads, baked goods (e.g., donuts, bagels, cup cakes, etc.), cigarettes, high-priced wines or liquor, etc. A retailer may require a store associate 2102 to provide the pay-by-weight products to shoppers (e.g., 2112, 2114, 2116, etc.) instead of allowing a shopper to remove the pay-by-weight product from a store shelf on their own.

In some embodiments, the method may include analyzing the one or more images to identify the product interactions and to associate the at least one pay-by-weight product involved with each product interaction with a particular shopper among the plurality of shoppers. For example, processing device 202 may analyze image data obtained by the one or more image sensors 310 to identify one or more persons or objects in the image data. As used herein, the term identify may broadly refer to determining an existence of a person or a product in the image data. It is also contemplated, however, that in some embodiments identifying a person in the image data may include recognizing a likeness of the person and associating an identifier (e.g., name, customer ID, account number, telephone number, etc.) with the recognized person. It is contemplated that processing device 202 may use any suitable image analysis technique, for example, including one or more of object recognition, object detection, image segmentation, feature extraction, optical character recognition (OCR), object-based image analysis, shape region techniques, edge detection techniques, pixel-based detection, artificial neural networks, convolutional neural networks, etc., to identify one or more persons or objects in the image data. It is further contemplated that processing device 202 may access one or more databases 140 to retrieve one or more reference images of likenesses of one or more persons or reference images of one or more pay-by-weight products. Further, processing device 202 may use one or more of the image analysis techniques discussed above to compare the images retrieved from database 140 with the image data received from the one or more image sensors 310 to recognize the likeness of one or more shoppers (e.g., 2112, 2114, 2116, etc.) or to recognize one or more pay-by-weight products (e.g., 2122, 2124, 2126, 2142, 2144, 2146, etc.) in the image data. It is also contemplated that processing device 202 may retrieve other identifying information (e.g., name, customers ID, account number, telephone number, etc.) associated with the images retrieved from database 140 based on, for example, profiles of the one or more shoppers (e.g., 2112, 2114, 2116, etc.) stored in database 140. It is further contemplated that processing device 202 may retrieve information (e.g., product id, price, brand name, etc.) about the one or more pay-by-weight products.

Processing device 202 may associate the at least one pay-by-weight product (e.g., 2142) involved with each product interaction with a particular shopper (e.g., 2114) from among all the shoppers (e.g., 2112, 2114, 2116, etc.) present in the analyzed images. For example, processing device 202 may recognize that shopper 2114 received pay-by-weight product 2142 from store associate 2102 in a particular product interaction. Alternatively, processing device 202 may recognize that shopper 2114 returned pay-by-weight product 2142 to store associate 2102 in a product interaction. Processing device 202 may associate pay-by-weight product 2142 involved with that particular product interaction with a particular shopper 2114. It is to be understood that shopper 2114 and pay-by-weight product 2142 are merely exemplary and that processing device 202 may perform the above-describe association between any of shoppers (e.g., 2112, 2114, 2116, etc.) and any of pay-by-weight products (e.g., 2122, 2124, 2126, 2142, 2144, 2146, etc.)

In some embodiments, the method may include providing a notification to the store associate requesting supplemental information to assist in the association of the at least one pay-by-weight product involved with a selected product interaction with the particular shopper among the plurality of shoppers. As discussed above, processing device 202 may detect one or more product interactions based on an analysis of image data obtained by the one or more image sensors 310. It is contemplated, however, that in some instances, processing device 202 may not be able to identify the shopper and/or the pay-by-weight product associated with a product interaction, because of, for example, a quality of the image data. For example, in some instances images obtained by the one or more sensors 310 may be too dark because of insufficient light. As a result, processing device 202 may not be able to identify shopper (e.g., 2114) and/or pay-by-weight product (e.g., 2142) being given to shopper 2114 by store associate 2102. As another example, portions of an image of shopper 2114 and/or pay-by-weight product 2142 may be occluded by another shopper (e.g., 2116), and/or another object. By way of another example, an image of product (e.g., 2122, 2124, 2126, 2142, 2144, 2146, etc.) may be blurry or out of focus making it difficult to read a label on the product using optical character recognition techniques. As a result, processing device 202 may not be able to identify shopper (e.g., 2112, 2114, 2116, etc.) and/or pay-by-weight product (e.g., 2122, 2124, 2126, 2142, 2144, 2146, etc.) based on analysis of the images, and/or processing device 202 may not be able to determine whether, for example, product 2142 was given to shopper 2114 or 2116. In such situations, processing device 202 may provide a notification to store associate 2102, requesting supplemental information that may assist processing device 202 in identifying, for example, which of shopper 2114 or 2116 may have received product 2142. Processing device 202 may also be able to use the supplemental information to associate product (e.g., 2142) with shopper (e.g., 2114).

In some embodiments, the notification may be provided to the store associate when the analysis of the one or more images results in an ambiguity level greater than a predetermined threshold with respect to the association of the at least one pay-by-weight product involved with each product interaction with the particular shopper among the plurality of shoppers. For example, processing device 202 may be configured to determine an ambiguity level associated with the one or more product interactions when processing device 202 is unable to identify a shopper (e.g., 2112, 2114, 2116, etc.) and/or a pay-by-weight product (e.g., 2122, 2124, 2126, 2142, 2144, 2146, etc.), or when processing device 202 is unable to identify a shopper (e.g., 2114 or 2116) to whom a product (e.g., 2142) may have been given during a product interaction. By way of example, the ambiguity level associated with a product interaction may be a numerical value ranging between a minimum and maximum value, with the value indicating a degree of ambiguity. As another example, the ambiguity level may be in the form of text (e.g., Low, Medium, High, etc.) indicating a degree of ambiguity. Processing device 202 may be configured to identify shopper (e.g., 2112, 2114, 2116, etc.) and/or pay-by-weight product (e.g., 2122, 2124, 2126, 2142, 2144, 2146, etc.) by comparing image data obtained from the one or more image sensors 310 with one or more reference images of shopper (e.g., 2112, 2114, 2116, etc.) and/or pay-by-weight product (e.g., 2122, 2124, 2126, 2142, 2144, 2146, etc.). Processing device 202 may be configured to determine an ambiguity level associated with a product interaction based on, for example, a degree of similarity between the image data and the reference image of the (e.g., 2112, 2114, 2116, etc.) and/or pay-by-weight product (e.g., 2122, 2124, 2126, 2142, 2144, 2146, etc.). It is also contemplated that processing device 202 may execute one or more mathematical or statistical algorithms, machine learning or neural network models, and/or other models to determine an ambiguity level associated with a product interaction.

In some embodiments, processing device 202 may transmit a notification to store associate 2102 when an ambiguity level associated with a product interaction is greater than a predetermined threshold ambiguity level. A product interaction having an ambiguity level greater than the threshold ambiguity level may be deemed an ambiguous product interaction. It is contemplated that processing device 202 may compare the determined ambiguity level associated with a product interaction with the threshold ambiguity level. For example, processing device 202 may be configured to determine that the product interaction between store associate 2102 and shopper 2114 or 2116 is ambiguous when the determined ambiguity level is greater than or equal to the threshold ambiguity level. When processing device 202 determines that the determined ambiguity level is greater than or equal to the threshold ambiguity level, processing device 202 may be configured to transmit a notification to store associate 2102 to provide supplemental information.

In some embodiments, the threshold may be determined based on price associated with the at least one pay-by-weight product. For example, a retailer may determine that there is no need to request supplemental information form store associate 2102 for product interactions involving low-priced items (e.g., generic brands of meat or cheese). The retailer may do so to prevent overwhelming store associate 2102 with too many requests for supplemental information and/or to allow other tasks assigned to store associate 2102 to take priority. In such cases, processing device 202 may set a high threshold ambiguity level for low-priced items. As a result, processing device 202 may not provide notifications to store associate 2102 for product interactions associated with low-priced items and having an ambiguity level less than the high threshold ambiguity level. On the other hand, the retailer may wish to make sure that high-priced pay-by-weight products (e.g., rare caviar, premium deli meat or cheese, very old vintage wine, etc.) are provided to the correct shopper. In such cases, processing device 202 may set a low threshold ambiguity level for high-priced items. This may ensure that even product interactions associated with high-priced items and having an ambiguity level less than the low threshold ambiguity level are detected by processing device 202. As a result, processing device 202 may transmit notifications to store associate 2102 for product interactions associated with high-priced items having a relatively low ambiguity level.

In some embodiments, the threshold may be determined based on at least one pending task of the store associate. In some situations, the threshold ambiguity level may be based whether store associate 2102 is busy. A retailer may determine that it is not cost-effective to ask store associate 2102 to provide supplemental information when store associate 2102 may be busy, for example, for a low-priced pay-by-weight product involved in an ambiguous product interaction. In such cases, processing device 202 may set a high threshold ambiguity level for low-priced pay-by-weight products. As a result, when processing device 202 determines that store associate 202 has a pending task, processing device 202 may be configured to transmit a notification to store associate only for the very ambiguous product interactions involving low-priced items (e.g., product interactions having a relatively high ambiguity level, e.g., 90% or higher). Processing device 202 may not require information from store associate 2102 for product interactions associated with low-priced items and having a relatively low ambiguity level (e.g., 50% or lower).

In contrast, a retailer may wish to make sure that high-priced pay-by-weight products (e.g., rare caviar, premium deli meat or cheese, very old vintage wine, etc.) are provided to the correct shopper even when the store associate may be busy. In such cases, processing device 202 may set a low threshold ambiguity level for high-priced pay-by-weight products. As a result, when processing device 202 determines that store associate 2102 has a pending task, processing device 202 may be configured to transmit a notification to store associate 2102 for product transactions involving high-priced items even though these transactions may have a relatively low ambiguity level (e.g., 50% or less).

It is contemplated that the notification to store associate 2102 may request store associate 2102 to identify a shopper (e.g., 2114 or 2116) receiving a pay-by-weight product (e.g., 2142). Additionally or alternatively, the notification to store associate 2102 may request store associate 2102 to identify a pay-by-weight product (e.g., 2142) given to a particular shopper (e.g., shopper 2114). Store associate 2102 may identify a shopper and/or a pay-by-weight product in many ways. In some embodiments, the notification provided to the store associate may include a request to match a shopper to a specific pay-by-weight product, and the supplemental information includes a gesture by the store associate represented in additional images captured by the one or more image sensors, wherein the gesture enables identification of the shopper that received the specific pay-by-weight product. It is contemplated that in some situations, store associate 2102 may identify a shopper (e.g., 2112, 2114, 2116, etc.) and/or a pay-by-weight product (e.g., 2122, 2124, 2126, 2142, 2146, 2148, etc.) using a gesture (e.g., pointing to the shopper, pointing to the product, etc.). As discussed above, processing device 202 may receive one or more images obtained by the one or more imaging sensor 310. Processing device 202 may be configured to perform image analysis, using one or more of the techniques or algorithms discussed above, to identify a gesture made by store associate 2102 in the image data obtained by the one or more image sensor 310. Processing device 202 may also be configured to identify a shopper (e.g., 2112, 2114, 2116, etc.) and/or a pay-by-weight product (e.g., 2122, 2124, 2126, 2142, 2146, 2148, etc.) based on the identified gesture. For example, when a gesture made by store associate 2102 includes pointing to, for example shopper 2114, processing device 202 may be configured to associate shopper 2114 with an ambiguous product interaction and/or with a particular pay-by-weight product (e.g., 2142). By way of another example, when a gesture made by store associate 2102 includes pointing towards a pay-by-weight product (e.g., 2142), processing device 202 may be configured to associate that pay-by-weight product 2142 with an ambiguous product interaction and/or with a particular shopper (e.g., 2114).

In some embodiments, the supplemental information may be provided by the store associate via a computing device.

It is contemplated that store associate 2102 may additionally or alternatively identify a shopper (e.g., 2112, 2114, 2116, etc.) and/or a pay-by-weight product (e.g., 2122, 2124, 2126, 2142, 2146, 2148, etc.) by selecting an identifier associated with the shopper and/or with the pay-by-weight product using a computing device. For example, processing device 202 may transmit a notification to a computing device associated with store associate 2102. It is contemplated that the computing device may include one or more of a desktop computer, a laptop computer, a checkout terminal, etc. In some embodiments, the computing device may be a mobile computing device. For example, the computing device may include a cellular phone, a smartphone, a tablet computer, a wearable device such as a smartwatch, etc.

In some embodiments, the notification to the store associate may include identifiers of two or more shoppers and may request that the store associate select which of the two or more shoppers received a specific pay-by-weight product. As discussed above, processing device 202 may transmit a notification to a computing device associated with store associate 2102, requesting supplemental information regarding a shopper (e.g., 2112, 2114, 2116, etc.) and/or a pay-by-weight product (e.g., 2122, 2124, 2126, 2142, 2146, 2148, etc.) associated with an ambiguous product interaction. It is contemplated that in some embodiments the notification transmitted by processing device 202 to the computing device associated with store associate 2102 may include identifiers of two or more shoppers. In some embodiments, the identifiers may include pictures of the two or more shoppers. By way of example, the identifiers may include photographs of the two or more shoppers. In some embodiments, the identifiers may include shopper id numbers. For example, identifiers may include names, customer identification numbers, and/or any other type of identification numbers associated with the two or more shoppers. Processing device 202 may transmit a notification to store associate 2102, with the identifiers displayed on, for example, a computing device associated with store associate 2102.

Figure 22:
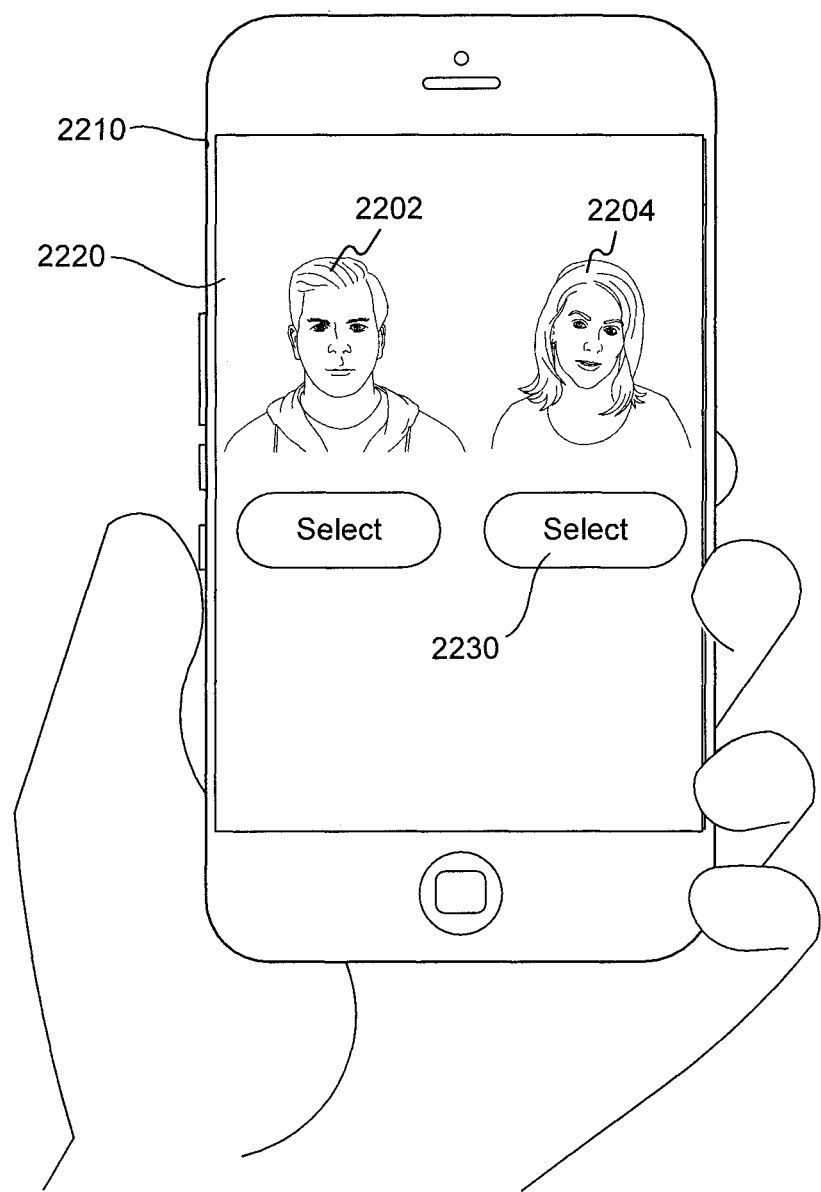
FIG. 22 illustrates an example of a device displaying a notification sent to the store associate, consistent with the present disclosure.

FIG. 22 illustrates an example of a computing device 2210 associated with store associate 2102 displaying a notification sent to store associate 2102 by processing device 202. For example, device 2210 may be a smartphone having a display 2220. As illustrated in FIG. 22, images 2202 and 2204 of a pair of shoppers associated with an ambiguous product interaction may be displayed on display 2220. Additionally, a graphical element 2230 (e.g., button, widget, etc.) may be displayed below each of the images 2202 and 2204. Store associate 2102 may be able to select graphical element 2230 below one of the displayed images, using one or more input devices associated with device 2210, to provide supplemental information, identifying a shopper associated with the ambiguous product interaction. Although FIG. 22 illustrates images of shoppers displayed on display 2220 of device 2210, it is contemplated that in some embodiments, additionally or alternatively, images of one or more pay-by-weight products (e.g., 2122, 2124, 2126, 2142, 2146, 2148, etc.) associated with an ambiguous product interaction may be displayed on display 2220. Furthermore, one or more graphical elements 2230 may be displayed on display 2220 to allow store associate 2102 to identify one or more of the pay-by-weight products (e.g., 2122, 2124, 2126, 2142, 2146, 2148, etc.) associated with the ambiguous product interaction.

In some embodiments, the two or more shoppers may be ranked in the notification based on a determined likelihood that each of the two or more shoppers received the specific pay-by-weight product. It is contemplated that processing device 202 may determine a likelihood that each of shoppers (e.g., 2112, 2114, 2116, etc.) received a particular pay-by-weight product (e.g., 2142). Processing device 202 may also transmit the determined likelihoods together with the identifiers for the two or more shoppers (e.g., 2112, 2114, 2116, etc.) to computing device 2210 associated with store associate 2102. In some embodiments, the likelihood may be determined based on archived shopping behavior for at least one of the two or more shoppers. It is contemplated that server 135 and/or database 140 may store information associated with one or more shoppers (e.g., 2112, 2114, 2116, etc.) in the form of customer profiles. For example, a customer profile for a shopper (e.g., 2112, 2114, 2116, etc.) may include identification information of shopper (e.g., 2112, 2114, 2116, etc.). The identification information may include, for example, a name, an identification number, an address, and telephone number, an email address, a mailing address. The customer profile for a shopper (e.g., 2112, 2114, 2116, etc.) may also include, for example, a shopping history, including a list of products previously purchased by shopper (e.g., 2112, 2114, 2116, etc.), frequency of purchase of each of the products in the list, total value of products purchased by shopper (e.g., 2112, 2114, 2116, etc.) during each visit to a retail store or during a predetermined period of time, payment history of shopper (e.g., 2112, 2114, 2116, etc.), including information regarding on-time payments, late payments, delinquent payments, etc. In some embodiments, processing device 202 may determine a likelihood that a particular shopper (e.g., 2112, 2114, 2116, etc.) may have received a particular pay-by-weight product (e.g., 2142) based on the past shopping history of shopper (e.g., 2112, 2114, 2116, etc.) stored in a customer profile associated with the shopper.

In some embodiments, the likelihood may be determined based on an analysis of the received one or more images. For example, processing device 202 may determine a distance between shopper (e.g., 2112, 2114, 2116, etc.) and pay-by-weight product (e.g., 2122, 2124, 2126, 2142, 2146, 2148, etc.). Processing device 202 may identify a shopper (e.g., 2112, 2114, 2116, etc.) as having received pay-by-weight product (e.g., 2122, 2124, 2126, 2142, 2146, 2148, etc.) based on the determined distance. For example, shopper 2114 may be positioned at a distance $L_1$ from pay-by-weight product 2142, whereas shopper 2112 may be positioned at a distance $L_2$ from pay-by-weight product. Because distance $L_1$ may be smaller than distance $L_2$, processing device 202 may determine that shopper 2114 is more likely to have received pay-by-weight product 2142 than shopper 2112. It is contemplated that processing device 202 may use other criteria (e.g., an action or a gesture of a shopper or a store associate, matching an order number or a product number with a shopper, etc.) to identify a shopper (e.g., 2112, 2114, 2116, etc.) as having received pay-by-weight product (e.g., 2122, 2124, 2126, 2142, 2146, 2148, etc.) based on analysis of the images captured by image sensors 310. Additionally or alternatively, processing device 202 may use one or more mathematical and/or statistical algorithms, one or more machine learning models, and/or one or more neutral networks to assign a likelihood that shopper (e.g., 2112 or 2114) received pay-by-weight product 2142. Processing device 202 may also be configured to rank the list of identifiers transmitted to, for example, computing device 2210 associated with store associate 2102 based on the determined likelihood. For example, processing device 202 may determine that shopper 2114 has a 60% likelihood of having received pay-by-weight product 2142 whereas shopper 2112 has 20% likelihood of having received pay-by-weight product 2142. Processing device 202 may transmit a notification to computing device 2210 associated with store associate 2102 when, for example, the likelihoods are less than a threshold likelihood (e.g., threshold likelihood of 80%). Processing device 202 may be configured to provide the determined likelihood (e.g., 60% or 20%, etc.) in association with the respective identifiers (e.g., photographs, customer identifiers, etc.) of, for example, shoppers 2112 and 2114 in the notification transmitted to computing device 2210 associated with store associate 2102. It is contemplated that store associate may rely on the displayed likelihood values in providing the supplemental information to processing device 202. It is to be understood that the values 20%, 60%, 80%, etc., are exemplary and nonlimiting and processing device may assign other numerical or textual values to the determined and threshold likelihoods.

In some embodiments, the method may include receiving the requested supplemental information from the store associate. For example, when store associate 2102 receives a notification from processing device 202, store associate 2102 may identify a shopper (e.g., 2112, 2114, 2116, etc.) and/or pay-by-weight product (e.g., 2122, 2124, 2126, 2142, 2146, 2148, etc.). As discussed above, store associate 2102 may do so by using one or more gestures and/or by making a selection on computing device 2210 associated with store associate 2102. As one example, store associate 2102 may point to one of the shoppers (e.g., point to shopper 2114 out of shoppers 2114 and 2116). Processing device 202 may detect the pointing gesture based on an analysis of the one or more images captured by image sensors 310. Processing device 202 may receive the supplemental information in the form of the detected gesture. By way of another example, store associate 2102 may select one of the plurality of images of shoppers (e.g., 2202) displayed on computing device 2210 associated with store associate 2102 to identify the shopper that may have received a pay-by-weight product. Processing device 202 may receive a signal from computing device 2210, identifying the shopper selected by store associate 2102 (e.g., supplemental information).

In some embodiments, the store associate may be a service robot, and wherein the supplemental information may be determined based on an output of one or more sensors associated with the service robot. Although the above description has identified store associate 2102 as being a person, it is contemplated that in some embodiments the store associate may be a service robot (e.g., robot 2104, see FIG. 21). In some embodiments, a service robot may have a human-like appearance and be capable of mobility (e.g., a legged robot). In other embodiments, a service robot may take on a machine-like appearance having mobility via one or more wheels or one or more tracks or treads. It is contemplated that service robot 2104 may include a variety of sensors, for example, image sensors, weight sensors, pressure sensors, distance sensors, etc. It is also contemplated that service robot 2104 may be equipped with its own processing device. When service robot 2104 provides a pay-by-weight product (e.g., 2122, 2124, 2126, 2142, 2146, 2148, etc.) to a shopper (e.g., 2112, 2114, 2116, etc.), or receives a pay-by-weight product from a shopper, the one or more sensors of service robot 2104 may generate signals that may be transmitted by service robot 2104 to processing device 202. Processing device 202 may be configured to determine whether a pay-by-weight product (e.g., 2122, 2124, 2126, 2142, 2146, 2148, etc.) has been provided by or received by service robot 2104 based on the signals received from the one or more sensors of service robot 2104. Processing device 202 may also be configured to identify a shopper (e.g., 2112, 2114, 2116, etc.) and/or pay-by-weight product (e.g., 2122, 2124, 2126, 2142, 2146, 2148, etc.) involved in the product interaction between a shopper and service robot 2104 based on the one or more signals received from the one or more sensors of service robot 2104.

In some embodiments, the method may include using the analysis of the one or more images and the requested supplemental information to determine the association of the at least one pay-by-weight product involved with the selected product interaction with the particular shopper among the plurality of shoppers. As discussed above, one or more product interactions may be ambiguous because, for example, processing device 202 may be unable to identify a shopper (e.g., 2112, 2114, 2116, etc.) and/or pay-by-weight product (e.g., 2122, 2124, 2126, 2142, 2146, 2148, etc.) associated with a particular product interaction. In such cases, processing device 202 may receive supplemental information from store associate 2102 as discussed above. Processing device 202 may be configured to use both the image analysis of the image data obtained from the one or more sensors 310 and the supplemental information provided by store associate 2102 to identify the shopper and/or the product associated with a particular product interaction. Processing device 202 may also be configured to associate a shopper (e.g., 2114) with a pay by weight product (e.g., 2142) based on a combination of the analysis of the one or more images and the supplemental information provided by store associate 2102.

In some embodiments, the association of the at least one pay-by-weight product involved with each product interaction with the particular shopper among the plurality of shoppers may be further based on scanning of a barcode associated with the at least one pay-by-weight product. As discussed above, processing device 202 may identify a shopper (e.g., 2112, 2114, 2116, etc.) associated with a product interaction based on the analysis of the one or more images obtained by image sensor 310 and/or based on supplemental information provided by store associate 2102. Processing device 202 may also be configured to associate a pay-by-weight product (e.g., 2122, 2124, 2126, 2142, 2146, 2148, etc.) with an identified shopper (e.g., 2112, 2114, 2116, etc.) based on information associated with the pay-by-weight product. As one example, store associate 2102 and/or shopper (e.g., 2112, 2114, 2116, etc.) may scan a barcode 2154 (see FIG. 21) attached to pay-by-weight product 2148. Processing device may receive information associated with pay-by-weight product 2148 based on scanning of barcode 2154. In some embodiments, the association of the at least one pay-by-weight product involved with each product interaction with the particular shopper among the plurality of shoppers may be further based on interrogation of an RFID tag associated with the at least one pay-by-weight product. It is contemplated that in some embodiments, store associate 2102 and/or shopper (e.g., 2112, 2114, 2116, etc.) may use, for example, an RFID reader to read RFID tag 2156 associated with pay-by-weight product 2146. Processing device 202 may receive information associated with pay-by-weight product 2146 based on scanning (e.g., interrogation) of RFID tag 2156. Processing device 202 may be configured to associate pay-by-weight product 2148 or 2146 with a shopper (e.g., 2112, 2114, 2116, etc.) based on the information received from, for example, scanning of the barcode 2154 and/or scanning of the RFID tag 2156.

In some embodiments, the method may further comprise requesting from at least one of the plurality of shoppers additional information to assist in the association of the at least one pay-by-weight product involved with the selected product interaction with the particular shopper among the plurality of shoppers. It is contemplated that in some embodiments processing device 202 may request additional information from the one or more shoppers (e.g., 2112, 2114, 2116, etc.) in addition to or as an alternative to the supplemental information requested from store associate 2102. For example, processing device 202 may transmit a notification to a computing device associated with the one or more shoppers (e.g., 2112, 2114, 2116, etc.), requesting them to provide additional information regarding one or more product interactions. The computing device associated with the one or more shoppers may include one or more of a smartphone, a tablet computer a smartwatch, a mobile phone, a laptop computer, a smart glass, etc. The notification may include requests for information such as, whether shopper (e.g., 2112, 2114, 2116, etc.) placed an order for pay-by-weight product (e.g., 2122, 2124, 2126, 2142, 2146, 2148, etc.), a quantity (e.g., volume or weight, etc.) of the pay-by-weight product that may have been ordered by a shopper, a brand of the pay-by-weight product that may have been ordered by a shopper, etc. The one or more shoppers (e.g., 2112, 2114, 2116, etc.) may provide the additional information in the form of one or more gestures that may be captured in the one or more images obtained by image sensors 310. Processing device 202 may analyze the one or more images obtained by the one or more sensors 310 to identify the gestures made by the one or more shoppers (e.g., 2112, 2114, 2116, etc.). Processing device 202 may also be configured to identify the pay-by-weight product (e.g., 2122, 2124, 2126, 2142, 2146, 2148, etc.) that may be associated with a particular shopper based on the gestures detected in the one or more images.

It is also contemplated that in some embodiments, the one or more shoppers (e.g., 2112, 2114, 2116, etc.) may provide the additional information by selecting one or more icons or widgets, or by entering text on a computing device associated with the one or more shoppers (e.g., 2112, 2114, 2116, etc.). Processing device 202 may receive signals from the computing device associated with the one or more shoppers (e.g., 2112, 2114, 2116, etc.) and determine the additional information based on the received signals. It is further contemplated that the one or more shoppers may provide the additional information to store associate 2102, who in turn may provide the additional information to processing device 202 in the form of one or more gestures, and/or by selecting one or more icons or widgets, and/or entering information on computing device 2210 associated with store associate 2102. Processing device 202 may detect the one or more gestures made by store associate 2102 based on an analysis of the one or more images received by the one or more image sensors 310. Processing device 202 may determine the additional information based on the identified gestures made by store associate 202. Additionally or alternatively, processing device 202 may receive signals from computing device 2210 associated with store associate 2102 and determine the additional information based on the received signals.

In some embodiments, the additional information requested from the at least one of the plurality of shoppers may be forgone when a credibility indicator associated with the at least one of the plurality of shoppers is below a selected threshold. A retailer may determine that additional information regarding a pay-by-weight product interaction may not be necessary from a shopper who may be deemed to be not credible or trustworthy by the retailer. For example, a shopper's past shopping behavior may indicate whether the shopper is a trusted shopper (e.g., whether the shopper is credible or trustworthy). A trusted shopper as used in this disclosure may be determined based on information in the customer profile that indicates, for example, that shopper (e.g., 2112, 2114, 2116, etc.) has previously informed the retail store 105 regarding incorrect product interactions (e.g., when the shopper has received an incorrect pay-by-weight product). As another example, a trusted shopper may be determined based on information in the customer profile indicating that (e.g., 2112, 2114, 2116, etc.) has previously informed retail store 105 regarding errors in the price of products previously purchased by the shopper (e.g., when the shopper has been charged an erroneously lower price for a product). Other criteria to determine whether a shopper is a trusted shopper may include determining whether the shopper has paid for purchased products on time, and/or whether the shopper has a good credit history, etc. It is to be understood that these criteria for defining a trusted shopper are exemplary and nonlimiting and that many these or other criteria may be used individually or in any combination to define a trusted shopper.

Processing device 202 may be configured to determine a credibility indicator associated with a shopper (e.g., 2112, 2114, 2116, etc.) based on, for example, the customer profile discussed above. By way of example, processing device 202 may assign a relatively high credibility indicator (e.g., greater than or equal to 75%) when the shopper (e.g., 2112, 2114, 2116, etc.) is deemed to be a trusted shopper. In some embodiments processing device 202 may assign a relatively high credibility indicator (e.g., greater than or equal to 75%) when the shopper (e.g., 2112, 2114, 2116, etc.) is a returning customer, that is, when the information in a customer profile associated with shopper (e.g., 2112, 2114, 2116, etc.) indicates that the shopper has previously shopped at a particular retail store (e.g., 105C). In contrast, processing device 202 may assign a relatively lower credibility indicator (e.g., 30% or less) to a shopper that is not a trusted shopper or for example to a first-time shopper. It is contemplated that processing device 202 may forego transmitting notifications to a shopper (e.g., 2112, 2114, 2116, etc.), having a low credibility indicator. For example, a shopper having a low credibility indicator may suggest that any additional information provided by that particular shopper may not be trustworthy. Accordingly, processing device 202 may be configured to forego transmitting the notification, requesting additional information, to a shopper having a low credibility indicator.

In some embodiments, the at least one of the plurality of shoppers may be selected from the plurality of shoppers based on a plurality of credibility indicators associated with the plurality of shoppers. As discussed above, processing device 202 may be configured to assign credibility indicators to the one or more shoppers (e.g., 2112, 2114, 2116, etc.) who may be involved in one or more pay-by-weight product interactions. Processing device 202 may select a shopper from the plurality of shoppers based on the credibility indicator, and may provide a notification to the selected shopper, requesting additional information. For example, processing device 202 may have assigned shopper 2112 and shopper 2114 credibility indicators of 40% and 70%, respectively. Although both credibility indicators may be less than a threshold credibility indicator value (e.g., 90%), processing device 202 may select shopper 2114 having a higher credibility indicator for providing additional information that may help to associate a pay-by-weight product (e.g., 2142) with that particular shopper 2114. It is to be understood that the numerical values of 30%, 40%, 70% 75%, 90% etc., discussed above are exemplary and nonlimiting and other credibility indicator values may be used. It is also to be understood that in some embodiments the credibility indicator may instead take textual values (e.g., low, medium, high).

In some embodiments, the method may include updating a virtual shopping cart of the particular shopper among the plurality of shoppers with the at least one pay-by-weight product involved with the selected product interaction. As discussed above, processing device 202 may perform analysis of the image data obtained by the one or more image sensor 310, request supplemental information from store associate 2102, and/or request additional information from the one or more shoppers (e.g., 2112, 2114, 2116, etc.) to identify a shopper and/or a pay-by-weight product associated with a product interaction, and to associate the identified shopper and the identified pay-by-weight product. Processing device 202 may also be configured to update a virtual shopping cart associated with the identified shopper (e.g., 2112, 2114, 2116, etc.). For example, processing device 202 may be configured to add the identified pay-by-weight product to a list of products purchased by the identified shopper based on the analysis of the one or more images, supplemental information from source associate 2102, and/or additional information obtained from one or more shoppers (e.g., 2112, 2114, 2116, etc.). Items in the virtual shopping cart may be used by processing device 202 to, for example, automatically withdraw payment from a debit or credit account of an associated shopper or, for example, to issue an invoice an associated shopper for the purchased products.

Figure 23:
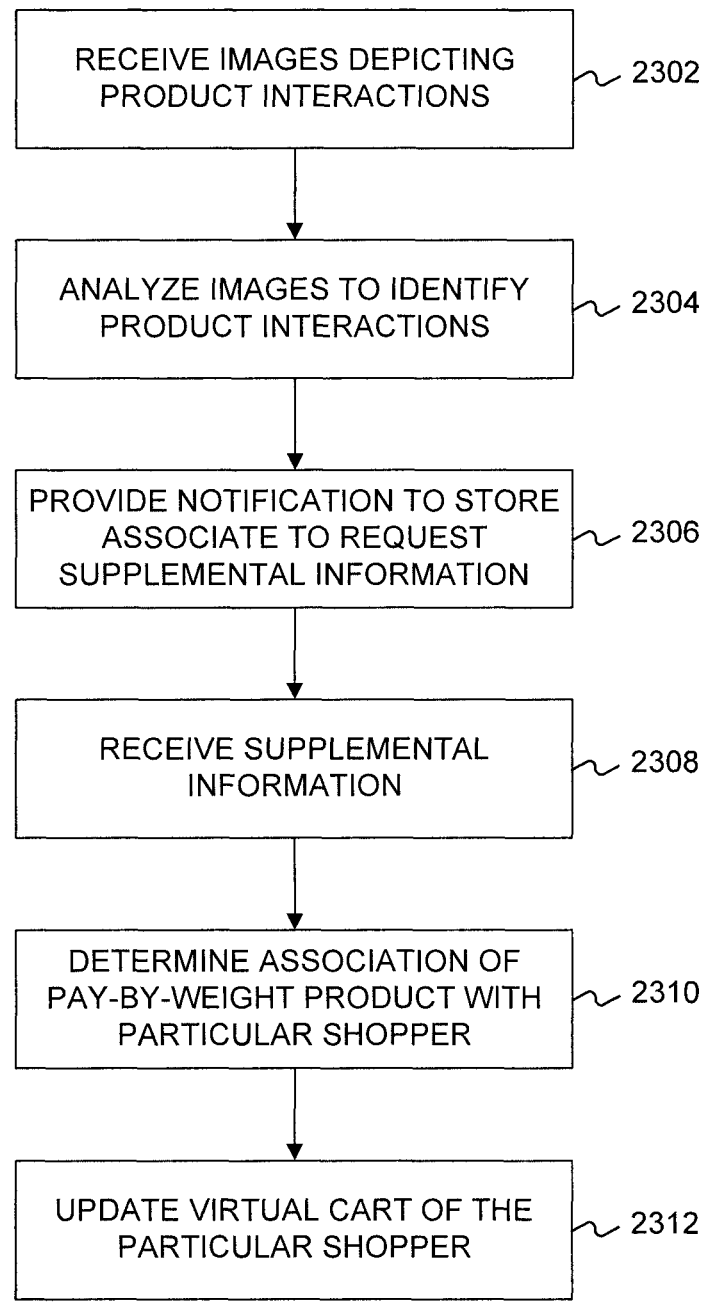
FIG. 23 illustrates an exemplary method for updating virtual shopping carts of shoppers with pay-by-weight products, consistent with the present disclosure.

FIG. 23 is a flowchart showing an exemplary process 2300 for updating virtual shopping carts of shoppers with pay-by-weight products. Process 2300 may be performed by one or more processing devices associated with server 135, such as processing device 202.

In step 2302, process 2300 may include receiving one or more images captured by one or more image sensors, wherein the one or more images may depict product interactions between a store associate and a plurality of shoppers, wherein each of the product interactions may involve at least one pay-by-weight product. For example, as discussed above, a retail store (e.g., 105A, 105B, 105C, etc., see FIG. 1) may include one or more capturing devices 125 configured to capture one or more images. One or more of capturing devices 125 may include one or more image sensors 310 that may be configured to capture images of one or more persons (e.g., shoppers, store associates, etc.), one or more pay-by-weight products (e.g., 2122, 2124, 2126, 2142, 2144, 2146, etc.), and/or other objects (e.g., shopping carts, checkout counters, walls, columns, poles, aisles, pathways between aisles), etc. The images may be in the form of image data, which may include, for example, pixel data streams, digital images, digital video streams, data derived from captured images, etc.

In step 2304, process 2300 may include analyzing the image data to identify at least one shopper at one or more locations of the retail store. For example, processing device 202 may analyze the image data obtained by the one or more image sensors 310 to identify one or more persons or objects in the image data. It is contemplated that processing device 202 may use any suitable image analysis technique, for example, including one or more of object recognition, object detection, image segmentation, feature extraction, optical character recognition (OCR), object-based image analysis, shape region techniques, edge detection techniques, pixel-based detection, artificial neural networks, convolutional neural networks, etc., to identify one or more persons or objects in the image data. It is further contemplated that processing device 202 may access one or more databases 140 to retrieve one or more reference images of likenesses of one or more persons. Further, processing device 202 may use one or more of the image analysis techniques discussed above to compare the images retrieved from database 140 with the image data received from the one or more image sensors 310 to recognize the likeness of one or more shoppers (e.g., 2112, 2114, 2116, etc.) or to recognize one or more pay-by-weight products (e.g., 2122, 2124, 2126, 2142, 2144, 2146, etc.) in the image data. It is also contemplated that processing device 202 may retrieve other identifying information (e.g., name, customers ID, account number, telephone number, etc.) associated with the images retrieved from database 140 based on, for example, profiles of the one or more shoppers (e.g., 2112, 2114, 2116, etc.) stored in database 140. It is further contemplated that processing device 202 may retrieve information (e.g., product id, price, brand name, etc.) about the one or more pay-by-weight products.

Additionally or alternatively, in step 2304, process 2300 may include analyzing one or more images, such as the one or more images received by step 2302, to identify the product interactions and/or to associate the at least one pay-by-weight product involved with each product interaction with a particular shopper among the plurality of shoppers. In some examples, step 2304 may analyze the one or more images to determine positions of hands of shoppers and of different pay-by-weight products. A particular product interaction, as well as a particular shopper and a particular pay-by-weight product corresponding to the product interaction, may be identified (among a plurality of shoppers and among a plurality of pay-by-weight products, respectively) based on proximity between the position of the hand of the particular shopper and the particular pay-by-weight product. In some examples, a convolution of at least a part of at least one image of the one or more images may be calculated, in response to a first value of the calculated convolution, an interaction of a first shopper with a particular pay-by-weight product may be identified, and in response to a second value of the calculated convolution, an interaction of a second shopper with the particular pay-by-weight product may be identified, the second shopper may differ from the first shopper. In some examples, a convolution of at least a part of at least one image of the one or more images may be calculated, in response to a first value of the calculated convolution, an interaction of a particular shopper with a first pay-by-weight product may be identified, and in response to a second value of the calculated convolution, an interaction of the particular shopper with a second pay-by-weight product may be identified, the second pay-by-weight product may differ from the first pay-by-weight product. In some examples, the shopper may be identified by analyzing the one or more images using visual person detection algorithms. In some examples, the one or more images may be analyzed using a visual action recognition algorithm to determine whether the shopper interacts with the pay-by-weight product or only being (or appearing to be) in the proximity of the pay-by-weight product.

In step 2306, process 2300 may include providing a notification to the store associate requesting supplemental information to assist in the association of the at least one pay-by-weight product involved with a selected product interaction with the particular shopper among the plurality of shoppers. For example, in some instances, processing device 202 may not be able to identify either the shopper or the pay-by-weight product, or both because of the quality of the image data. For example, in some instances images obtained by the one or more sensors 310 may be too dark because of insufficient light or the image may be too blurry. As a result, processing device 202 may not be able to identify shopper (e.g., 2114) and/or pay-by-weight product (e.g., 2142) being given to shopper 2114 by store associate 2102. As another example, portions of an image of shopper 2114 and/or pay-by-weight product 2142 may be occluded by another shopper (e.g., 2116), and/or another object. By way of another example, an image of product (e.g., 2122, 2124, 2126, 2142, 2144, 2146, etc.) may be blurry or out of focus making it difficult to read a label on the product using optical character recognition techniques. As a result, processing device 202 may not be able to identify shopper (e.g., 2112, 2114, 2116, etc.) and/or pay-by-weight product (e.g., 2122, 2124, 2126, 2142, 2144, 2146, etc.) based on analysis of the images, and/or processing device 202 may not be able to determine whether, for example, product 2142 was given to shopper 2114 or 2116. In such situations, processing device 202 may provide a notification to store associate 2102, requesting supplemental information that may assist processing device 202 in identifying, for example, which of shopper 2114 or 2116 may have received product 2142. Processing device 202 may also be able to use the supplemental information to associate product (e.g., 2142) with shopper (e.g., 2114).

In step 2308, process 2300 may include receiving the requested supplemental information from the store associate. For example, when store associate 2102 receives a notification from processing device 202, store associate 2102 may identify a shopper (e.g., 2112, 2114, 2116, etc.) and/or pay-by-weight product (e.g., 2122, 2124, 2126, 2142, 2146, 2148, etc.). As discussed above, store associate 2102 may do so by using one or more gestures and/or by making a selection on computing device 2210 associated with store associate 2102. As one example, store associate 2102 may point to one of the shoppers (e.g., point to shopper 2114 out of shoppers 2114 and 2116). Processing device 202 may detect the pointing gesture based on an analysis of the one or more images captured by image sensors 310. Processing device 202 may receive the supplemental information in the form of the detected gesture. By way of another example, store associate 2102 may select one of the plurality of images of shoppers (e.g., 2202) displayed on computing device 2210 associated with store associate 2102 to identify the shopper that may have received a pay-by-weight product. Processing device 202 may receive a signal from computing device 2210, identifying the shopper selected by store associate 2102 (e.g., supplemental information).

In step 2310, process 2300 may include determining the association of the at least one pay-by-weight product involved with the selected product interaction with the particular shopper among the plurality of shoppers, using the analysis of the one or more images and the requested supplemental information. As discussed above, one or more product interactions may be ambiguous because, for example, processing device 202 may be unable to identify a shopper (e.g., 2112, 2114, 2116, etc.) and/or pay-by-weight product (e.g., 2122, 2124, 2126, 2142, 2146, 2148, etc.) associated with a particular product interaction. In such cases, processing device 202 may receive supplemental information from store associate 2102 as discussed above. Processing device 202 may be configured to use both the image analysis of the image data obtained from the one or more sensors 310 and the supplemental information provided by store associate 2102 to identify the shopper and/or the product associated with a particular product interaction. Processing device 202 may also be configured to associate a shopper (e.g., 2114) with a pay by weight product (e.g., 2142) based on a combination of the analysis of the one or more images and the supplemental information provided by store associate 2102. In some examples, the analysis of the one or more images by step 2304 may fail to identify the product interactions and/or to associate the at least one pay-by-weight product involved with each product interaction with a particular shopper among the plurality of shoppers or may fail to do so at a sufficient confidence level. The requested supplemental information may be used to overcome the failure to identify or to increase the confidence of the identification to a sufficient confidence level. For example, the failure may be due to an ambiguity among two or more shoppers based on the analysis of the one or more image alone, and the requested supplemental information may be used to resolve the ambiguity and decide on a particular shopper of the two or more shoppers. In another example, the failure may be due to ambiguity among two or more pay-by-weight products based on the analysis of the one or more image alone, and the requested supplemental information may be used to resolve the ambiguity and decide on a particular pay-by-weight product of the two or more pay-by-weight products. In yet another example, the failure may be due to inability to determine whether a particular product interaction occurred or not based on the analysis of the one or more image alone, and the requested supplemental information may be used to determine whether the particular product interaction occurred or not.

In step 2312, process 2300 may include updating a virtual shopping cart of the particular shopper among the plurality of shoppers with the at least one pay-by-weight product involved with the selected product interaction. As discussed above, processing device 202 may perform analysis of the image data obtained by the one or more image sensor 310, request supplemental information from store associate 2102, and/or request additional information from the one or more shoppers (e.g., 2112, 2114, 2116, etc.) to identify a shopper and/or a pay-by-weight product associated with a product interaction, and to associate the identified shopper and the identified pay-by-weight product. Processing device 202 may also be configured to update a virtual shopping cart associated with the identified shopper (e.g., 2112, 2114, 2116, etc.). For example, processing device 202 may be configured to add the identified pay-by-weight product to a list of products purchased by the identified shopper based on the analysis of the one or more images, supplemental information from source associate 2102, and/or additional information obtained from one or more shoppers (e.g., 2112, 2114, 2116, etc.). Items in the virtual shopping cart may be used by processing device 202 to, for example, automatically withdraw payment from a debit or credit account of an associated shopper or, for example, to issue an invoice an associated shopper for the purchased products.

Providing a frictionless experience when products are stored in bulk product packages (e.g., shelf-ready boxes or other packages) is challenging. One source of difficulty is that cameras may be unable to adequately image regions within or near the bulk packages. As a result, a system solely relying on cameras to capture interactions between a shopper and products may have difficulty assessing how many items a particular shopper removes from a particular bulk package. For example, a camera may have captured images showing that a shopper picked one or more products from a bulk package disposed on a shelving unit. However, due to the relative position between the shopper, the bulk package, and the camera, a part of the shopper may have blocked the bulk package in the images captured by the camera, such that it may be difficult to assess the number of products picked by the shopper solely based on the captured images. For another example, while the captured images may have sufficient resolutions to enable the assessment of the number of large products (e.g., a pack of toilet paper), the resolutions may be insufficient for assessing the number of smaller products (e.g., deodorant packages). As still another example, while some captured images may show that a shopper's hand moves closer to, or even touches, a product, it may be difficult to determine whether the shopper has picked a product or placed a product back to the bulk package solely based on the captured images. To address this issue, an embodiment of the present disclosure uses a combination of different types of sensors (e.g., cameras, weight sensors, pressure sensors, etc.) to facilitate frictionless checkout of products that are stored in bulk packages. For example, images captured from a camera may be used to identify a bulk package with which the shopper interacts (which can enable determination of a product type), and a weight sensor can be used to determine the number of products removed from the identified bulk packaging.

As noted generally above, a retail environment may provide a frictionless checkout experience. As used herein, a frictionless checkout refers to any checkout process for a retail environment with at least one aspect intended to expedite, simplify, or otherwise improve an experience for customers. In some embodiments, a frictionless checkout may reduce or eliminate the need to take inventory of products being purchased by the customer at checkout. For example, this may include tracking the selection of products made by the shopper so that they are already identified at the time of checkout. The tracking of products may occur through the implementation of sensors used to track movement of the shopper and/or products within the retail environment, as described throughout the present disclosure. Additionally or alternatively, a frictionless checkout may include an expedited or simplified payment procedure. For example, if a retail store has access to payment information associated with a shopper, the payment information may be used automatically or upon selection and/or confirmation of the payment information by the user. In some embodiments, a frictionless checkout may involve some interaction between the user and a store associate or checkout device or terminal. In other embodiments, the frictionless checkout may not involve any interaction. For example, the shopper may walk out of the store with the selected products and a payment transaction may occur automatically. While the term "frictionless" is used for purposes of simplicity, it is to be understood that this encompasses semi-frictionless checkouts as well. Accordingly, various types of checkout experiences may be considered "frictionless," and the present disclosure is not limited to any particular form or degree of frictionless checkout.

Figure 24:
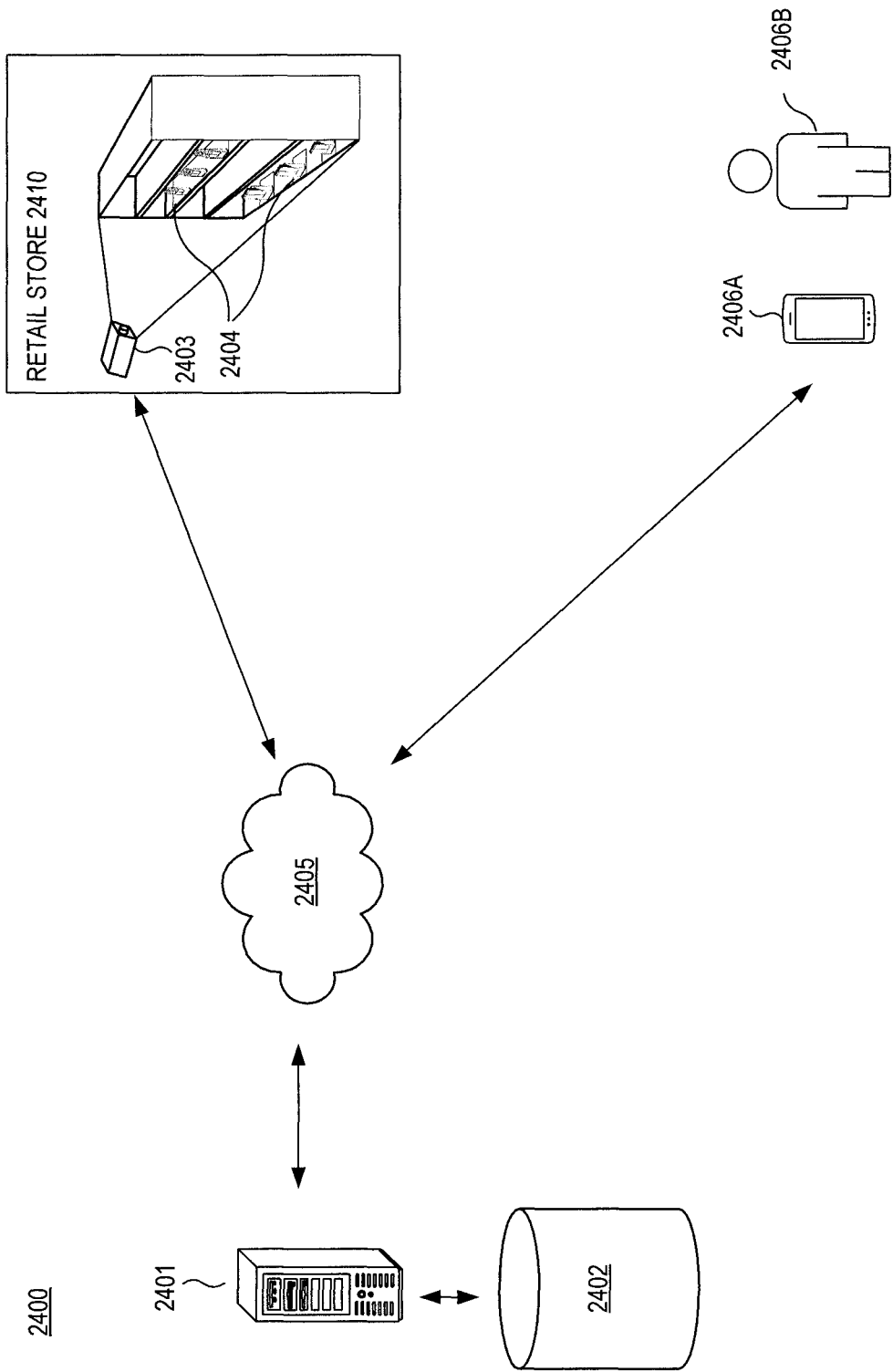
FIG. 24 is an illustration of an exemplary system for identifying products removed from bulk packaging, consistent with embodiments of the present disclosure.

FIG. 24 is an illustration of an exemplary system 2400 for identifying products removed from bulk packaging, consistent with some embodiments of the present disclosure. As illustrated in FIG. 24, system 2400 may include a server 2401, a database 2402, a plurality of cameras 2403 and a plurality of sensors 2404 in a retail store 2410, a network 2405, and a personal device 2406A associated with a shopper 2406B in the retail store 2410. Retail store 2410 may include one or more shelving units, on which bulk packages are disposed. Each bulk package may contain one or more products.

In the embodiment illustrated in FIG. 24, server 2401 may be a cloud-based server that communicates with sensors 2404 and personal device 2406A via the network 2405. In some other embodiments, server 2401 may be part of a system associated with the retail store 2401 that communicates with sensors 2404 using a wireless local area network (WLAN).

Server 2401 may be coupled to one or more physical or virtual storage devices such as database 2402. Database 2402 may store information related to various products in retail store 2410, as well information related to various shoppers in retail store 2410. The information may be accessed by server 2401 to identify products and quantity changes related to the identified products.

Cameras 2403 may be disposed in various locations in retail store 2410 to capture static or moving images of various locations in retail store 2410. Cameras 2403 may transmit the captured images to server 2401 via network 2405. Server 2401 may execute an image analysis process to identify shoppers as well as products and/or bulk packages in the captured images, and interactions between the shoppers and the products and/or bulk packages. For example, when server 2401 detects, based on the captured images, that a distance between a shopper, or a part of the shopper (e.g., a hand), and a product or a bulk package is less than a predetermined threshold, server 2401 may determine that the shopper has interacted with the product or the bulk package. The interactions between the shopper and the products or bulk packages may include, for example, a shopper picking up a product from a bulk package and placing the picked product 2530 in a shopping cart or basket, picking up a product from a bulk package and carrying the picked product away, or picking up a product from a bulk package and then placing the picked product back inside the bulk package, etc.

Sensors 2404 may comprise various types of sensors disposed in various locations in retail store 2410 for measuring one or more parameters of the products disposed in retail store 2410. For example, sensors 2404 may comprise detection elements 801A and 801B described with reference to FIGS. 8A and 8B.

In some embodiments, sensors 2404 may comprise one or more spatial sensors arranged to capture interactions between shopper 2406B and one or more bulk packages each configured to contain a plurality of products. For example, the spatial sensors may comprise light detection and ranging (LIDAR) sensors, motion sensors, image sensors, radio-frequency identification (RFID) readers, piezoresistive sensors, light sensors, radio detection and ranging (RADAR) sensors, acoustic sensors, and more.

In some embodiments, sensors 2404 may comprise one or more sensors configured to monitor changes associated with the bulk packages, such as addition or removal of one or more products in the bulk packages. For example, sensors 2404 may comprise a weight sensor (e.g., a weight sensitive pad) configured to monitor changes in a weight of a bulk package, or a pressure sensor.

Personal device 2406A may communicate with server 2401 to present information derived by server 2401 based on processing of image data acquired by cameras 2403 and sensing data acquired by sensors 2404. For example, personal device 2406A may present a virtual shopping cart, which may include a list of products that has been removed by shopper 2406B from the store shelf and a number of these products. An example of the virtual shopping cart presented in personal device 2406A may be illustrated in FIG. 11E. Personal device 2406A may be all possible types of devices capable of outputting a virtual shopping cart managed by server 2401 to shopper 2406B, such as a mobile device, a tablet, a personal digital assistant (PDA), etc.

Figure 25A:
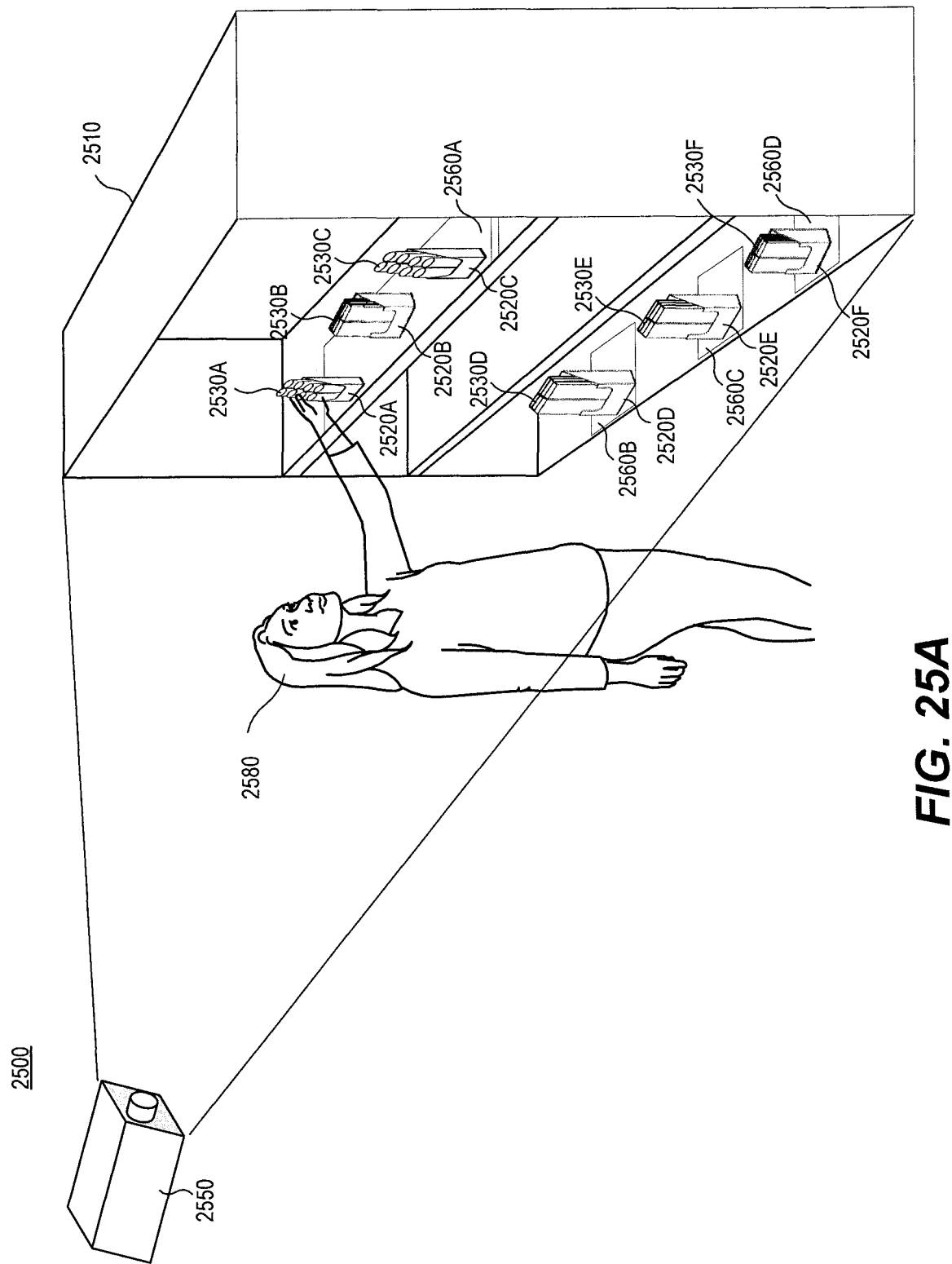
FIG. 25A is a schematic illustration of an example configuration of a retail store, consistent with embodiments of the present disclosure.
Figure 25B:
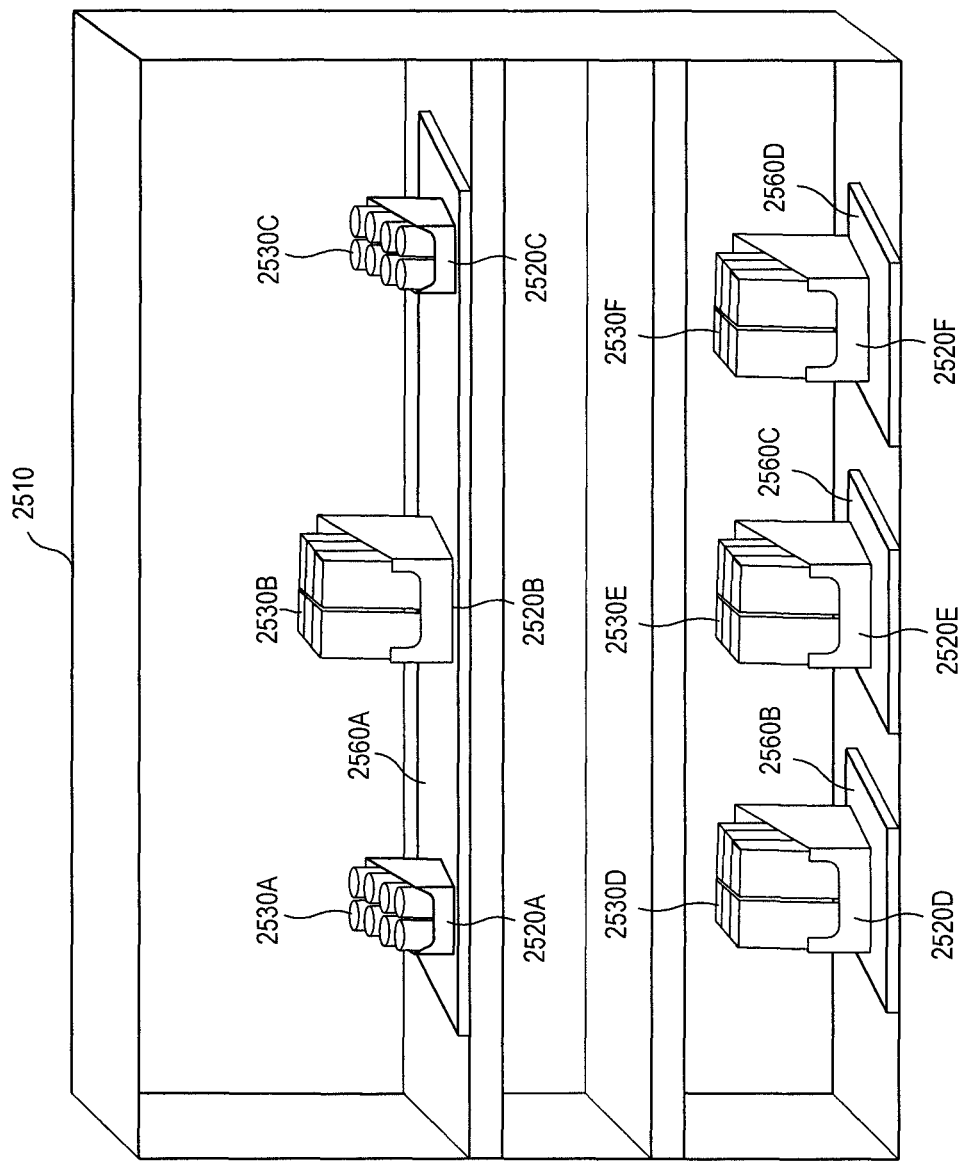
FIG. 25B is a schematic illustration of a front view of a shelving unit in a retail store, consistent with embodiments of the present disclosure.

FIG. 25A is a schematic illustration of an example configuration of retail store 2500, consistent with the embodiments of the present disclosure. FIG. 25B is a schematic illustration of a front view of a shelving unit 2510 in retail store 2500, consistent with the embodiments of the present disclosure.

As shown in FIGS. 25A and 25B, retail store 2500 may include shelving unit 2510 on which a plurality of bulk packages 2520A, 2520B, 2520C, 2520D, 2520E, 2520F (collectively referred to as "bulk packages 2520") are disposed. Each of bulk packages 2520 may respectively contain a plurality of products 2530A, 2530B, 2530C, 2530D, 2530E, 2530F (collectively referred to as "products 2530"). In some embodiments, bulk packages 2520 may include shelf-ready packages configured to hold a plurality of products 2530 each weighing less than 1 kg.

Retail store 2500 may also include one or more camera 2550 configured to capture image data, and one or more sensors 2560A, 2560B, 2560C, 2560D (collectively referred to as "sensors 2560") configured to monitor changes associated with bulk packages 2520. Camera 2550 and sensors 2560 may be transmit captured images and sensing data to a server (such as server 2401 illustrated in FIG. 24) via a network (such as network 2405 illustrated in FIG. 24).

Camera 2550 may be arranged to capture images showing interactions between a shopper 2580 and one or more bulk packages 2520. For example, as shown in FIG. 25A, camera 2550 may capture an image showing an interaction between shopper 2580 and bulk package 2520A arranged on a left side of an upper shelf of shelving unit 2510. The interaction shown in the captured image may indicate that a hand of shopper 2580 is adjacent to, or touches, bulk package 2520A or one or more products 2530A contained in bulk package 2520A. In some embodiments, the image alone may be insufficient for determining whether products were removed from the particular bulk package 2520A, or the quantity of products removed from bulk package 2520A.

Sensors 2560 may be configured to monitor changes associated with the one or more bulk packages 2520. In some embodiments, sensors 2560 may include one or more weight sensors configured to monitor changes in the weight of bulk packages 2520. For example, as shown in FIGS. 25A and 25B, weight sensor 2560A is disposed under bulk packages 2520A, 2520B, and 2520C to monitor changes in a weight of a combination of bulk packages 2520A, 2520B, and 2520C. Weight sensors 2560B, 2560C, and 2560D are respectively disposed under bulk packages 2520D, 2520E, and 2520F to monitor respective weight changes in bulk packages 2520D, 2520E, and 2520F. In some other embodiments, sensors 2560 may include other types of sensors. For example, sensors 2560 may include one or more pressure sensors configured to be located such that one or more bulk packages 2520 may apply detectable pressure on the pressure sensors.

In some embodiments, the output from sensor 2560 alone may be insufficient for determining whether products were removed from a particular bulk package. For example, as shown in FIG. 25B, a product 2530A in bulk package 2520A and a product 2530C in bulk package 2530A may have the same weight. Therefore, when a product is removed from bulk package 2520A or bulk package 2520C, the output from weight sensor 2560A may indicate that the combined weight of bulk packages 2520A, 2520B, and 2520C is reduced by one product 2530A or 2530C. However, the output from weight sensor 2560A may be insufficient for determining whether the product is removed from bulk package 2520A or bulk package 2520C. Thus, according to embodiments of the present disclosure, the output from different types of sensors may be used to determine the types and quantities of products being removed, thus facilitating frictionless checkout.

Figure 26A:
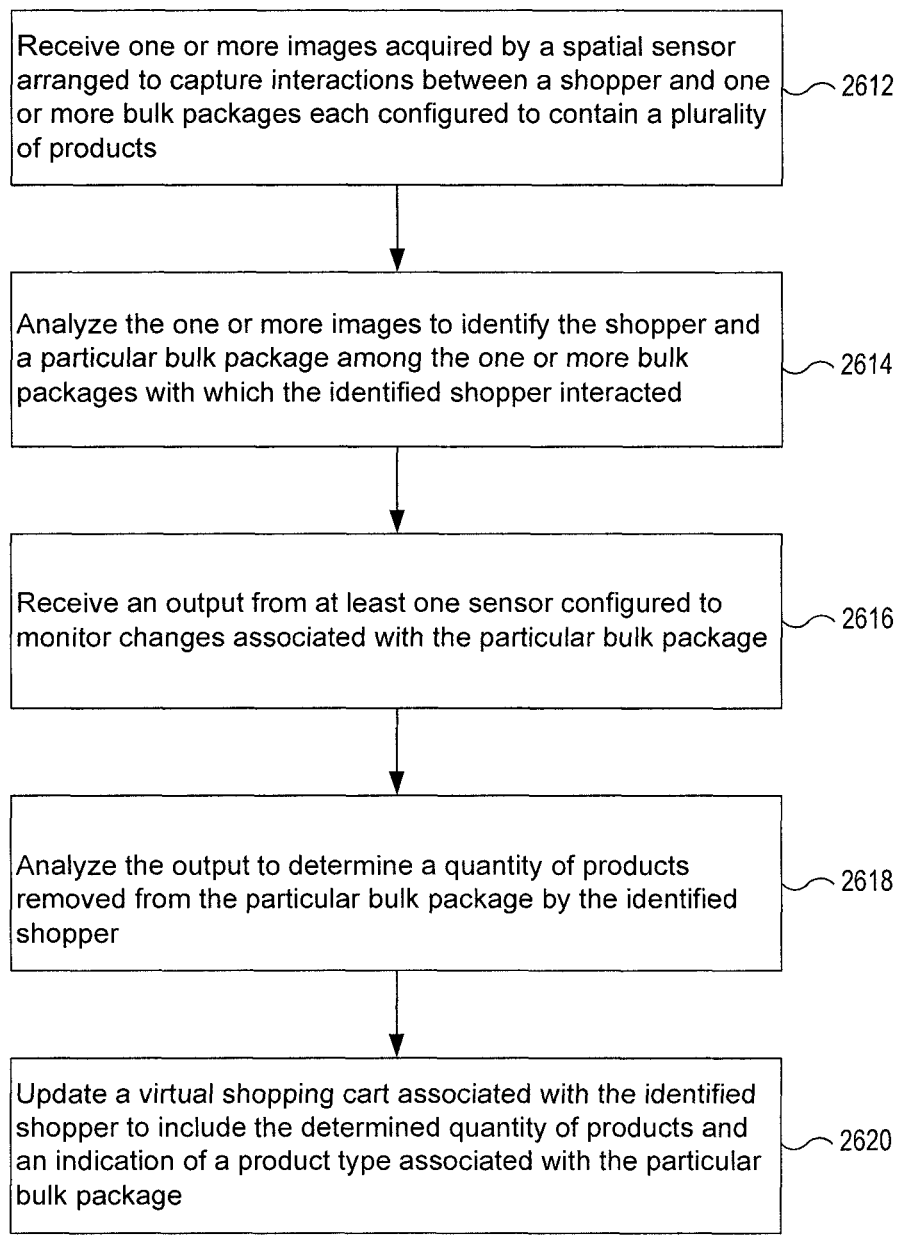
FIG. 26A includes a flowchart representing an exemplary method for identifying products removed from bulk packaging, consistent with an embodiment of the present disclosure.

FIG. 26A includes a flowchart representing an exemplary method 2600 for identifying products removed from bulk packaging, consistent with an embodiment of the present disclosure. Method 2600 may be performed by a processor at a server (e.g., server 135 or 2401) or a computer (e.g., one of devices 145A, 145B, 145C, and 145D). For purposes of illustration, in the following description, reference is made to certain components of images shown in FIGS. 24, 25A, and 25B. It will be appreciated, however, that other implementations are possible and that other configurations may be used to implement method 2600. It will also be readily appreciated that the illustrated method can be altered to modify the order of steps, delete steps, or further include additional steps.

For example, method 2600 may be performed by at least one processing device of a server, such as processing device 302, as described above. In some embodiments, some or all of method 2600 may be performed by a different device associated with system 100. In some embodiments, a non-transitory computer readable medium may contain instructions that when executed by a processor cause the processor to perform method 2600. Further, method 2600 is not necessarily limited to the steps shown in FIG. 26A, and any steps or processes of the various embodiments described throughout the present disclosure may also be included in method 2600.

At step 2612, the processor at the server or the computer may receive one or more images acquired by a camera arranged to capture interactions between a shopper and one or more bulk packages each configured to contain a plurality of products. For example, as shown in FIG. 25A, the processor may receive one or more images acquired by camera 2550 arranged to capture interactions between shopper 2580 and bulk packages 2520 disposed on shelving unit 2510. Each bulk package 2520 may include a plurality of products 2530. The interactions between shopper 2580 and bulk packages 2520 may include, for example, shopper 2580 picking up a product 2530 from a bulk package 2520 and placing the picked product 2530 in a shopping cart or basket, picking up a product 2530 from a bulk package 2520 and carrying the picked product 2530 away from shelving unit 2510, or picking up a product 2530 from a bulk package 2520 and then placing the picked product 2530 back inside bulk package 2520, etc.

At step 2614, the processor may analyze the one or more images to identify the shopper and a particular bulk package among the one or more bulk packages with which the identified shopper interacted. For example, as shown in FIG. 25A, the processor may analyze one or more images acquired by camera 2550. As a result of the analysis, the processor may determine an identity of shopper 2580 and bulk package 2520A with which shopper 2580 interacted. In the embodiment illustrated in FIG. 26, the one or more images alone may be insufficient for the processor to determine whether products 2530A were removed from bulk package 2520A. In some examples, step 2614 may analyze the one or more images to determine positions of a hand of customer 2580 and of the different bulk packages 2520, and the particular bulk package may be identified among the one or more bulk packages based on proximity between the position of the hand of customer 2580 and the particular bulk package. In some examples, a convolution of at least a part of at least one image of the one or more images may be calculated, in response to a first value of the calculated convolution, an interaction of the shopper with a first bulk package among the one or more bulk packages may be identified, and in response to a second value of the calculated convolution, an interaction of the shopper with a second bulk package among the one or more bulk packages may be identified, the second bulk package may differ from the first bulk package. In some examples, the shopper may be identified by analyzing the one or more images using visual person detection algorithms. In some examples, the one or more images may be analyzed using a visual action recognition algorithm to determine whether the shopper interacts with the particular bulk package or only being (or appearing to be) in the proximity of the particular bulk package.

In some embodiments, the processor may analyze the one or more images captured by the camera to determine a product type associated with the particular bulk package. For example, the processor may determine the product type from a logo displayed on the particular bulk package, from textual information displayed on the particular bulk package, and from a label disposed on the shelving unit next to the particular bulk package. In some examples, OCR algorithms may be used to analyze the one or more images and identify text appearing on the particular bulk package, and the determination of the product type associated with the particular bulk package may be based on the identified text.

At step 2616, the processor may receive an output from at least one sensor configured to monitor changes associated with the particular bulk package. For example, as shown in FIG. 25A, the processor may receive an output from sensor 2560A which is configured to monitor changes associated with bulk package 2520A. Sensor 2560A may include a weight sensor configured to monitor changes in a weight of bulk package 2520A.

At step 2618, the processor may analyze the output from the at least one sensor to determine a quantity of products removed from the particular bulk package by the identified shopper. The at least one sensor may include a pressure sensor or a weight sensor. The at least one sensor may be disposed on a retail shelf and may be disposed under the particular bulk package. For example, as shown in FIGS. 25A and 25B, the processor may analyze the output from weight sensor 2560A. As a result of the analysis, the processor may determine a quantity of products 2530A removed from bulk package 2520A by shopper 2580. In the embodiment illustrated in FIGS. 25A and 25B, because weight sensor 2560 extends under all of bulk packages 2520A, 2520B, and 2525C and thus monitors changes of a combined weight of bulk packages 2520A, 2520B, and 2525C, the output from weight sensor 2560A alone may be insufficient for the processor to determine whether products 2530A were removed from bulk package 2520A, 2520B, or 2520C or from another bulk package among the one or more bulk packages. Additionally, in the embodiment illustrated in FIGS. 25A and 25B, the output from sensor 2560A alone is insufficient for determining an identification of shopper 2580 that removes a product 2530A from bulk package 2520A.

In some embodiments, the processor may obtain, from a database (e.g., database 2402) information indicative of a first weight of a single product associated with a first bulk package among the one or more bulk packages and a second weight of a single product associated with a second bulk package among the one or more bulk packages. Then, the processor may determine a quantity of products removed from the particular bulk package based on, at least in part, on the first weight and the second weight. For example, the processor may obtain a first weight of a single product 2530A associated with bulk package 2520A, and a second weight of a single product 2530B associated with bulk package 2530B. Then, the processor may determine a quantity of products 2530A removed from bulk package 2520A based on, at least in part, on the first weight and the second weight.

At step 2620, the processor may update a virtual shopping cart associated with the identified shopper to include the determined quantity of products and an indication of a product type associated with the particular bulk package. For example, as shown in FIG. 25A, the processor may update a virtual shopping cart associated with shopper 2580 to include the determined quantity of products 2530A and an indication of a product type associated with bulk package 2520A.

In some embodiment, if the quantity of products removed from the particular bulk package cannot be conclusively determined by the processor, the processor may deliver a notification to the identified shopper that the identified shopper is not eligible for frictionless checkout. For example, the processor may deliver a notification to a personal device associated with the identified shopper.

In the embodiment illustrated in FIG. 26A, camera 2550 may be used to capture interactions between a shopper and one or more bulk packages. In some alternative embodiments, one or more spatial sensors may be used to capture interactions between a shopper and one or more bulk packages. Such an embodiment may be implemented according to FIG. 26B.

Figure 26B:
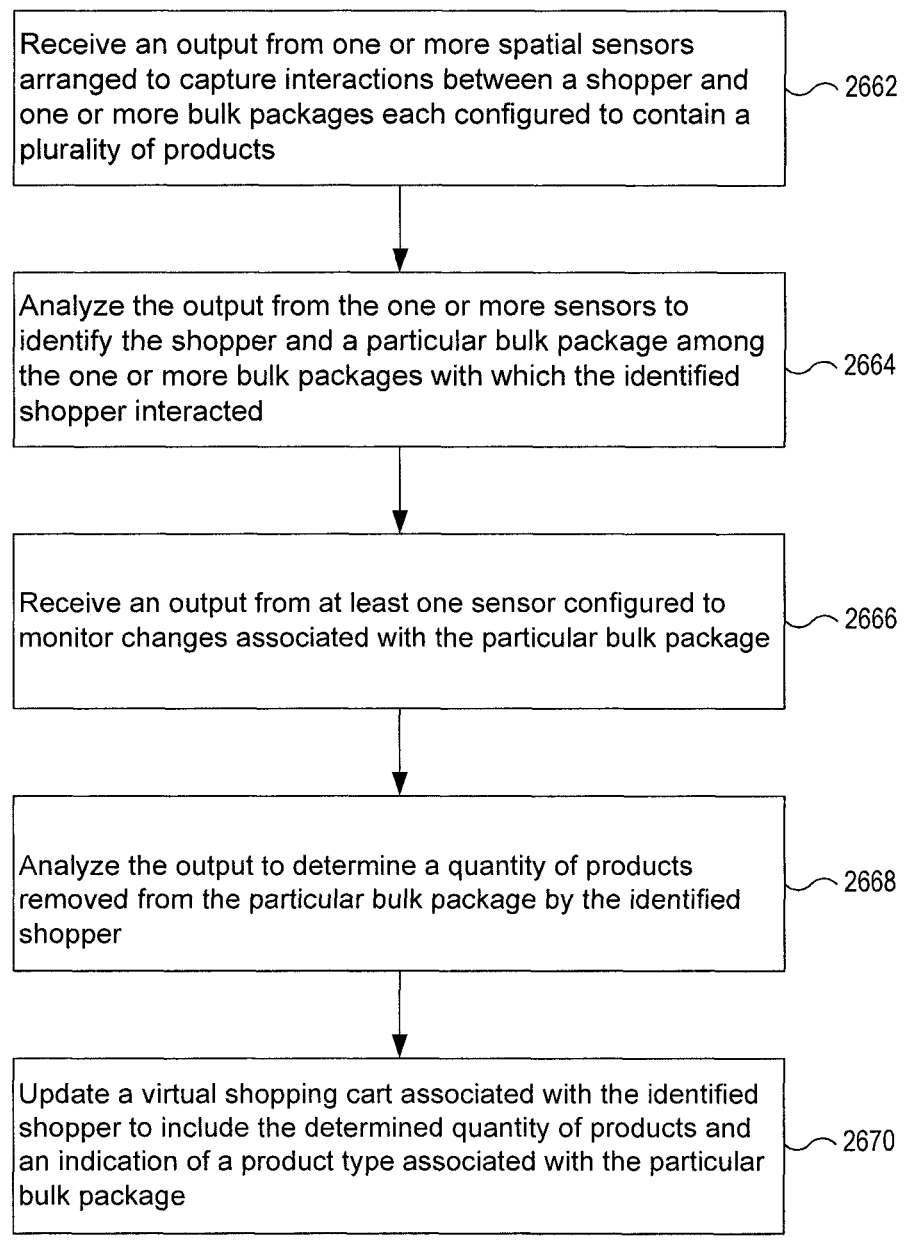
FIG. 26B includes a flowchart representing an exemplary method for identifying products removed from bulk packaging, consistent with another embodiment of the present disclosure.

FIG. 26B includes a flowchart representing an exemplary method 2650 for identifying products removed from bulk packaging, consistent with another embodiment of the present disclosure. Similar to method 2600, method 2650 may also be performed by a processor at a server (e.g., server 135 or 2401) or a computer (e.g., one of devices 145A, 145B, 145C, and 145D). It will be readily appreciated that the illustrated method can be altered to modify the order of steps, delete steps, or further include additional steps.

For example, method 2650 may be performed by at least one processing device of a server, such as processing device 302, as described above. In some embodiments, some or all of method 2650 may be performed by a different device associated with system 100. In some embodiments, a non-transitory computer readable medium may contain instructions that when executed by a processor cause the processor to perform method 2650. Further, method 2650 is not necessarily limited to the steps shown in FIG. 26B, and any steps or processes of the various embodiments described throughout the present disclosure may also be included in method 2650.

At step 2662, the processor at the server or the computer may receive an output from one or more spatial sensors arranged to capture interactions between a shopper and one or more bulk packages each configured to contain a plurality of products. The one or more sensors may include at least one of a LIDAR system, a motion sensor, a camera, an RFID reader, or a piezoresistive sensor.

At step 2664, the processor may analyze the output from the one or more spatial sensors to identify the shopper and a particular bulk package among the one or more bulk packages with which the identified shopper interacted.

At step 2666, the processor may receive an output from at least one additional sensor configured to monitor changes associated with the particular bulk package. The at least one additional sensor may include a weight sensor configured to monitor changes in a weight of the particular bulk package. Alternatively or additionally, the at least one additional sensor includes a pressure sensor.

At step 2668, the processor may analyze the output from the at least one additional sensor to determine a quantity of products removed from the particular bulk package by the identified shopper.

At step 2670, the processor may update a virtual shopping cart associated with the identified shopper to include the determined quantity of products and an indication of a product type associated with the particular bulk package.

In an ideal frictionless shopping experience, shoppers receive immediate feedback on their actions and the status of their shopping carts. For example, after detecting a product interaction (e.g., picking/returning a product from/to the shelf), a frictionless shopping system may inform the shopper that the system registered the detected product interaction. However, this real-time or near real-time feedback regarding product interactions might be used by malicious shoppers to identify blind spots of the frictionless shopping system in the retail store as part of a shoplifting strategy. In one aspect of this disclosure, the suggested frictionless system may provide less information to suspected shoppers. Specifically, system 100 may control how and what information is provided to shoppers. In another aspect of this disclosure, the suggested frictionless system may provide information at a slower rate. Specifically, system 100 may control when the information is provided to shoppers. Implementing these measures may help reduce the risk of malicious shoppers using the information provided by the system to identify and take advantage of blind spots of the frictionless shopping system.

Figure 27:
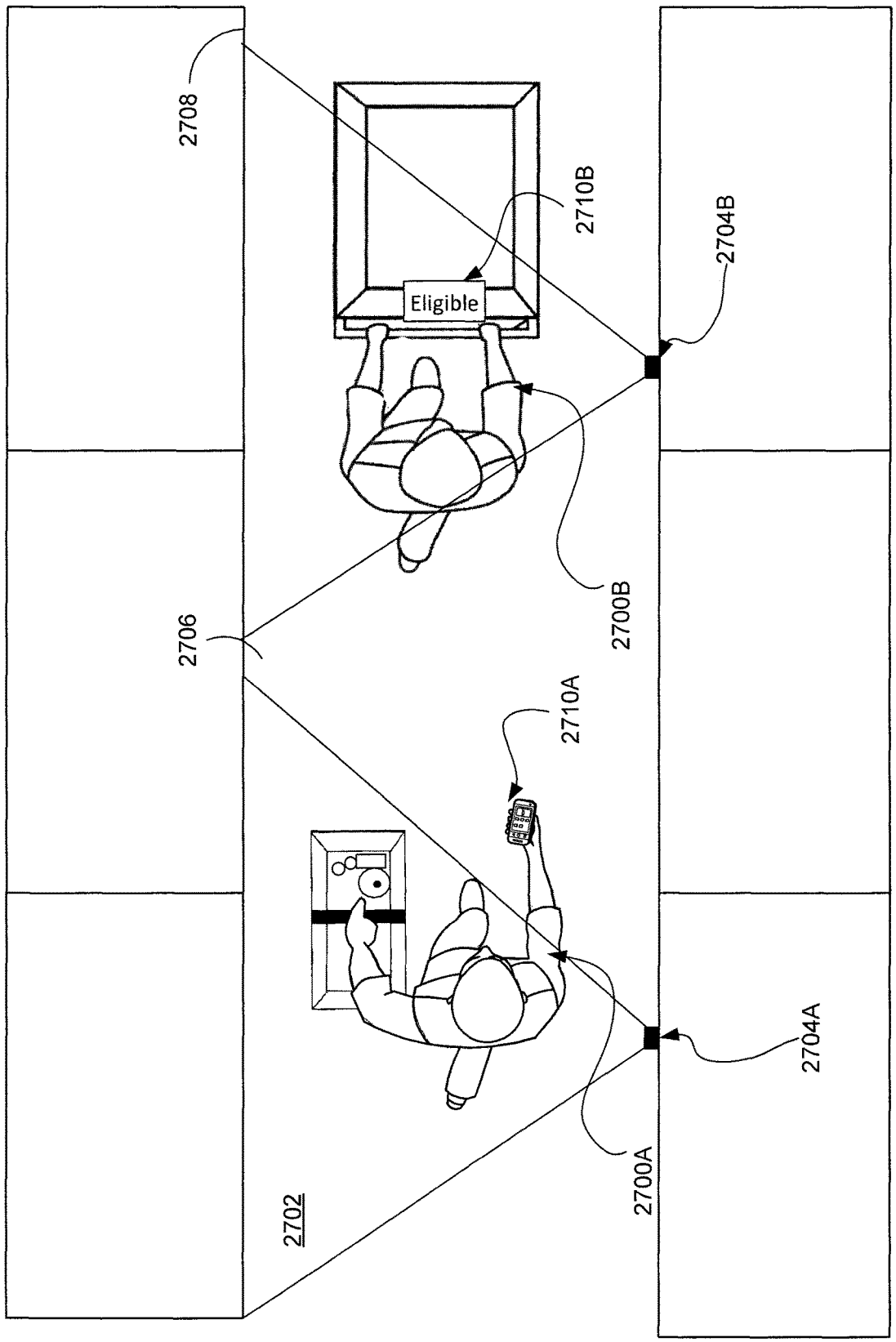
FIG. 27 is a top view representation of an aisle in a retail store with multiple image sensors deployed thereon for identifying a plurality of product interaction events of a shopper, consistent with the present disclosure.

FIG. 27 illustrates a schematic diagram of a top view of a first shopper 2700A and a second shopper 2700B (collectively referred to as shoppers 2700) walking in aisle 2702 of retail store 105. As described above with reference to FIG. 6A, a plurality of image sensors (e.g., image sensors 2704A and 2704B) may be deployed in aisle 2702 as part of a frictionless shopping system (e.g., system 100) for acquiring images to identify a plurality of product interaction events for shoppers 2700. In the illustrated example, the coverage of image sensors 2704A and 2704B may be partial due to error during installment, due to a temporary occlusion, or any other reason. Accordingly, the frictionless shopping system includes a first blind spot 2706 and a second blind spot 2708 in aisle 2702. Picking products from these spots may not be detected by the frictionless shopping system and may be used by malicious shoppers to exploit the system and steal from retail store 105.

Consistent with the present disclosure, shoppers 2700 may be provided with frictionless shopping data. The term "frictionless shopping data" or simply "shopping data" refers to any information provided to shoppers and intended to expedite, simplify, or otherwise improve the checkout process of shoppers. In some embodiments, the frictionless shopping data may indicate one or more product interactions identified by the frictionless shopping system. In other embodiments, shopping data may indicate the need to take inventory of products being purchased by the customer at checkout associated, e.g., the eligibility statuses of shoppers 2700. In yet other embodiments, the shopping data may be indicative of products currently included in virtual shopping carts associated with shoppers 2700. For example, the shopping data may include an identification of a type of product and quantity associated with a detected product interaction event. Additional examples of the shopping data provided to shoppers 2700 are described throughout the disclosure. Shoppers 2700 may be provided with the frictionless shopping data via their associated communication devices 2710 (e.g., a communication device 2710A and a communication device 2710B). In the illustrated example, communication device 2710A of first shopper 2700A is a personal communication device (e.g., smartphone). One skilled in the art would recognize that the personal communication device may include any wearable device (e.g., smart glasses, a smartwatch, a clip-on camera). Communication device 2710B of second shopper 2700B may be a smart cart with a display. The smart cart may communicate with a personal communication device of second shopper 2700B to update a virtual shopping cart associated with second shopper 2700B.

In an embodiment, the shopping data may be delivered to shoppers 2700 as push notifications. The push notifications may be issued after a determined number of product interactions have been detected, after detection of a trigger event (e.g., a detection that a shopper has entered a checkout area of retail store 105, or issued periodically while shoppers 2700 are in retail store 105 (e.g., every 1 minute, 2 minutes, 5 minutes, 10 minutes etc.). In another embodiment, the shopping data may be delivered to shoppers 2700 by way of updating an online interface accessible to shopper 2700 such at the online interface is descriptive of the status of the shopper's shopping cart. The online interface may include a webpage or an application associated with retail store 105. For example, a shopper may access his or her online shopping list and see it automatically being updated while collecting the products from shelves of retail store 105. In some cases, the virtual shopping cart of a shopper may be updated as the shopper selects products from a retail shelf (adding a product to the list) and as the shopper returns products to the retail shelf (removing the product from the list).

Figure 28:
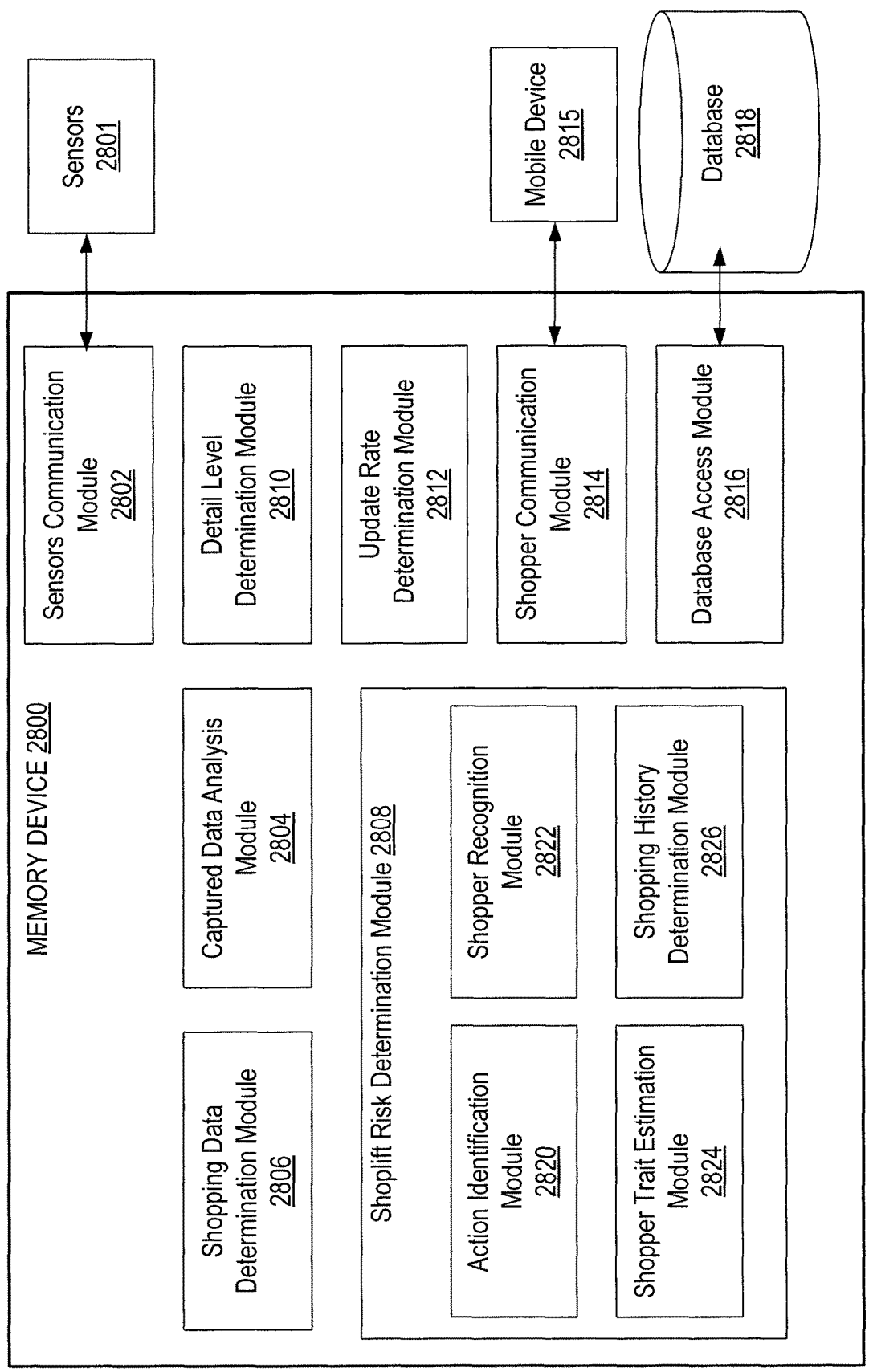
FIG. 28 is a block diagram illustrating an exemplary embodiment of a memory device containing software modules for executing methods consistent with the present disclosure.

FIG. 28 illustrates an exemplary embodiment of a memory device 2800 containing software modules consistent with the present disclosure. In particular, as shown, memory device 2800 may include a sensors communication module 2802, a captured data analysis module 2804, a shopping data determination module 2806, a shoplift risk determination module 2808, a detail level determination module 2810, an update rate determination module 2812, a shopper communication module, and a database access module 2816 in communication with database 2818. Modules 2802 to 2816 may contain software instructions for execution by at least one processor (e.g., processing device 202) associated with system 100. Sensors communication module 2802, captured data analysis module 2804, shopping data determination module 2806, shoplift risk determination module 2808, detail level determination module 2810, update rate determination module 2812, shopper communication module 2814, and database access module 2816 may cooperate to perform various operations. For example, sensors communication module 2802 may receive an data from one or more sensors in retail store 105, captured data analysis module 2804 may use the received data to detect a shopper and to identify a plurality of product interaction events for the detected shopper, shopping data determination module 2806 may determine frictionless shopping data for the shopper, shoplift risk determination module 2808 may use database 2818 to determine a likelihood that the shopper will be involved in shoplifting, detail level determination module 2810 may determine the detail level of frictionless shopping data to provide to the shopper based on the determined shoplift risk, update rate determination module 2812 may determine update rate for updating the shopper with the shopping data also based on the determined shoplift risk, and shopper communication module 2814 may cause a delivery of the determined shopping data to the shopper.

According to disclosed embodiments, memory device 2800 may be part of system 100, for example, memory device 226. Alternatively, memory device 2800 may be stored in an external database or an external storage communicatively coupled with server 135, such as one or more databases or memories accessible over communication network 150. Further, in other embodiments, the components of memory device 2800 and the various software modules may be distributed in more than one server and more than one memory device.

In some embodiments, sensors communication module 2802 may receive information from sensors 2801, located in retail store 105. In one example, sensors communication module 2802 may receive image data (e.g., images or video) captured by a plurality of image sensors fixedly mounted in retail store 105 or derived from images captured by a plurality of image sensors fixedly mounted in retail store 105. In another example, sensors communication module 2802 may receive image data (e.g., images or data derived from images) from robotic capturing devices configured to navigate autonomously within retail store 105 and to capture images of multiple types of products. In yet another example, sensors communication module 2802 may additionally receive data from one or more shelf sensors disposed on a surface of the retail shelf configured to hold one or more products placed on the retail shelf. The one or more shelf sensors may include any combination of pressure sensitive pads, touch-sensitive sensors, light detectors, weight sensors, light sensors, resistive sensors, ultrasonic sensors, and more.

In some embodiments, captured data analysis module 2804 may process the information collected by sensors communication module 2802 to detect a shopper and to identify a plurality of product interaction events for the detected shopper in retail store 105. Consistent with the present disclosure, the plurality of product interaction events may involve the shopper taking a product from a shelf or returning a product to a shelf. In one embodiment, captured data analysis module 2804 may identify the plurality of product interaction events solely based on image data, for example, image data received from a plurality of image sensors fixedly mounted in retail store 105 (e.g., as illustrated in FIG. 27). In another embodiment, captured data analysis module 2804 may identify the plurality of product interaction events using a combination of image data and data from one or more shelf sensors. For example, captured data analysis module 2804 may analyze the data received from detection elements attached to store shelves, alone or in combination with images captured in retail store 105 to detect a product interaction event.

Shopping data determination module 2806 may determine frictionless shopping data for one or more shoppers. Consistent with the present disclosure, shopping data determination module 2806 may use artificial neural networks, convolutional neural networks, machine learning models, image regression models, and other processing techniques to determine the frictionless shopping data. For example, captured data analysis module 2806 may calculate a convolution of at least part of the image data. In response to a first value of the calculated convolution, shopping data determination module 2806 may determine a first frictionless shopping data for the product interaction event and, in response to a second value of the calculated convolution, shopping data determination module 2806 may determine a second frictionless shopping data for the same product interaction event. The second frictionless shopping data may differ from the first frictionless shopping data. In some embodiments, the shopping data may be indicative of products involve with the product interactions identified by captured data analysis module 2804. For example, the first frictionless shopping data may be indicative of an item added to a virtual shopping cart associated with the shopper, and the second frictionless shopping data may be indicative of a removal of an item from the virtual shopping cart associated with the shopper. In other embodiments, the shopping data may be indicative of the frictionless checkout eligibility status of a shopper. For example, the first frictionless shopping data may indicate that the shopper is eligible for frictionless checkout and the second frictionless shopping data may indicate that the shopper is ineligible for frictionless checkout.

Shoplift risk determination module 2808 may determine the likelihood that a certain shopper will be involved in shoplifting. Consistent with the present disclosure, determining the likelihood may include determining a shoplift risk level. The term "shoplift risk level" refers to any indication, numeric or otherwise, of a level (e.g., within a predetermined range) indicative of a probability that a given shopper will attempt to shoplift. For example, the shoplift risk level may have a value between 1 and 10. Alternatively, the shoplift risk level may be expressed as a percentage or any other numerical or non-numerical indication. In some cases, the system may compare the shoplift risk level to a threshold. As mentioned above, the term "threshold" as used herein denotes a reference value, a level, a point, or a range of values. In operation, when a shoplift risk level associated with a shopper exceeds a threshold (or below it, depending on a particular use case), the system may follow a first course of action and, when the shoplift risk level is below it (or above it, depending on a particular use case), the system may follow a second course of action. The value of the threshold may be predetermined for all shoppers or may be dynamically selected based on different considerations. For example, when the shoplift risk level of a certain shopper exceeds a risk threshold, the system may use detail level determination module 2810 and update rate determination module 2812 to reduce the shopping data provided to the certain shopper.

Consistent with the present disclosure, shoplift risk determination module 2808 may determine the likelihood that the shopper will be involved in shoplifting using one or a combination of the following modules: an action identification module 2820, a shopper recognition module 2822, a shopper trait estimation module 2824, and a shopping history determination module 2826. Modules 2820-2826 may be part of shoplift risk determination module 2808 or separate from shoplift risk determination module 2808. In some embodiments, the determined shoplift risk level may be an aggregation (e.g., a weighted combination) of two or more modules. For example, shoplift risk determination module 2808 may make the determination of the shoplift risk level based on a weighted average shoplift risk level determined by at least some of modules 2820-2826. Different analyses may be assigned different weights to different modules, and the disclosed embodiments are not limited to any particular combination of analyses and weights.

Action identification module 2820 is configured to use image data from sensors 2801 to determine the likelihood that the shopper will be involved in shoplifting. Specifically, image analysis modules 2820 may detect one or more actions taken by the shopper that may be classified as suspicious and determine a corresponding shoplift risk level. In the context of this disclosure, a suspicious action includes any action that may indicate the intent or the act of theft by a shopper. The suspicious action may include any one or more of, for example, a furtive glance by the shopper, a shopper attempt to hide his/her face, a shopper attempt to hide a picked item, and the like. In one embodiment, image analysis modules 2820 may detect an avoidance action taken by the shopper to avoid at least one store associate. The detection of the avoidance action may result in a higher determined shoplift risk level than where the shopper is not detected as engaging in such avoidance action.

Shopper recognition module 2822 is configured to determine whether the shopper is a recognized shopper, e.g., a returned customer. In some cases, the determination that the shopper is a recognized shopper may result in a first determined shoplift risk level lower than a second determined shoplift risk level resulting from a determination that the shopper is not a recognized shopper. In a first embodiment, the determination of whether the shopper is a recognized shopper may be based on analysis of the received image data (e.g., from sensors 2801). For example, the determination of whether the shopper is a recognized shopper may be based on a comparison of at least a portion of the received image data to image information stored in a recognized shoppers database associated with retail store 105. In a second embodiment, the determination of whether the shopper is a recognized shopper may be based on an interaction with an electronic device associated with the shopper. For example, the electronic device may be an RFID tag (e.g., a tag associated with retail store 105) or a mobile communication device (e.g., communication device 2710A). In other examples, the electronic device may be included on a shopping basket associated with the shopper, and wherein the electronic device is configured to receive a shopper identification code from the shopper.

Shopper trait estimation module 2824 is configured to estimate a trait of a shopper based on the analysis of the image data, and to determine the likelihood that the shopper will be involved in shoplifting based, at least in part, on the estimated trait of the shopper. The estimated traits may include age, gender, income class, and more. For example, under the assumption that elderly shoppers may be less likely to try to shoplift than young shoppers, shopper trait estimation module 2824 may assign, for example, higher risk level to shoppers between certain ages (e.g., between 16 and 28 years of age) than to shoppers between other ages (e.g., between 65 and 82 years of age). Specifically, in one embodiment, a first estimated age may associated with a first determined shoplift risk level that is lower than a second determined shoplift risk level associated with a second estimated age, wherein the first estimated age is greater than the second estimated age.

Shopping history determination module 2826 is configured retrieve a shopping history associated with a particular shopper from a shopping history database (e.g., part of databases 2818), and to determine the likelihood that the shopper will be involved in shoplifting based, at least in part, on the retrieved shopping history. In one example, the shopping history retrieved from the database may include previous questionable conduct by the shopper that may result in the determination of a higher risk of shoplifting. In one embodiment, the shopping history database may store facial signatures of shoppers that previously visited retail store 105. The facial signatures may be used in identifying the shopper via the analysis of the image data and in retrieving the shopping history for the shopper from the shopping history database. In additional embodiments, the shopping history database may store a history records of returns made to the retail store by different shoppers. Thereafter, shopping history determination module 2826 may use the history of returns in determining the likelihood that a shopper will be involved in shoplifting.

Using the determined shoplift risk level determined by shoplift risk determination module 2808, detail level determination module 2810 may determine the detail level of frictionless shopping data to provide to the shopper. Consistent with the present disclosure, fewer details may be provided in the frictionless shopping data to shoppers with a higher shoplift risk level. Examples of different detail levels are described below with reference to FIG. 29. Independently from (or in coordination with) detail level determination module 2810, update rate determination module 2812 may use the determined shoplift risk level determined by shoplift risk determination module 2808 to determine update rate for updating the shopper with the frictionless shopping data. Consistent with the present disclosure, a lower update rate for providing in the frictionless shopping data may be used for shoppers with a higher shoplift risk level. Examples of different update rates are described below with reference to FIG. 30.

Shopper communication module 2814 may cause delivery of the shopping data determined by shopping data determination module 2806 to the shopper at a detail level determined by detail level determination module 2810 and/or at an updated rate determined by update rate determination module 2812. Consistent with the present disclosure, shopper communication module 2814 may include software instructions for facilitating communications between the device on which it is implemented (e.g., server 135) and mobile device 2815 associated with the shopper. Shopper communication module 2814 may enable receipt and transmission of data from and to one or more shoppers. For example, the received data may include a request for additional shopping data, and the transmitted data may include the frictionless shopping data. In one embodiment, mobile device 2815 may be a communication device that belongs to the shopper, for example, communication device 2710A. In another embodiment, mobile device 2815 may be a communication device that belongs to retail store 105 and provided to the shopper for conducting frictionless shopping, for example, communication device 2710B may be part of a smart cart with an output display that provides the determined shopping data.

In some embodiments, database access module 2816 may cooperate with database 2818 to retrieve stored data. The retrieved data may include, for example, sales data, theft data (e.g., a likelihood that a certain product may be subject to shoplifting), shoppers identifying data, personal shopping history data, a schedule of arrivals of additional products, inventory records, checkout data, calendar data, historical product turnover data, and more. As described above, shoplift risk determination module 2808 may use the data stored in database 2818 to determine a shoplift risk level for one or more shoppers. Database 2818 may include separate databases, including, for example, a vector database, raster database, tile database, viewport database, and/or a user input database, configured to store data. The data stored in database 2818 may be received from modules 2802-2814, server 135, from any communication device associated with retail stores 105, market research entity 110, suppliers 115, users 120, and more. Moreover, the data stored in database 2818 may be provided as input using data entry, data transfer, or data uploading.

Modules 2802-2816 and 2820-2826 may be implemented in software, hardware, firmware, a mix of any of those, or the like. For example, if the modules are implemented in software, the modules may be stored in a server (e.g., server 135) or distributed over a plurality of servers. In some embodiments, any one or more of modules 2802-2816, modules 2820-2826, and data associated with database 2818 may be stored in database 140 and/or located on server 135, which may include one or more processing devices. Processing devices of server 135 may be configured to execute the instructions of modules 2802-2816 and 2820-2826. In some embodiments, aspects of modules 2802-2816 and 2820-2826 may include software, hardware, or firmware instructions (or a combination thereof) executable by one or more processors, alone, or in various combinations with each other. For example, modules 2802-2816 and 2820-2826 may be configured to interact with each other and/or other modules of server 135 to perform functions consistent with disclosed embodiments.

FIG. 29 depicts a table 2900 that describes two detail levels of shopping data delivered to shoppers in four use cases 2902-2908. In the illustrated example, first shoplift risk level 2910 associated with a first shopper is lower than second shoplift risk level 2912 associated with a second shopper. In other words, the determined likelihood that the second shopper will be involved in shoplifting is greater than the likelihood that the first shopper will be involved in shoplifting. Moreover, as described above, the system may compare the determined shoplift risk level to a threshold. In the example use cases, first shoplift risk level 2910 may be below the shoplift risk threshold and second shoplift risk level 2920 may be greater than the shoplift risk threshold.

In first use case 2902, the frictionless shopping data provided in conjunction with first shoplift risk level 2910 identifies both a quantity and a type of a particular product selected by the first shopper, and the frictionless shopping data provided in conjunction with second shoplift risk level 2912 identifies a type, but not a quantity, of a particular product selected by the second shopper. In this context, the quantity of the particular product may include a number of items, an overall weight, a size of the item, etc. For example, frictionless shopping system (e.g., system 100) may deliver to the first shopper an indication that two 500 g packages of pasta were added to his or her virtual cart. But the indication delivered to the second shopper only indicates that pasta was added to his or her virtual cart, without informing the second shopper how many packages of pasta were added.

In second use case 2904, the frictionless shopping data provided in conjunction with first shoplift risk level 2910 identifies a type of a particular product selected by the first shopper, and the frictionless shopping data provided in conjunction with second shoplift risk level 2912 identifies a general class, but not a specific type, of a particular product selected by the second shopper. In this context, the type of the particular product may include a brand name, a type of container (e.g., bottle or can), identifying detail (e.g., diet or non-diet, type of flavor, etc.), and more. For example, the system may deliver to the first shopper an indication that a bottle of Diet Coke was added to his or her virtual cart. But the indication delivered to the second shopper only indicates that a soft drink was added to his or her virtual cart, without informing the second shopper which type of soft drink was added.

In third use case 2906, the frictionless shopping data provided in conjunction with first shoplift risk level 2910 identifies product interaction events in which products were removed from a retail shelf and also identifies product interaction events in which products were returned to a retail shelf, and the frictionless shopping data provided in conjunction with second shoplift risk level 2912 identifies product interaction events in which products were removed from a retail shelf but does not identify product interaction events in which products were returned to a retail shelf. For example, the system may deliver to the first shopper an indication that a bottle Diet Coke 20 fl. oz was added to his virtual cart and that the regular Coke was deleted from his virtual cart. But the indication delivered to the second shopper only indicates that a bottle Diet Coca Cola was added to her virtual cart, without identifying that the regular Coca Cola was deleted from her virtual cart.

In fourth use case 2908, the frictionless shopping data provided in conjunction with first shoplift risk level 2910 includes a notification sent to the first shopper in response to each detected product interaction event involving the first shopper, and the frictionless shopping data provided in conjunction with second shoplift risk level 2912 includes notifications regarding detected product interaction events that are sent to the second shopper in response to a secondary trigger event, rather than in response to detection of individual product interaction events. In some embodiments, the secondary trigger event may include a detection that the second shopper has exited an aisle of the retail store. In other embodiments, the secondary trigger event may include a detection that the second shopper has entered a checkout area of the retail store. In other embodiments, the secondary trigger event may include expiration of a predetermined time period, reports including shopping data may be issued periodically while the second shopper is in the retail store, for example, every 1 minutes, 2 minutes, 5 minutes, 10 minutes, etc.

The foregoing use cases provide examples of the kinds of details in the shopping data delivered to a shopper associated with a first determined shoplift risk level than to a shopper associated with a second determined shoplift risk level, wherein the second determined shoplift risk level is higher than the first determined shoplift risk level. A person skilled in the art would recognize that these use cases are only examples, and the disclosed system can be used to provide different levels of details.

Figure 30:
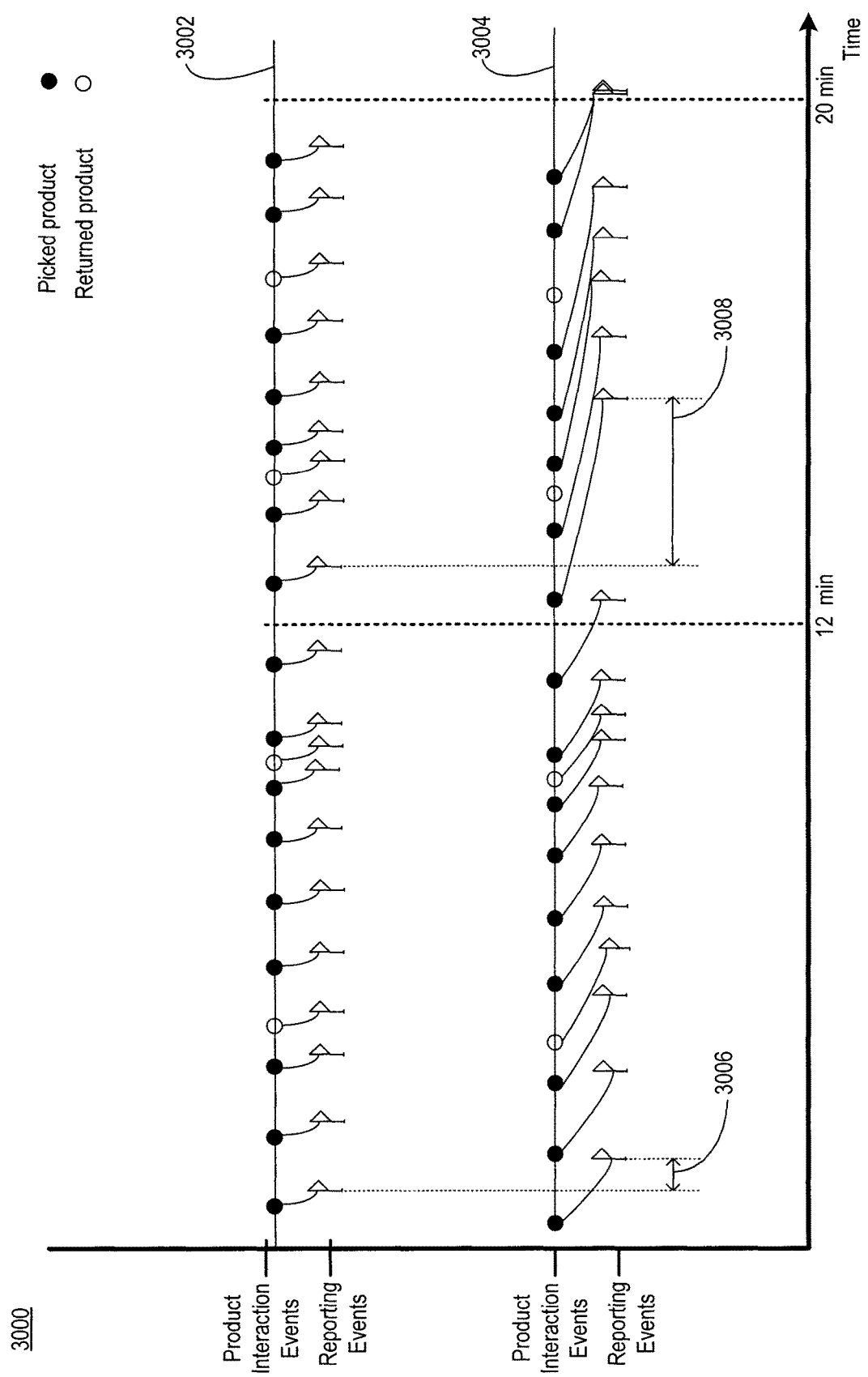
FIG. 30 is a diagram showing example timelines illustrating two different update rates for providing shopping data, consistent with the present disclosure.

FIG. 30 is a diagram 3000 showing example timelines illustrating two different update rates for providing shopping data to shoppers, according to disclosed embodiments. In the illustrated diagram, first timeline 3002 represents the product interaction events and the reporting events associated with a first shopper having a shoplift risk level lower than a value (e.g., a predetermined threshold), and second timeline 3004 represents the product interaction events and the reporting events associated with a second shopper having a shoplift risk level greater than the value. In other words, the determined likelihood that the second shopper will be involved in shoplifting is greater than the likelihood that the first shopper will be involved in shoplifting.

First timeline 3002 includes two types of product interaction events. The first type of product interaction event is represented as a black dot and involves the first shopper picking a product from a shelf. The second type of product interaction event is represented as a white dot and involves the first shopper returning a product to a shelf. In the depicted example, after 20 minutes, the first shopper is going to a checkout area. During the 20 minutes of shopping in retail store 105, first shopper had picked sixteen products and returned four products. For each product interaction event, first shopper receives a report represented in diagram 3000 as a flag. The report may include shopping data associated with a detected product interaction event. Consistent with the present disclosure, the transmission of a report to the shopper is only one example of delivering the shopping data to shoppers. The shopping data may also be delivered to shoppers by way of updating an online interface accessible to the shoppers. Accordingly, the reporting events may represent times in which the online interface are being updated. As shown, when the system determines that it unlikely that the first shopper will be involved in shoplifting the update rate for delivering the shopping data is without any purposeful delays.

For the sake of illustration, second timeline 3004 includes the same plurality of product interaction events as illustrated in first timeline 3002, but, as shown, the update rate of the reporting events in second timeline 3004 is slower compared to the update rate in first timeline 3002. Consistent with the present disclosure, the determined update rate of the second shopper includes an intended time delay in delivering the shopping data to the second shopper. A first delay 3006 represents the intended time delay introduced to the second shopper relative to the first shopper. The time delay may be applied from a time associated with a particular detected product interaction event. In some embodiments, the time delay increases as a determined likelihood that a shopper will be involved in shoplifting increases. For example, after 12 minutes, the system had detected a suspicious action taken by the second shopper that increases the determined likelihood that the second shopper will be involved in shoplifting. Accordingly, second delay 3008 that represents the purposeful time delay introduced to the second shopper after the detection of the suspicious action, is greater than first delay 3006. For example, first delay 3006 may be included in a range of 10 seconds to one minute, and second delay 3008 may be included in a range of 1 minute to 5 minutes. In addition, after the detection of the suspicious action the system may stop providing shopping data associated with product interaction events that involve the shopper returning a product to a shelf.

In disclosed embodiments, the shopping data provided to the second shopper may include notifications regarding detected product interaction events issued in response to a secondary trigger event. The secondary trigger event may include a detection that the shopper has exited an aisle of the retail store, a detection that the shopper has entered a checkout area of the retail store, or expiration of a predetermined time period. In the case illustrated in second timeline 3004, the second shopper enters the checkout area, and he or she receives all the shopping data reports that were purposefully delayed.

Figure 31:
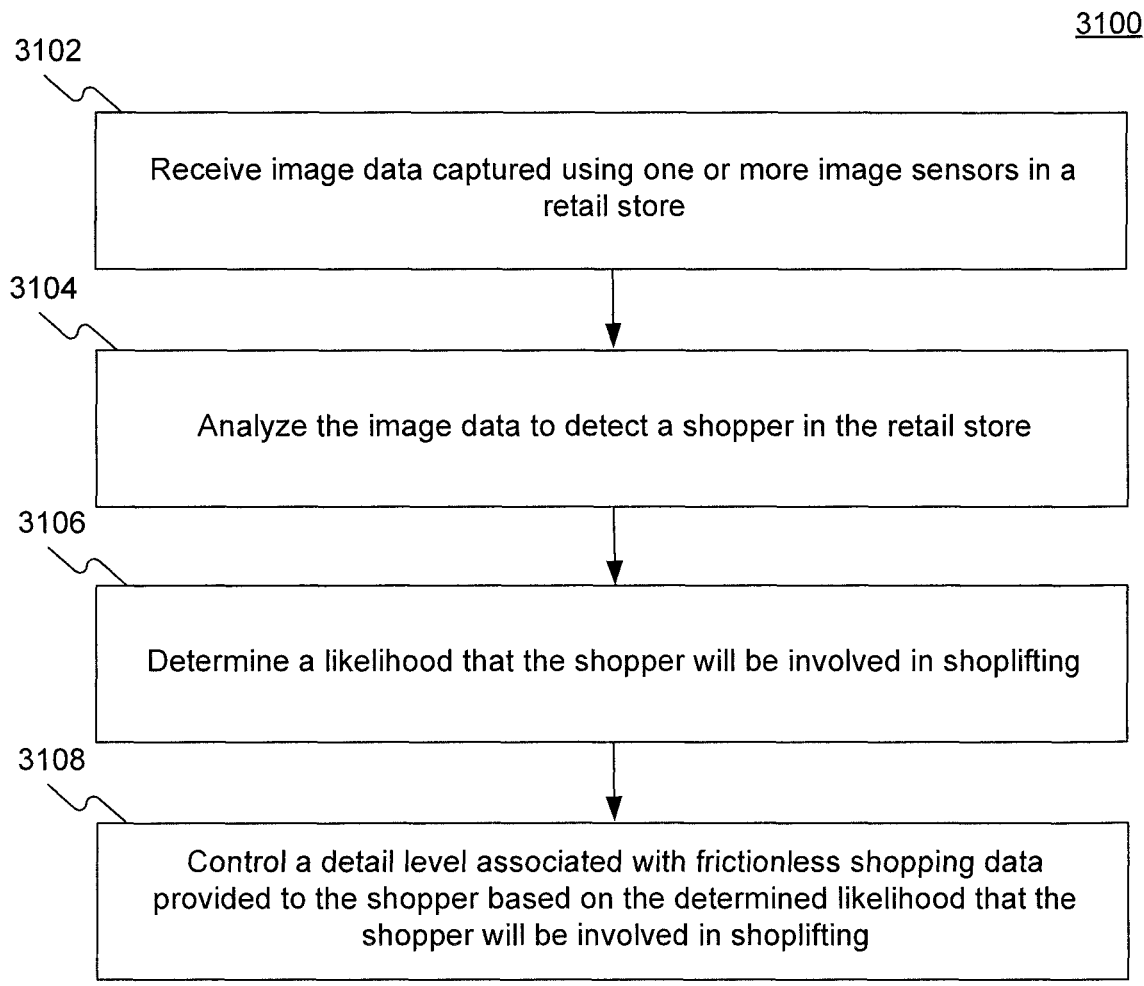
FIG. 31 is a flowchart of an exemplary method for controlling a detail level of shopping data provided to frictionless shoppers, consistent with the present disclosure.

FIG. 31 is a flowchart of an example process 3100 for controlling a detail level of shopping data provided to frictionless shoppers executed by a processing device of system 100, according to embodiments of the present disclosure. The processing device of system 100 may include at least one processor within an image processing unit (e.g., server 135) or any processor associated with retail store 105. For purposes of illustration, in the following description, reference is made to certain components of system 100. It will be appreciated, however, that other implementations are possible and that any combination of components or devices may be used to implement the exemplary method. It will also be readily appreciated that the illustrated method can be altered to modify the order of steps, delete steps, or further include additional steps, such as steps directed to optional embodiments.

In some embodiments, the processing device of system 100 may receive image data captured using one or more image sensors in a retail store. As discussed earlier, image sensors and various other types of sensors may be used to monitor inventory of products in retail store 105. By way of example only, at step 3102 in FIG. 31, a processing device (e.g., processing device 202) may receive image data captured using one or more image sensors in a retail store. In some embodiments, the processing device may receive image data from one or more capturing devices 125 and sensor data from at least one shelf sensor (e.g., detection elements 851). Specifically, the processing device may receive input from one or more shelf sensors disposed on a surface of a retail shelf configured to hold one or more products in additional to the image data. The one or more shelf sensors may include, for example, a weight-sensitive sensor, a touch-sensitive sensor, a pressure-sensitive sensor, a light-sensitive sensor, or any combination thereof.

In some embodiments, the processing device of system 100 may analyze the image data to detect a shopper in the retail store. Consistent with the present disclosure, detecting a shopper in the retail store may include associated a single shopper with a plurality pf product interaction events. Alternatively, detecting a shopper in the retail store may include determining whether the shopper is a recognized shopper. In one embodiment, a determination of whether the shopper is a recognized shopper may be based on analysis of the received image data. For example, the determination of whether the shopper is a recognized shopper may be based on a comparison of at least a portion of the received image data to image information stored in a recognized shopper database (e.g., facial signatures). In an alternative embodiment, the determination of whether the shopper is a recognized shopper may additionally be based on an interaction with an electronic device associated with the shopper. The electronic device may be an RFID tag, a mobile device, or a smart basket associated with the shopper and configured to receive a shopper identification code from the shopper. By way of example only, at step 3104 in FIG. 31, the processing device may analyze the image data to detect a shopper in the retail store, for example using visual person detection algorithms.

In some embodiments, the processing device of system 100 may determine a likelihood that the shopper will be involved in shoplifting. As used herein, the term "likelihood" generally refers to the probability of an event. The term "likelihood," when used in reference to shoplifting, generally contemplates the estimated probability that an individual will be involved in shoplifting from retail store 105. The individual may be the one that does the actual lifting or the one that seeks out weak points of the frictionless shopping system of retail store 105. By way of example only, at step 3106 in FIG. 31, the processing device may determine the likelihood that the shopper will be involved in shoplifting. In one embodiment, the determination of the likelihood that the shopper will be involved in shoplifting may be based on analysis of the received image data. For example, detection of an avoidance action taken by the shopper to avoid at least one store associate may result in a higher determined shoplift risk level than where the shopper is not detected as engaging in an avoidance action. In another embodiment, the determination of the likelihood that the shopper will be involved in shoplifting may be based on outcome of an attempt to recognize the shopper. For example, a determination that the shopper is a recognized shopper may result in a first determined shoplift risk level lower than a second determined shoplift risk level resulting from a determination that the shopper is not a recognized shopper. In another embodiment, the determination of the likelihood that the shopper will be involved in shoplifting may be based on an estimated age of the shopper, which may be determined based on the analysis of the image data. For example, a first estimated age may be associated with a first determined shoplift risk level that is lower than a second determined shoplift risk level associated with a second estimated age, wherein the first estimated age is greater than the second estimated age. In another embodiment, the determination of the likelihood that the shopper will be involved in shoplifting may be based on a shopping history for the shopper retrieved from a shopping history database. The shopping history for the shopper may indicate that the shopper is associated with previous questionable conduct. In a first example, the shopping history database may store facial signatures of shoppers that previously visited the retail store. The facial signatures may be used in identifying the shopper via an analysis of the image data. In a second example, the shopping history database may store a history of returns made to the retail store by the shopper. The history of returns may be used in determining the likelihood that the shopper will be involved in shoplifting. In some examples, the trajectory of the shopper in the retail store may be determined, for example by analyzing the image data to detect positions of the shopper in the retail store at different times (for example using visual person detection algorithms), and combining the detected positions of the shopper into a trajectory, for example using a Kalman filter to remove false detections from the trajectory. Further, the trajectory may be analyzed, for example using a classification or a regression model that takes a trajectory as an input, to determine the likelihood that the shopper will be involved in shoplifting. Such model may be a machine learning model trained using training example to determine likelihood of shoplifting (binary 'likely' or 'not likely' in a case of a binary classification model, discrete likelihood in a case of a multiclass classification model, continuous likelihood in a case of a regression model, etc.) using training examples. An example of such training example may include a sample trajectory together with a label indicating the likelihood of shoplifting corresponding to the sample trajectory. In some examples, the image data may be analyzed to detect actions of the shopper, for example using visual action recognition algorithms. Further, the likelihood that the shopper will be involved in shoplifting may be determined based on the detected actions. For example, each action may be assigned a suspicion score, for example based on a type of the action or other properties of the action, and the likelihood that the shopper will be involved in shoplifting may be determined based on a statistical measure (such as maximum, minimum, median, mean, mode, variance, etc.) or other function of the suspicion scores corresponding to the suspicion scores. In some examples, image data of the shopper may be analyzed to determine stress level of the shopper (for example using a visual classification model, or based on facial expression, based on perspiration, etc.). Further, the likelihood that the shopper will be involved in shoplifting may be determined based on the determined stress level. For example, a stressed shopper may be assigned a higher likelihood that the shopper will be involved in shoplifting than a non-stressed shopper that has otherwise similar characteristics.

In some embodiments, the processing device of system 100 may control a detail level associated with frictionless shopping data provided to the shopper based on the determined likelihood that the shopper will be involved in shoplifting. In this disclosure, the term "controlling a detail level associated with frictionless shopping data" includes determining the frictionless shopping data for the shopper and selecting how much of the determined frictionless shopping data to share with the shopper. In one embodiments, the determined frictionless shopping data includes an indication of products currently included in a virtual shopping cart associated with the shopper. For example, the virtual shopping cart may update as the shopper selects products from a retail shelf and when the shopper returns. By way of example only, at step 3108 in FIG. 31, the processing device may control a detail level associated with frictionless shopping data provided to the shopper based on the determined likelihood that the shopper will be involved in shoplifting. Generally, more detail is delivered in the provided frictionless shopping data at a first determined shoplift risk level than at a second determined shoplift risk level, wherein the second determined shoplift risk level is higher than the first determined shoplift risk level.

In an example, the frictionless shopping data provided in conjunction with the first shoplift risk level may identify both a quantity and a type of a particular product selected by the shopper, but the frictionless shopping data provided in conjunction with the second determined shoplift risk level may identify a type, but not a quantity, of a particular product selected by the shopper. In another example, the frictionless shopping data provided in conjunction with the first determined shoplift risk level may identify a type of a particular product selected by the shopper, but the frictionless shopping data provided in conjunction with the second determined shoplift risk level may identify a general class, but not a specific type, of a particular product selected by the shopper. In yet another example, the frictionless shopping data provided in conjunction with the first determined shoplift risk level may identify product interaction events in which products were removed from a retail shelf and also may identify product interaction events in which products were returned to a retail shelf, but wherein the frictionless shopping data provided in conjunction with the second determined shoplift risk level may identify product interaction events in which products were removed from a retail shelf but does not identify product interaction events in which products were returned to a retail shelf. In a fourth example, the frictionless shopping data provided in conjunction with the first determined shoplift risk level may include a notification sent to the shopper in response to each detected product interaction event involving the shopper, but wherein the frictionless shopping data provided in conjunction with the second determined shoplift risk level includes notifications regarding detected product interaction events that are issued in response to a secondary trigger event, rather than in response to detection of individual product interaction events.

Figure 32:
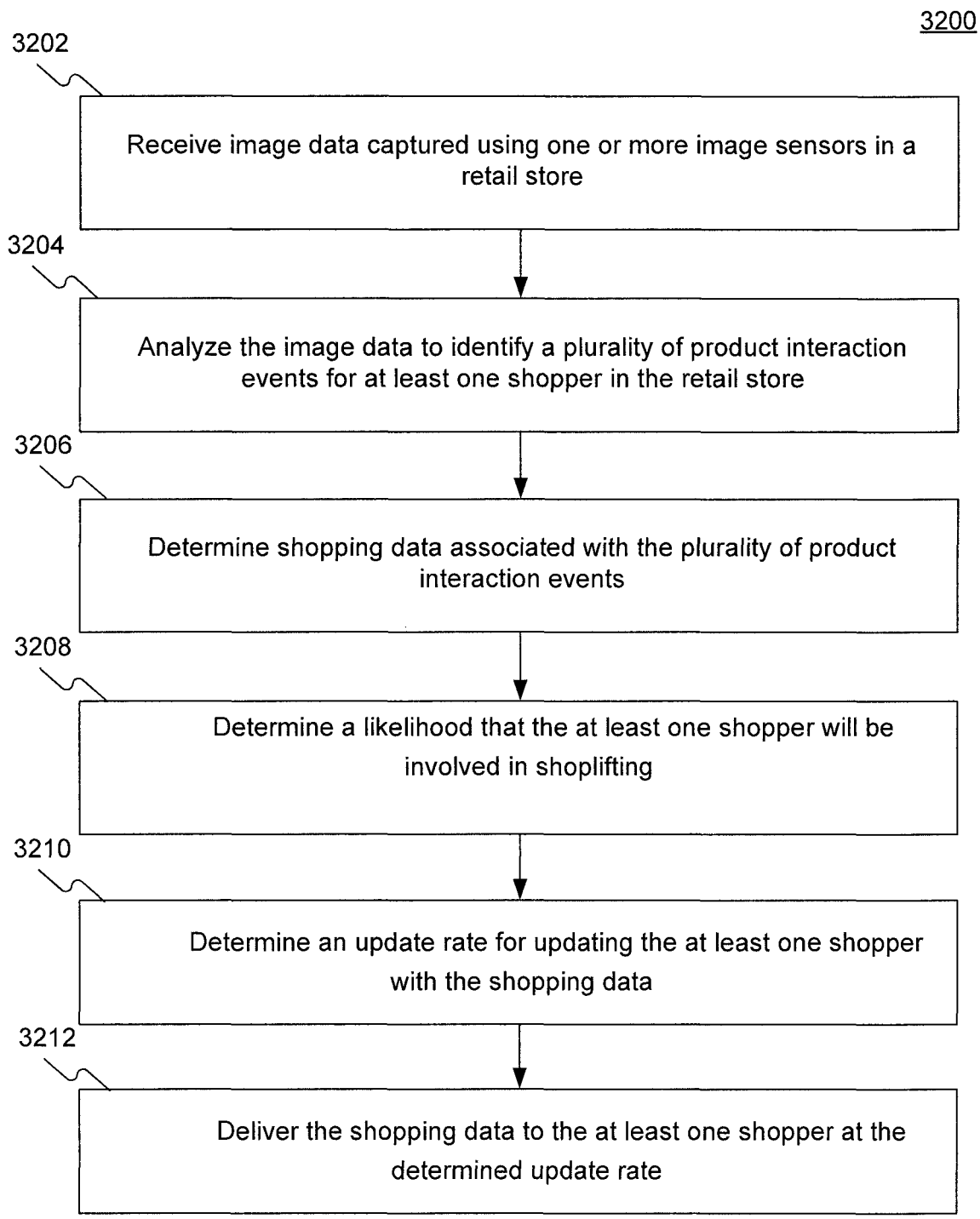
FIG. 32 is a flowchart of an exemplary method for delivering shopping data to frictionless shoppers at a determined update rate, consistent with the present disclosure.

FIG. 32 is a flowchart of an example process 3200 for delivering shopping data to frictionless shoppers executed by a processing device of system 100, according to embodiments of the present disclosure. The processing device of system 100 may include at least one processor within image processing unit (e.g., server 135) or any processor associated with retail store 105. For purposes of illustration, in the following description, reference is made to certain components of system 100. It will be appreciated, however, that other implementations are possible and that any combination of components or devices may be used to implement the exemplary method. It will also be readily appreciated that the illustrated method can be altered to modify the order of steps, delete steps, or further include additional steps, such as steps directed to optional embodiments.

As discussed above with reference to step 3102 in FIG. 31, in some embodiments, the processing device of system 100 may receive image data captured using one or more image sensors in a retail store. Accordingly, at step 3202, the processing device may receive image data captured using one or more image sensors in a retail store. In some embodiments, the processing device of system 100 may analyze the image data to identify a plurality of product interaction events for at least one shopper in the retail store. The plurality of product interaction events may be associated with a single shopper or with multiple shoppers. Consistent with the present disclosure, the step of identifying the plurality of product interaction events may include identifying every shopper in retail store 105 and determining for each shopper a plurality of product interaction events that represent all the products that the shopper interacted with (e.g., picked from a shelf or returned to a shelf). By way of example only, at step 3204 in FIG. 32, the processing device may analyze the image data to identify a plurality of product interaction events for at least one shopper in the retail store. The plurality of product interaction events may involve the at least one shopper taking a product from a shelf and may also involve the at least one shopper returning a product to a shelf.

In some embodiments, the processing device of system 100 may determine shopping data associated with the plurality of product interaction events. In one embodiment, the determination of the shopping data may include determining a frictionless checkout eligibility status of shopper. For example, a successful identification of the product in a product interaction may result in an eligible frictionless checkout status, and a failed identification of the product in a product interaction may result in an ineligible frictionless checkout status. In another embodiment, the determination of the shopping data may include an identification of a type of product associated with a product interaction event. By way of example only, at step 3206 in FIG. 32, the processing device may determine shopping data associated with the plurality of product interaction events.

As discussed above with reference to step 3106 in FIG. 31, in some embodiments, the processing device of system 100 may determine a likelihood that the at least one shopper will be involved in shoplifting. Accordingly, at step 3208, the processing device may determine a likelihood that the at least one shopper will be involved in shoplifting. The different ways that the processing device may determine the likelihood that a shopper will be involved in shoplifting, as discussed above with reference to step 3106, may also be implemented in process 3200.

In some embodiments, the processing device of system 100 may determine an update rate for updating the at least one shopper with the shopping data based on the determined likelihood. As used herein, the term "update rate" generally refers to how often shopping data is delivered to the at least one shopper. Consistent with the present disclosure, determining the update rate for delivering of shopping data to the at least one shopper may include determining how often shopping data may be transmitted to a communication device associated with the at least one shopper or how often an online interface accessible to the at least one shopper will be updated with new shopping data. By way of example only, at step 3210 in FIG. 32, the processing device may determine an update rate for updating the at least one shopper with the shopping data based on the determined likelihood. Generally, wherein a first shoplift risk level is higher than a second determined shoplift risk level, a shopping data may be provided at a first update rate for a shopper associated with the first shoplift risk level that is lower than a second update rate for a shopper associated with the second shoplift risk level. The determination of the update rate may include determining a time delay to apply in delivering the shopping data to the at least one shopper. For example, the delay may be included in a range of 10 seconds to 1 minute or in a range of 1 minute to 5 minutes. In one embodiment, the delay may increase as a determined likelihood that the at least one shopper will be involved in shoplifting increases, for example, the determined likelihood may change upon detecting of an action of the at least one shopper. Alternatively, the delay may decrease as a determined likelihood that the at least one shopper will be involved in shoplifting decreases. In another embodiment, the time delay may be applied from a time associated with a particular detected product interaction event.

In some embodiments, the processing device of system 100 may deliver the shopping data to the at least one shopper at the determined update rate. As mentioned above, the shopping data delivered to the at least one shopper may be indicative of products currently found in at least one virtual shopping cart associated with the at least one shopper or the frictionless checkout eligibility status of shopper. By way of example only, at step 3212 in FIG. 32, the processing device may deliver the shopping data to the at least one shopper at the determined update rate. The determined update rate may be higher than a default update rate or lower than default update rate. In addition, the processing device may use two (or more) determined update rates for delivering the shopping data. For example, a first determined update rate may be used for delivering a first type of shopping data (e.g., indications that a user picked a product from a shelf), and a second determined update rate may be used for delivering a second type of shopping data (e.g., indications that a user returned a product to a shelf). The first determined update rate may be different (e.g., it may be greater or lower) than the second determined update rate.

While frictionless shopping technology develops, store associates will need to continue to manually scan unidentified products, resolve product interaction ambiguities, etc. Forced interactions with checkout clerks, however, may negatively impact the shopping experience, especially in situations where an entire shopping cart may be disqualified from frictionless shopping eligibility due to the presence of even one or a few ambiguous items. A retail store may wish to minimize the need for human interaction in checkout and maximize the availability of frictionless shopping, even if for portions of the items in a shopper's cart. One way to reduce the requirement for human interaction and to maximize the number of products available for frictionless shopping is to track frictionless shopping disqualification events on a per shopping receptacle basis. For example, if a particular shopper is associated with an ambiguous product interaction event, that event may disqualify only one of the shopper's receptacles from frictionless shopping eligibility. The shopper's other shopping receptacles may remain eligible for frictionless shopping. In this way, the proposed system may reduce the number of receptacles and the number of products that must be manually scanned by a store clerk. The following description is directed to this concept.

As described above, a frictionless checkout refers to a checkout process that eliminates or reduces the need to take inventory of products being purchased by the shopper at checkout. Consistent with some embodiments, the frictionless checkout process may be a full frictionless checkout process or a semi frictionless checkout process. A full frictionless checkout process may exclude any interaction between the shopper and a store associate or checkout device. For example, the shopper may walk out of the store with the selected products and a payment transaction may occur automatically. In contrast, a semi frictionless checkout process may include some kind of interaction between the shopper and a store associate or checkout device regarding some of the selected products, but not to all of the selected products. In one example the system may make a decision if there is a need to take inventory of products being purchased by the shopper at checkout on per shopping receptacle basis. This example is described below with reference to FIG. 33A.

Figure 33A:
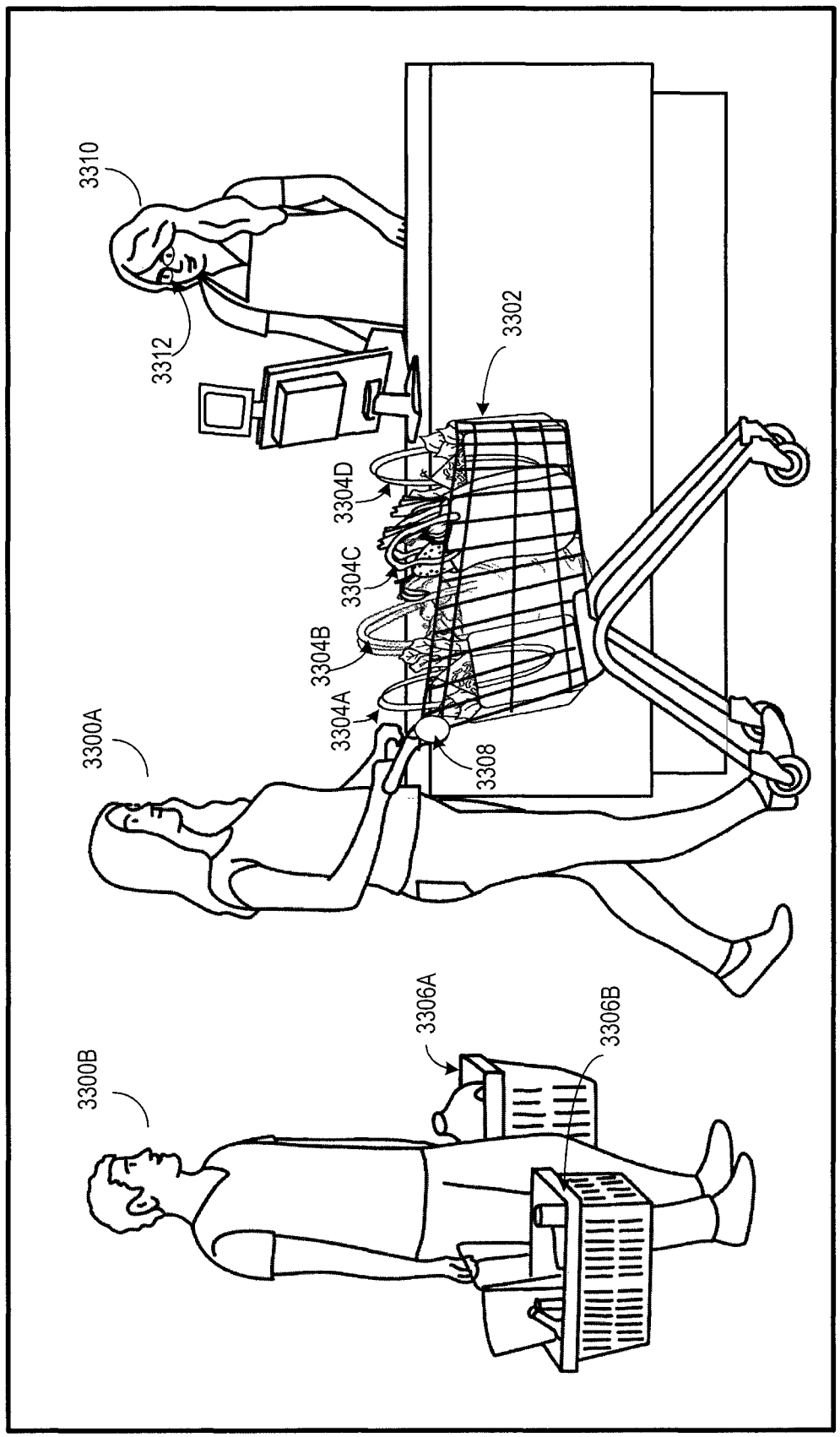
FIG. 33A is a schematic illustration of a semi frictionless checkout process, consistent with the present disclosure.

FIG. 33A depicts two shoppers 3300 (e.g., a first shopper 3300A and a second shopper 3300B) standing in a checkout area of retail store 105. Each of the depicted shoppers is associated with a plurality of shopping receptacles. Specifically, first shopper 3300A is associated with (e.g., uses) five shopping receptacles: a cart 3302 and four reusable shopping bags 3304A-D. Second shopper 3300B is associated with (e.g., caries) two shopping receptacles: shopping basket 3306A and shopping basket 3306B. Consistent with this disclosure, the term "shopping receptacle" is used to describe any form of container in which shoppers can place products. In one example, the capacity of a shopping receptacle may vary between 10 liters and 500 liters. According to one embodiment, a shopping receptacle associated with shopper 3330 may include a shopping bag. In some examples, the shopping bag may be a paper bag, a plastic bag, a reusable shopping bag, or a biodegradable bag. According to another embodiment, a shopping receptacle associated with shopper 3330 may include a shopping cart. In some examples, the shopping cart may be a personal folding shopping cart or a conventional store cart, as illustrated in the figure. According to another embodiment, a shopping receptacle associated with shopper 3330 may include a section of a shopping cart. For example, some shopping carts may have spacers or dividers such that a particular section of the shopping cart (e.g., rear section, middle section, and front section) may be treated as a separate shopping receptacle. According to another embodiment, a shopping receptacle associated with shopper 3330 may include a shopping basket. The listed types of shopping receptacles should be considered as inclusive examples of shopping receptacles. Other types shopping receptacles may be used and, in some embodiments, a particular shopper may be associated (e.g. use) any one or more of a particular type of shopping receptacle.

For example, consistent with the present disclosure, a shopper may concurrently use multiple shopping receptacles having the same type or different types. As shown in FIG. 33A, first shopper 3300A uses shopping cart 3302 and shopping bags 3304, and second shopper 3300B uses only shopping baskets 3306. The system may be programmed to distinguish between shopping receptacles of a single shopper and to track the products being placed in each of the shopping receptacles. In one embodiment, each of the shopping receptacles used by shopper 3300 may include a unique identifier enabling the system to automatically distinguish shopping receptacles from each another. Examples of unique identifiers may include a visual code (such as a barcode, a QR code, etc.), an RFID tag, or a text. Consistent with the present disclosure, the system may use captured image data to automatically distinguish shopping receptacles from each other. In one embodiment, the image data may include images captured by at least one image sensor fixedly mounted to a store shelf in retail store 105, such as a plurality of stationary capturing devices 125. In another embodiment, the image data may include images captured by at least one image sensor fixedly mounted to a shopping cart in the retail store, such as an image sensor 3308. The field of view of image sensor 3308 may be directed to the inside of the shopping cart for capturing a plurality of shopping receptacles.

The system may be configured to identify product interaction events and to associate each event to one of a plurality of shopping receptacles associated with the shopper. In one embodiment, the system may identify the plurality of product interaction events solely based on image data such as, for example, image data received from a plurality of image sensors fixedly mounted in retail store 105 and/or an image sensor fixedly mounted to the shopping cart. Alternatively, the system may identify the plurality of product interaction events using a combination of image data and data from one or more shelf sensors. For example, sensor data received from detection elements attached to store shelves may be used to identify which product was picked from a shelf and image data from image sensor 3308 may be used to associate the identified product with the appropriate shopping receptacle. If the system fails to identify the product inserted to a shopping receptacle, that shopping receptacle may be determined as ineligible for frictionless checkout. Accordingly, the system may cause delivery of an indicator identifying which of the shopper's shopping receptacles is ineligible for frictionless checkout. In one embodiment, the indicator may be delivered to a computing device associated with a store associate of the retail store. For example, with reference to FIG. 33A, the indicator may be delivered to a store associate 3310 via smart glasses 3312.

Figure 33B:
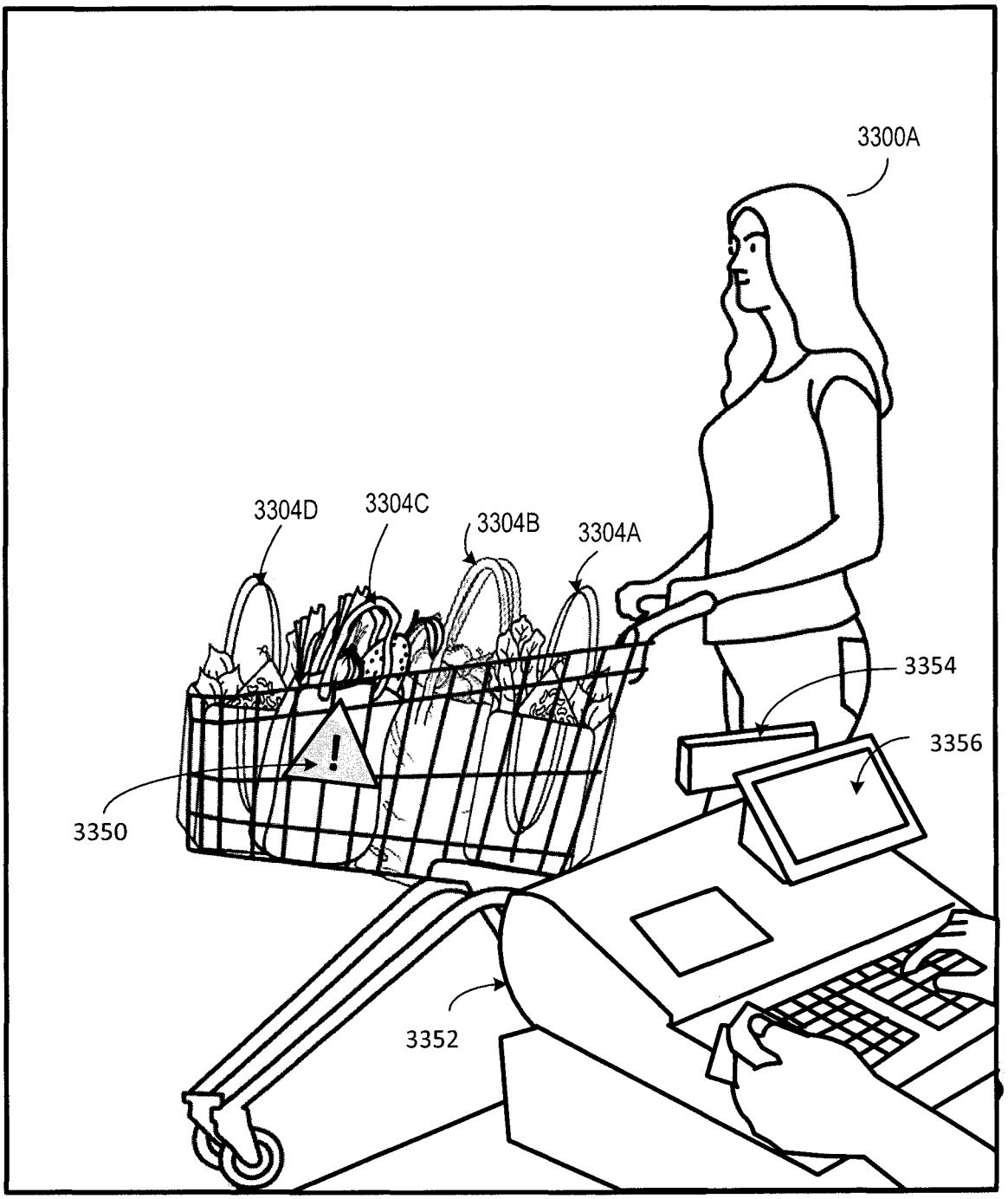
FIG. 33B is a schematic illustration of an example visual indicator showing the frictionless checkout eligibility status of a shopping receptacle, consistent with the present disclosure.

FIG. 33B illustrates an example visual indicator showing the frictionless checkout eligibility status of a shopping receptacle. Specifically, the frictionless eligibility indicator may identify which of the shopping receptacles associated with a particular shopper is ineligible for frictionless checkout. Consistent with the present disclosure, a frictionless eligibility indicator may be delivered to a communication device. In one embodiment, the communication device may be a wearable device associated with a shopper, for example, a mobile device (e.g., smartphone, smartwatch, or a store pager that the shopper collects when entering retail store 105). In another embodiment, the communication device may be a wearable device may be associated with a store associate. FIG. 33B depicts the view from smart glasses 3312 of store associate 3310. As shown, a visual indicator 3350 may overlay the image of shopping bag 3304C and may indicate that shopping bag 3304C is ineligible for frictionless checkout. The absence of visual indicator 3350 overlaying the image of shopping bags 3304A, 3304B, and 3304D, and cart 3302 may indicate these shopping receptacles are eligible for frictionless checkout. Based on the delivered indicator, store associate 3310 may asked shopper 3300A to take out all the items only from shopping bag 3304C (i.e., not from shopping bags 3304A, 3304B, and 3304D, and cart 3302) in order to scan them manually.

In disclosed embodiments, the visual indicator may be delivered to a mobile device associated with the shopper. For example, after first shopper 3300A enters a checkout area, he or she may receive a text message to his or her smartphone indicating that reusable shopping bags 3304A-C are eligible for frictionless checkout and reusable shopping bag 3304D is ineligible for frictionless checkout. In other embodiments, the indicator may be delivered by a display associated with a shopping cart used by the shopper. For example, the indicator may be delivered to communication device 2710B illustrated in FIG. 27. In other embodiments, the indicator may be delivered to a computing device associated with a store associate of the retail store. For example, the indicator may include an image of the ineligible shopping receptacle and may be delivered to a cash register device 3352. The indicator delivered to cash register device 3352 may be displayed on a first display 3354 pointing to the shopper and/or to a second display 3356 pointing to the cashier. In other embodiments, the indicator may be delivered via a feedback device associated with a shopping receptacle. The feedback device may be a display device, a haptic feedback device, a light emitting device, or an audio feedback device. For example, the shopping receptacle may be a shopping basket that provides a color indication of the shopping receptacle's eligibility for frictionless checkout. Specifically, a green light may indicate that products in the shopping receptacle may be eligible for frictionless checkout; and a red light may indicate that products in the shopping receptacle may be ineligible for frictionless checkout.

Figure 34:
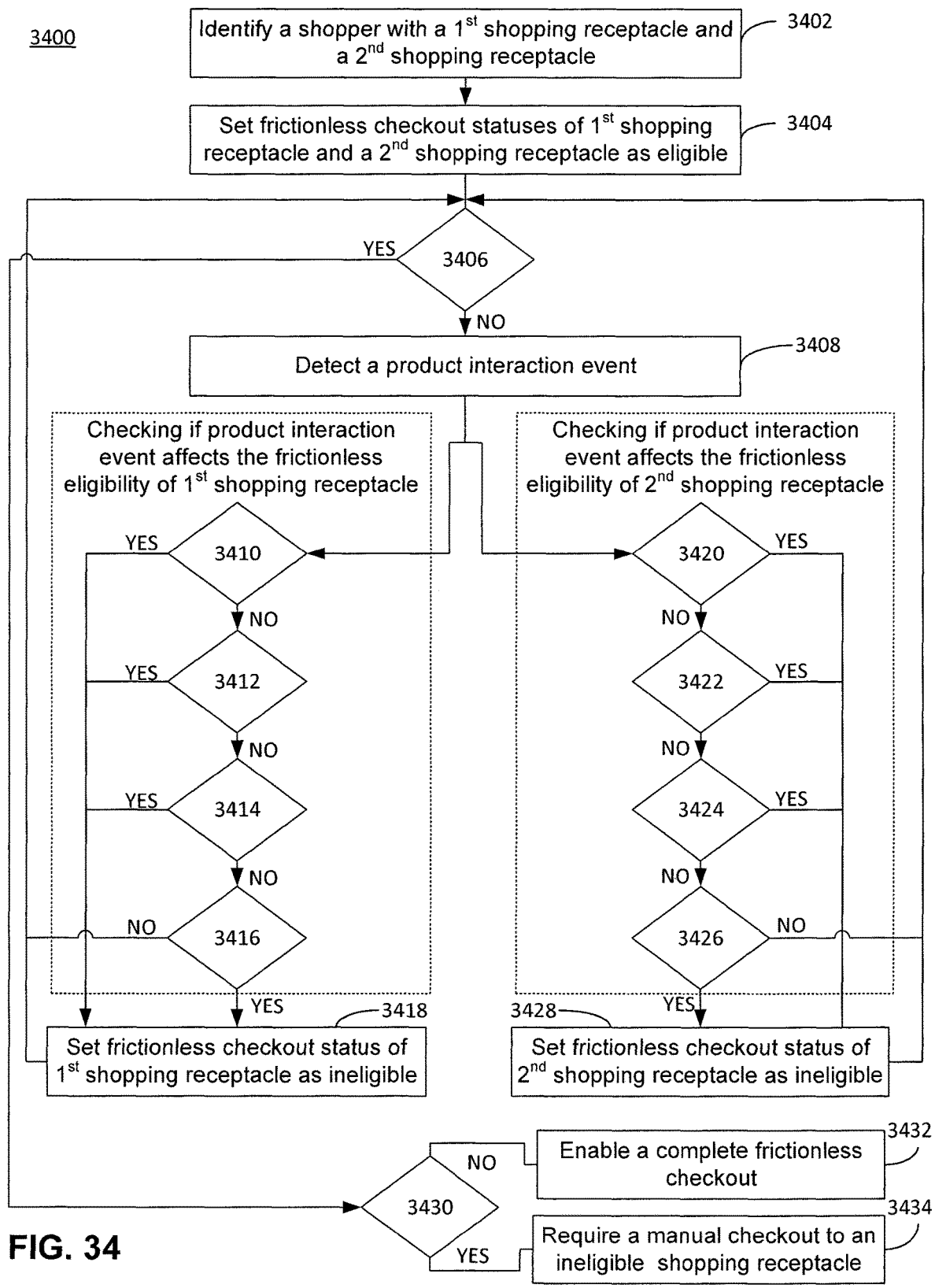
FIG. 34 is a block flow diagram illustrating an example process for determining the frictionless checkout eligibility statuses of two shopping receptacles, consistent with the present disclosure.

FIG. 34 depicts a flow diagram illustrating an example process 3400 for determining the frictionless checkout eligibility statuses of two shopping receptacles. For purposes of illustration, the shopper has only two shopping receptacles. It will be appreciated, however, that process 3400 may be expended to cover cases where the shopper has more than two shopping receptacles. In the following description, reference is made to certain components of system 100, yet other components of the system may be used to implement example process 3400. It will also be readily appreciated that the example process 3400 can be altered to modify the order of steps, delete steps, or add additional steps.

Process 3400 begins when the processing device analyzes captured image data to identify a shopper at retail store 105 with a first shopping receptacle and a second shopping receptacle (block 3402). Examples of shopping receptacles are described above with reference to FIG. 33A. Thereafter, the processing device may set the frictionless checkout statuses of the first shopping receptacle and the second shopping receptacle as eligible (block 3404). The processing device may determine if the shopper has entered to the store's checkout area or continues shopping (decision block 3406). As long as the shopper continues shopping in retail store 105, the processing device may detect product interaction events (block 3408). In disclosed embodiments, the processing device may detect product interaction events based on analysis of captured image data. In other embodiments, the processing device may obtain sensor data from one or more shelf sensors, and the detecting of product interaction events may be based on analysis of the image data and the sensor data. For example, the sensor data may be obtained from a weight-sensitive sensor, a touch-sensitive sensor, a pressure-sensitive sensor, a light-sensitive sensor, or any combination thereof. Consistent with the present disclosure, detecting a product interaction event may include determining whether the product interaction event involves the first shopping receptacle or involves the second shopping receptacle. In a first example, the product interaction event may include the shopper removing a product from a shelf and inserting it to the first shopping receptacle. In a second example, the product interaction event may include the shopper returning a product to a shelf from the second shopping receptacle.

After block 3408, the process may split into two identical branches based on the association of the shopping receptacle to the product interaction event. In each of the branches, the processing device may determine if the product interaction event affects the frictionless eligibility of the corresponding shopping receptacle. This determination may involve one or more steps illustrated in decision blocks 3410-3416 and 3420-3426. According to one embodiment, the processing device may attempt to identify a type of product involved in the detected product interaction event (decisions blocks 3410 and 3420). To identify the type of product involved in the detected product interaction event, the processing device may use any method known in the art including methods described herein. When the processing devices fails to identify the type of product, the process may move to block 3418 or block 3428, and the processing device may set the frictionless checkout status of the respective shopping receptacle as ineligible. When the processing device succeeds in identifying the type of product involved in the detected product interaction event, the process may continue to decision block 3412 or to decision block 3422, respectively.

Process 3400 may resume when the processing device determines if at least one indicator of a degree of ambiguity associated with the detected product interaction event is greater than a threshold (decisions blocks 3412 and 3422). The at least one indicator of a degree of ambiguity associated with the product interaction event may be determined based on the image data, based on the sensor data, or a combination thereof. When the at least one indicator of a degree of ambiguity associated with the product interaction event is greater than a threshold, the process may move to block 3418 or block 3428, and the processing device may set the frictionless checkout status of the respective shopping receptacle as ineligible. When the at least one indicator of a degree of ambiguity associated with the product interaction event is less than a threshold, the process may continue to decision block 3414 or to decision block 3424, respectively.

Process 3400 may resume when the processing device determines if the product associated with the detected product interaction event is designated as ineligible for frictionless checkout (decisions blocks 3414 and 3424). In one example, certain products (e.g., fresh fruits) may be categorically designated as ineligible for frictionless checkout. In another example, products collected from a shelf, or a portion of a shelf temporarily designated as ineligible for frictionless checkout may also cause products to be designated as ineligible. When the shopper selects a product designated as ineligible for frictionless checkout, the process may move to block 3418 or block 3428, and the processing device may set the frictionless checkout status of the respective shopping receptacle as ineligible. When the shopper selects a product designated as eligible for frictionless checkout, the process may continue to decision block 3416 or to decision block 3426, respectively.

Process 3400 may resume when the processing device determines if a product value associated with the detected product interaction event exceeds a predetermined threshold (decisions blocks 3416 and 3426). Consistent with disclosed embodiments, the processing device may identify that the shopper picked a product, but failed to recognize which product was picked. In such a situation it may be in the retail store interest to encourage frictionless checkout for one or more reasons. For example, proceeding with frictionless checkout may save store associates resources and/or increase the customer's satisfaction. Therefore, for example, if a shopper picked a product from a shelf in which all the products costs less than a predetermined threshold (e.g., a product costing less than $2), the processing device may maintain the eligible frictionless status of the shopping receptacle even when the specific product was not identified. In another example, the predetermined threshold may be up to 5% of a total product value associated with products selected by the shopper. When the product value exceeds the predetermined threshold, the process may continue to block 3418 or block 3428, and the processing device may set the frictionless checkout status of the respective shopping receptacle as ineligible. When the product value is less than (or equal to) the predetermined threshold, the frictionless checkout status of the first shopping receptacle and the second shopping receptacle may be kept as eligible and the process may next determine if the shopper has entered to the checkout area or continues shopping (decision block 3406).

When the processing device determines that the shopper has entered to the checkout area, the processing device may determine if the frictionless checkout status of at least one of the shopping receptacle is ineligible (decision block 3430). When the frictionless checkout statuses of all the shopping receptacles associated with the shopper are eligible, the processing device may enable the shopper a complete frictionless checkout (block 3432). When the frictionless checkout status of at least one of the shopping receptacles is ineligible, the processing device may require a manual checkout to a specific ineligible shopping receptacle (block 3434). For example, when the first shopping receptacle is determined to be eligible for frictionless shopping and the second shopping receptacle is determined to be ineligible for frictionless shopping, the processing device may require a manual checkout action with respect to only the second shopping receptacle.

In another embodiment, prior to executing the step of block 3434, the processing device may cause an ambiguity resolution action in response to a determination that one of shopping receptacle has an ineligible checkout status due to an ambiguous product interaction event. In one example, causing the ambiguity resolution action may include issuing a query to the shopper to confirm the identity of products in an ineligible shopping receptacle. The query may be answered using a dedicated device for scanning a barcode or placing the products in front of a camera. In another example, when a shopping receptacle corresponds to a shopping list, the shopping list may be used to reduce a degree of ambiguity associated with the product interaction event. Other examples of ambiguity resolution actions that may resolve ambiguous product interaction events are described above. After completing the ambiguity resolution action, the processing device may restore the frictionless checkout eligibility status of one or more shopping receptacles in question.

In a related embodiment, the ambiguity resolution action may include completing a manual checkout to one of the shopping receptacles. Specifically, in some cases, ambiguity resolution actions, such as non-frictionless checkout of one of the shopping receptacles, may resolve the ambiguity with respect to the other shopping receptacles. Consistent with the present disclosure, processing device may detect a product interaction event involving an ambiguity between the first shopping receptacle and the second shopping receptacle. The processing device may access data related to the first shopping receptacle and data related to the second shopping receptacle to select one of the first and second shopping receptacles. Thereafter, the processing device may cause delivery of an indicator identifying that the selected shopping receptacle is ineligible for frictionless checkout. The selection of which of the shopping receptacle to identify as ineligible for frictionless checkout may be based, at least in part, on quantity of products corresponding to each shopping receptacle, on prices of products corresponding to each shopping receptacle, on degree of ambiguity corresponding to each shopping receptacle, and more. Additionally, the selection of the shopping receptacle may be made after detecting the product interaction event involving an ambiguity between the first shopping receptacle and the second shopping receptacle. Alternatively, the selection of the shopping receptacle may be made after additional product interaction events occur.

Figure 35:
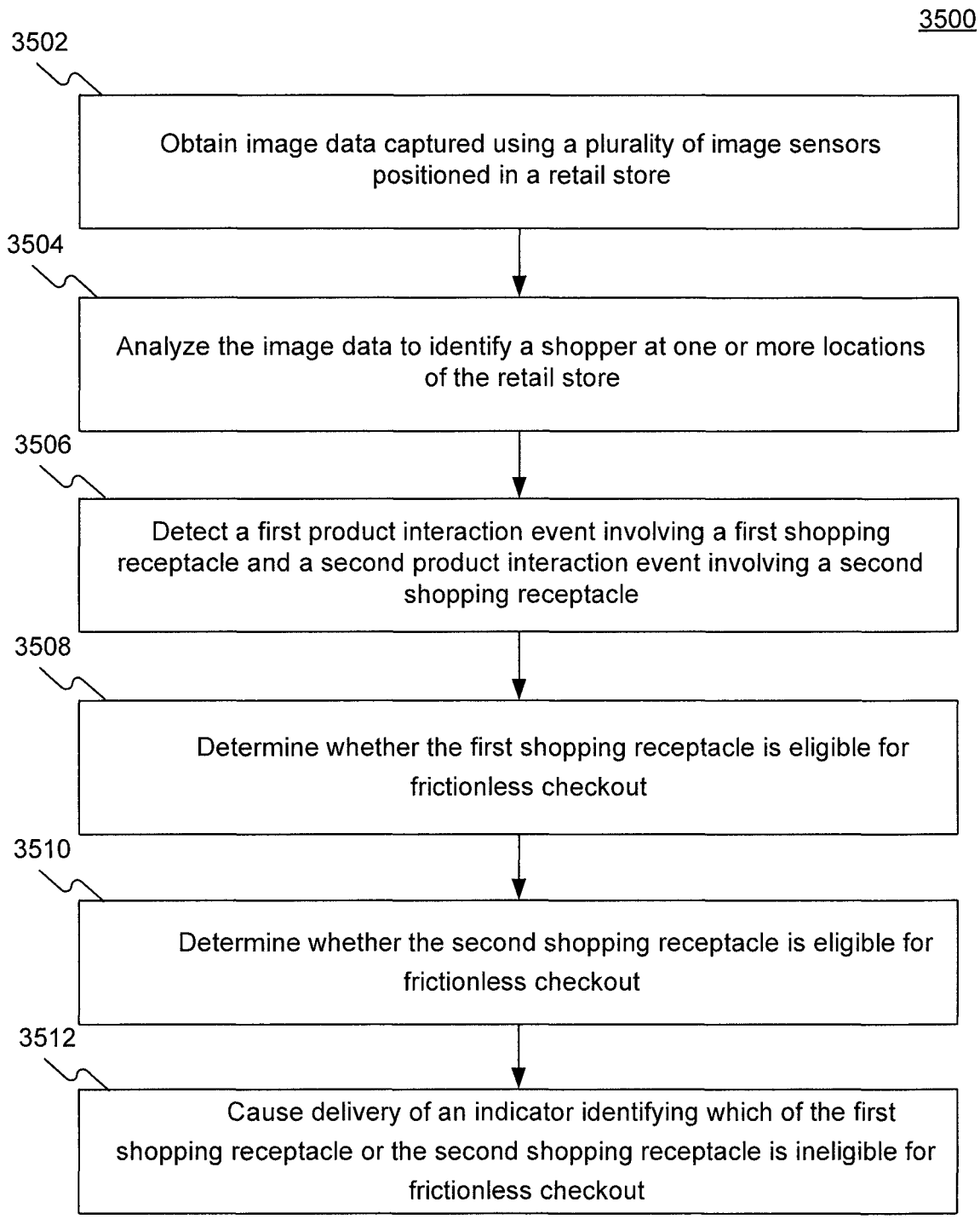
FIG. 35 is a flowchart of an exemplary process for tracking frictionless shopping eligibility relative to individual shopping receptacles, consistent with the present disclosure.

FIG. 35 is a flowchart of an example process 3500 for tracking frictionless shopping eligibility relative to individual shopping receptacles executed by a processing device of system 100, according to embodiments of the present disclosure. The processing device of system 100 may include at least one processor within an image processing unit (e.g., server 135) or any processor associated with retail store 105. For purposes of illustration, in the following description, reference is made to certain components of system 100. It will be appreciated, however, that other implementations are possible and that any combination of components or devices may be used to implement the exemplary method. It will also be readily appreciated that the illustrated method can be altered to modify the order of steps, delete steps, or add additional steps, such as steps directed to optional embodiments.

In disclosed embodiments, the processing device of system 100 may obtain image data captured using a plurality of image sensors positioned in a retail store. As discussed earlier, image sensors and various other types of sensors may be used to detect product interaction events in retail store 105. These sensors may include weight sensors, touch sensors, pressure sensors, light sensors, and more. By way of example, at step 3502 in FIG. 35, a processing device (e.g., processing device 202) may obtain image data captured using a plurality of image sensors positioned in a retail store. In some embodiments, the image data may include images captured by at least one image sensor fixedly mounted in the retail store. The at least one image sensor may be fixedly mounted to a store shelf or to other objects in retail store 105 (such as walls, ceilings, floors, refrigerators, checkout stations, displays, dispensers, rods which may be connected to other objects in retail store 105, and so forth). In other embodiments, the image data may include images captured by at least one image sensor fixedly mounted to a shopping cart in the retail store. For example, the at least one image sensor may be mounted such it captures the inside of the shopping cart.

In disclosed embodiments, the processing device of system 100 may analyze the image data to identify a shopper at one or more locations of the retail store. The shopper may be associated with a plurality of shopping receptacles. Consistent with the present disclosure, at least one of the first shopping receptacle or the second shopping receptacle may be a shopping bag, a shopping cart, a section of a shopping cart, or a shopping basket. By way of example, at step 3504 in FIG. 35, the processing device may analyze the image data to identify a shopper at one or more locations of the retail store. In one embodiment, each of the first shopping receptacle and the second shopping receptacle may include a unique identifier enabling the first shopping receptacle and the second shopping receptacle to be automatically distinguished from one another by the system. The unique identifier may include a visual code (e.g., a barcode, a QR code, a serial number, a color code, etc.). Alternatively, the unique identifier may include an RFID tag or text. In some examples, a machine learning model may be trained using training examples to transform images of shopping receptacles to mathematical objects in a mathematical space. The transformation may be configured, through the training, to transform different images of the same shopping receptacle (for example, images taken from different viewpoints, at different illumination conditions, etc.) to nearby mathematical objects in the mathematical space, and to transform images of different shopping receptacle to mathematical objects that are distant from one another in the mathematical space. For example, a training example may include two images of the same shopping receptacle, and a loss function used in the training of the machine learning model for that pair of images may be monotonically increasing function of the distance between the two mathematical objects corresponding to the two images. In another example, a training example may include two images of two different shopping receptacles, and a loss function used in the training of the machine learning model for that pair of images may be monotonically decreasing function of the distance between the two mathematical objects corresponding to the two images. The trained machine learning model may be used to transform images of shopping receptacle to mathematical objects in the mathematical space, a clustering algorithm may be used to identify groups of mathematical objects in the mathematical space that correspond to specific shopping receptacles, and the determination that an image (or a portion of an image) is an image of a particular shopping receptacle may be based on an association of the mathematical object corresponding to the image to a particular cluster corresponding to the particular shopping receptacle. In some examples, visual tracking algorithms may be used to track shopping receptacle in a video, and to determine that a particular shopping receptacle in a first frame of the video is the same shopping receptacle seen in a particular position in a second frame of the video. In some examples, a convolution of at least part of an image of a shopping receptacle may be calculated. In response to a first value of the convolution, it may be determined that the shopping receptacle is a first shopping receptacle, and in response to a second value of the convolution, it may be determined that the shopping receptacle is a second shopping receptacle, the second shopping receptacle may differ from the first shopping receptacle.

In disclosed embodiments, the processing device of system 100 may detect a first product interaction event involving a first shopping receptacle associated with the shopper and a second product interaction event involving a second shopping receptacle associated with the shopper. The product interaction events may include the shopper removing a product from a shelf associated with the retail store or returning a product from a shelf associated with the retail store. In one embodiment, the detection of at least one of the first or second product interaction event may be based solely on an analysis of the image data. In another embodiment, the detection of at least one of the first or second product interaction event may be based on an analysis of the image data and sensor data (e.g., the sensor data may be obtained from a one or more sensors disposed on a retail shelf between the retail shelf and one or more products placed on the retail shelf). By way of example, at step 3506 in FIG. 35, the processing device may detect a first product interaction event involving a first shopping receptacle associated with the shopper and a second product interaction event involving a second shopping receptacle associated with the shopper. Consistent with the present disclosure, detecting a product interaction event may include determining a degree of ambiguity associated with the first product interaction event. The degree of ambiguity associated with at least one of the first product interaction event and the second product interaction event may be determined based on the image data or based on a combination of image data and sensor data.

In disclosed embodiments, the processing device of system 100 may determine whether each of the shopping receptacles associated with the shopper is eligible for frictionless checkout. The determination may be based on the detected product interaction events. By way of example, at step 3508 in FIG. 35, the processing device may determine whether the first shopping receptacle is eligible for frictionless checkout based on the detected first product interaction event, and at step 3510 the processing device may determine whether the second shopping receptacle is eligible for frictionless checkout based on the detected second product interaction event. For example, if the first shopping receptacle is determined to be eligible for frictionless shopping and the second shopping receptacle is determined to be ineligible for frictionless shopping, the processing device may require a manual checkout action with respect to only the second shopping receptacle. In one embodiment, the determination that the first shopping receptacle is eligible for frictionless checkout may be based on at least one indicator of a degree of ambiguity associated with the first product interaction event. For example, if the degree of ambiguity associated with the second product interaction event is high, the processing device may determine that the second shopping receptacle is ineligible for frictionless checkout. In another embodiment, the determination that the first shopping receptacle is eligible for frictionless checkout may be based on whether the detected first product interaction event includes the shopper selecting a product that is designated as ineligible for frictionless checkout. For example, a product may be picked from a shelf designated as ineligible for frictionless checkout. In another embodiment, the determination that the first shopping receptacle is ineligible for frictionless checkout may be based on a determination of a product value associated with the first product interaction event. Specifically, a shopping receptacle may be determined to be ineligible for frictionless checkout if the estimated product value associated with product interaction event exceeds a predetermined threshold. In one example, the predetermined threshold may be up to $1.5 for a single product. In another example, the predetermined threshold may be up to 4.5% of a total product value associated with products selected by the shopper.

In disclosed embodiments, in response to a determination that the first shopping receptacle or the second shopping receptacle is ineligible for frictionless checkout, the processing device of system 100 may cause delivery of an indicator identifying which of the first shopping receptacle or the second shopping receptacle is ineligible for frictionless checkout. By way of example, at step 3512 in FIG. 35, the processing device may cause delivery of an indicator identifying which of the first shopping receptacle or the second shopping receptacle is ineligible for frictionless checkout. In one embodiment, the indicator identifying which of the first shopping receptacle or the second shopping receptacle is ineligible for frictionless checkout may be delivered to a wearable device associated with the shopper. In another embodiment, the indicator identifying which of the first shopping receptacle or the second shopping receptacle is ineligible for frictionless checkout may be delivered to a mobile device associated with the shopper. In another embodiment, the indicator identifying which of the first shopping receptacle or the second shopping receptacle is ineligible for frictionless checkout may be delivered by a display associated with a shopping cart used by the shopper. In another embodiment, the indicator identifying which of the first shopping receptacle or the second shopping receptacle is ineligible for frictionless checkout may be delivered to a computing device associated with a store associate of the retail store. In another embodiment, the indicator identifying which of the first shopping receptacle or the second shopping receptacle is ineligible for frictionless checkout may be delivered to the shopper after the shopper enters a checkout area of the retail store. In another embodiment, the indicator identifying which of the first shopping receptacle or the second shopping receptacle is ineligible for frictionless checkout may be delivered to the shopper before the shopper enters a checkout area of the retail store. In another embodiment, the indicator identifying which of the first shopping receptacle or the second shopping receptacle is ineligible for frictionless checkout may be delivered via a feedback device associated with at least one of the first shopping receptacle and the second shopping receptacle. The feedback device may be a display device, a haptic feedback device, a light emitting device, or an audio feedback device.

In disclosed embodiments, the processing device may cause an ambiguity resolution action in response to a detection of at least one ambiguous interaction event among the first product interaction event or the second product interaction event. Thereafter, the processing device may cause an eligibility status for frictionless checkout for the first shopping receptacle or the second shopping receptacle to be restored based on data associated with a completion of the ambiguity resolution action. In one embodiment, the ambiguity resolution action may include a request to answer a query to confirm identity of products involved in the at least one ambiguous interaction event. In another embodiment, when a shopping receptacle corresponds to a shopping list, the shopping list may be used to reduce a degree of ambiguity associated with the product interaction event. Specifically, when the first shopping receptacle corresponds to a first shopping list and the second shopping receptacle corresponds to a second shopping list (e.g., different from the first shopping list), the first shopping list may be used to reduce a degree of ambiguity associated with the first product interaction event, and the second shopping list may be used to reduce a degree of ambiguity associated with the second product interaction event.

In some case, manual checkout of one shopping receptacle may resolve the ambiguity with respect to another shopping receptacle. Thus, the system may identify only one of the two shopping receptacles as ineligible for frictionless checkout. Specifically, the processing device may detect, based on the analysis of the image data, a third product interaction event involving an ambiguity between the first shopping receptacle and the second shopping receptacle. Thereafter, the processing device may access data related to the first shopping receptacle and data related to the second shopping receptacle to select one of the first and second shopping receptacle. Then the processing device may select which of the first shopping receptacle and the second shopping receptacle to classify as ineligible for frictionless checkout. The processing device may next cause delivery of an indicator identifying that the selected shopping receptacle is ineligible for frictionless checkout. In one embodiment, the selection may be made after the third product interaction event, while in other embodiment the selection may be made after additional product interaction events are detected. For example, the selection may be made when the shopper enters to the checkout area (e.g., within a predefined distance from a checkout device). Moreover, the selection may be based, at least in part, on the quantity of products corresponding to each shopping receptacle, on the prices of products corresponding to each shopping receptacle, or on the degree of ambiguity corresponding to each shopping receptacle.

As noted generally above, a retail environment may provide a frictionless checkout experience. As used herein, a frictionless checkout refers to any checkout process for a retail environment with at least one aspect intended to expedite, simplify, or otherwise improve an experience for customers. In some embodiments, a frictionless checkout may reduce or eliminate the need to take inventory of products being purchased by the customer at checkout. For example, this may include tracking the selection of products made by the shopper so that they are already identified at the time of checkout. The tracking of products may occur through the implementation of sensors used to track movement of the shopper and/or products within the retail environment, as described throughout the present disclosure. Additionally or alternatively, a frictionless checkout may include an expedited or simplified payment procedure. For example, if a retail store has access to payment information associated with a shopper, the payment information may be used automatically or upon selection and/or confirmation of the payment information by the user. In some embodiments, a frictionless checkout may involve some interaction between the user and a store associate or checkout device or terminal. In other embodiments, the frictionless checkout may not involve any interaction. For example, the shopper may walk out of the store with the selected products and a payment transaction may occur automatically. While the term "frictionless" is used for purposes of simplicity, it is to be understood that this encompasses semi-frictionless checkouts as well. Accordingly, various types of checkout experiences may be considered "frictionless," and the present disclosure is not limited to any particular form or degree of frictionless checkout.

The above described embodiments allow for the tracking of products selected by a shopper and determining into which shopping receptacle each selected product is placed. In some scenarios, it might be desirable to associate different shopping receptacles with different shopping accounts. For example, a grocery delivery and pick-up service company may allow online customers to order groceries from retail stores, with the shopping being performed by personal shoppers. When a shopper shops for products in a retail store, it might be more efficient for the shopper to shop for multiple customers simultaneously, each customer having ordered a list of items from the same retail store. Thus, the shopper may carry multiple shopping receptacles for collecting items to be delivered to the multiple different customers. As used herein, a shopping receptacle may refer to any container that contains products that were picked up by a shopper and placed therein. The shopping receptacle may be associated with a virtual shopping cart of a shopping account. The shopping receptacle may be a box, a bag, a basket, or a physical shopping cart. After the shopper has collected all of the items ordered by the multiple customers, the shopper may proceed with the frictionless checkout described above. According to an embodiment of the present disclosure, a system may receive images of the multiple shopping receptacles as well as the products disposed therein. Then, the system may analyze received image data to detect product selections and update different virtual carts based on which shopping receptacle each selected product is placed.

Figure 36:
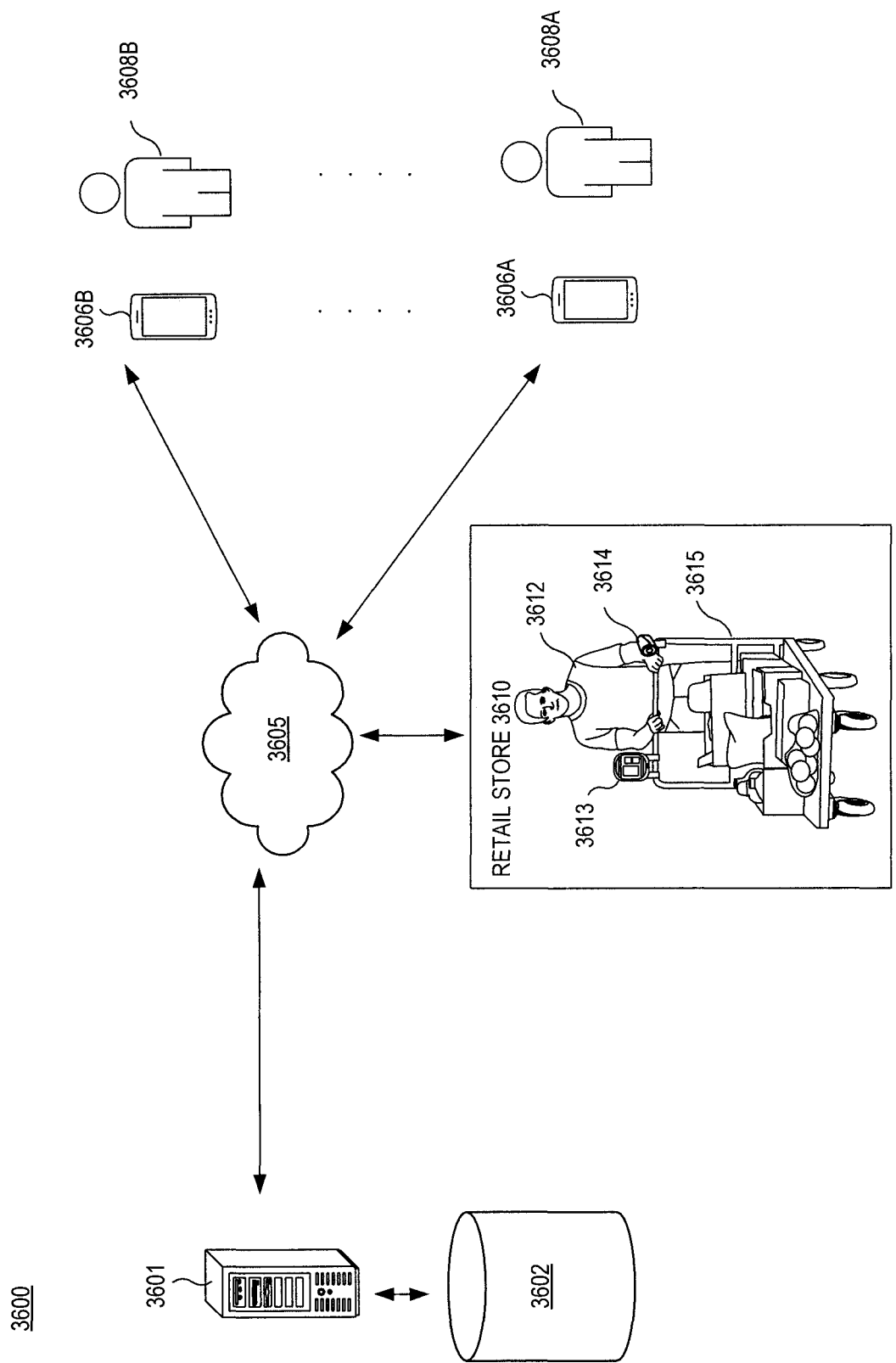
FIG. 36 is an illustration of an exemplary system for frictionless shopping for multiple shopping accounts, consistent with some embodiments of the present disclosure.

FIG. 36 is an illustration of an exemplary system 3600 for frictionless shopping for multiple shopping accounts, consistent with some embodiments of the present disclosure. As illustrated in FIG. 36, system 3600 may include a server 3601, a database 3602, a network 3605, and a plurality of personal devices 3606 (e.g., 3606A, 3606B) respectively associated with a plurality of customers 3608 (e.g., 3608A, 3608B). In addition, system 3600 may include one or more physical shopping carts 3615 in a retail store 3610. Each physical shopping cart 3615 may have one or more of a user interface device 3613 and an image sensor 3614 attached thereto.

In the embodiment illustrated in FIG. 36, server 3601 may be a cloud-based server that communicates with user interface devices 3613, image sensors 3614, and the personal devices 3606A and 3606B via network 3605. In some other embodiments, server 3601 may be part of a system associated with retail store 3610 that communicates with user interface devices 3613 and image sensors 3614 using a wireless local area network (WLAN). According to an embodiment of the present disclosure, sever 3601 may receive multiple orders from multiple customers, each order including a list of products to be shopped for in a retail store. Server 3601 may also receive image data showing multiple shopping receptacles carried by a personal shopper in the retail store. Server 3601 may analyze the received image data to determine multiple virtual shopping carts respectively associated with the multiple shopping receptacles, and to identify the products placed in each one of the multiple shopping receptacles. Server 3601 may update the multiple virtual shopping carts according to the identified products.

Server 3601 may be coupled to or communicatively connected to one or more physical or virtual storage devices such as database 3602. The information stored in database 3602 may be accessed by server 3601 to perform various methods in the embodiments of the present disclosure. Database 3602 may include product type model data (e.g., an image representation, a list of features, a model obtained by training machine learning algorithm using training examples, an artificial neural network, and more) that may be used to identify products that are placed in shopping receptacles in received images. Database 3602 may also include catalog data (e.g., retail store chain's catalog, retail store's master file, etc.) that may be used to check the names and prices of the identified products. Database 3602 may further include various information about shopping receptacles that may be used to identify the shopping receptacles as well as virtual shopping carts respectively associated with the shopping receptacles. For example, database 3602 may store correlation information between shopping receptacles and virtual shopping carts. Moreover, database 3602 may include store layouts of various retail stores. Each store layout may include a floor plan showing an arrangement of a plurality of store shelves within a corresponding retail store, as well as placement of a plurality of products on the store shelves within the retail store.

Personal devices 3606 (e.g., 3606A, 3606B) may be respectively associated with customers 3608 (e.g., 3608A, 3608B). Each personal device 3606 may be configured to present an online shopping platform to a corresponding customer 3608, which allows customer 3608 to order products from retail store 3610. After customers 3608 submit orders, personal devices 3606 may transmit the orders to sever 3601 via network 3605. Each order may contain a list of products to be shopped from retail store 3610, and a time that the products need to be delivered to the corresponding customer 3608. Based on the received orders, server 3601 may generate one or more shopping lists each containing a list of products that need to be collected by a shopper 3612 from retail store 3610 for a corresponding customer. Additionally, server 3601 may generate a shopping path for shopper 3612 to concurrently collect the products in the one or more shopping lists.

Image sensor 3614 may be mounted on physical shopping cart 3615 or may disposed in various locations in retail store 3700 or 3750 to capture static or moving images of various locations in retail store 3700 or 3750. Image sensor 3614 may transmit the captured images to server 3601 via network 3605. Server 2401 may execute an image analysis process to identify shoppers as well as products and/or shopping receptacles in the captured images, and interactions between the shoppers and the products and/or bulk packages. For example, server 3601 may detect, based on the captured images, that a shopper has placed a first product into a first shopping receptacle, and placed a second product into a second shopping receptacle. Server 3601 may perform the detection based on a movement of the shopper in the moving images captured by image sensor 3614. Alternatively or additionally, server 3601 may perform the detection by comparing two static images of the shopping receptacles taken at different times, and detect any change in the products placed in the shopping receptacles.

User interface device 3613 may communicate with server 3601 to present information derived by server 3601 based on processing of image data acquired by image sensor 3614. For example, user interface device 3614 may present one or more shopping lists each including a list of products to be shopped for a virtual shopping cart corresponding to an online shopping account for a customer. User interface device 3614 may also present one or more virtual shopping carts each including a list of products and a number of these products that have been placed in a corresponding shopping receptacle. An example of the virtual shopping cart presented in user interface device 3613 is illustrated in FIG. 11E. User interface device 3614 may further present a map, a text message, or a voice message describing the shopping path for shopper 3612 in order to collect the products in the one or more shopping lists. Moreover, user interface device 3614 may include a text message notifying the shopper if a product that has been placed in a shopping receptacle does not belong to the shopping list corresponding to the shopping receptacle. User interface device 3614 may be all possible types of devices capable of outputting the information derived by server 3601 to shopper 3612, such as a mobile device, a tablet, a personal digital assistant (PDA), etc.

Figure 37A:
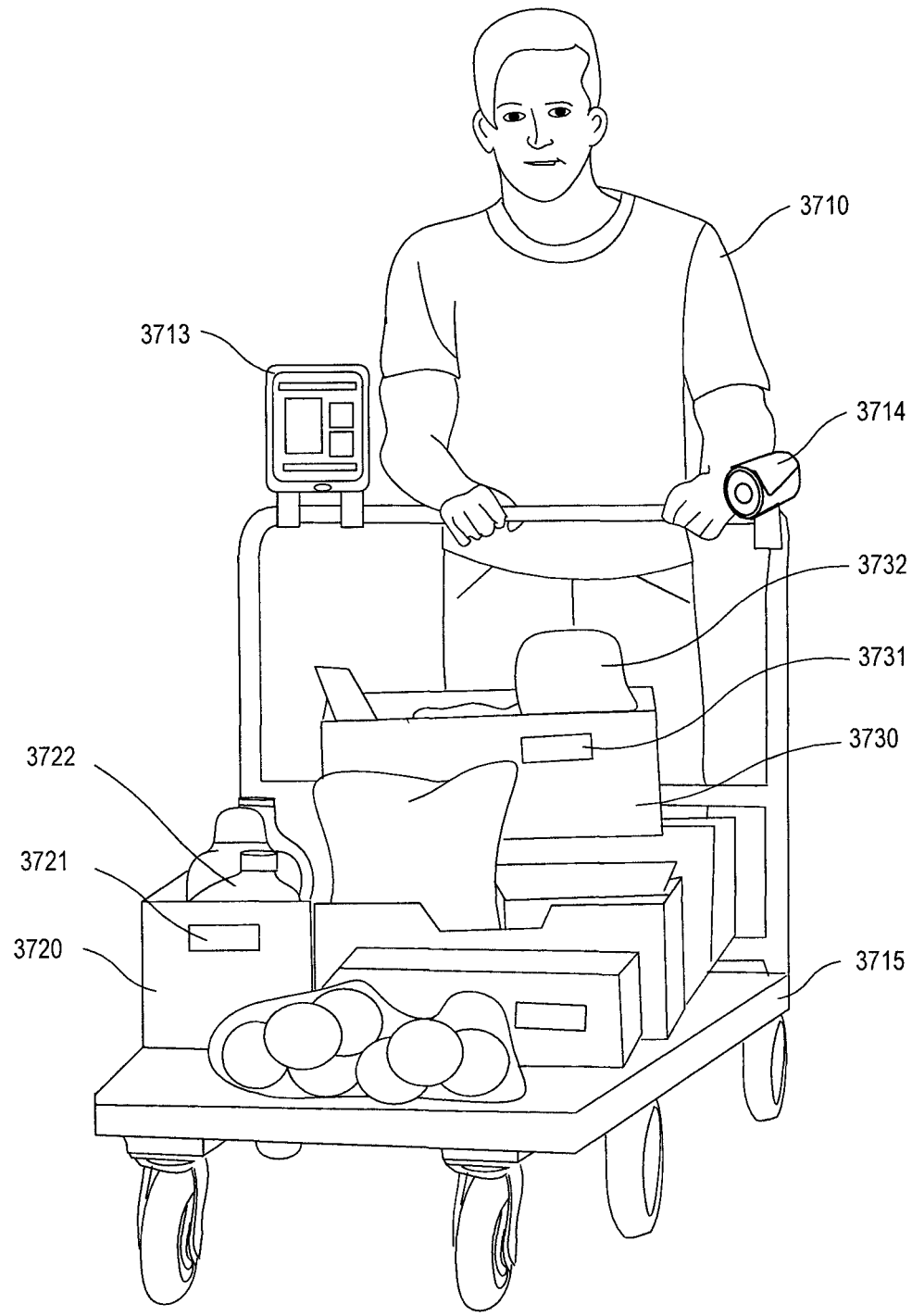
FIG. 37A is a schematic illustration of an example configuration of a retail store, consistent with an embodiment of the present disclosure.

FIG. 37A is a schematic illustration of an example configuration of a retail store 3700, consistent with an embodiment of the present disclosure. As shown in FIG. 37A, retail store 3700 may include a physical shopping cart 3715. A user interface device 3713 and an image sensor 3714 may be fixedly attached to physical shopping cart 3715. User interface device 3713 may be arranged to display or present information (e.g., shopping list, shopping path, notification, etc.) to shopper 3710 when shopper 3710 is holding shopping cart 3715. Image sensor 3714 may be arranged to capture images of all of the contents in shopping cart 3715.

A plurality of shopping receptacles may be disposed in shopping cart 3715. The shopping receptacles may include a plurality of boxes, bags, or baskets. In the embodiment illustrated in FIG. 37A, a first box 3720 and a second box 3730 may be disposed in shopping cart 3715. Each one of first box 3720 and second box 3730 may include a plurality of products 3722 or 3732 that have been collected by shopper 3710. First box 3720 may include a label 3721, which contains a visual identifier (e.g., a barcode, a quick response (QR) code, a flag, a color, an alphanumeric text or code) that uniquely identifies first box 3720. Based on the visual identifier, a server (e.g., sever 3601) may identify a virtual shopping cart that correlates to first box 3720. Similarly, second box 3730 may include a label 3731 which contains a visual identifies that uniquely identifies second box 3730. In an alternative embodiment, each one of labels 3721 and 3731 may be a radio-frequency identification (RFID) tag that transmits signals containing identification information of the corresponding box 3720 or 3730.

In the embodiment illustrated in FIG. 37A, shopping cart 3715 is illustrated as a shopping platform with only one side. In other embodiments, shopping cart 3715 may include four sides surrounding a platform. In addition, in the embodiment illustrated in FIG. 37A, first box 3720 and second box 3730 are placed in the same shopping cart 3715. In other embodiments, first box 3720 and second box 3730 may be placed in different shopping carts. Still alternatively, shopper 3710 may carry two physical shopping carts, each physical shopping cart being associated with a virtual shopping cart. In this case, each physical shopping cart may include a visual identifier or an RFID tag that unique identifies the physical shopping cart. Still alternatively, a box (or a bag, a basket, etc.) may be disposed in a physical shopping cart, with the box being associated with a first virtual shopping cart, and the physical shopping cart being associated with a second virtual shopping cart.

FIG. 37B is a schematic illustration of an example configuration of a retail store 3750, consistent with another embodiment of the present disclosure. As shown in FIG. 37A, retail store 3700 may include a shopping cart 3715, and an image sensor 3764 mounted on a store shelf 3760. Image sensor 3764 may be arranged to capture images of all of the contents in shopping cart 3715 carried by shopper 3710. A mobile phone 3706 associated with shopper 3710 to display or present information (e.g., shopping list, shopping path, notification, etc.) to shopper 3710.

Figure 38A:
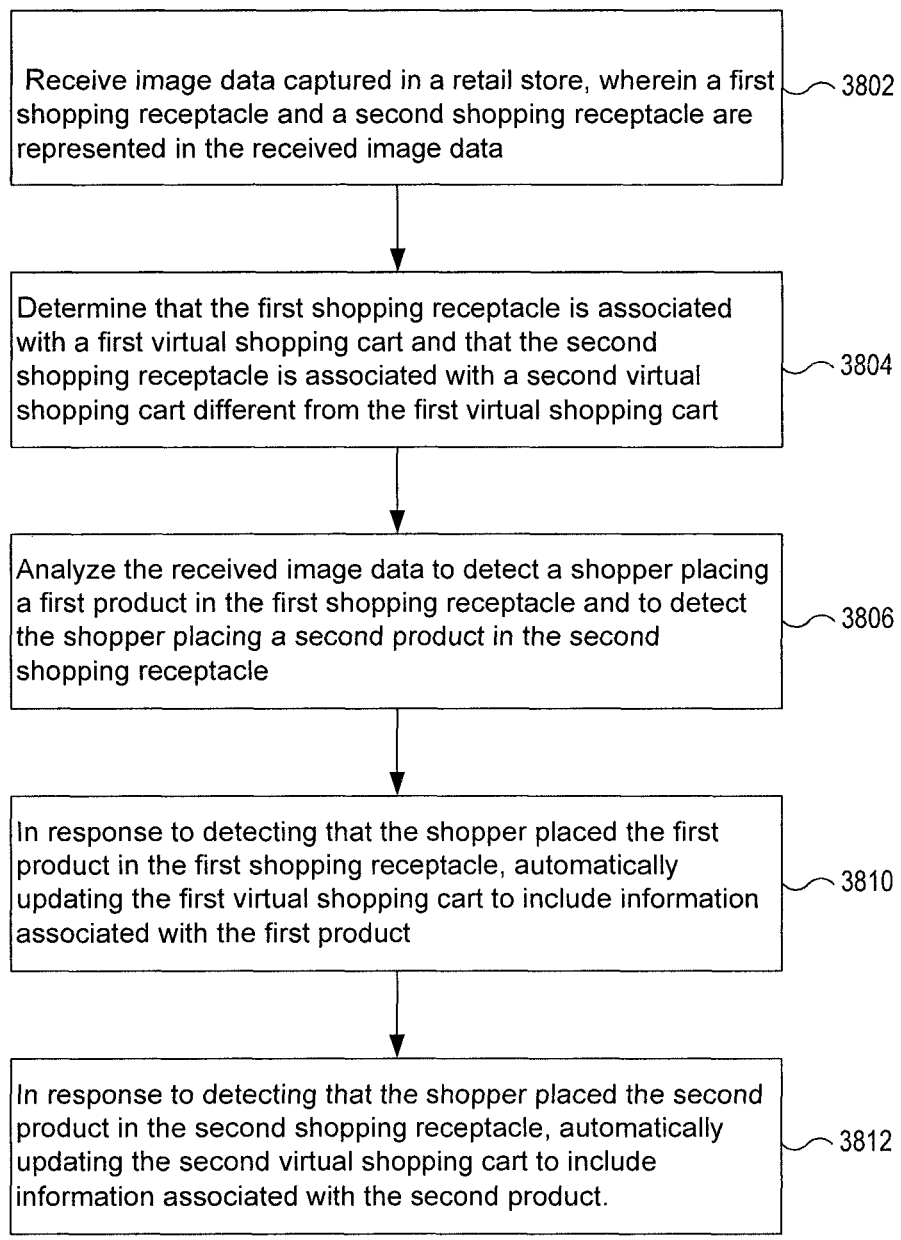
FIGS. 38A, 38B, and 38C include flowcharts representing an exemplary method for automatically updating a plurality of virtual shopping carts, consistent with an embodiment of the present disclosure.
Figure 38B:
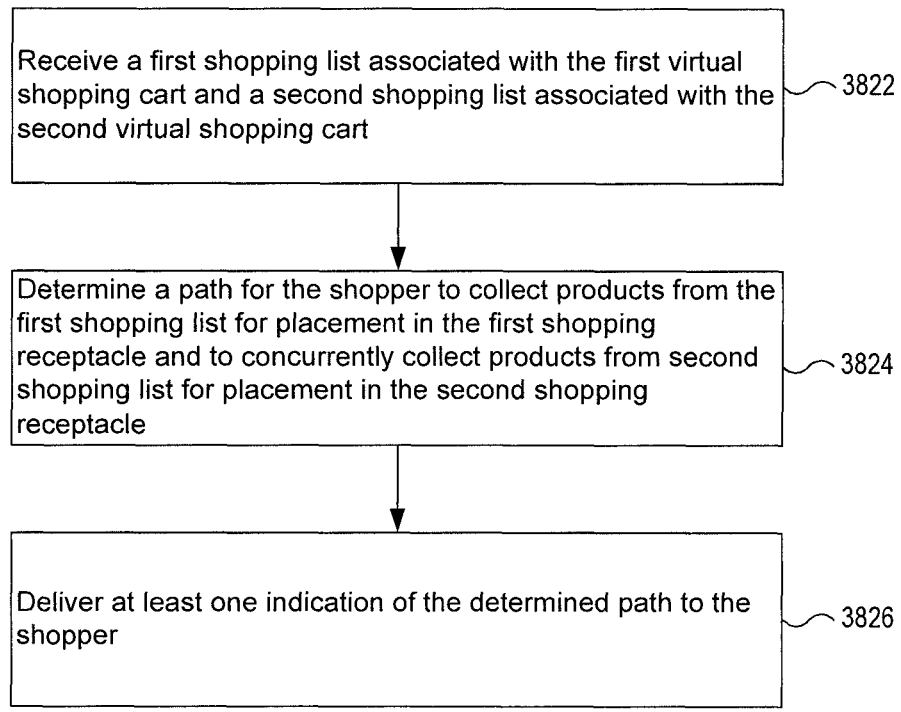
Figure 38C:
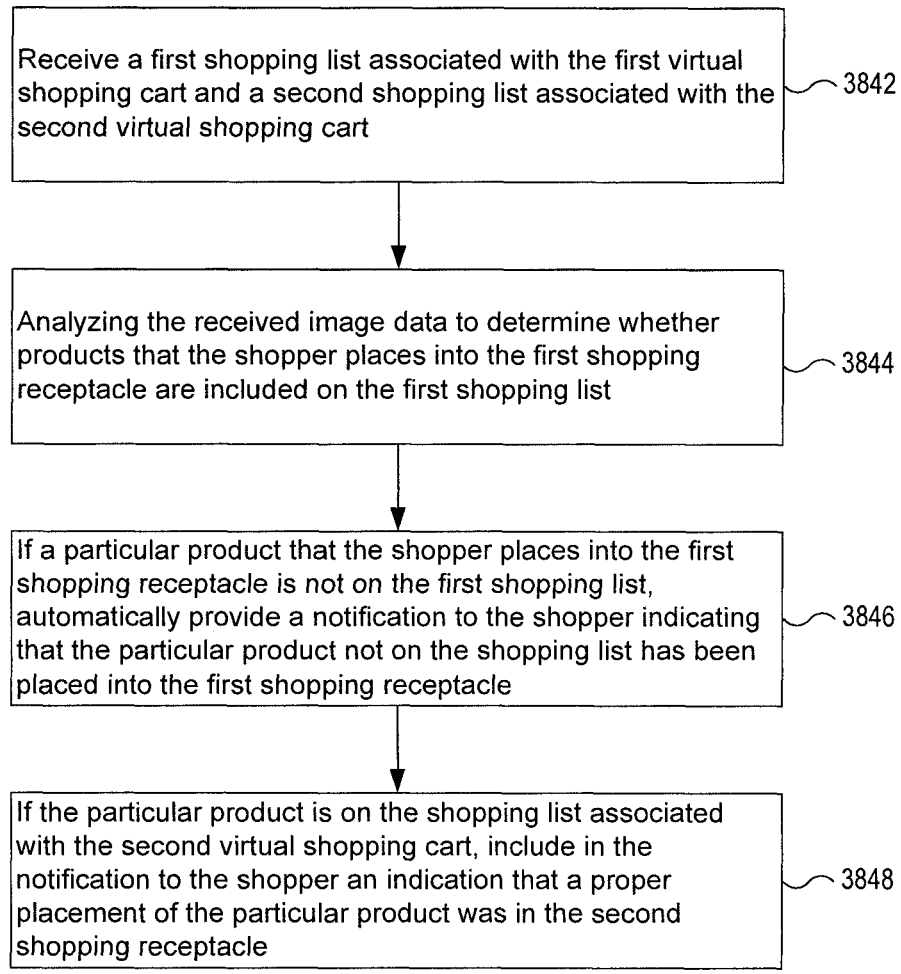

FIGS. 38A, 38B, and 38C include flowcharts representing an exemplary method 3800 for automatically updating a plurality of virtual shopping carts, consistent with an embodiment of the present disclosure. Method 3800 may be performed by a processor at a server (e.g., server 135 or 2401) or a computer (e.g., one of devices 145A, 145B, 145C, and 145D). It will be appreciated, however, that other implementations are possible and that other configurations may be used to implement method 3800. It will also be readily appreciated that the illustrated method can be altered to modify the order of steps, delete steps, or further include additional steps.

For example, method 3800 may be performed by at least one processing device of a server, such as processing device 302, as illustrated in FIG. 3. In some embodiments, some or all of method 3800 may be performed by a different device associated with system 100. In some embodiments, a non-transitory computer readable medium may contain instructions that when executed by a processor cause the processor to perform method 3800. Further, method 3800 is not necessarily limited to the steps shown in FIG. 38A, and any steps or processes of the various embodiments described throughout the present disclosure may also be included in method 3800.

Referring to FIG. 38A, at step 3802, the processor at the server or the computer may receive image data captured in a retail store, wherein a first shopping receptacle and a second shopping receptacle are represented in the received image data. In some embodiments, each one of the first shopping receptacle and the second shopping receptacle each may include at least one of a box, a bag, or a basket. The first shopping receptacle and the second shopping receptacle may be placed in a single physical shopping cart. For example, as illustrated in FIG. 37A, the first shopping receptacle and the second shopping receptacle may be first box 3720 and second box 3730 that are placed in physical shopping cart 3715. In some embodiments, at least one of the first shopping receptacle or the second shopping receptacle is a physical shopping cart. For example, the first shopping receptacle is a first physical shopping cart, and the second shopping receptacle is a second physical shopping cart. In some embodiments, the first shopping receptacle is a physical shopping cart, and the second shopping receptacle comprises at least one of a box, a bag, or a basket. In some embodiments, the image data may include images captured by at least one image sensor fixedly mounted to a physical shopping cart in the retail store. For example, as illustrated in FIG. 37A, image sensor 3714 may be fixedly mounted to physical shopping cart 3715 in retail store 3700. In some embodiments, the image data may images captured by at least one image sensor fixedly mounted to a store shelf in the retail store. For example, as illustrated in FIG. 37B, image sensor 3764 may be mounted to store shelf 3760 in retail store 3750.

At step 3804, the processor may determine that the first shopping receptacle is associated with a first virtual shopping cart and that the second shopping receptacle is associated with a second virtual shopping cart different from the first virtual shopping cart. In some embodiments, the processor may perform the determination in step 3804 based on analysis of the received image data. For example, each of the first shopping receptacle and the second shopping receptacle may include a visual identifier that correlates a shopping receptacle to a virtual shopping cart. The visual identifier may include a barcode, a quick response (QR) code, a flag, colors, an alphanumeric text or code, etc. For example, as illustrated in FIGS. 37A and 37B, each one of boxes 3720 and 3730 placed on shopping cart 3715 may include a label 3721 or 3731 that has the barcode, the QR code, the flag, the color, or the alphanumeric text or code. In some embodiments, the processor may perform the determination in step 3804 based on one or more electronic signals. The one or more electronic signals may be received from radio-frequency identification (RFID) tags associated with each of the first shopping receptacle and the second shopping receptacle. The RFID tags may transmit signals include identification information of the shopping receptacles.

In some embodiments, the correlation between the shopping receptacles and the virtual shopping carts may be established when a shopper enters a retail store. For example, as illustrated in FIG. 37A, shopper 3710 may manually enter, via user interface device 3713 mounted on shopping cart 3715, identification information (e.g., an alphanumerical code) of each of first box 3720 and second box 3730, and identification information (e.g., account number) of each one of the first virtual shopping cart and the second virtual shopping cart. User interface device 3713 may then transmit the correlation information between the boxes and the virtual shopping carts to a database. For another example, as illustrated in FIG. 37B, shopper 3710 may use mobile phone 3706 to scan first and labels 3721 and 3731 on first and second boxes 3720 and 3730 to acquire their identification information. Then, shopper 3710 may use mobile phone 3706 to select a virtual shopping account to be associated with each one of first and second boxes 3720 and 3730. Mobile phone 3706 may then transmit the correlation information between the boxes and the virtual shopping carts to a database. In some embodiments, after detecting that the shopper has placed a product into a shopping receptacle and that the correlation between the shopping receptacles and the virtual shopping cart has not been established, the process may transmit a notice to the shopper via, for example, user interface device 3713 or mobile phone 3706, to remind the shopper to establish such correlation.

At step 3806, the processor may analyze the received image data to detect a shopper placing a first product in the first shopping receptacle and to detect the shopper placing a second product in the second shopping receptacle. For example, as illustrated in FIGS. 37A and 37B, the processor may analyze the image data to detect that shopper 3710 places first product 3722 in first box 3720, and places second product 3732 in second box 3730. In some embodiments, in step 3806, the processor may analyze the received image data to first detect an existence of each one of first product 3722 and second product 3732, and then identify first product 3722 and second product 3732. For example, for each one of first product 3722 and second product 3732, the processor may determine a unique identifier associated with the product and then retrieve product information (e.g., product type, prices, etc.) from a product catalogue stored in a database (e.g., database 3602 or a local database in retail store 3700 or 3750) according to the unique identifier. In some examples, the image data may be analyzed to determine positions of first product 3722 and second product 3732 (for example, in the image data, in relation to a physical object, in real-world coordinates), for example using visual object detection algorithms. Further, the image data may be analyzed to determine positions of the first shopping receptacle and the second shopping receptacle (for example, in the image data, in relation to a physical object, in real-world coordinates), for example using visual object detection algorithms. Further, step 3806 may detect that the shopper placed the first product in the first shopping receptacle and that the shopper placed the second product in the second shopping receptacle based on the determined positions of the first product, the first shopping receptacle, the second product and the second shopping receptacle, for example based on proximity between the determined position of the first product and the determined position of the first shopping receptacle and/or based on proximity between the determined position of the second product and the determined position of the second shopping receptacle. In some examples, the image data may be analyzed to determine a relative motion between the first product and the first shopping receptacle, and/or to determine a relative motion between the second product and the second shopping receptacle, for example using visual motion detection algorithms. Further, step 3806 may detect that the shopper placed the first product in the first shopping receptacle and that the shopper placed the second product in the second shopping receptacle based on the determined relative motion between the first product and the first shopping receptacle and/or on the determine relative motion between the second product and the second shopping receptacle, for example, based on the first product moving towards the first shopping receptacle and based on the second product moving towards the second shopping receptacle. In some examples, a convolution of at least part of the image data may be calculated. Further, in response to a first value of the calculated convolution of the at least part of the image data, step 3806 may detect that the shopper placed a first product in the first shopping receptacle, and in response to a second first value of the calculated convolution of the at least part of the image data, step 3806 may forgo detecting that the shopper placed a first product in the first shopping receptacle.

At step 3810, in response to detecting that the shopper placed the first product in the first shopping receptacle, the processor may automatically update the first virtual shopping cart to include information associated with the first product. In some embodiments, the processor may automatically update the first virtual shopping cart by adding a price of the first product to an invoice associated with the first virtual shopping cart. The processor may also add a product type, a product name, and a quantity of the first product placed in the first shopping receptacle, to the invoice associated with the first virtual shopping cart.

At step 3812, in response to detecting that the shopper placed the second product in the second shopping receptacle, the process may automatically update the second virtual shopping cart to include information associated with the second product. In some embodiment, the processor may automatically update the second virtual shopping cart by adding a price of the second product to an invoice associated with the second virtual shopping cart. The processor may also add a product type, a product name, and a quantity of the second product placed in the second shopping receptacle, to the invoice associated with the second virtual shopping cart.

Referring to FIG. 38B, method 3800 for automatically updating the virtual shopping carts may further includes steps 3822, 3824, and 3826. In some embodiments, one or more of steps 3822, 3824, and 3826 may be performed before the steps in FIG. 37A.

At step 3822, the processor may receive a first shopping list associated with the first virtual shopping cart and a second shopping list associated with the second virtual shopping cart. Each shopping list may include a list of products that need to be purchased by the shopper for the corresponding virtual shopping cart.

At step 3824, the processor may determine a path for the shopper to collect products from the first shopping list for placement in the first shopping receptacle and to concurrently collect products from second shopping list for placement in the second shopping receptacle. The processor may determine the path based on both of the first shopping list and the second shopping list, as well as a store layout of the retail store. The store layout may include a floor plan showing arrangement of a plurality of store shelfs within the retail store, as well as placement of a plurality of products on the store shelfs. The store layout may be stored in a database (e.g., database 3602 or a local database in retail store 3700 or 3750). In another example, the store layout may be on an analysis of image data captured from the retail store. For example, locations of products of different product types may be determined based on the analysis of the image data as described herein.

At step 3826, the processor may deliver at least one indication of the determined path to the shopper. For example, the processor may deliver the indication of the determined path to user interface device 3713 of FIG. 37A, or to mobile phone 3706 associated with shopper 3710 in FIG. 37B. The indication of the determined path may include a diagrammatic representation of the determined path overlaid on top of a floor plan of the retail store. Alternatively or additionally, the indication of the determined path may include a list of aisle numbers, shelf numbers, and products names sequentially arranged in an order determined by the processor.

Referring to FIG. 38C, method 3800 for automatically updating the virtual shopping carts may further include steps 3842 through 3848.

At step 3842, the processor may receive a first shopping list associated with the first virtual shopping cart and a second shopping list associated with the second virtual shopping cart.

At step 3844, the processor may analyze the received image data to determine whether products that the shopper places into the first shopping receptacle are included on the first shopping list. The processor may perform the analysis every time the shopper places a new product into the first shopping receptacle. Alternatively, the processor may perform the analysis at a predetermined interval, for example, every 5 minutes, every 10 minutes, every 20 minutes, etc. If the processor performs the analysis at the predetermined interval, the processor may only need to compare the products placed into the shopping receptacles with the shopping list within the predetermined interval. Still alternatively, the processor may perform the analysis before a checkout process. In some examples, a convolution of at least part of the received image data may be calculated, in response to a first value of the calculated convolution, step 3844 may determine that products that the shopper places into the first shopping receptacle are included on the first shopping list, and in response to a second value of the calculated convolution, step 3844 may determine that at least one product that the shopper places into the first shopping receptacle is not included on the first shopping list. In some examples, the received image data may be analyzed using visual product recognition algorithm to identify types and/or quantities of the products that the shopper places into the first shopping receptacle, and step 3844 may compare the identified types and/or quantities with product types and/or quantities in the first shopping list to determine whether the products that the shopper places into the first shopping receptacle are included on the first shopping list.

At step 3846, if the processor determines that a particular product that the shopper places into the first shopping receptacle is not on the first shopping list, the processor may automatically provide a notification to the shopper indicating that the particular product not on the first shopping list has been placed into the first shopping receptacle. The notification may include an identification of the particular product. In some embodiments, the notification may be provided to mobile phone 3706 associated with shopper 3710 (as illustrated in FIG. 37B). Alternatively or additionally, the notification may be provide to user interface device 3713 mounted on physical shopping cart 3715 (as illustrated in FIG. 37A).

At step 3848, the processor may further determine if the particular product that the shopper places into the first shopping receptacle but is not on the first shopping list, is on the second shopping list associated with the second virtual shopping cart. If the processor determines that the particular product is on the second shopping list, the processor may include in the notification to the shopper an indication that a proper placement of the particular product was in the second shopping receptacle. If the processor determines that the particular product is not on the second shopping list, the processor may forgo including the indication that the proper placement of the particular product was in the second shopping receptacle.

As described above, the disclosed embodiments may allow for identification and tracking of products selected by shoppers in a retail environment by processing image data or other sensor data. In some embodiments, this may allow for a frictionless shopping experience for a shopper, as described above. In some instances, the captured image data may be insufficient for fully identifying a selected product. For example, ambiguity may exist regarding which product a shopper selected. To aid in resolving such ambiguous product selection events, the disclosed embodiments may include accessing an electronic shopping list associated with a customer. For example, if it is unclear based on image data whether a shopper has selected Pepsi® or Diet Pepsi®, and an electronic shopping list associated with the shopper includes Diet Pepsi®, it may be more likely that the shopper has selected the item on the shopping list. This may also assist in preserving a shopper's eligibility for frictionless checkout as described above with respect to FIGS. 18-20B.

As used herein an electronic shopping list may refer to any data representing items that are associated with a customer. In some embodiments, the shopping list may be a list of desired items. For example, a customer of a retail store may create a shopping list of items that he or she intends to purchase from the retail store. Alternatively or additionally, the electronic shopping list may be a list of items associated with the customer based on previous purchases. For example, the electronic shopping list may include a list of all items a customer has ever purchased, a list of items most commonly purchase, a list of items purchased in one or more previous visits, or the like. Accordingly, the list may be automatically generated and maintained by a server or other computing device.

The electronic shopping list may be generated and/or stored in any suitable format for representing a list of products. For example, the electronic shopping list may be stored as a list, an array, a text string or text file, a table, a database, or various other data structures. In some embodiments the electronic shopping list may be stored in local memory of a device. For example, a shopping list may be stored in a phone or other mobile device of a customer, shopper, store associate, or the like. Alternatively or additionally, the electronic shopping device may be stored remotely and may be accessed by a device within the retail store. For example, the electronic shopping list may be stored on a remote server (e.g., server 135), on a cloud storage platform, on a web server, on remote desktop or laptop computing device, or any other storage device accessible via a network.

Figure 39:
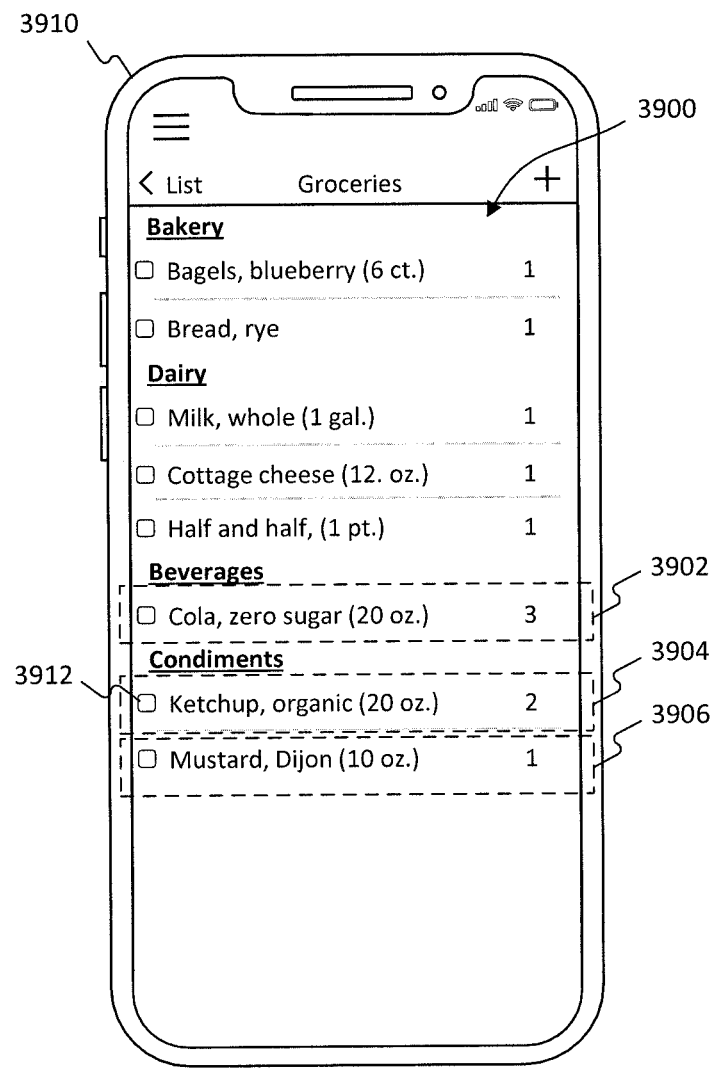
FIG. 39 illustrates an example electronic shopping list associated with a customer, consistent with the disclosed embodiments.

FIG. 39 illustrates an example electronic shopping list 3900 associated with a customer, consistent with the disclosed embodiments. In this example, electronic shopping list 3900 may be displayed on a mobile device 3910. In some embodiments, mobile device 3910 may be associated with the customer. For example, the customer may access and reference electronic shopping list 3900 while shopping in a retail store. As another example, mobile device 3910 may be associated with a shopper, which may be a different entity than the customer. For example, a shopper may act as a proxy for the customer and may shop on the customer's behalf using the electronic shopping list. The shopper may be a human shopper or may be a robotic device configured to select products from one or more retail shelves. In some embodiments, mobile device 3910 may correspond to various other devices described herein, including one or more of output devices 145A, 145B, 145C and 145D. Electronic shopping list 3900 may be accessible to other devices, such as image processing unit 130, which may use electronic shopping list 3900 to resolve ambiguous product selection events, as described herein. While FIG. 39 shows electronic shopping list 3900 being displayed on mobile device 3910, it is to be understood that electronic shopping list 3900 may not necessarily be displayed in the retail environment and may be stored and accessed electronically.

As shown in FIG. 39, electronic shopping list 3900 may include one or more products, such as products 3902, 3904, and 3906. Electronic shopping list 3900 may include additional information describing each product in the list. For example, electronic shopping list 3900 may include one or more of a brand name, a model, a product type or subtype (e.g., a product flavor, diet vs. regular, whole vs. 2% milk, etc.), a product category, a unit or packaging type (e.g., can, bottle, jar, box, etc.), a product size, or any other information that may help to identify a particular product. In some embodiments, electronic shopping list 3900 may include a product number, such as a stock-keeping unit (SKU) number or other identifier. In some embodiments, the product may be represented in electronic shopping list 3900 by the identifier and the information displayed in FIG. 39 may be accessed through a look-up function based on the identifier.

In some embodiments, electronic shopping list 3900 may include other data, such as a quantity of items to be purchased. For example, product 3904 may be associated with a quantity of 2 units, whereas product 3902 may be associated with a quantity of 3 units, as shown. As another example, electronic shopping list 3900 may include data or metadata indicating whether a product has been selected by a shopper, whether a product has been purchased, whether a product is in stock, or various other information associated with the product, which may or may not be displayed on mobile device 3910. In other words, mobile device 3910 may only display a subset or summary of information included in electronic shopping list 3900. In some embodiments, mobile device 3910 may include a checkbox or other element indicating whether a product has been selected, purchased, or the like. For example, mobile device 3910 may display checkbox 3912 indicating whether product 3904 has been selected by the shopper. Checkbox 3912 may be interactive such that a shopper may select checkbox 3912 to toggle a status associated with product 3904.

Electronic shopping list 3900 may be generated in various ways. In some embodiments, electronic shopping list 3900 may be generated by a customer associated with electronic shopping list 3900. For example, a customer may select products for inclusion in electronic shopping list 3900 from a larger list of available products via user interface. For example, the user interface may be presented through an app or application (e.g., a retail store app, a grocery or other product delivery app, a generic shopping list app, or the like). In some embodiments, this may include a web-based application, such as a website or other online interface for a retailer, a delivery service, or the like. The customer may select from a list of all available products in the store to build electronic shopping list 3900. The customer may select the products through mobile device 3910 or through another device, such as a personal computing device, a second mobile device, a tablet, a laptop, or the like.

Alternatively or additionally, electronic shopping list 3900 may be generated automatically. In some embodiments, electronic shopping list 3900 may be at least partially generated based on a customer's shopping history in a particular retail store. The automatically generated shopping list may be a prediction of items the customer would like to purchase during the next visit. For example, if a certain customer always buys a particular brand of organic ketchup, electronic shopping list 3900 may be generated to include this product. When an ambiguity arises regarding which ketchup product a customer selects, the disclosed embodiments may include accessing electronic shopping list 3900 to determine which type of ketchup the customer usually purchases. In some embodiments, a customer may confirm, modify, supplement, or revise the list of automatically generated products included in electronic shopping list 3900. Alternatively or additionally, electronic shopping list 3900 may not be tied to a particular visit but may be a record of previous purchases, as described above.

As described herein, the disclosed systems and methods may detect items selected by a shopper using image data. Items identified as having been selected may be included in a virtual shopping cart associated with a shopper (and/or a customer). Accordingly, in this context, a virtual shopping cart may refer to a list of items having been selected in a retail store by a shopper. This virtual shopping cart may be used during a checkout process by the shopper. For example, the disclosed systems may generate a total amount due based on the items in the virtual shopping cart and request payment from the shopper or customer for the items. In some embodiments, the virtual shopping cart may be a frictionless checkout as described throughout the present disclosure. Accordingly, it may be beneficial to maintain an accurate virtual shopping cart for a shopper to avoid potential issues during checkout or to maintain frictionless checkout eligibility for a shopper.

Figure 40A:
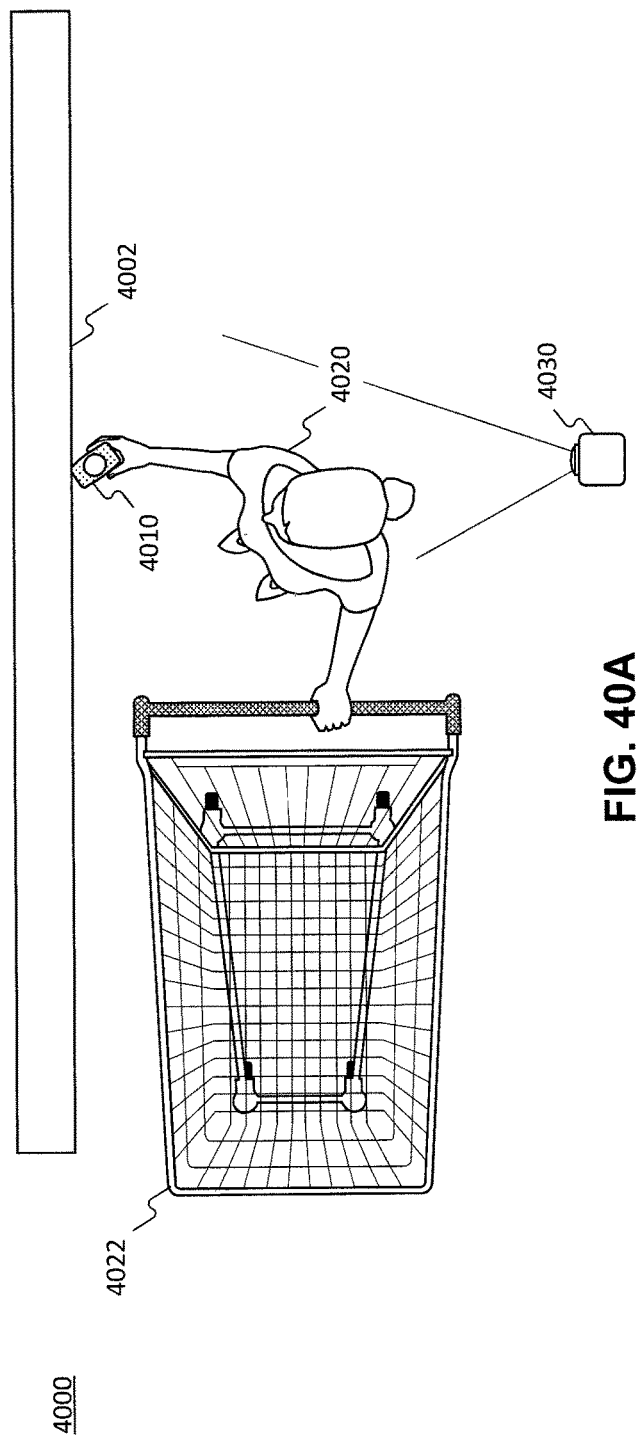
FIG. 40A illustrates an example product interaction event that may be detected, consistent with the disclosed embodiments.

As described above, various forms of ambiguity may arise when a shopper selects a product. FIG. 40A illustrates an example product interaction event 4000 that may be detected, consistent with the disclosed embodiments. As shown in FIG. 40A, a shopper 4020 may interact with a product 4010 in a retail environment, which may include, looking at product 4010, stopping in front of product 4010, picking up product 4010 from a shelf 4002, returning product 4010 to shelf 4002, placing product 4010 in a shopping cart 4022 associated with shopper 4020, or various other forms of interaction. In some embodiments, the interaction between shopper 4020 and product 4010 may at least partially be detected by a sensor. For example, the sensor may include a camera 4030, as shown in FIG. 40A. Camera 4030 may include any device capable of capturing one or more images from within a retail environment. In some embodiments, camera 4030 may correspond to image capture device 125 (including devices 125A, 125B, 125C, 125D, 125E, 125F, or 125G) as described above. Accordingly, any embodiments or features described in reference to image capture device 125 may equally apply to camera 4030. Camera 4030 (and in some cases, additional image capture devices) may be used to identify shopper 4020 in the retail environment, as well as product 4010, as described above.

In some embodiments, product interaction event 4000 may be an ambiguous product selection event due to a view of camera 4030 being at least partially blocked. For example, shopper 4020 may be positioned such that the interaction with product 4010 by shopper 4020 is blocked by shopper 4020 or an obstacle, such as another shopper, a shelf, another shopping cart, or the like. Accordingly, it may be unclear whether the product was selected or returned to the shelf. For example, it may be unclear whether product 4010 was selected by shopper 4020 (e.g., placed into shopping cart 4022) or was returned to shelf 4002. Or, if a product was selected, it may also be unclear whether product 4010 was selected or whether a different product from shelf 4002 was selected. Various other types of events related to camera 4030 may cause uncertainty as to the interaction with product 4010, as described above with respect to FIG. 18. It is to be understood that the ambiguous product interaction event illustrated in FIG. 40A is provided by way of example, and various other scenarios may lead to uncertainty in the selection of products.

In some embodiments, the shopper may be associated with multiple electronic shopping lists. For example, as noted above, the shopper may be a "picker" or proxy shopper who may shop for multiple customers, each being associated with a different electronic shopping list. As another example, the shopper may be a robotic device programmed to select products for different customers. Accordingly, identifying an electronic shopping list may include selecting an electronic shopping list from a plurality of electronic shopping lists associated with a shopper. In some embodiments, server 135 may select the electronic shopping list based on image data. For example, this may include detecting product selection events, and comparing the selected products to each of the plurality of electronic shopping lists. In some embodiments, the identification of the electronic shopping list may be based on a receptacle corresponding to a detected product selection event. For example, the shopper may have a cart or other apparatus for carrying products having multiple receptacles associated with different customers (or different electronic shopping lists). Based on which receptacle the selected product is placed into, the associated electronic shopping list may be identified. These receptacles may include shopping bags, bins, separate carts, boxes, cartons, or other forms of containers.

Figure 40B:
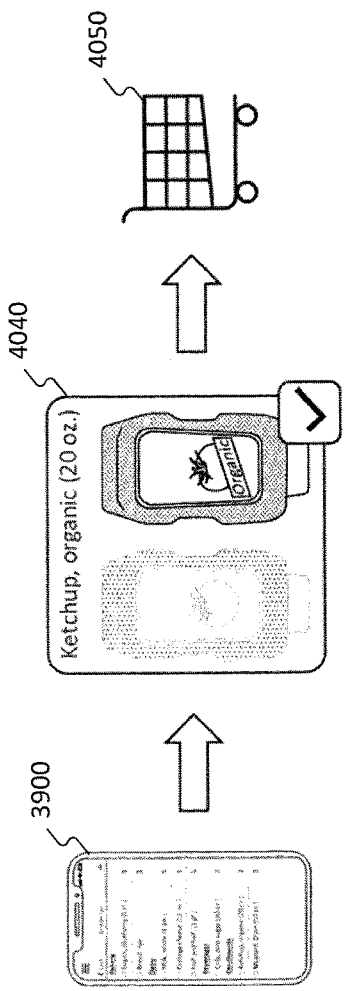
FIG. 40B is a diagrammatic illustration of an example process for resolving an ambiguity based on a shopping list, consistent with the disclosed embodiments.

Consistent with the embodiments disclosed herein, server 135 may access an electronic shopping list to resolve the ambiguity. FIG. 40B is a diagrammatic illustration of an example process for resolving an ambiguity based on a shopping list, consistent with the disclosed embodiments. Based on product interaction event 4000, server 135 may access electronic shopping list 3900, as shown in FIG. 40B. Based on the contents of electronic shopping list 3900, which may be associated with shopper 4020, sever 135 may make an identification 4040 of product 4010. For example, server 135 may determine that product 4010 is a condiment based on the location of shopper 4020 and/or product 4010, but may not know which condiment has been selected. In some embodiments, server 135 may determine that product 4010 is a bottle of ketchup but server 135 may be missing further information to more precisely identify product 4010. Using the example of electronic shopping list 3900 shown in FIG. 39, server 135 may determine that electronic shopping list 3900 includes product 3904, which represents a particular organic ketchup product. Accordingly, server 135 may determine that the ketchup product 4010 selected by shopper 4020 is most likely product 3904. Accordingly, as shown in FIG. 40B, identification 4040 may include identifying product 4010 as a 20 oz. bottle of organic ketchup as opposed non-organic ketchup, other brands of organic ketchup, other sizes of organic ketchup, or the like.

Based on identification 4040, product 4010 may be added to virtual shopping cart 4050 associated with shopper 4020. Accordingly, virtual shopping cart 4050 may be used in a checkout process associated with the shopper. In some embodiments, the checkout process may be a frictionless checkout process, as described above. Accordingly, virtual shopping cart 4050 may be associated with a frictionless checkout. As described above, this may also require a shopper to maintain a frictionless checkout eligibility status, which may be lost due to ambiguous product interaction events. Accordingly, in response to identification 4040, a frictionless shopping eligibility status associated with the shopper may be maintained. In some embodiments, based on identification 4040, electronic shopping list 3900 may be updated to reflect the identification of product 4010. For example, this may include marking an item as having been selected from the list, updating a quantity associated with the item on the list, removing the item, or the like. In some embodiments, the updated electronic shopping list 3900 may then be used for additional product selection events. The refined list may narrow the candidate products for future product selection events, which may improve the accuracy for future identifications.

In some embodiments, the disclosed embodiments may include selecting between multiple items in electronic shopping list 3900. For example, if server 135 determines that product 4010 is a condiment but electronic shopping list 3900 includes multiple condiments, identification 4040 may include selecting between the condiments included in electronic shopping list 3900. In some embodiments, this may be based on information included in the captured images. For example, if system 135 determines that product 4010 has a size, shape, color, position, and/or other properties that are more consistent with product 3904 than other condiment products on electronic shopping list 3900 (such as product 3906), product 4010 may be identified as product 3904. In some embodiments, the quantity of product selected may be compared to a quantity associated with products on electronic shopping list 3900, which may assist in identifying product 4010. For example, if shopper 4020 selects two of product 4010, it may be more likely that product 4010 is product 3904, consistent with the quantity for product 3904 indicated in electronic shopping list 3900.

In some embodiments, identification 4040 may be based on an indicator of a confidence level, such as a confidence score, associated with the identification of product 4010. For example, server 135 may generate a confidence score indicating a degree of likelihood that product 4010 has been correctly identified. The confidence score may be generated based on various factors, including an image quality of the representation of product 4010 in an image, a degree of matching between detected product 4010 and an expected appearance of a product in an electronic shopping list, how closely the number of products selected matches the quantity for a product in the electronic shopping list, an inventory of the identified product in the retail store, or any other factors that may affect a confidence level for identification 4040.

In some embodiments, identification 4040 may be based on a comparison of a confidence score to a threshold. For example, a minimum confidence score threshold value may be set and a product may be identified and added to virtual cart 4050 if a confidence score exceeds the minimum threshold value. The confidence level for a product identification and the threshold values may similarly be used in association with maintaining a frictionless checkout status for a shopper. In some embodiments, the threshold value may vary depending on other factors. As one example, the predetermined threshold may vary based on a product type. For example, more expensive items, such as electronics may require a higher confidence score to be identified or for a shopper to maintain frictionless checkout eligibility. As another example, the predetermined threshold may depend on a location in the retail store. For example, more expensive or critical areas of a store (e.g., a pharmacy, or the like) may require a higher confidence level. In some embodiments, the confidence score may be used to distinguish between multiple products on electronic shopping list 3900. For example, if product 4010 is determined to be a condiment, a confidence score may be generated for each of products 3904 and 3906. The product on electronic shopping list 3900 having the highest confidence score may be identified in identification 4040.

Figure 41:
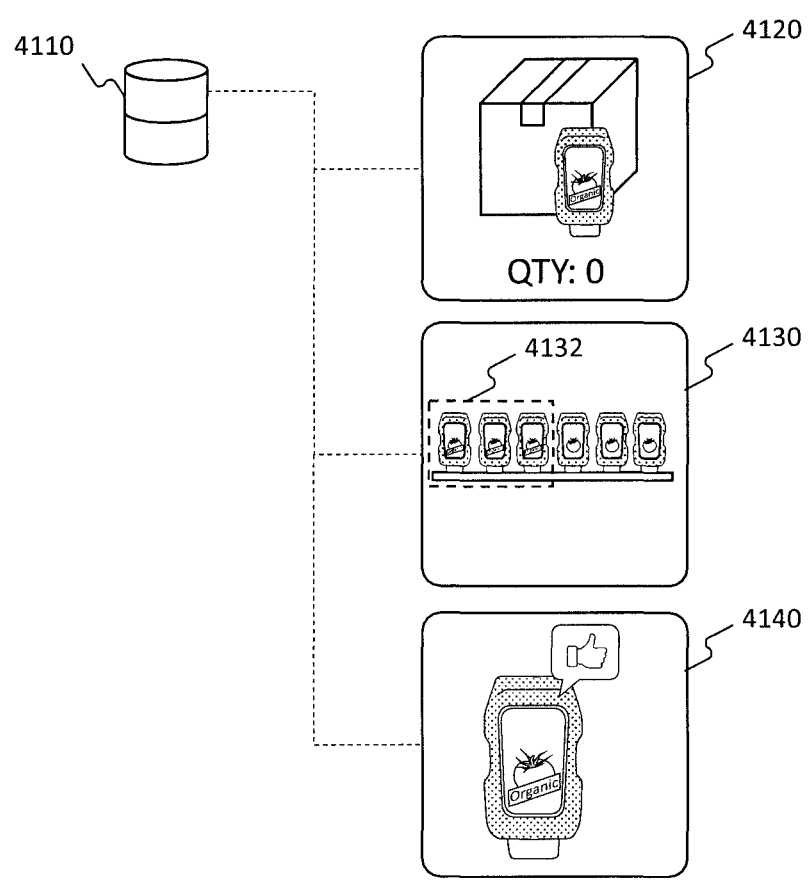
FIG. 41 illustrates example information that may be used to identify a product or to confirm a product identification, consistent with the disclosed embodiments.

Consistent with the disclosed embodiments, various additional information may be used to identify product 4010. FIG. 41 illustrates example information that may be used to identify a product or to confirm a product identification, consistent with the disclosed embodiments. As shown in FIG. 41 server 135 may access a data source 4110, which may store various information associated with a retail store, a customer, a product, a product manufacturer, or any other information that may be relevant to identification of a product. Data source 4110 may include any device or interface through which this data may be accessed. For example, data source 4110 may be a database, a server, a local hard drive or memory device, a cloud storage platform, an online resource (e.g., a webpage, a website, etc.), sensor output, electronic transmission, or any other source of information. In some embodiments, data source 4110 may correspond to one or more other data sources described throughout the present disclosure, including memory device 226, database 140, one or more of devices 145A, 145B, 145C, and 145D, or any other devices associated with system 100.

In some embodiments, server 135 may access inventory data 4120. As used herein, inventory information may refer to any information indicating an inventory of a retail store. For example, inventory data 4120 may include a database, record, or other data structure indicating a number of products available within a retail store. This may include a number of items displayed on retail shelving, a number of items in a storage area, or both. For example, inventory data 4120 may refer to an inventory of product 3620 included in a storage area of the retail store including shelving unit 3610. The storage area may be a storage room, a portion of a shelving unit within the retail store dedicated to storage (e.g., a top shelf, etc.), or any other suitable storage location. In other embodiments, inventory data 4120 may refer to off-site storage, for example, in a warehouse, in a delivery truck, or the like.

Inventory data 4120 may be accessed by server 135 and used to identify product 4010. For example, if product 3904 is out of stock, as indicated by inventory data 4120, product 4010 likely does not correspond to product 3904. Similarly, the stocked inventory of products not on electronic shopping list 3900 may also help identify product 4010. For example, if products similar to product 3904 are out of stock, it may be more likely that product 4010 corresponds to product 3904, which may increase a confidence level, etc. In some embodiments, server 135 may identify product 4010 as corresponding to a second product on electronic shopping list 3900 when a first product is out of stock. For example, as described above, electronic shopping list 3900 may include a historical list of items purchased by a shopper or customer. The electronic shopping list may further include ranking information associated with the customer's past purchases within a particular product type group. This ranking may be based on how commonly each product is purchased, a preference ranking input by the customer, a relative price of the products, or any other information that may rank products relative to each other. In some embodiments, the ranking may be specific to instances where the first product is out of stock. For example, the ranking may be an indication of what products the customer typically buys when product 3904 is out of stock. If the customer typically buys a different brand or different size of product in this scenario that replacement product may be identified as product 4010. The ranking may also be a general ranking of how commonly products are purchased (i.e., not in the context of a primary product being out of stock).

In some embodiments, inventory data 4120 may be used to update electronic shopping list 3900. For example, if product 3904 is indicated as being out of stock, a substitute product may be added to electronic shopping list 3900, based on a similar analysis as described above. This updated electronic shopping list may then be used to resolve product selection ambiguities. For example, when product interaction event 4000 is detected, electronic shopping list 3900 may have already been updated based on product 3904 being out of stock. In particular, product 3904 may be replaced with a substitute product determined to be most likely to be purchased instead of product 3904. Information about the substitute product may then be used to perform identification 4040, consistent with the techniques described above.

As another example of information that may aid in identifying a product, server 135 may access planogram data 4130. As used herein, planogram data may refer to any information indicating a preferred or intended placement of products on a retail shelf. For example, planogram data 4130 may include information associated with contractual obligations and/or other preferences related to the retailer methodology for placement of products on the store shelves. Based on image data (e.g., images acquired by camera 4030), server 135 may determine an area 4132 (or approximate area) from which product 4010 was selected. Area 4132 may be compared to a location within a planogram based on planogram data 4130 to identify or help identify product 4010. Combined with the analysis based on electronic shopping list 3900, planogram data 4130 may increase the accuracy of product identification 4040. In some embodiments, this may result in a higher confidence level associated with identification 4040.

As another example, server 135 may access product affinity data 4140 associated with the customer. As used herein, product affinity data may refer to any information indicating a preference for or tendency toward a product or product type by a customer. Product affinity data 4140 may be specific to a particular customer. For example, product affinity data 4140 may be a ranking of historical purchases by a customer, which may indicate an affinity for a particular product. Affinity data 4140 may also indicate an affinity for a particular product type. For example, if the customer consistently buys organic products, bulk products, low fat or fat-free varieties, or the like, it may indicate an affinity between the customer and this product type. In some embodiments, affinity data 4140 may be based on information input by the customer. For example, the customer may select or otherwise identify preferred products or product types through a user interface, which may be stored as affinity data 4140. As another example, a user may "like" or rate particular products, which may indicate an affinity between the customer and those products. Accordingly, affinity data 4140 may be accessed from a social media network or other platform through which a ratings or other indications of product affinities may be recorded. Various other types of information, including browsing history, search history, or other data associated with a customer may similarly indicate product affinities.

In some embodiments, product affinity data 4140 may not be specific to a particular customer. Rather, product affinity data 4140 may reflect preferences or tendencies of other customers. For example, this may include the highest ranked product, most liked product, a trending product, or other indications of affinities between customers and products. In some embodiments, product affinity data 4140 may indicate a pairwise affinity between products or product types. For example, customers who commonly buy Brand X of deodorant may be more likely to buy Brand X (or even Brand Y) of shaving cream. As another example, customers who frequently buy organic products may commonly purchase sulfate-free products. These product affinities may be indicated in product affinity data 4140. Accordingly, if a shopper has already selected sulfate-free shampoo, it may be more likely that product 4010 is organic ketchup rather than regular ketchup. This product affinity data may be used to further identify product 4010, which may increase a confidence level associated with product identification 4040.

Various other information accessible to server 135 may also be used to identify products in conjunction with electronic shopping list 3900. For example, this may include analyzing image data to determine a location of the shopper during product interaction event 4000. This location may be used to further refine the identification of product 4010. For example, if the shopper is in an all-natural or organic aisle, it may be more likely that product 4010 corresponds to product 3904 as opposed to regular ketchup. As another example, the shopper may be near a promotional display which may narrow or limit the candidates for product 4010. It is to be understood that the additional information that may be used to identify product 4010 in conjunction with information from electronic shopping list 3900 is not limited to the types of information shown in FIG. 41 and any type of information described throughout the present disclosure may be used. This may include data from other sensors, data associated with other shoppers, detected actions by the shopper or other shoppers, or the like.

Figure 42:
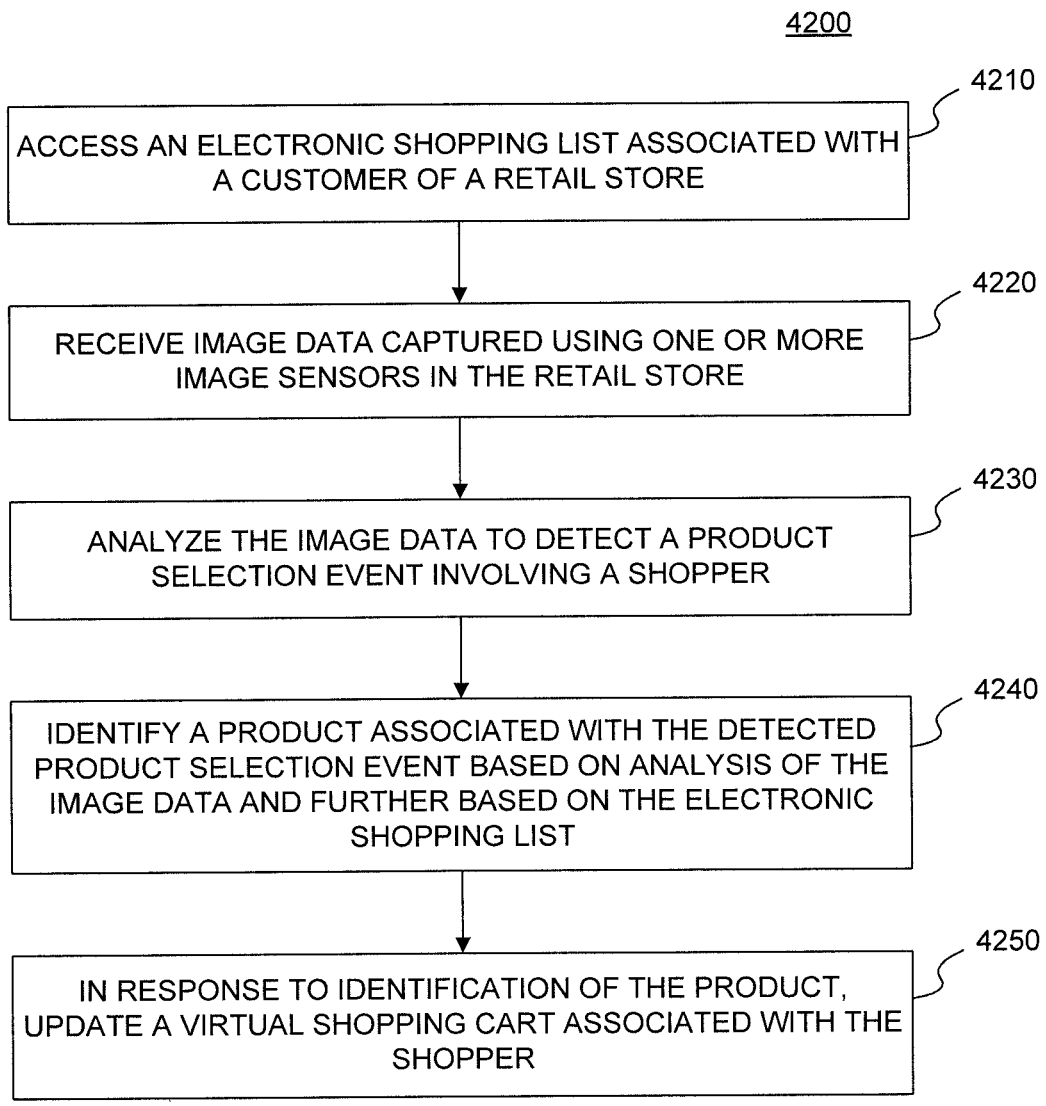
FIG. 42 is a flowchart of an exemplary method for using an electronic shopping list to resolve ambiguity associated with a selected product, consistent with the present disclosure.

FIG. 42 is a flowchart of an exemplary method for using an electronic shopping list to resolve ambiguity associated with a selected product, consistent with the present disclosure. Process 4200 may be performed by at least one processing device of a server, such as processing device 302, as described above. In some embodiments, some or all of process 4200 may be performed by a different device associated with system 100. In some embodiments, a non-transitory computer readable medium may contain instructions that when executed by a processor cause the processor to perform process 4200. Further, process 4200 is not necessarily limited to the steps shown in FIG. 42, and any steps or processes of the various embodiments described throughout the present disclosure may also be included in process 4200, including those described above with respect to FIGS. 39, 40A, 40B, and 41.

In step 4210, process 4200 includes accessing an electronic shopping list associated with a customer of a retail store. For example, this may include accessing electronic shopping list 3900 described above. The electronic shopping list may be stored in any location or plurality of locations accessible to server 135. For example, accessing the electronic shopping list may include accessing the electronic shopping list from a server, from a cloud storage platform, from a website or other online or web-based platform, a local device memory, or any other storage location. The electronic shopping list may be generated in various ways. In some embodiments, the electronic shopping list may be generated by the customer. For example, the customer may select one or more products for inclusion in the electronic shopping list through a user interface. Alternatively or additionally, the electronic shopping list may be automatically generated. For example, the electronic shopping list may be generated based on the customer's shopping history in the retail store. Accordingly, the electronic shopping list may be a historical list of items purchased by the customer, which may include the quantity or frequency of items being purchased, the time or date of purchase, or other information.

In step 4220, process 4200 includes receiving image data captured using one or more image sensors in the retail store. For example, this may include receiving image data from camera 4030. The image sensors may be positioned such that product interaction events may be detected using the image data. The image data may be processed using an image processing unit 130 as described above.

In step 4230, process 4200 includes analyzing the image data to detect a product selection event involving a shopper. For example, this may include detecting product selection event 4000, as shown in FIG. 40A. In some embodiments, the product selection event may be an ambiguous product selection event. In other words, at least one aspect of the selected product may not be clear or fully identified based on analysis of the image data alone. In some embodiments, the shopper may also be the customer of the retail store of step 4210. Alternatively or additionally, the shopper may be a proxy for the customer and may shop for the customer based on the electronic shopping list. For example, the shopper may be a "picker" or other individual tasked with shopping for one or more customers. Some other non-limiting examples of such ambiguous product selection events are described above, for example, in relation to FIGS. 18-20. In some embodiments, the shopper may be a robot.

In some embodiments, the shopper may be associated with a plurality of different electronic shopping lists. The different electronic shopping lists may correspond to different customers. For example, the shopper may select or pick products for multiple customers at the same time or at different times. Alternatively or additionally, the electronic shopping lists may correspond to the same customer. For example, the shopper may be the customer, but the customer may have multiple electronic shopping lists. Accordingly, process 4200 may further include analyzing the image data to select the electronic shopping list from the plurality of different electronic shopping lists, where the electronic shopping list corresponds to the detected product selection event. For example, the selection of the electronic shopping list may be based on a receptacle corresponding to the detected product selection event, as described above.

In step 4240, process 4200 includes identifying a product associated with the detected product selection event based on analysis of the image data and further based on the electronic shopping list. For example, based on the analysis of the image data, at least one characteristic of the selected product may be determined. Step 4240 may include comparing the at least one characteristic of the selected product to one or more characteristics of products included in the electronic shopping list. Based on a match between the determined at least one characteristic of the selected product with at least one characteristic of a product included in the electronic shopping list, the selected product may be identified. Referring to the example from FIG. 40B, the selected product may be identified as a ketchup bottle based on analysis of the image data, but it may not be clear exactly which ketchup product was selected. Step 4240 may include referencing the electronic shopping list to identify ketchup products included in the electronic shopping list. If the list includes a 20 oz. bottle of organic ketchup of a particular brand (e.g., product 3904), this information may be used to further identify the selected product.

Consistent with various embodiments of the present disclosure, step 4240 may include accessing additional information for identifying the product associated with the detected product selection event. For example, this may include accessing data from data source 4110, as described above. In some embodiments step 4240 may include accessing inventory information associated with the retail store, such as inventory data 4120. The identification of the product may further be based on the inventory information. For example, if a particular product is indicated as being out of stock, it may be likely that the selected product is not the particular product that is out of stock. In some embodiments, the electronic shopping list may include ranking information associated with the customer's past purchases of products of a particular product type group. In the event that a product listed on the electronic shopping list is indicated as being out of stock, step 4240 may include identifying the selected product based on the ranking information. For example, if when Pepsi Zero Sugar® is not available, the shopper or customer typically chooses Diet Pepsi®, when Pepsi Zero Sugar® is indicated as being out of stock, the selected product may be identified as Diet Pepsi® in step 4240. In some embodiments, process 4200 may include updating the electronic shopping list based on the inventory information. For example, the shopping list may be compared to the inventory information and may be modified to include substitutes for any items not in stock. For example, if Pepsi Zero Sugar® is not in stock, the shopping list may be automatically updated to include Diet Pepsi®. Accordingly, step 4240 may include basing the identification of the product on the updated electronic shopping list.

In some embodiments, step 4240 may include accessing planogram information indicative of a desired placement of products on shelves of the retail store. For example, this may include accessing planogram data 4130, as shown in FIG. 42. Accordingly, as described above, step 4240 may include further basing the identification of the product on the planogram information. For example, an area or approximate area the product was selected from may be compared to the planogram information to further identify the selected product.

As another example, step 4240 may include receiving product affinity information associated with the customer. For example, this may include product affinity data 4140, as shown in FIG. 42. As described above, the product affinity information may include indications of affinities between the customer and a product or product type. Alternatively or additionally, this may include pairwise affinities between products or product types. For example, the product affinity information may indicate a correlation between purchasing products of a first type and products of a second type by the same customers. The product affinity information may be specific to the customer (e.g., based on transaction history for the customer) or may be based on an aggregation of transaction history for a plurality of customers. The plurality of customers may be selected in various ways. For example, the plurality of customers may be customers of the same retail store, customers who have purchased a particular product (e.g., a product from the electronic shopping list that is out of stock), customers in the same geographical region as the retail store, customers with similar demographic data as the customer, or the like.

In some embodiments, data from sensors within the retail environment may also be used to identify the product. This may include the one or more image sensors in the retail store, or additional sensors described herein. For example, step 4240 may include analyzing the image data to determine a location of the shopper during the product selection event. This may include the shopper's position within the retail store, a direction the shopper is facing, or other information that may help identify which product was selected. Accordingly, step 4240 may further include basing the identification of the product on the determined location of the shopper.

In step 4250, process 4200 includes updating a virtual shopping cart associated with the shopper in response to identification of the product. For example, this may include updating virtual shopping cart 4050, as described above. The virtual shopping cart may be any form of data indicating which products have been selected by the shopper. For example, the virtual shopping cart may be a list, a table, an array, a database, or any other data structure suitable for tracking selected items. In some embodiments, the virtual shopping cart may be integrated into the electronic shopping list. For example, the electronic shopping list may include fields or other data elements indicating whether items on the electronic shopping list have been selected, which may also include a quantity of items selected. Consistent with the embodiments described above, the virtual shopping cart may further be associated with the customer. For example, if the shopper is a proxy shopper for the customer, the virtual shopping cart may also be associated with the customer.

In some embodiments, process 4200 may include additional steps not shown in FIG. 42. For example, process 4200 may further include automatically updating the electronic shopping list to indicate that the product from the electronic shopping list has been selected. Accordingly, process 4200 may further include using the updated electronic shopping list to identify one or more additional products associated with one or more additional product selection events.

In some embodiments, the retail store may include a frictionless checkout process, which may require the shopper to be eligible to use. Process 4200 may further include maintaining a frictionless shopping eligibility status associated with the shopper in response to identification of the product. In some embodiments, the frictionless shopping status may depend on a degree of confidence (e.g., a confidence score, etc.) associated with the identification of the product. Accordingly, process 4200 may include determining an indicator of a confidence level associated with the identification of the product and maintaining the friction shopping eligibility status for the shopper if the indicator of the confidence level is above a predetermined threshold. In some embodiments, the predetermined threshold may depend on various factors associated with the product selection event. For example, the predetermined threshold may vary based on a product type associated with the product. Thus, a predetermined threshold for more valuable or expensive items may be different than the predetermined threshold of other items. Similarly, the predetermined threshold may vary based on location in a retail store. The predetermined threshold may vary based on other factors, such as a time of the day, a number of customers in the store (i.e., how busy the store is), a number of associates present in the store, the identity of the shopper or customer, and more.

As described above, the disclosed embodiments may include the use of electronic shopping lists, which may indicate a list of items a customer intends to purchase. Accordingly, these electronic shopping lists may be used by a shopper when selecting products in a retail environment. For example, proxy shoppers who shop on behalf of one or more customers are becoming increasingly common in retail environments. These proxy shoppers may select and purchase items based on an electronic shopping list associated with a customer. As another example, a customer may generate his or her own electronic shopping list and may use it to select items in the retail store.

Typically, these electronic shopping lists are generated some time prior to products being selected in the retail environment. For example, a customer may generate an electronic shopping list including items to be selected by a shopper hours, days, or even weeks ahead of the items being selected. In some cases, products that were indicated as being available when the electronic shopping list was generated may no longer be available at the time the order is being fulfilled. This leaves the shopper with the burden of determining whether a replacement item should be selected and, if so, which available product best suit's the customer's needs or preferences. This situation may pose difficulties for a proxy shopper who might have little or no information regarding the customer's needs or preferences.

The embodiments disclosed herein address these and other issues by automatically selecting a best available substitute for a product that is out of stock. Based on image data from image sensors included in the retail store, an inventory shortage for products on an electronic shopping list can be detected or even predicted ahead of time. Based on the predicted inventory shortage, an electronic shopping list can automatically be updated to reflect the shortage, which may ease the burden on the shopper at the time of fulfilment of the order. Accordingly, the disclosed embodiments provide, among other advantages, improved efficiency, convenience, and functionality over prior art electronic shopping list management systems.

Consistent with the disclosed embodiments, a system, such as image processing unit 130 may access an electronic shopping list of one or more customers of a retail store. For example, as described above, server 135 may access electronic shopping list 3900, as shown in FIG. 39. Electronic shopping list 3900 may include at least one product associated with a shopping order. As used herein, a shopping order may refer to a request, command, or instruction for one or more items to be purchased. For example, electronic shopping list 3900 may include products 3902, 3904, and 3906, which a customer may have selected for purchase from a retail store. As described above, electronic shopping list 3900 may include information describing each product in the list, which may include one or more of a brand name, a model, a product type or subtype (e.g., a product flavor, diet vs. regular, whole vs. 2% milk, etc.), a product category, a unit or packaging type (e.g., can, bottle, jar, box, etc.), a product size, a product identifier (e.g. a SKU number), or any other information that may help to identify a particular product.

Figure 43:
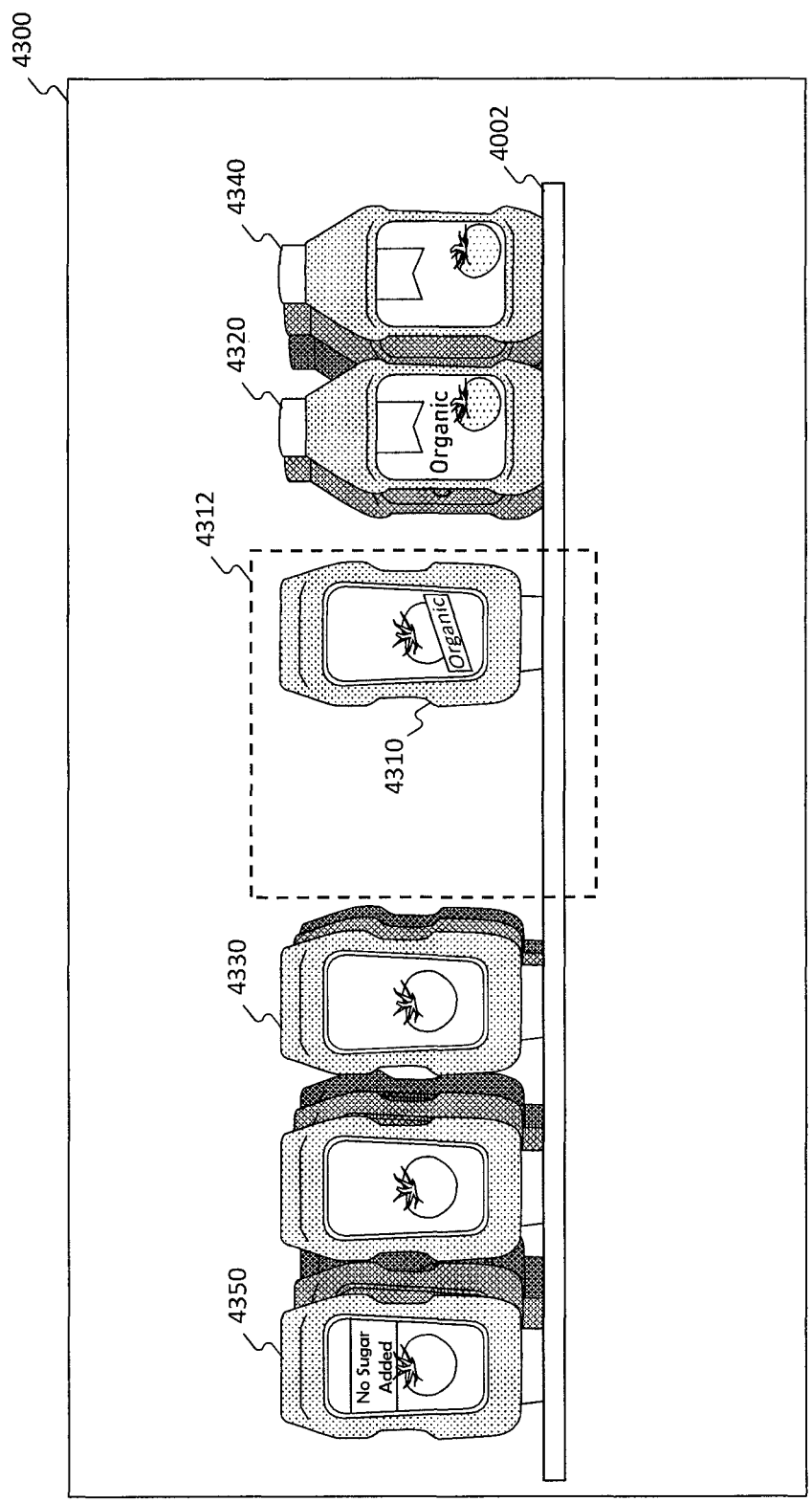
FIG. 43 illustrates an example image that may be analyzed to predict an inventory shortage, consistent with the present disclosure.

To determine when an electronic shopping list needs to be updated, the disclosed embodiments may include accessing image data from one or more image sensors included in a retail store. The images may be analyzed to predict an inventory shortage of one or more products included on an electronic shopping list. FIG. 43 illustrates an example image 4300 that may be analyzed to predict an inventory shortage, consistent with the present disclosure. Image 4300 may be captured by an image capture device, such as camera 4030 or image capture device 125 (including devices 125A, 125B, 125C, 125D, 125E, 125F, or 125G), as described above. Image 4300 may include at least portion of a shelf that may display products of a retail store. For example, image 4300 may include at least a portion of shelf 4002, as shown in FIG. 43. Server 135 may determine or predict an inventory shortage based on image 4300 or similar images captured by an image capture device. As used herein, an inventory shortage may refer to any condition in which a product is unavailable due to the physical quantity of the product within a retail environment. For example, an inventory shortage may occur when an item intended to be purchased is out of stock. This may refer to the item being out of stock on a retail shelf, the item being out of stock within the entirety of the retail store (e.g., including a stocking room, delivery receiving area, etc.), or within the greater supply chain of the retail store. In some embodiments, the inventory shortage may be based on a difference between a demand for a product and the current or planned inventory. For example, if a quantity of 4 units of a particular product is included on one or more shopping lists, but only 3 units of the product are in stock, this may indicate an inventory shortage exists. Additional details regarding inventory shortages are provided below.

As shown in FIG. 43, image 4300 may include representations of various products stocked on shelf 4002. For example, this may include a particular organic ketchup product 4310, which may correspond to product 3904 included in electronic shopping list 3900. Various other products 4320, 4330, 4340 and 4350 may also be placed on shelf 4002 and included in image 4300. Server 135 may analyze image 4300 to determine an inventory shortage for product 4310. For example, server 135 may analyze image 4300 to determine a number of units of product 4310 displayed on shelf 4002. In some embodiments, this may include identifying a portion 4312 of shelf 4002 dedicated to product 4310. Portion 4312 may be identified in various ways. For example, portion 4312 may be identified by analyzing one or more previous images to determine where product 4310 is typically stocked on shelf 4002. As another example, this may include accessing a planogram associated with shelf 4002, which may indicate an intended or planned area where product 4310 should be placed. In the example shown in FIG. 43, only one unit of product 4310 may be available. Accordingly, because the inventory for product 4310 is less than a quantity of item 3904 on electronic shopping list 3900, server 135 may determine a shortage of product 4310 exists. As another example, an inventory shortage may be identified any time quantity of available units for product 4310 reaches zero or drops before a predetermined threshold (e.g., 5 units, 2 units, etc.).

While simplified examples are provided above, additional or more factors may equally be considered for identifying an inventory shortage. In some embodiments, an inventory shortage with respect to a product included in an electronic shopping list may be determined based on a quantity of the product included in one or more additional electronic shopping lists. For example, server 135 may access electronic shopping lists for multiple shoppers associated with retail environment 135. If the number of units of a product included in the electronic shopping lists exceeds a detected inventory for a product on shelf 4002, an inventory shortage may be predicted. In some embodiments, an inventory shortage may be determined with respect to one or more particular electronic shopping lists. For example, each electronic shopping list may be associated with a specified or predicted time at which a shopper associated with the respective shopping list will select a product. In some embodiments, the times may be input by a shopper or customer when placing an order or generating the shopping list. As another example, the times may be scheduled by the retail store (e.g., indicating when a shopping order will be available for pickup, etc.).

In some embodiments, the times may be predicted based on other information. For example, an order may be estimated to be fulfilled within 24 hours of being placed, within 2 weeks of the time a previous order for a customer was fulfilled, or various other predetermined timeframes. In some embodiments, the expected or predicted time to fulfilment of an order may depend on a type of shopper. For example, as described above, a shopper may be the customer, or may be another entity, such as a proxy shopper, a store associate or another entity that may shop in place of a customer. A store associate may be expected to fulfil orders sooner than other types (or vice versa). Or, as another example, a store associate may be expected to fulfil orders at particular times based on a fulfilment schedule associated with the retail store. In some embodiments, rather than based on a category of shopper, server 135 may store and access historical information for a particular shopper or customer to predict a time for an order to be fulfilled. For example, if a particular shopper usually shops on Wednesday mornings, an order may be expected to be fulfilled during the morning of the next upcoming Wednesday. Based on the order in which shopping orders are expected to be fulfilled, an inventory shortage may be predicted with respect to only later electronic shopping lists where an inventory for a product is predicted to be depleted based on the quantity of a product included in prior electronic shopping lists.

Various other factors may also be used to determine or predict an inventory shortage. In some embodiments, information about a product may be tracked over time to predict an inventory shortage. As one example, an inventory of an item may be tracked over time to determine a rate at which a product is removed from a retail shelf. For example, this may include detecting a quantity of product 4310 on shelf 4002 in multiple images over time. Server 135 may determine an expected inventory for the product at an estimated fulfilment time for an electronic shopping list assuming the product continues to be selected at the same rate. This expected inventory may be compared to the quantity of a product included in an electronic shopping list to identify an inventory shortage. Similarly, the inventory may be tracked over time based on a detected rate at which the product is added to a virtual cart of one or more shoppers, or is purchased by one or more shoppers.

In some embodiments, a product delivery schedule for a product may also be taken into consideration. For example, server 135 may access a delivery schedule which may indicate a predicted time at which additional products will be received at the retail store. This may also include a scheduled quantity of a particular product to be delivered. This information may be used in conjunction with any of the various examples described above for determining an inventory shortage. For example, if 3 units of a product are included on a first shopping list and an additional unit of a product is included on a second shopping list, and only 3 units are detected as being in stock, this may typically trigger an inventory shortage prediction for the second electronic shopping list. However, if a shipment for the product is expected to be delivered prior to an expected fulfillment time for the second shopping list, no inventory shortage may be predicted.

Based on the predicted inventory shortage, server 135 may automatically update one or more electronic shopping lists. Accordingly, if an inventory shortage is predicted to occur before an order associated with the electronic shopping list is expected to be fulfilled, the updated shopping list may be used in place of the original shopping list. The updated shopping list may be modified to ease the burden on a shopper deciding how to respond to the inventory shortage. Accordingly, the updated shopping list may be presented to the shopper prior to or during fulfilment of the order.

Figure 44:
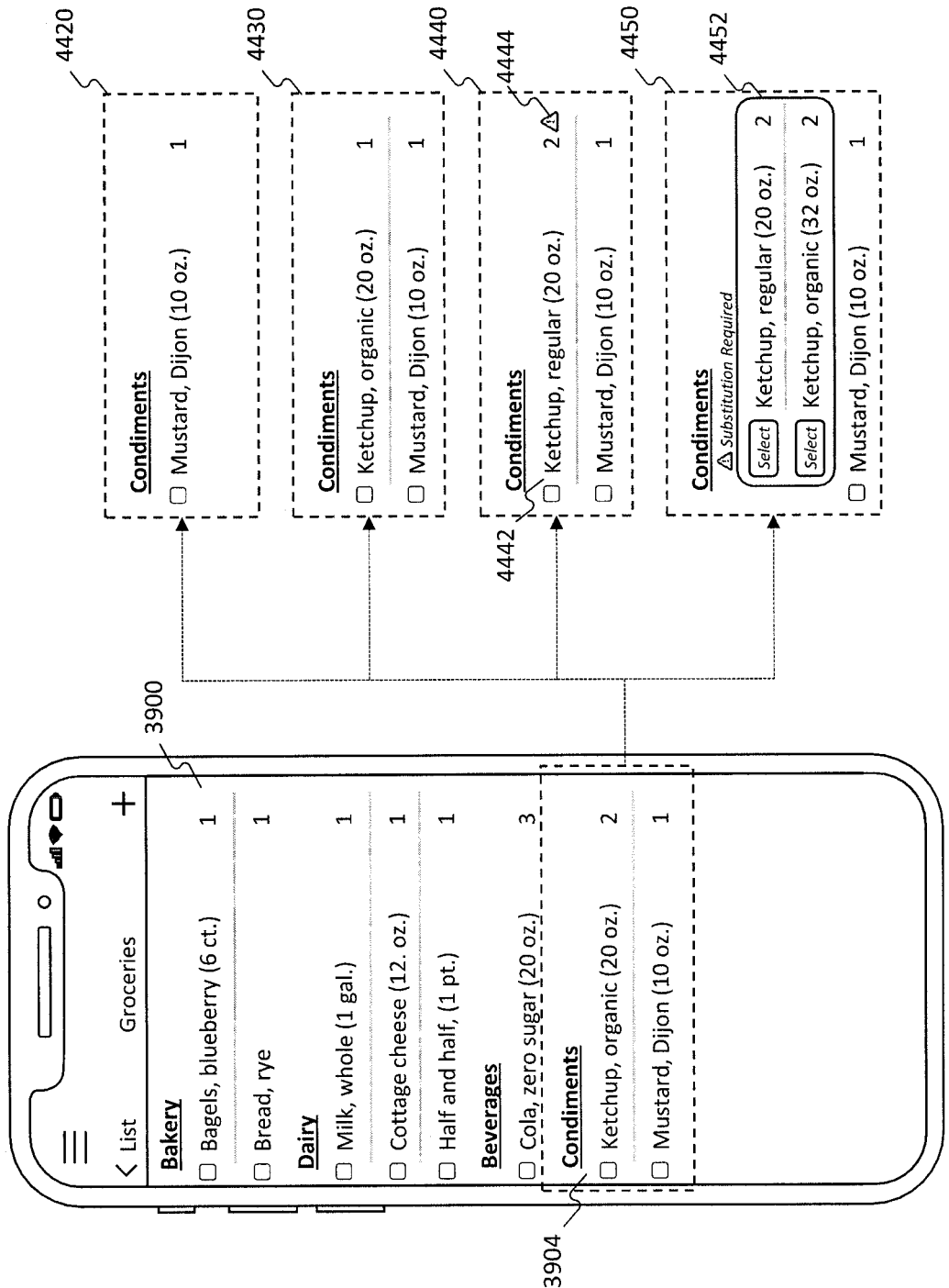
FIG. 44 is a diagrammatic illustration of various updates to an electronic shopping list that may be performed, consistent with the present disclosure.

The electronic shopping list may be updated in various ways based on the predicted inventory shortage. FIG. 44 is a diagrammatic illustration of various updates to electronic shopping list 3900 that may be performed, consistent with the present disclosure. As shown in FIG. 44, electronic shopping list 3900 may include item 3904, which may correspond to product 4310 shown in image 4300. As described above, an inventory shortage associated with product 4310 may be predicted. Server 135 may take various actions based on the predicted inventory shortage, including updates 4420, 4430, 4440, and 4450, as shown. In some embodiments, the updates may include removing an item from the electronic shopping list. For example, this may include removing item 3904 from electronic shopping list 3900 as illustrated in update 4420. This may be due to no units of product 3410 being available, an insufficient number of products 3410 being available to fulfil the quantity indicated in electronic shopping list 3900, or various other conditions described herein. As another example, the update may include updating a quantity of a product included on the electronic shopping list. For example, as illustrated in update 4430, this may include reducing the number of item 3904 included in electronic shopping list 3900 from 2 units to 1 unit. This reduction may be due to a prediction that only 1 unit of product 4310 will be available at the time an order associated with electronic shopping list 3900 is fulfilled, as illustrated in FIG. 43.

In some embodiments, the update to electronic shopping list 3900 may include substituting one product for another product in the list. For example, as illustrated by update 4440, server 135 may replace item 3904 with a replacement item 4442. In some embodiments, this may include visually identifying item 4442 as a substitute item, for example, by including a visual indicator 4444. Various other methods for identifying item 4442 as a substitute may be used, such as displaying item 4442 in a different font, different color, in a separate section of electronic shopping list 3900, or the like.

The product to be substituted into electronic shopping list 3900 may be identified in various ways. Substitute item 4442 may be selected from the same product category as the original item. In this example, replacement item 4442 may correspond to product 4330 shown in FIG. 43. In some embodiments, substitute item 4442 may be selected to have at least one attribute in common with item 3904. For example, product 4330 may be a regular bottle of ketchup of the same brand and size as product 4310. In some embodiments, substitute item 4442 may be selected to maximize the number of attributes in common with item 3904. For example, product 4330 may be selected over product 4340, which may be of a different product type (e.g., non-organic) and may be of a different brand than product 4310. In some embodiments, one or more attributes may be ranked or weighted higher than others. For example, it may be more important that substitute item 4442 have the same size and same product type (e.g., organic) than the same brand, or vice versa. In some embodiments, the rankings or relative weights of attributes may be customer-specific. For example, based on a shopping history for a customer, customer preference inputs, or the like, server 135 may identify certain attributes as being more important to a particular customer than others. Alternatively or additionally, the ranking or relative weights of attributes may vary based on a product category, a geographic location of a retail store, demographic information for a shopper (e.g., age, gender, etc.), or any other relevant factors.

In some embodiments, substitute item 4442 may be identified based on a shopping history for a shopper or customer. For example, if a customer purchases product 4330 more frequently than products 4320, 4340, or 4350, product 4330 may be selected for substitute item 4442. The shopping history may represent an entire shopping history for a customer or may be a subset of purchases. For example, the shopping history may be limited to occasions where product 4310 was out of stock to determine which product the customer purchases as a substitute. As other examples, the shopping history may be limited to a number of most recent transactions, transactions occurring at the same or similar time of day as the current shop, transactions occurring on the same day of the week or time of month as the current shop, transactions that also include another item of a particular product category (e.g., hot dogs, hamburger buns, mustard, etc.), or various other factors. In some embodiments, the shopping history may not be tied to a particular customer or shopper, but may be for all customers of a retail store, customers of a similar demographic as the current customer, recent transactions at the retail store, or the like.

According to some embodiments, substitute item 4442 may be selected based on product affinity information associated with the customer. For example, server 135 may access product affinity data 4140, as described above. For example, the product affinity information may be a ranking of historical purchases by a customer, which may indicate an affinity for a particular product. The product affinity information may also indicate an affinity for a particular product type. For example, if the customer consistently buys organic products, bulk products, low fat or fat-free varieties, or the like, it may indicate an affinity between the customer and this product type. As another example, the product affinity information may be based on a preference or other input from the customer. In some embodiments, the product affinity information may indicate a pairwise affinity between products or product types. For example, customers who commonly buy Brand X of deodorant may be more likely to buy Brand X (or even Brand Y) of shaving cream. As another example, customers who frequently buy organic products may commonly purchase sulfate-free products.

In some embodiments, the inventory of one or more other products may be considered in selecting substitute item 4442. For example, server 135 may identify product 4320 as being the best substitute for product 4310, but an inventory shortage with respect to product 4320 may also be identified with respect to product 4320. The inventory shortage for product 4320 may be predicted using the various methods described above with respect to product 4310. For example, although 2 units of product 4320 are shown as being stocked in image 4300, product 4320 may be included on one or more electronic shopping lists expected to be fulfilled before electronic shopping list 3900. Accordingly, product 4330 may be selected as a substitute instead. In some embodiments, a ranking of substitute products may be determined, which may be based on any of the methods for selecting a substitute product described herein. Accordingly, this ranking may be used to select substitute item 4442 in the event that one or more products are also associated with predicted inventory shortages.

In some embodiments, substitute item 4442 may be selected based on an optimization process for multiple electronic shopping lists. For example, the customer associated with electronic shopping list 3900 may not have a strong preference or requirement that products be organic, whereas a second customer associated with an electronic shopping list expected to be fulfilled after electronic shopping list 3900 may have a requirement for organic products. If product 4320 is selected as substitute item 4442 in electronic shopping list 3900, this may leave no organic products available for the second customer. Accordingly, server 135 may select product 4330 as substitute item 4442 to leave product 4320 available for the second customer. As another example, this may include suggesting or performing a substitution on an electronic shopping list not associated with a predicted inventory shortage in order to resolve or better address predicted inventory shortages on other electronic shopping lists. For example, if product 4310 is predicted to be available at the time a first electronic shopping list is expected to be fulfilled but not at the time a second electronic shopping list is expected to be fulfilled, server 135 may suggest a substitution of product 4330 on the first electronic shopping list if a customer associated with the second electronic shopping list has a greater preference for organic products than a customer associated with the first electronic shopping list. As one skilled in the art would recognize, more complex optimizations may be performed for as a greater number of electronic shopping lists are considered.

According to some embodiments, substitute item 4442 may be selected at least in part based on an input from a customer or shopper associated with electronic shopping list 3900. For example, server 135 may send a notice to the customer regarding the predicted inventory shortage and may receive a selection from the customer of one or more alternate products to include as substitute item 4442. In some embodiments, this may include a request for the customer to select the substitute product from a list of all available products in the retail store, or a subset of products (e.g., products of the same product category or type, etc.). Alternatively or additionally, server 135 may suggest one or more products and the customer may confirm a suggested substitute or select from multiple substitute products. For example, server 135 may present an interface 4452 to receive a selection from a customer or shopper from multiple suggested substitute products. Interface 4452 may be integrated into a display of electronic shopping list 3900, as shown in FIG. 44, or may be displayed as part of a separate interface or menu.

While various updates 4420, 4430, 4440, and 4450 are provided by way of example, it is to be understood that various other updates to electronic shopping list 3900 may be made, consistent with the present disclosure. In some embodiments, multiple updates may be made to the same electronic shopping list. For example, if only one of product 4310 is available, the updates may include reducing the quantity of item 3904 by one and adding a quantity of one substitute item 4442 to electronic shopping list 3900. In some embodiments, server 135 may make updates to more than one electronic shopping list. For example, this may include substituting an item on a first list and removing an item from a second list.

As an alternative to or in addition to the updates described above, various other actions may be taken based on identification of an inventory shortage. For example, this may include automatically sending a notice to a customer regarding an automatic update to the electronic shopping list. This may include transmitting a notice to device 3910 or device 125. Similarly, server 135 may transmit a notice or alert identifying the predicted shortage to a store associate, a store manager, a supplier associate with the product, an inventory management system, or the like. In some embodiments, server 135 may automatically submit a restocking request, submitting an order for additional products, marking a product as unavailable on a website or other database, or other actions to mitigate the predicted inventory shortage.

Figure 45:
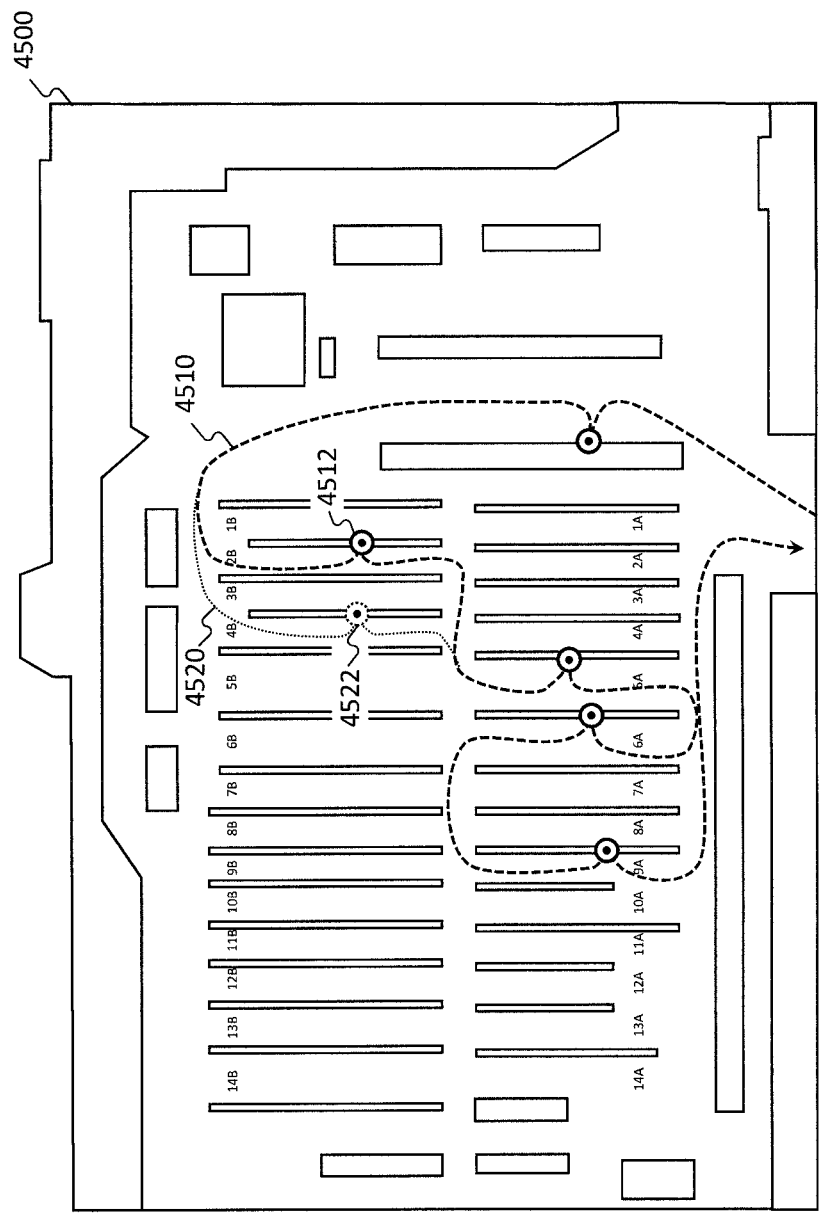
FIG. 45 illustrates an example shopping path that may be generated based on an updated electronic shopping list, consistent with the present disclosure.

In some embodiments, server 135 may generate a shopping path associated with the updated electronic shopping list. The shopping path may represent a suggested or optimized route a shopper should take through a retail store to select the items in the electronic shopping list. FIG. 45 illustrates an example shopping path 4510 that may be generated based on an updated electronic shopping list, consistent with the present disclosure. For example, an inventory shortage may be predicted with respect to product 4522 and, as a result, product 4512 may be substituted in the electronic shopping list for product 4522 as described above. Accordingly, shopping path 4510 may be generated to include substitute product 4512, as shown in FIG. 45. As another example, product 4522 may be removed and the shopping path may be generated not to include either of products 4512 and 4522. In some embodiments, generating the shopping path may include updating a previous shopping path. For example, if product 4512 is substituted for product 4522, a previous shopping path 4520 may be updated to shopping path 4510, as shown. While shopping path 4510 is shown as a path overlaid on a map 4500 of a retail store, the shopping path may be represented in any suitable way to show flow or order of selections through a retail store. For example, the shopping path may include a series of locations (e.g., coordinates, store aisles or sections, etc.), an ordered list of items, a display in an augmented reality device, or the like. Generating the shopping path may include making the shopping path available to a customer, a store associated, a shopper, or another entity associated with the electronic shopping list.

Consistent with the disclosed embodiments, image data may be continuously or periodically analyzed to predict inventory shortage events. For example, this may include continuous monitoring of image frames, analyzing images at specified intervals (e.g., every minute, 10 minutes, every hour, every 6 hours, etc.), after a trigger event (e.g., when a new item is added to an electronic shopping list, when a new electronic shopping list is submitted or created, or various other events). In some embodiments, various events may be detected that resolve or negate a predicted inventory shortage. For example, server 135 may identify a restocking event associated with a product, which may resolve a predicted inventory shortage. As other examples, a customer may return a product to a shelf or a retail store, a delivery or restocking of a product may be scheduled, an intervening electronic shopping list may be canceled, a product may be removed from an intervening electronic shopping list, or other events may occur that resolve an inventory shortage. Accordingly, server 135 may update the updated shopping list based on the restocking event or other event. For example, this may include adding a product back to the electronic shopping list, removing a substitute item from the electronic shopping list, increasing a quantity of an item, or the like.

Figure 46:
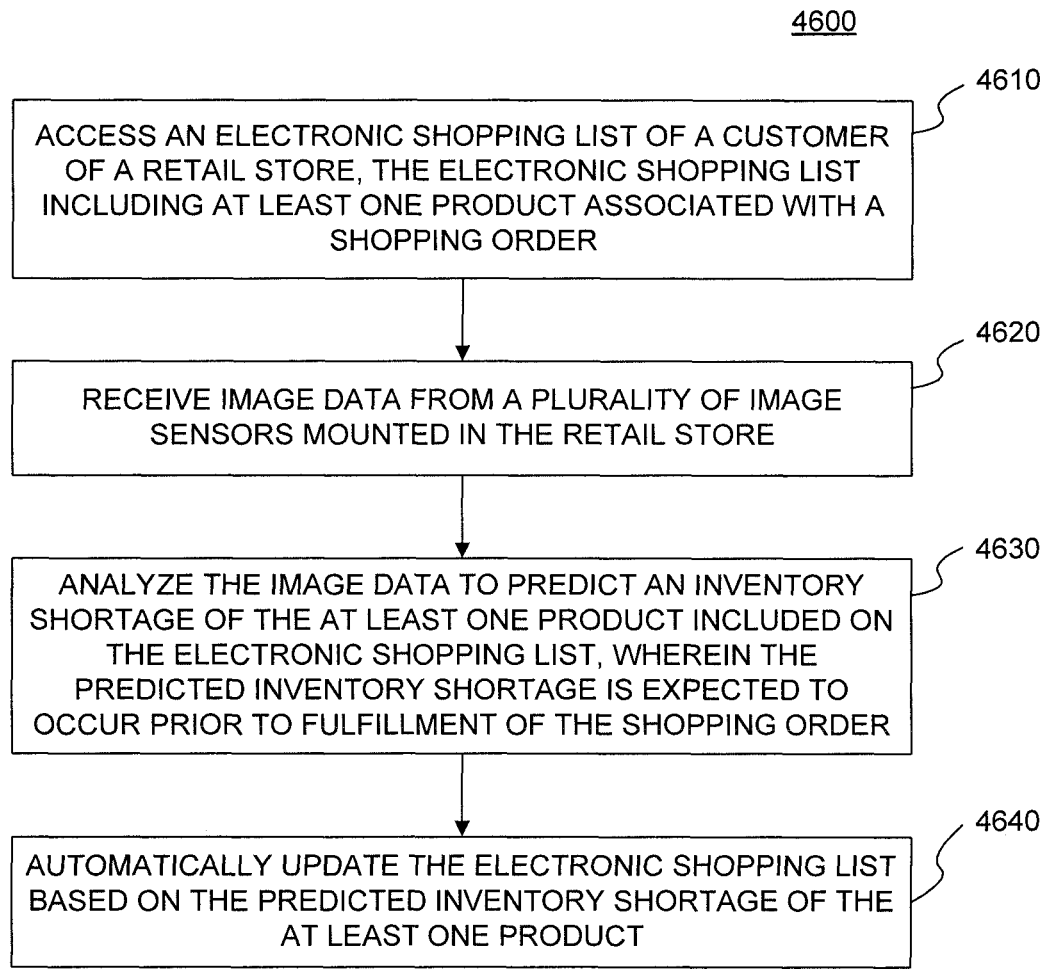
FIG. 46 is a flowchart of an exemplary method for automatically updating electronic shopping lists of customers of retail stores, consistent with the present disclosure.

FIG. 46 is a flowchart of an exemplary method for automatically updating electronic shopping lists of customers of retail stores, consistent with the present disclosure. Process 4600 may be performed by at least one processing device of a server, such as processing device 302, as described above. In some embodiments, some or all of process 4600 may be performed by a different device associated with system 100. In some embodiments, a non-transitory computer readable medium may contain instructions that when executed by a processor cause the processor to perform process 4600. Further, process 4600 is not necessarily limited to the steps shown in FIG. 46, and any steps or processes of the various embodiments described throughout the present disclosure may also be included in process 4600, including those described above with respect to FIGS. 43, 44, and 45.

In step 4610, process 4600 includes accessing an electronic shopping list of a customer of a retail store. For example, this may include accessing electronic shopping list 3900 described above. Consistent with the disclosed embodiments, the electronic shopping list may include at least one product associated with a shopping order. The electronic shopping list may be stored in any location or plurality of locations accessible to server 135. For example, accessing the electronic shopping list may include accessing the electronic shopping list from a server, from a cloud storage platform, from an online website or other web-based platform, a local device memory, or any other storage location. The electronic shopping list may be generated in various ways. In some embodiments, the electronic shopping list may be generated by the customer. For example, the customer may select one or more products for inclusion in the electronic shopping list through a user interface. Alternatively or additionally, the electronic shopping list may be automatically generated. For example, the electronic shopping list may be generated automatically based on the customer's shopping history in the retail store.

Fulfilment of the shopping order may be completed by various entities, including the customer, a store associated of the retail store, a proxy shopper, or the like. In some embodiments, the electronic shopping list may be associated with an expected fulfillment time. For example, the fulfilment time may depend on a type of the shopper expected to fulfill the shopping order. The fulfilment time may be estimated or determined based on other factors, as described in greater detail above.

In step 4620, process 4600 includes receiving image data from a plurality of image sensors mounted in the retail store. For example, this may include receiving image 4300, which may be captured by camera 4030. The image sensors may be positioned such that an inventory for items may be ascertained using the image data. The image data may be processed using an image processing unit 130 as described above.

In step 4630, process 4600 includes analyzing the image data to predict an inventory shortage of the at least one product included on the electronic shopping list. The predicted inventory shortage may have occurred or may be expected to occur prior to fulfillment of the shopping order. The inventory shortage may be predicted in various ways, as described above. For example, the inventory shortage may be predicted based on a determination that the at least one product is currently out of stock. Various other factors may also be considered to predict the inventory shortage, including a detected rate at which the at least one product is added to a virtual cart, a detected rate at which the at least one product is removed from a retail shelf, a quantity of the at least one product included in electronic shopping lists associated with additional shopping orders expected to be fulfilled prior to fulfilment of the shopping order, a product delivery schedule associated with the retail store, or any other information that may indicate that the at least one product will not be available at the time of fulfilment of the shopping order. In some examples, a convolution of at least part of the image data may be calculated. Further, in response to a first value of the calculated convolution of the at least part of the image data, an inventory shortage of the at least one product included on the electronic shopping list may be predicted, and in response to a second value of the calculated convolution of the at least part of the image data, no inventory shortage of the at least one product included on the electronic shopping list may be predicted. For example, the inventory shortage of the at least one product included on the electronic shopping list may be predicted when the value of the calculated convolution of the at least part of the image data is a particular group of values.

In step 4640, process 4600 includes automatically updating the electronic shopping list based on the predicted inventory shortage of the at least one product. The electronic shopping list may be updated in a variety of ways, as described in detail above. For example, automatically updating the electronic shopping list may include removing the at least one product from the electronic shopping list, as described above with respect to update 4420. Similarly, automatically updating the electronic shopping list may include reducing a quantity of the at least one product included on the electronic shopping list, as described above with respect to update 4430. In some embodiments, updating the electronic shopping list may include substituting the at least one product with a second product. For example, the second product may be selected based on a shopping history associated with the customer or product affinity information associated with the customer, as described above. In some embodiments, the second product may be selected based on an inventory of a third product, which may differ from the at least one product and from the second product. For example, an ordinary substitute for the at least one product may be the third product, but a low inventory of the third product may cause a substitute by the second product. The inventory of the third product may include an inventory prior to fulfillment of the shopping order, a predicted inventory at an expected time of the fulfillment of the shopping order, a current inventory, or various other inventories. In some embodiments, the inventory of the third product may be determined based on image analysis, as performed in step 4630.

In some embodiments, step 4640 may include receiving input from the customer regarding the substitute product. For example, step 4640 may include sending a notice to the customer regarding the predicted inventory shortage and receiving a selection from the customer of the at least one alternate product. Based on the selection, step 4640 may include substituting the at least one product on the electronic shopping list with the at least one alternate product. In some embodiments, step 4640 may further include identifying to the customer the at least one alternate product. Accordingly, the user may confirm or select from the presented at least one alternate product. In some embodiments, the at least one alternate product may be identified based on a shopping history associated with the customer. Alternatively or additionally, the at least one alternate product may be identified based on product affinity information associated with the customer.

In some embodiments, process 4600 may include additional steps not shown in FIG. 46. For example, process 4600 may include automatically sending a notice to the customer regarding the automatic update to the electronic shopping list. Similarly, process 4600 may include automatically sending a notice to a store associate, a store manager, a supplier of the at least one product, or other entity indicating the predicted inventory shortage. In some embodiments, process 4600 may further include taking one or more actions to resolve the predicted inventory shortage. For example, this may include automatically submitting an order for the at least one product, automatically scheduling a restocking event associated with the at least one product, removing a product from being displayed as available on an online website or other list of products, or various other actions.

In some embodiments, process 4600 may include generating a shopping path associated with the updated electronic shopping list. For example, this may include generating shopping path 4510, as described above with respect to FIG. 45. In some embodiments, generating the shopping path may include updating a previously generated shopping path based on the updated electronic shopping list. For example, this may include removing a portion of a path associated with the at least one product, recalculating an optimized path through a retail environment, or similar updates. The generated shopping path may be provided to the customer, the shopper (e.g., a proxy shopper), a store associate, or other entities associated with the electronic shopping list. For example, the generated shopping path may be displayed on a user interface, overlaid on a map of the retail store, presented as a series of locations within the retail store, displayed through an augmented reality device, presented audibly, or presented through various other means.

As described above, process 4600 may further include updating the updated shopping list as additional information is received. For example, process 4600 may include receiving additional image data from the plurality of image sensors, analyzing the additional image data to identify a restocking event associated with the at least one product, and updating the updated shopping list based on the restocking event. For example, updating the updated shopping list may include adding the at least one product back to the electronic shopping list, increasing a quantity of the at least one product on the electronic shopping list, removing a substitute item added to the electronic shopping list, or the like. In some embodiments, the updated shopping list may be updated based on other information, such as the at least one product being detected as being returned to the shelf (e.g., by a customer, etc.), the at least one product being returned to the retail store, a delivery of the at least one product being scheduled, or any other information that may affect the predicted inventory shortage.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, 4K Ultra HD Blu-ray, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A non-transitory computer-readable medium including instructions that when executed by a processor cause the processor to perform a method for determining whether shoppers are eligible for frictionless checkout, the method comprising:
    obtaining image data captured using a plurality of image sensors positioned in a retail store;
    analyzing the image data to identify at least one shopper at one or more locations of the retail store;
    detecting, based on the analysis of the image data, at least one product interaction event associated with an action of the at least one shopper at the one or more locations of the retail store;
    determining whether the at least one shopper is eligible for frictionless checkout based on a determination that a number of ambiguous events among the detected at least one product interaction event exceeds a predetermined threshold number of ambiguous events; and
    in response to a determination that the at least one shopper is ineligible for frictionless checkout, causing delivery of an indicator that the at least one shopper is ineligible for frictionless checkout.

2. The non-transitory computer-readable medium of claim 1, wherein the method further comprises:
    obtaining sensor data from one or more sensors disposed on a retail shelf between the retail shelf and one or more products placed on the retail shelf; and
    wherein the at least one product interaction event is detected based on analysis of the image data and the sensor data.

3. The non-transitory computer-readable medium of claim 1, wherein the at least one shopper includes a plurality of shoppers, and wherein identifying the at least one shopper at the one or more locations of the retail store includes determining an individual path for each of the plurality of shoppers in the retail store.

4. The non-transitory computer-readable medium of claim 1, wherein the at least one product interaction event is detected based on a plurality of products that the at least one shopper is expected to buy.

5. The non-transitory computer-readable medium of claim 1, wherein the action of the at least one shopper includes removing a product from a shelf associated with the retail store.

6. The non-transitory computer-readable medium of claim 1, wherein the action of the at least one shopper includes returning a product to a shelf associated with the retail store.

7. The non-transitory computer-readable medium of claim 1, wherein determining whether the at least one shopper is eligible for frictionless checkout is based on at least one indicator of a degree of ambiguity associated with the detected at least one product interaction event.

8. The non-transitory computer-readable medium of claim 1, wherein determining whether the at least one shopper is eligible for frictionless checkout is based on whether the at least one shopper is detected removing or selecting a product from a shelf that is designated as ineligible for frictionless checkout.

9. The non-transitory computer-readable medium of claim 1, wherein determining whether the at least one shopper is eligible for frictionless checkout includes determining an indicator of a confidence level associated with each detected product interaction event.

10. The non-transitory computer-readable medium of claim 1, wherein the method further comprises:
    obtaining cart data indicative of an actual plurality of products within a cart of a particular shopper;
    determining, based on analysis of the detected at least one product interaction event, an expected plurality of products within the cart of the particular shopper;
    determining whether a discrepancy exists between the actual plurality of products and the expected plurality of products; and
    determining that the particular shopper is ineligible for frictionless checkout based on the determined discrepancy.

11. The non-transitory computer-readable medium of claim 1, wherein the determination that the at least one shopper is ineligible for frictionless checkout is based on a determination of a product value associated with one or more ambiguous events among the detected at least one product interaction event.

12. The non-transitory computer-readable medium of claim 1, wherein the method further comprises:
    accessing a customer profile associated a particular shopper; and
    foregoing the delivery of the indicator that the particular shopper is ineligible for frictionless checkout based on information associated with the customer profile.

13. The non-transitory computer-readable medium of claim 1, wherein causing the delivery of the indicator that the at least one shopper is ineligible for frictionless checkout includes sending a notification to a wearable device associated with the at least one shopper.

14. The non-transitory computer-readable medium of claim 1, wherein causing the delivery of the indicator that the at least one shopper is ineligible for frictionless checkout includes sending a notification to a mobile device associated with the at least one shopper.

15. The non-transitory computer-readable medium of claim 1, wherein causing the delivery of the indicator that the at least one shopper is ineligible for frictionless checkout includes causing a notification to be generated by a shopping cart associated with the at least one shopper.

16. The non-transitory computer-readable medium of claim 1, wherein causing a delivery of the indicator that the at least one shopper is ineligible for frictionless checkout includes sending a notification to a computing device associated with a store associate of the retail store.

17. The non-transitory computer-readable medium of claim 1, wherein the delivery of the indicator that the at least one shopper is ineligible for frictionless checkout occurs after the at least one shopper enters a checkout area of the retail store.

18. The non-transitory computer-readable medium of claim 1, wherein the method further comprises:
    causing an ambiguity resolution action in response to a detection of at least one ambiguous event among the detected at least one product interaction event; and
    causing an eligibility status for frictionless checkout for the at least one shopper to be restored based on data associated with a completion of the ambiguity resolution action.

19. The non-transitory computer-readable medium of claim 1, wherein the predetermined threshold number of ambiguous events is based on a total number of product interaction events included in the at least one product interaction event.

20. A method for determining whether shoppers are eligible for frictionless checkout, the method comprising:
    obtaining image data captured using a plurality of image sensors positioned in a retail store;
    analyzing the image data to identify at least one shopper at one or more locations of the retail store;
    detecting, based on the analysis of the image data, at least one product interaction event associated with an action of the at least one shopper at the one or more locations of the retail store;
    determining whether the at least one shopper is eligible for frictionless checkout based on a determination that a number of ambiguous events among the detected at least one product interaction event exceeds a predetermined threshold number of ambiguous events; and
    in response to a determination that the at least one shopper is ineligible for frictionless checkout, causing delivery of an indicator that the at least one shopper is ineligible for frictionless checkout.

21. A system for determining whether shoppers are eligible for frictionless checkout, the system comprising:
    at least one processor programmed to:
        obtain image data captured using a plurality of image sensors positioned in a retail store;
        analyze the image data to identify at least one shopper at one or more locations of the retail store;
        detect, based on the analysis of the image data, at least one product interaction event associated with an action of the at least one shopper at the one or more locations of the retail store;
        determine whether the at least one shopper is eligible for frictionless checkout based on a determination that a number of ambiguous events among the detected at least one product interaction event exceeds a predetermined threshold number of ambiguous events; and
        in response to a determination that the at least one shopper is ineligible for frictionless checkout, cause delivery of an indicator that the at least one shopper is ineligible for frictionless checkout.

* * * * *